United States Patent
Dong

(10) Patent No.: US 10,990,461 B2
(45) Date of Patent: Apr. 27, 2021

(54) APPLICATION INTERACTION METHOD, INTERACTION METHOD AND APPARATUS

(71) Applicant: Beijing Xiaomi Mobile Software Co., Ltd., Beijing (CN)

(72) Inventor: Hongguang Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/699,416

(22) Filed: Nov. 29, 2019

(65) Prior Publication Data

US 2020/0192731 A1 Jun. 18, 2020

Related U.S. Application Data

(63) Continuation of application No. PCT/CN2017/114508, filed on Dec. 4, 2017.

(30) Foreign Application Priority Data

Jun. 14, 2017 (CN) .......................... 201710448714.2
Jun. 14, 2017 (CN) .......................... 201710449172.0
(Continued)

(51) Int. Cl.
*G06F 9/54* (2006.01)
*G06F 9/451* (2018.01)
(Continued)

(52) U.S. Cl.
CPC ................ *G06F 9/546* (2013.01); *G06F 8/61* (2013.01); *G06F 9/451* (2018.02); *H04L 67/28* (2013.01);
(Continued)

(58) Field of Classification Search
None
See application file for complete search history.

(56) References Cited

U.S. PATENT DOCUMENTS

| 6,094,684 | A | 7/2000 | Pallmann |
| 9,075,508 | B1 | 7/2015 | Cronin |

(Continued)

FOREIGN PATENT DOCUMENTS

| CN | 102932375 A | 2/2013 |
| CN | 103135969 A | 6/2013 |

(Continued)

OTHER PUBLICATIONS

English translation of Written Opinion of the International Searching Authority of PCT Application No. PCT/CN2017/114508, dated Mar. 15, 2018, issued by the ISA/CN—State Intellectual Property Office of the P.R. China.

(Continued)

*Primary Examiner* — Shih-Wei Kraft
(74) *Attorney, Agent, or Firm* — Finnegan, Henderson, Farabow, Garrett & Dunner, L.L.P.

(57) ABSTRACT

The present disclosure provides an application interaction method, an interaction method, and an apparatus. The application interaction method includes: acquiring a target message passing through an operating system; extracting a target application parameter from the target message, wherein the target application parameter includes at least an identifier of the target application; and launching the target application according to the target application parameter. By using the application interaction method provided by the present disclosure, interaction between applications is made available through the operating system of a user terminal, which not only improves the interaction efficiency between applications, but also ensures the accuracy of switch to a target (Continued)

application, thereby improving user experience on the terminal.

12 Claims, 65 Drawing Sheets

(30) Foreign Application Priority Data

| | | |
|---|---|---|
| Jul. 7, 2017 | (CN) | 201710551720.0 |
| Jul. 7, 2017 | (CN) | 201710552645.X |
| Jul. 7, 2017 | (CN) | 201710552952.8 |
| Jul. 7, 2017 | (CN) | 201710552955.1 |
| Jul. 7, 2017 | (CN) | 201710553136.9 |
| Jul. 7, 2017 | (CN) | 201710553148.1 |

(51) Int. Cl.
    *G06F 8/61*      (2018.01)
    *H04L 29/08*      (2006.01)

(52) U.S. Cl.
    CPC ............ *H04L 67/32* (2013.01); *H04L 67/34* (2013.01); *H04L 67/141* (2013.01)

(56) References Cited

U.S. PATENT DOCUMENTS

| | | | |
|---|---|---|---|
| 9,348,671 B1* | 5/2016 | Chen | G06F 11/3003 |
| 9,558,051 B1 | 1/2017 | Taylor | |
| 2005/0060412 A1* | 3/2005 | Chebolu | G06F 9/44505 |
| | | | 709/227 |
| 2014/0229898 A1* | 8/2014 | Terwedo | G06F 3/04842 |
| | | | 715/835 |
| 2015/0153911 A1 | 6/2015 | Seymour et al. | |
| 2015/0156257 A1 | 6/2015 | Li et al. | |
| 2015/0301873 A1 | 10/2015 | Liang et al. | |
| 2015/0317559 A1 | 11/2015 | Cronin | |
| 2016/0118060 A1 | 4/2016 | Yadav et al. | |
| 2016/0139776 A1 | 5/2016 | Donahue et al. | |
| 2017/0046180 A1* | 2/2017 | Desineni | G06F 9/542 |
| 2017/0061010 A1* | 3/2017 | Lee | G06F 16/955 |
| 2017/0116339 A1* | 4/2017 | Stein | G06F 16/9535 |
| 2017/0132023 A1* | 5/2017 | Desineni | G06F 9/44521 |
| 2017/0160883 A1 | 6/2017 | Yuan | |
| 2017/0188213 A1* | 6/2017 | Nirantar | H04W 4/20 |
| 2017/0289339 A1* | 10/2017 | Riva | G06F 9/4843 |

FOREIGN PATENT DOCUMENTS

| | | |
|---|---|---|
| CN | 103823715 A | 5/2014 |
| CN | 103973730 A | 8/2014 |
| CN | 104125258 A | 10/2014 |
| CN | 104317648 A | 1/2015 |
| CN | 104504313 A | 4/2015 |
| CN | 104980512 A | 10/2015 |
| CN | 105094862 A | 11/2015 |
| CN | 105122240 A | 12/2015 |
| CN | 105141709 A | 12/2015 |
| CN | 105302561 A | 2/2016 |
| CN | 105376189 A | 3/2016 |
| CN | 105553942 A | 5/2016 |
| CN | 105574170 A | 5/2016 |
| CN | 105763630 A | 7/2016 |
| CN | 105808725 A | 7/2016 |
| CN | 105915703 A | 8/2016 |
| CN | 105955723 A | 9/2016 |
| CN | 106095549 A | 11/2016 |
| CN | 106126033 A | 11/2016 |
| CN | 106293652 A | 1/2017 |
| CN | 106294372 A | 1/2017 |
| CN | 106325685 A | 1/2017 |
| CN | 106406931 A | 2/2017 |
| CN | 106469044 A | 3/2017 |
| CN | 106503134 A | 3/2017 |
| CN | 106528657 A | 3/2017 |
| CN | 106599231 A | 4/2017 |
| CN | 106651522 A | 5/2017 |
| CN | 106681746 A | 5/2017 |
| CN | 106815037 A | 6/2017 |
| CN | 106817420 A | 6/2017 |
| CN | 106844019 A | 6/2017 |
| JP | 4768375 B2 | 6/2011 |
| WO | WO 2013/039540 A1 | 3/2013 |
| WO | WO 2014/152936 A2 | 9/2014 |

OTHER PUBLICATIONS

Office Action dated Feb. 3, 2020, in counterpart Chinese Application No. 201710449172.0.
ISA State Intellectual Property Office of the People's Republic of China, International Search Report issued in Application No. PCT/CN2017/114508, dated Mar. 15, 2018, WIPO, 4 pages.
Extended European Search Report for Application No. 17913542.1, dated Apr. 1, 2020.
State Intellectual Property Office of the People's Republic of China, Office Action and Search Report Issued in Application No. 201710448714.2, dated Jul. 29, 2020, 16 pages.
State Intellectual Property Office of the People's Republic of China, Office Action and Search Report Issued in Application No. 201710449172.0, dated Aug. 25, 2020, 15 pages.

* cited by examiner

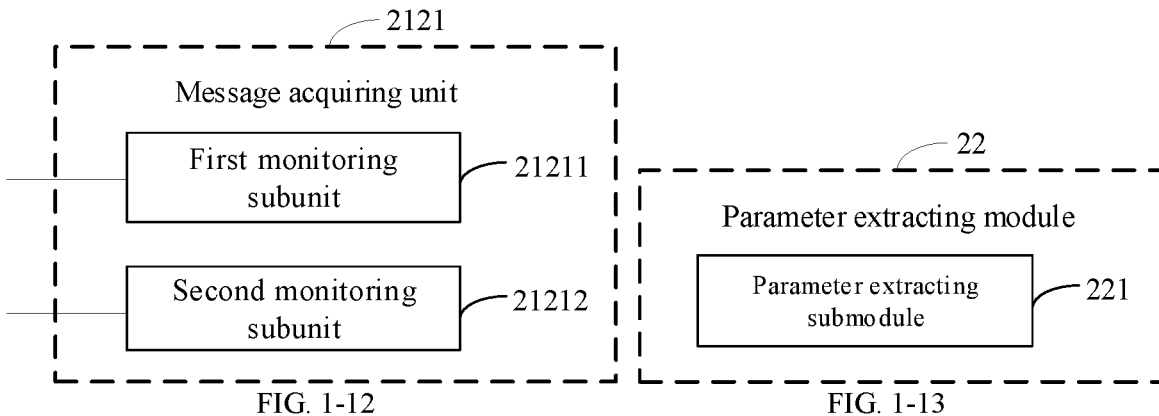
FIG. 1-12
FIG. 1-13
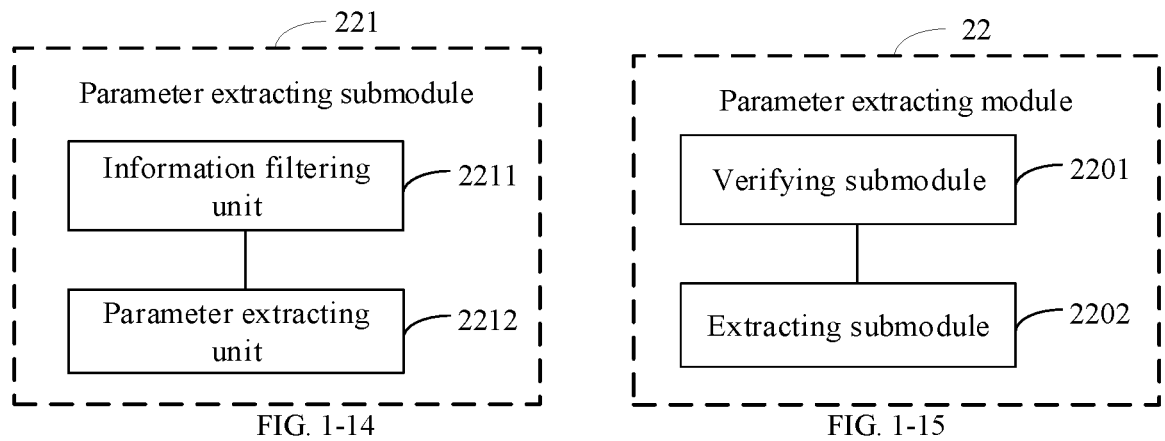
FIG. 1-14
FIG. 1-15
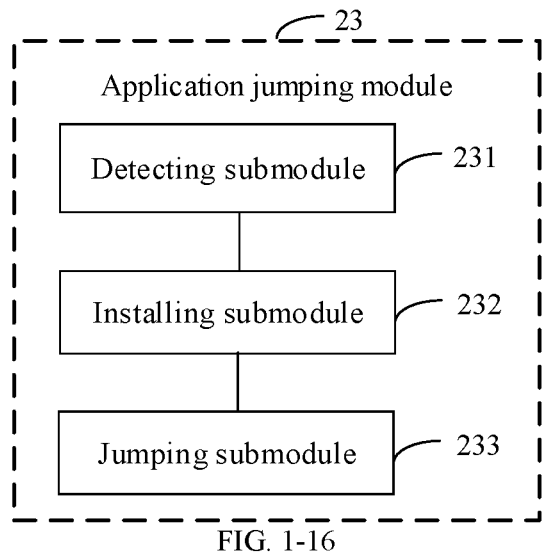
FIG. 1-16

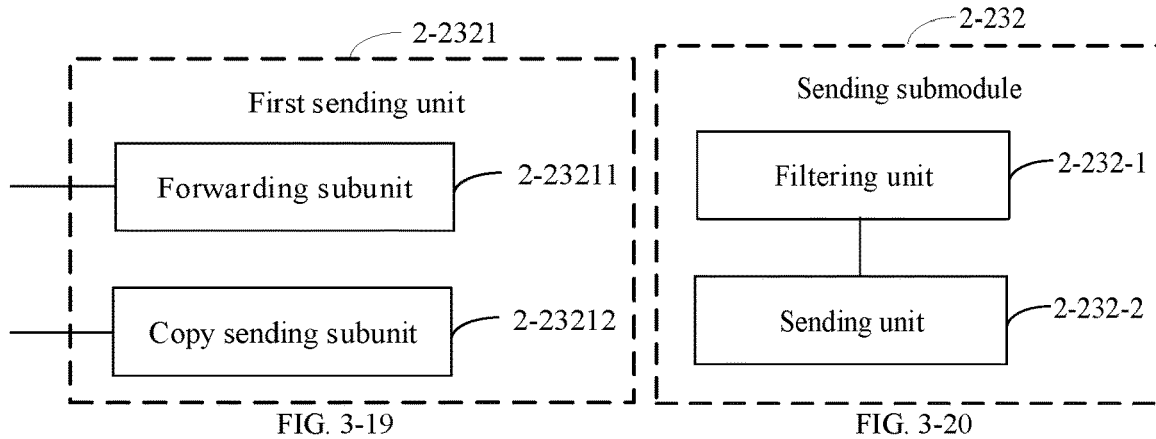
FIG. 3-19
FIG. 3-20
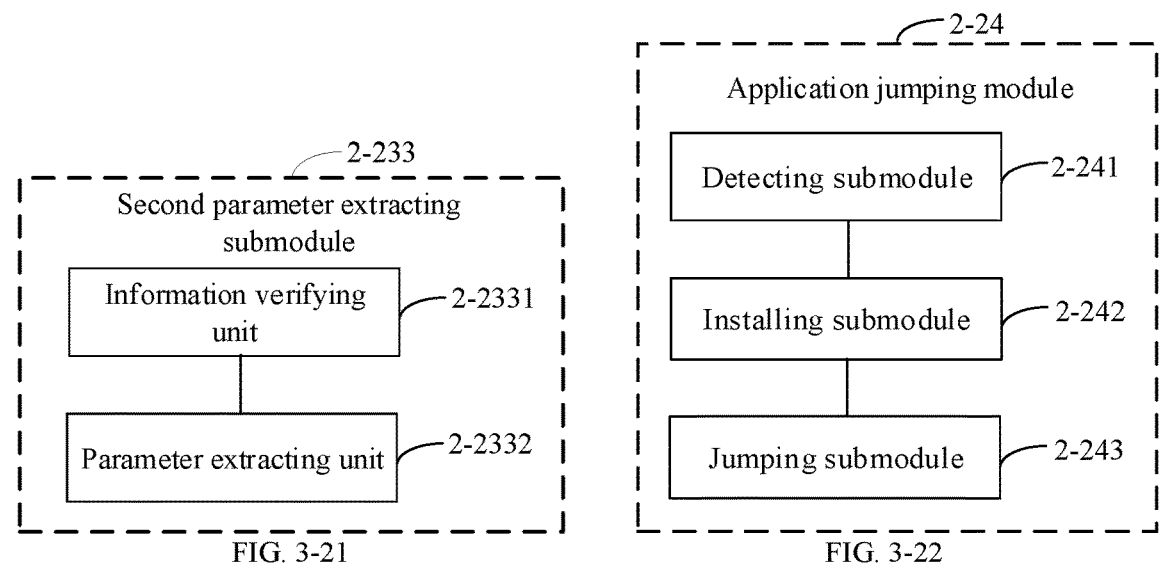
FIG. 3-21
FIG. 3-22
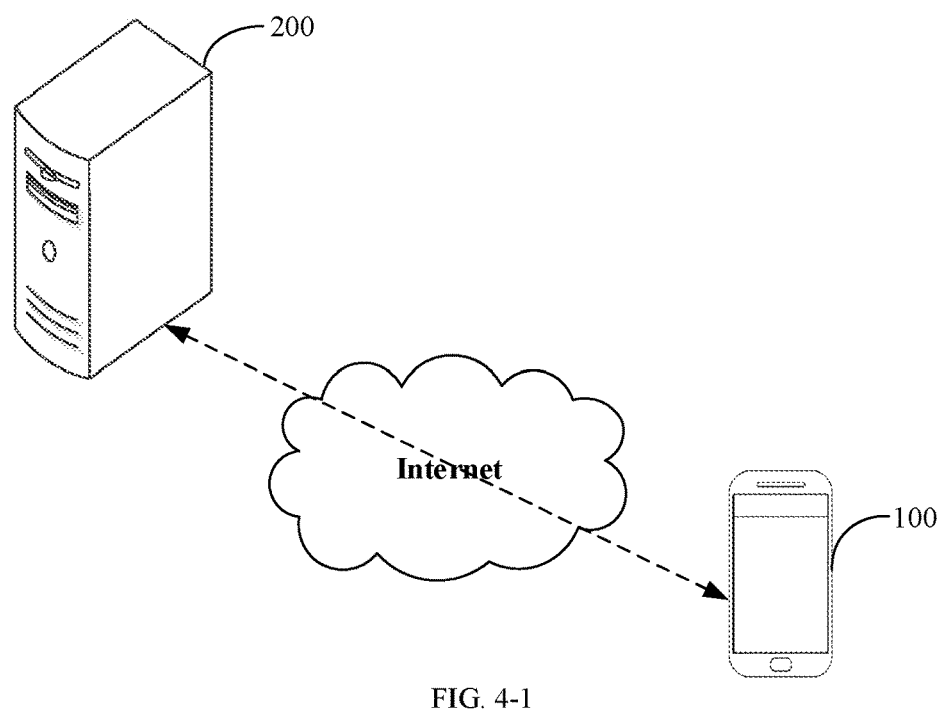
FIG. 4-1

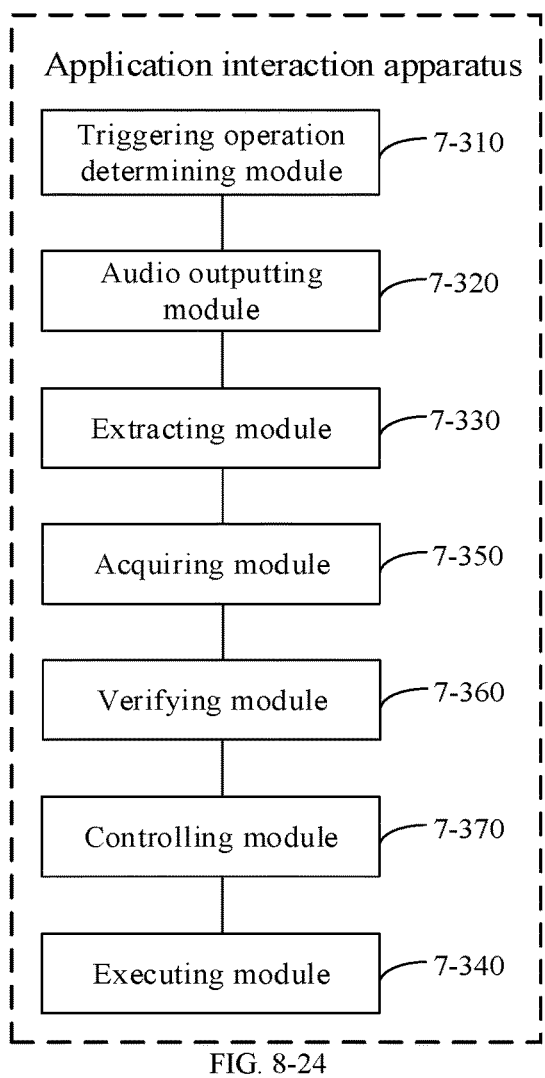
FIG. 8-24
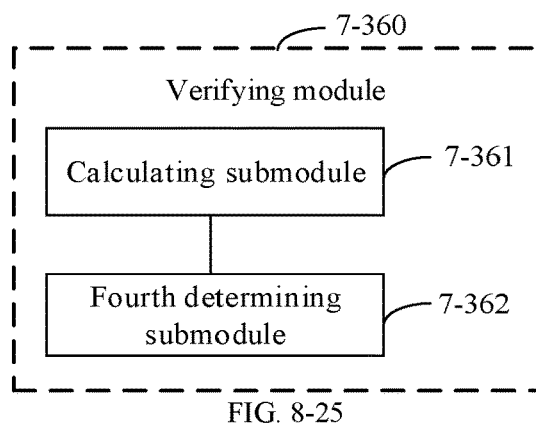
FIG. 8-25
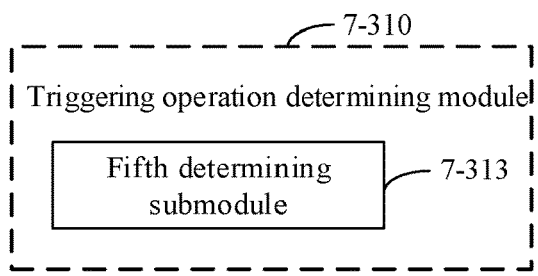
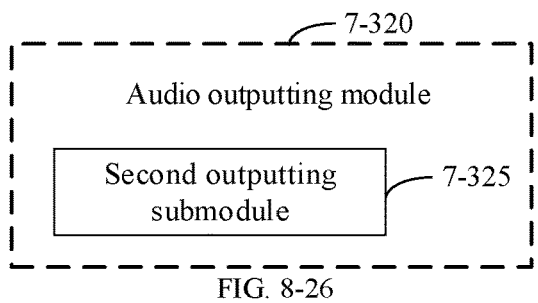
FIG. 8-26
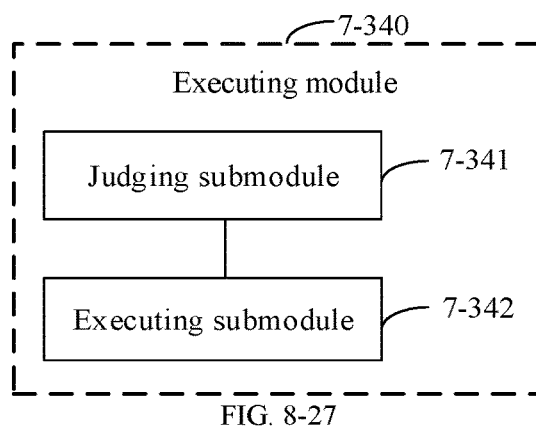
FIG. 8-27

APPLICATION INTERACTION METHOD, INTERACTION METHOD AND APPARATUS

CROSS REFERENCE TO RELATED APPLICATIONS

The present disclosure is a continuation of International Application No. PCT/CN2017/114508, filed on Dec. 4, 2017, which is based on and claims priority to eight Chinese patent applications, which are 201710448714.2 filed on Jun. 14, 2017, 201710449172.0 filed on Jun. 14, 2017, 201710553148.1 filed on Jul. 7, 2017, 201710552952.8 filed on Jul. 7, 2017, 201710552645.X filed on Jul. 7, 2017, 201710553136.9 filed on Jul. 7, 2017, 201710552955.1 filed on Jul. 7, 2017, and 201710551720.0 filed on Jul. 7, 2017. The present disclosure claims priority to all of the above patent applications, the contents of all of which are incorporated herein by reference in their entirety.

TECHNICAL FIELD

The present disclosure relates to the field of communication technologies, and in particular, to an application interaction method, an interaction method, and an apparatus.

BACKGROUND

With the development of computer communication technology, all kinds of application software have brought people excellent communication experiences. Jumping and turning from one application to another can be made available by using Deeplink technology. For example, in the case where application A is configured with Deeplink technology, when a user triggers a link in application A for jumping and turning to another application, it is possible to jump and turn to an internal page of another application, for example, application B, through the Deeplink technology. However, if application A is not adapted with the Deeplink technology, page jump between applications as described above is not available, which affects user experience of the terminal device.

SUMMARY

In view of this, the present disclosure provides an application interaction method, an interaction method, and an apparatus, which make jumps between applications available without being limited by whether an application is or is not configured with the Deeplink technology.

According to a first aspect of examples of the present disclosure, an application interaction method is provided, which includes:

acquiring a target message passing through an operating system;

extracting a target application parameter from the target message, where the target application parameter includes at least an identifier of the target application; and launching the target application according to the target application parameter.

According to a second aspect of examples of the present disclosure, an application interaction method applied in a network server is provided, which includes:

establish a network connection with the current application;

acquiring a target network request sent by the current application through the network connection;

generating a target response message according to the target network request, where the target response message is for jumping to a target application; and sending the target response message to the user terminal running the current application, so that the target response message is identified and analyzed when passing through the operating system, and the target application is launched by using the target application parameter obtained from analysis.

According to a third aspect of examples of the present disclosure, an application interaction method applied in a network server is provided, which includes:

receiving a network request sent by a user terminal, where the network request is used to request a jump to the target application, and the network request carries association information corresponding to the target application;

acquiring the target image according to the association information, where the target image is for carrying a jump request, the jump request includes a target application parameter, and the target application parameter includes at least an identifier of the target application; and pushing the target image to the user terminal, so that after outputting the target image, the user terminal may launch the target application according to the target application parameter extracted from the target image.

According to a fourth aspect of examples of the present disclosure, an application interaction method applied in a network server is provided, which includes:

receiving a network request sent by a user terminal, where the network request is used to request a jump to the target application, and the network request carries association information corresponding to the target application;

acquiring the target audio according to the association information, where the target audio is for carrying a jump request, the jump request includes a target application parameter, and the target application parameter includes at least an identifier of the target application; and pushing the target audio to the user terminal, so that after outputting the target audio, the user terminal may launch the target application according to the target application parameter extracted from the target audio.

According to a fifth aspect of examples of the present disclosure, an application interaction apparatus is provided, which includes:

a target message acquiring module, configured to acquire a target message passing through an operating system;

a parameter extracting module, configured to extract a target application parameter from the target message, where the target application parameter includes at least an identifier of the target application; and an application jumping module, configured to launch the target application according to the target application parameter.

According to a sixth aspect of examples of the present disclosure, an application interaction apparatus disposed in a network server is provided, which includes:

a network connection module, configured to establish a network connection with a current application;

a target request acquiring module, configured to acquire a target network request sent by the current application through the network connection;

a response module, configured to generate a target response message according to the target network request, where the target response message is for jumping to a target application; and a sending module, configured to send the target response message to the user terminal running the current application, so that the target response message is identified and analyzed when passing through the operating system, and the target application is launched by using the target application parameter obtained from analysis.

According to a seventh aspect of examples of the present disclosure, an application interaction apparatus disposed in a network server is provided, which includes:

a receiving module, configured to receive a network request sent by a user terminal, where the network request is used to request a jump to the target application, and the network request carries association information corresponding to the target application;

an image acquiring module, configured to acquire the target image according to the association information, where the target image is for carrying a jump request, the jump request includes a target application parameter, and the target application parameter includes at least an identifier of the target application; and a pushing module, configured to push the target image to the user terminal, so that after outputting the target image, the user terminal may launch the target application according to the target application parameter extracted from the target image.

According to an eighth aspect of examples of the present disclosure, an application interaction apparatus disposed in a network server is provided, which includes:

a receiving module, configured to receive a network request sent by a user terminal, where the network request is used to request a jump to the target application, and the network request carries association information corresponding to the target application;

an audio acquiring module, configured to acquire the target audio according to the association information, where the target audio is for carrying a jump request, the jump request includes a target application parameter, and the target application parameter includes at least an identifier of the target application; and a pushing module, configured to push the target audio to the user terminal, so that after outputting the target audio, the user terminal may launch the target application according to the target application parameter extracted from the target audio.

According to a ninth aspect of examples of the present disclosure, an application interaction method is provided, which is applied to a user terminal and includes:

acquiring a target message passing through an operating system, where the target message is from a web page and is used to instruct the operating system to perform a target operation;

extracting a target parameter from the target message; and performing the target operation according to the target parameter.

According to a tenth aspect of examples of the present disclosure, an interaction method applied in a network server is provided, which includes:

establishing a network connection with the current application which displays web pages;

acquiring a target network request sent by the current application through the network connection;

generating a target response message according to the target network request, where the target response message is for instructing the operating system of the user terminal to perform the target operation; and sending the target response message to the user terminal running the current application, so that the target response message is identified and analyzed when passing through the operating system, and performing the target operation by using the target parameter obtained from analysis.

According to an eleventh aspect of examples of the present disclosure, an interaction method applied in a network server is provided, which includes:

receiving a network request sent by a user terminal, where the network request is for requesting the operating system of the user terminal to perform a target operation, and the network request carries association information corresponding to the target operation;

acquiring the target image according to the association information, where the target image is for carrying a target parameter; and pushing the target image to the user terminal, so that after outputting the target image, the user terminal may perform the target operation according to the target parameter extracted from the target image.

According to a twelve aspect of examples of the present disclosure, an interaction method applied in a network server is provided, which includes:

receiving a network request sent by a user terminal, where the network request is for requesting the operating system of the user terminal to perform a target operation, and the network request carries association information corresponding to the target operation;

acquiring the target audio according to the association information, where the target audio is for carrying a target parameter; and pushing the target audio to the user terminal, so that after outputting the target audio, the user terminal may perform the target operation according to the target parameter extracted from the target audio.

According to a thirteenth aspect of examples of the present disclosure, an application interaction apparatus applied to a user terminal is provided, which includes:

a target message acquiring module, configured to acquire a target message passing through an operating system, where the target message is from a web page and is used to instruct the operating system to perform a target operation;

a parameter extracting module, configured to extract a target parameter from the target message; and an operation performing module, configured to perform the target operation according to the target parameter.

According to a fourteenth aspect of examples of the present disclosure, an interaction apparatus disposed in a network server is provided, which includes:

a network connection module, configured to establish a network connection with a current application which displays web pages;

a target request acquiring module, configured to acquire a target network request sent by the current application through the network connection;

a response module, configured to generate a target response message according to the target network request, where the target response message is for instructing the operating system of the user terminal to perform the target operation; and a sending module, configured to send the target response message to the user terminal running the current application, so that the target response message is identified and analyzed when passing through the operating system, and the target operation is performed by using the target parameter obtained from analysis.

According to a fifteenth aspect of examples of the present disclosure, an interaction apparatus disposed in a network server is provided, which includes:

a receiving module, configured to receive a network request sent by a user terminal, where the network request is for requesting the operating system of the user terminal to perform a target operation, and the network request carries association information corresponding to the target operation;

an image acquiring module, configured to acquire the target image according to the association information, where the target image is for carrying a target parameter; and a pushing module, configured to push the target image to the user terminal, so that after outputting the target image, the user terminal may perform the target operation according to the target parameter extracted from the target image.

According to a sixteenth aspect of examples of the present disclosure, an interaction apparatus disposed in a network server is provided, which includes:

a receiving module, configured to receive a network request sent by a user terminal, where the network request is for requesting the operating system of the user terminal to perform a target operation, and the network request carries association information corresponding to the target operation;

an audio acquiring module, configured to acquire the target audio according to the association information, where the target audio is for carrying a target parameter; and a pushing module, configured to push the target audio to the user terminal, so that after outputting the target audio, the user terminal may perform the target operation according to the target parameter extracted from the target audio.

According to a seventeenth aspect of examples of the present disclosure, a non-volatile computer readable storage medium storing a computer program is provided, where the computer program may perform the steps of any of the methods described in the first, second, third, fourth, ninth, tenth, eleventh or twelfth aspects when executed by the processor.

The technical solutions provided by the examples of the present disclosure may have the following beneficial effects:

By using the application interaction methods provided in the present disclosure, when the user tries to jump from an interface of the current application to another target application, in the case that the two applications are not configured with the DeepLink technology, a message from the current application is monitoring by taking the operating system of the terminal as a medium, and a target message containing a target application parameter is identified from the message, so as to extract the target application parameter. A quick and accurate jump to the target application is made available by using the target application parameter, without being limited by whether an application is or is not configured with the Deeplink technology. In this way, the process of human-computer interaction between the user and the terminal can be simplified and time is saved, which not only improves the interaction efficiency between applications but also ensures the accuracy of jumps to the target application, thereby improving the user experience at the terminal.

It is to be understood that the above general description and the following detailed description are intended to be illustrative and explanatory, but not restrictive of the present disclosure.

BRIEF DESCRIPTION OF DRAWINGS

The accompanying drawings, which are incorporated in and form part of the specification, show examples consistent with the present disclosure and serve to explain the principles of the present disclosure together with the specification.

FIG. 1-2 is a flowchart of another application interaction method according to an example of the present disclosure;

FIG. 1-3 is a flowchart of another application interaction method according to an example of the present disclosure;

FIG. 1-4 is a flowchart of another application interaction method according to an example of the present disclosure;

FIG. 1-5 is a flowchart of another application interaction method according to an example of the present disclosure;

FIG. 1-6 is a flowchart of another application interaction method according to an example of the present disclosure;

FIG. 1-7-1 is a schematic diagram of an application interaction scenario according to an example of the present disclosure;

FIG. 1-7-2 is a schematic diagram of an application interaction scenario according to related art.

FIG. 1-8 is a block diagram of an application interaction apparatus according to an example of the present disclosure;

FIG. 1-9 is a block diagram of another application interaction apparatus according to an example of the present disclosure;

FIG. 1-10 is a block diagram of another application interaction apparatus according to an example of the present disclosure;

FIG. 1-11 is a block diagram of another application interaction apparatus according to an example of the present disclosure;

FIG. 1-12 is a block diagram of another application interaction apparatus according to an example of the present disclosure;

FIG. 1-13 is a block diagram of another application interaction apparatus according to an example of the present disclosure;

FIG. 1-14 is a block diagram of another application interaction apparatus according to an example of the present disclosure;

FIG. 1-15 is a block diagram of another application interaction apparatus according to an example of the present disclosure;

FIG. 1-16 is a block diagram of another application interaction apparatus according to an example of the present disclosure;

FIG. 2-1 is a flowchart of an application interaction method according to an example of the present disclosure;

FIG. 2-2 is a flowchart of another application interaction method according to an example of the present disclosure;

FIG. 2-3 is a flowchart of another application interaction method according to an example of the present disclosure;

FIG. 2-4 is a flowchart of another application interaction method according to an example of the present disclosure;

FIG. 2-5 is a flowchart of another application interaction method according to an example of the present disclosure;

FIG. 2-6 is a flowchart of another application interaction method according to an example of the present disclosure;

FIG. 2-7 is a flowchart of another application interaction method according to an example of the present disclosure;

FIG. 2-8 is a flowchart of another application interaction method according to an example of the present disclosure;

FIG. 2-9 is a flowchart of another application interaction method according to an example of the present disclosure;

FIG. 2-10 is a block diagram of an application interaction apparatus according to an example of the present disclosure;

FIG. 2-11 is a block diagram of another application interaction apparatus according to an example of the present disclosure;

FIG. 2-12 is a block diagram of another application interaction apparatus according to an example of the present disclosure;

FIG. 2-13 is a block diagram of another application interaction apparatus according to an example of the present disclosure;

FIG. 2-14 is a block diagram of another application interaction apparatus according to an example of the present disclosure;

FIG. 2-15 is a block diagram of another application interaction apparatus according to an example of the present disclosure;

FIG. 2-16 is a block diagram of another application interaction apparatus according to an example of the present disclosure;

FIG. 2-17 is a block diagram of another application interaction apparatus according to an example of the present disclosure;

FIG. 2-18 is a block diagram of another application interaction apparatus according to an example of the present disclosure;

FIG. 2-19 is a block diagram of another application interaction apparatus according to an example of the present disclosure;

FIG. 2-20 is a block diagram of another application interaction apparatus according to an example of the present disclosure;

FIG. 2-21 is a block diagram of another application interaction apparatus according to an example of the present disclosure;

FIG. 3-1 is a flowchart of an application interaction method according to an example of the present disclosure;

FIG. 3-2 is a flowchart of another application interaction method according to an example of the present disclosure;

FIG. 3-2-1 is a schematic diagram of an application interaction method according to an example of the present disclosure;

FIG. 3-3 is a flowchart of another application interaction method according to an example of the present disclosure;

FIG. 3-4 is a flowchart of another application interaction method according to an example of the present disclosure;

FIG. 3-4-1 is a schematic diagram of another application interaction method according to an example of the present disclosure;

FIG. 3-5 is a flowchart of another application interaction method according to an example of the present disclosure;

FIG. 3-5-1 is a schematic diagram of another application interaction method according to an example of the present disclosure;

FIG. 3-6 is a flowchart of another application interaction method according to an example of the present disclosure;

FIG. 3-7 is a flowchart of another application interaction method according to an example of the present disclosure;

FIG. 3-8-1 is a schematic diagram of an application interaction method according to an example of the present disclosure;

FIG. 3-8-2 is a schematic diagram of another application interaction method according to an example of the present disclosure;

FIG. 3-8-3 is a schematic diagram of another application interaction method according to an example of the present disclosure;

FIG. 3-9 is a block diagram of an application interaction apparatus according to an example of the present disclosure;

FIG. 3-10 is a block diagram of another application interaction apparatus according to an example of the present disclosure;

FIG. 3-11 is a block diagram of another application interaction apparatus according to an example of the present disclosure;

FIG. 3-12 is a block diagram of another application interaction apparatus according to an example of the present disclosure;

FIG. 3-13 is a block diagram of another application interaction apparatus according to an example of the present disclosure;

FIG. 3-14 is a block diagram of another application interaction apparatus according to an example of the present disclosure;

FIG. 3-15 is a block diagram of another application interaction apparatus according to an example of the present disclosure;

FIG. 3-16 is a block diagram of another application interaction apparatus according to an example of the present disclosure;

FIG. 3-17 is a block diagram of another application interaction apparatus according to an example of the present disclosure;

FIG. 3-18 is a block diagram of another application interaction apparatus according to an example of the present disclosure;

FIG. 3-19 is a block diagram of another application interaction apparatus according to an example of the present disclosure;

FIG. 3-20 is a block diagram of another application interaction apparatus according to an example of the present disclosure;

FIG. 3-21 is a block diagram of another application interaction apparatus according to an example of the present disclosure;

FIG. 3-22 is a block diagram of another application interaction apparatus according to an example of the present disclosure;

FIG. 4-1 is a schematic diagram of an application interaction scenario according to an example of the present disclosure;

FIG. 4-2-1 is a schematic diagram of an application interaction method according to an example of the present disclosure;

FIG. 4-2-2 is a schematic diagram of another application interaction method according to an example of the present disclosure;

FIG. 4-3 is a flowchart of an application interaction method according to an example of the present disclosure;

FIG. 4-4 is a flowchart of another application interaction method according to an example of the present disclosure;

FIG. 4-5 is a flowchart of another application interaction method according to an example of the present disclosure;

FIG. 4-6 is a flowchart of another application interaction method according to an example of the present disclosure;

FIG. 4-7 is a flowchart of another application interaction method according to an example of the present disclosure;

FIG. 4-8 is a flowchart of an application interaction method according to an example of the present disclosure;

FIG. 4-9 is a flowchart of another application interaction method according to an example of the present disclosure;

FIG. 4-10 is a flowchart of another application interaction method according to an example of the present disclosure;

FIG. 4-11 is a flowchart of another application interaction method according to an example of the present disclosure;

FIG. 4-12 is a block diagram of an application interaction apparatus according to an example of the present disclosure;

FIG. 4-13 is a block diagram of another application interaction apparatus according to an example of the present disclosure;

FIG. 4-14 is a block diagram of another application interaction apparatus according to an example of the present disclosure;

FIG. 4-15 is a block diagram of another application interaction apparatus according to an example of the present disclosure;

FIG. 4-16 is a block diagram of another application interaction apparatus according to an example of the present disclosure;

FIG. 4-17 is a block diagram of another application interaction apparatus according to an example of the present disclosure;

FIG. 4-18 is a block diagram of another application interaction apparatus according to an example of the present disclosure;

FIG. 4-19 is a block diagram of another application interaction apparatus according to an example of the present disclosure;

FIG. 4-20 is a block diagram of an application interaction apparatus according to an example of the present disclosure;

FIG. 4-21 is a block diagram of another application interaction apparatus according to an example of the present disclosure;

FIG. 4-22 is a block diagram of another application interaction apparatus according to an example of the present disclosure;

FIG. 4-23 is a block diagram of another application interaction apparatus according to an example of the present disclosure;

FIG. 4-24 is a block diagram of another application interaction apparatus according to an example of the present disclosure;

FIG. 5-1-1 is a schematic diagram of an application interaction method according to an example of the present disclosure;

FIG. 5-1-2 is a schematic diagram of another application interaction method according to an example of the present disclosure;

FIG. 5-1-3 is a schematic diagram of another application interaction method according to an example of the present disclosure;

FIG. 5-1-4 is a schematic diagram of another application interaction method according to an example of the present disclosure;

FIG. 5-2 is a flowchart of an application interaction method according to an example of the present disclosure;

FIG. 5-3 is a flowchart of another application interaction method according to an example of the present disclosure;

FIG. 5-4 is a flowchart of another application interaction method according to an example of the present disclosure;

FIG. 5-5 is a flowchart of another application interaction method according to an example of the present disclosure;

FIG. 5-6 is a flowchart of another application interaction method according to an example of the present disclosure;

FIG. 5-7 is a flowchart of an application interaction method according to an example of the present disclosure;

FIG. 5-8 is a flowchart of another application interaction method according to an example of the present disclosure;

FIG. 5-9 is a flowchart of another application interaction method according to an example of the present disclosure;

FIG. 5-10 is a flowchart of another application interaction method according to an example of the present disclosure;

FIG. 5-11 is a flowchart of another application interaction method according to an example of the present disclosure;

FIG. 5-12 is a flowchart of another application interaction method according to an example of the present disclosure;

FIG. 5-13 is a block diagram of an application interaction apparatus according to an example of the present disclosure;

FIG. 5-14 is a block diagram of another application interaction apparatus according to an example of the present disclosure;

FIG. 5-15 is a block diagram of another application interaction apparatus according to an example of the present disclosure;

FIG. 5-16 is a block diagram of another application interaction apparatus according to an example;

FIG. 5-17 is a block diagram of another application interaction apparatus according to an example of the present disclosure;

FIG. 5-18 is a block diagram of an application interaction apparatus according to an example of the present disclosure;

FIG. 5-19 is a block diagram of another application interaction apparatus according to an example of the present disclosure;

FIG. 5-20 is a block diagram of another application interaction apparatus according to an example of the present disclosure;

FIG. 5-21 is a block diagram of another application interaction apparatus according to an example of the present disclosure;

FIG. 5-22 is a block diagram of an application interaction apparatus according to an example of the present disclosure;

FIG. 5-23 is a block diagram of an application interaction apparatus according to an example of the present disclosure;

FIG. 5-24 is a block diagram of another application interaction apparatus according to an example of the present disclosure;

FIG. 5-25 is a block diagram of another application interaction apparatus according to an example of the present disclosure;

FIG. 5-26 is a block diagram of another application interaction apparatus according to an example of the present disclosure;

FIG. 5-27 is a block diagram of another application interaction apparatus according to an example of the present disclosure;

FIG. 5-28 is a block diagram of another application interaction apparatus according to an example of the present disclosure;

FIG. 6-1 is a flowchart of an application interaction method according to an example of the present disclosure;

FIG. 6-2 is a flowchart of another application interaction method according to an example of the present disclosure;

FIG. 6-3 is a flowchart of another application interaction method according to an example of the present disclosure;

FIG. 6-4 is a flowchart of another application interaction method according to an example of the present disclosure;

FIG. 6-5 is a flowchart of another application interaction method according to an example of the present disclosure;

FIG. 6-6 is a schematic diagram of an application interaction scenario according to an example of the present disclosure;

FIG. 6-7 is a block diagram of an application interaction apparatus according to an example of the present disclosure;

FIG. 6-8 is a block diagram of another application interaction apparatus according to an example of the present disclosure;

FIG. 6-9 is a block diagram of another application interaction apparatus according to an example of the present disclosure;

Figure 1:
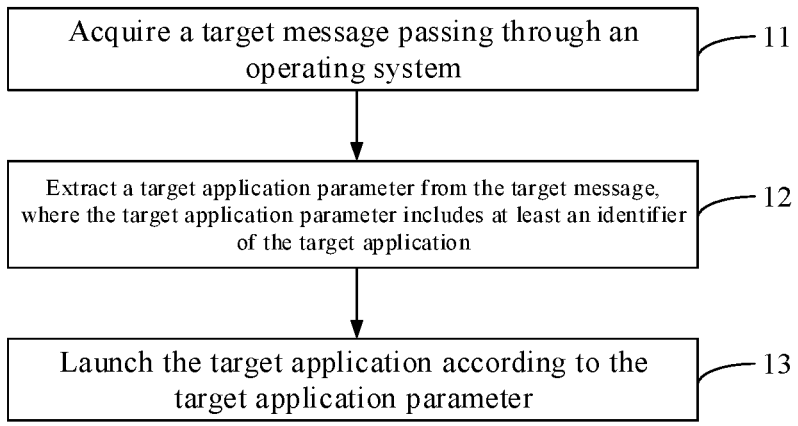
FIG. 1-1 is a flowchart of an application interaction method according to an example of the present disclosure.
Figures 1, 2:
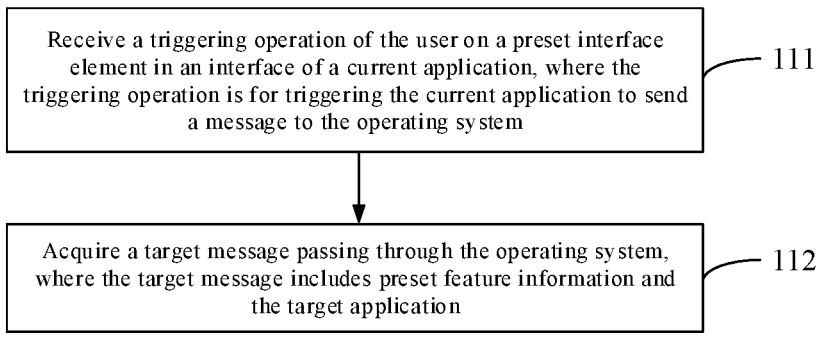
Figures 1, 2, 3:
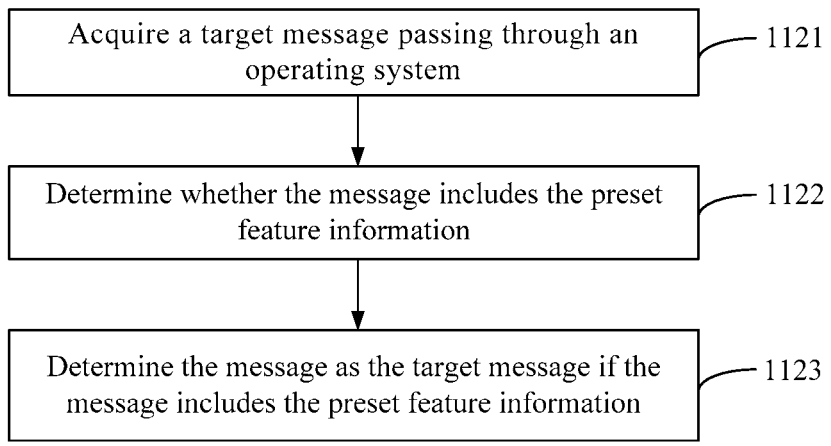
Figures 1, 2, 3, 4:
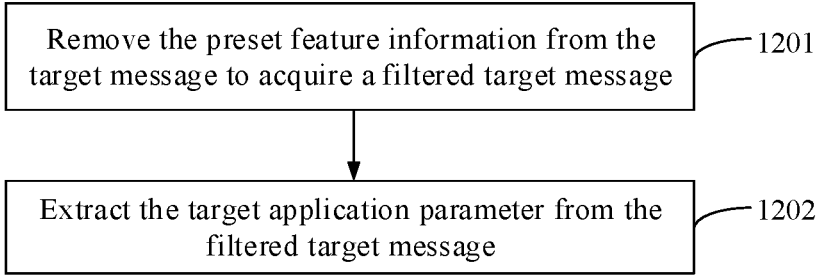
Figures 1, 2, 3, 4, 5:
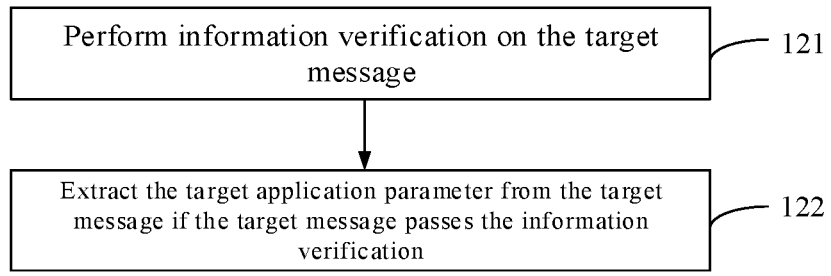
Figures 1, 2, 3, 4, 5, 6:
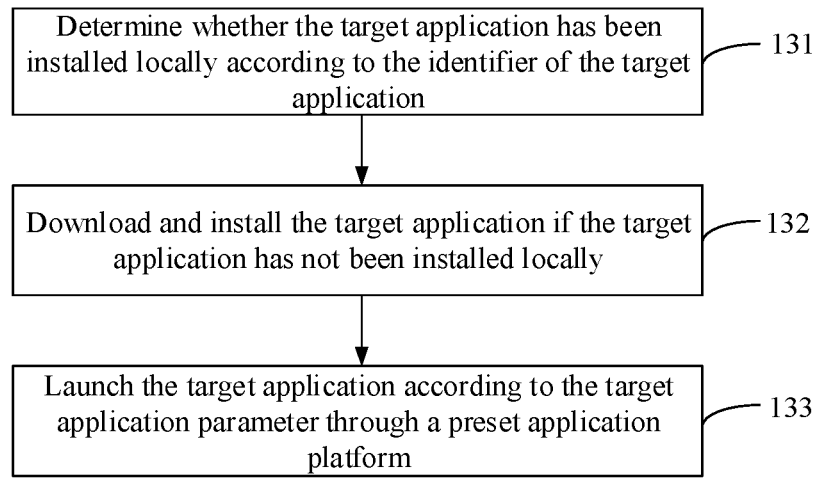
Figures 1, 2, 3, 4, 5, 6, 7:
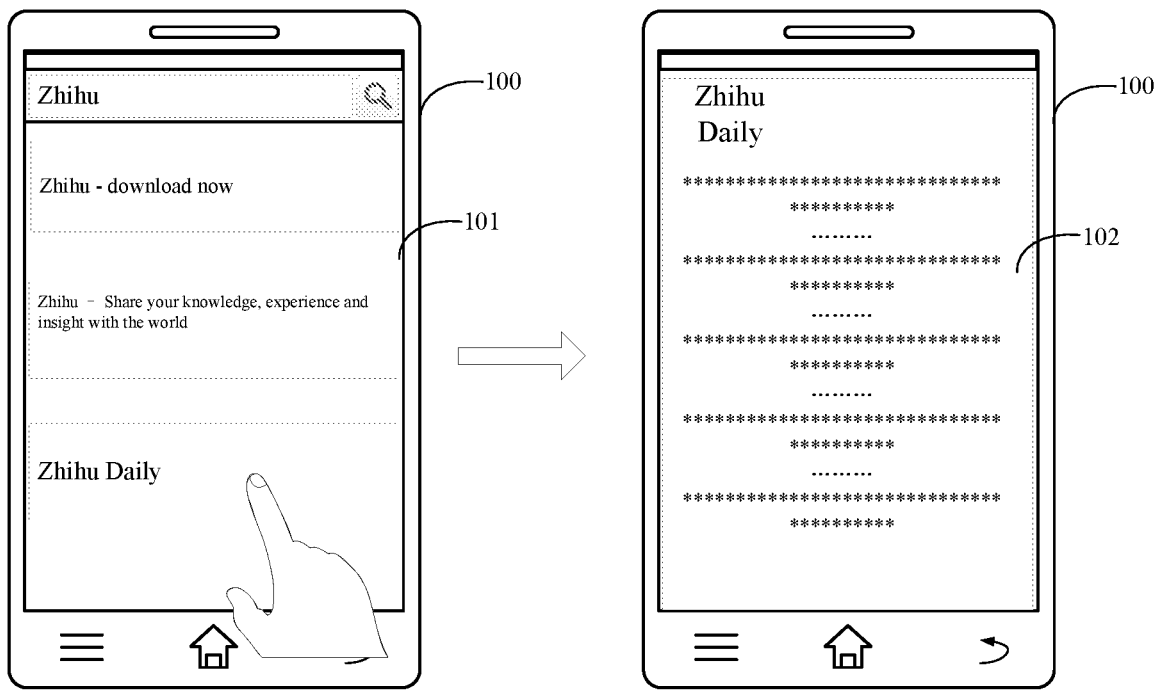
Figures 1, 2, 3, 4, 5, 6, 7:
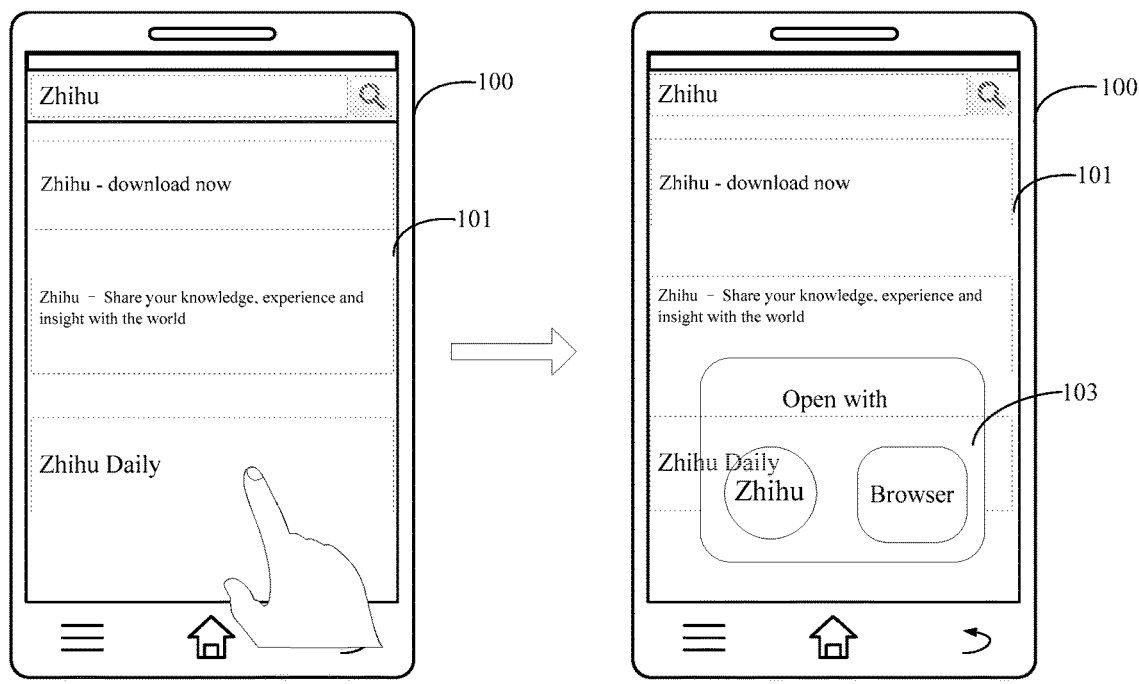
Figures 1, 2, 3, 4, 5, 6, 7, 8:
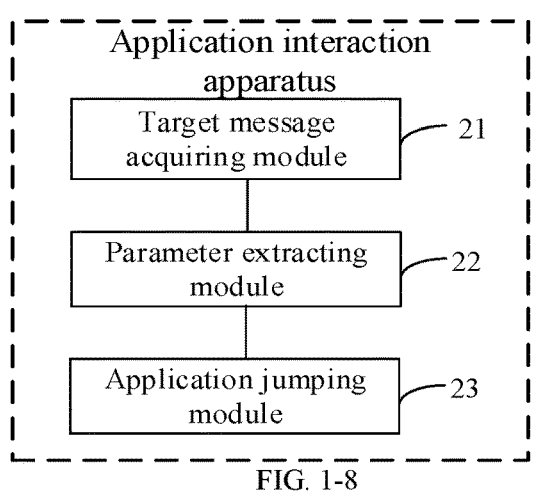
Figures 1, 2, 3, 4, 5, 6, 7, 8, 9:
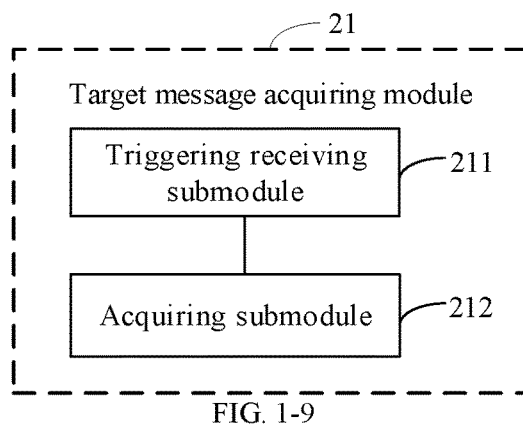
Figures 1, 2, 3, 4, 5, 6, 7, 8, 9, 10:
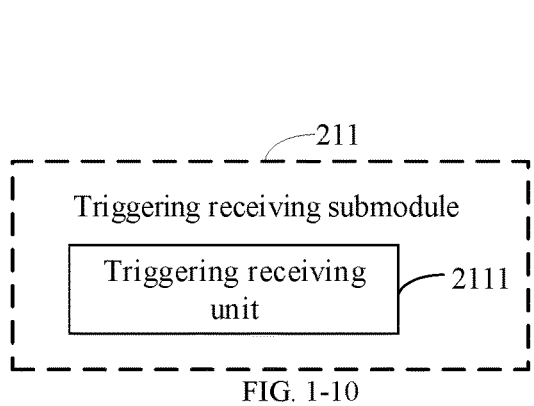
Figures 1, 2, 3, 4, 5, 6, 7, 8, 9, 10, 11:
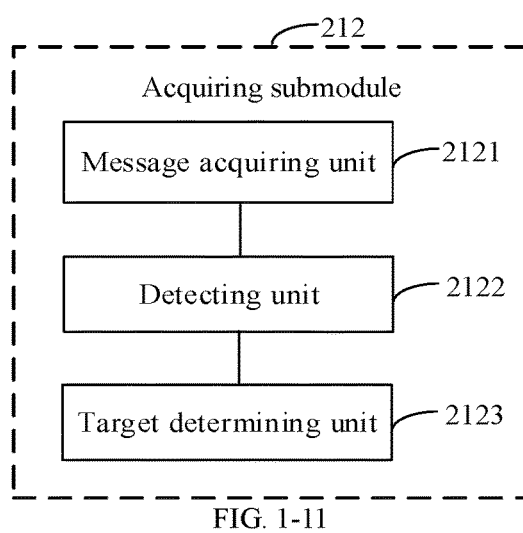
Figures 1, 2:
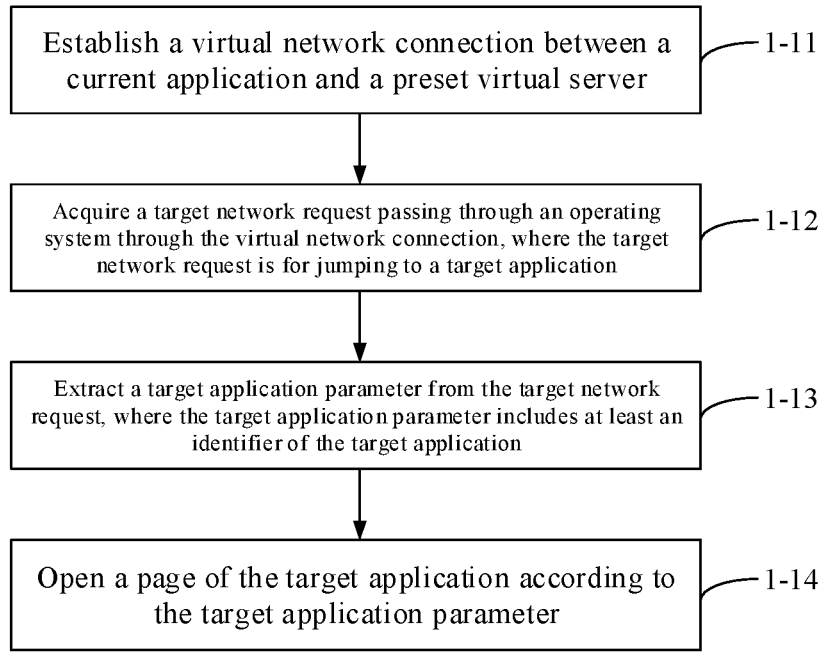
Figure 2:
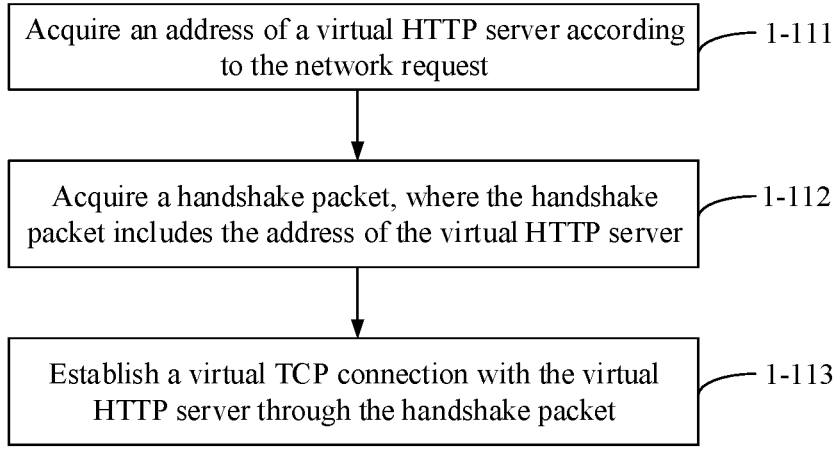
Figures 2, 3:
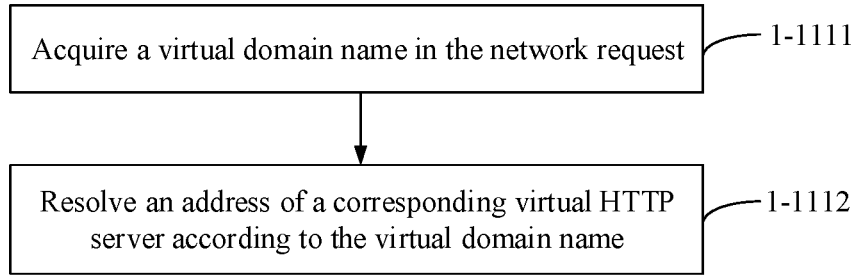
Figures 2, 3, 4:
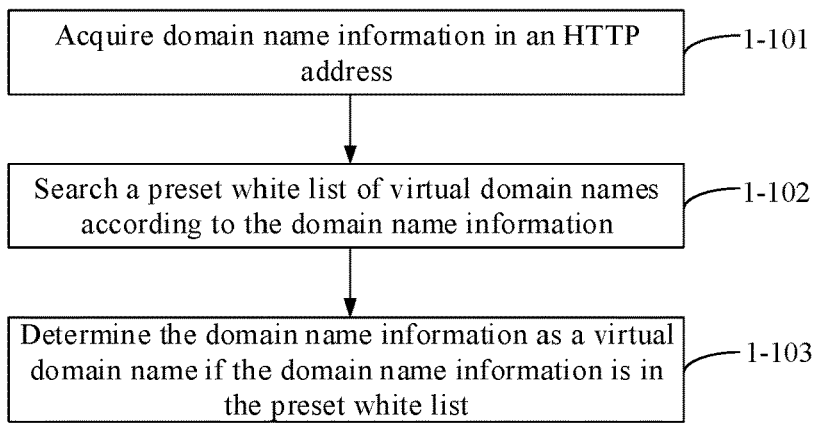
Figures 2, 3, 4, 5:
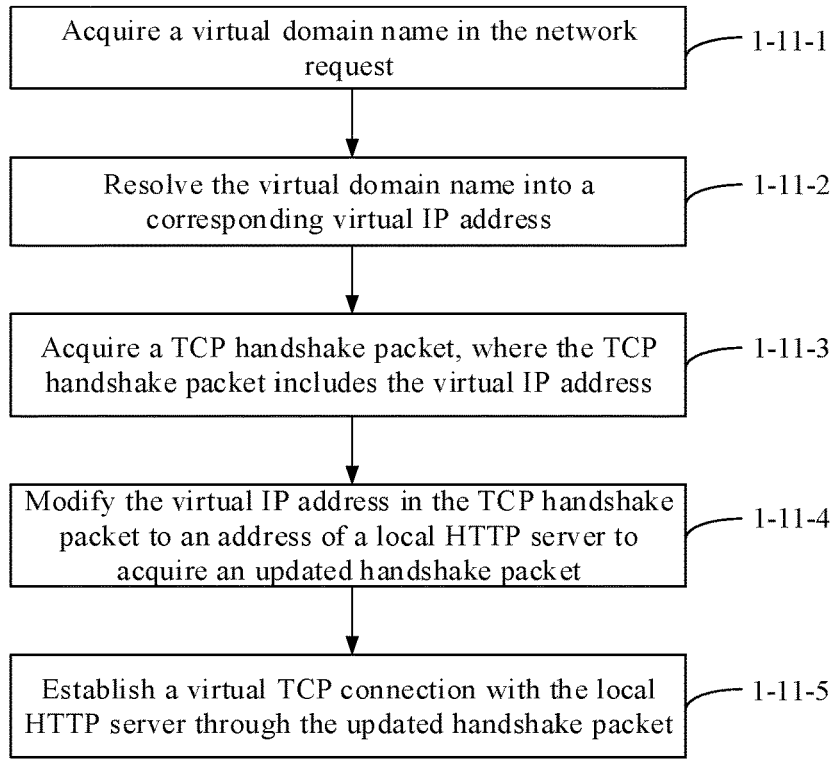
Figures 2, 3, 4, 5, 6:
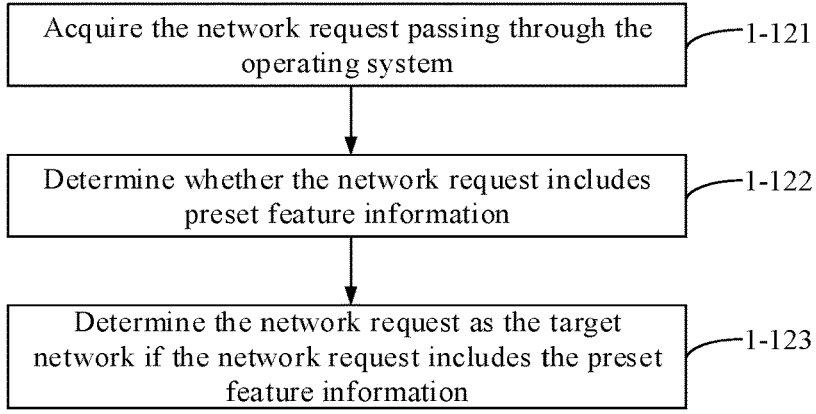
Figures 2, 3, 4, 5, 6, 7:
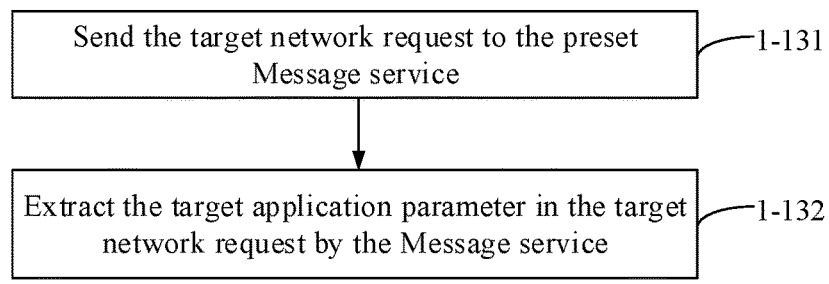
Figures 2, 3, 4, 5, 6, 7, 8:
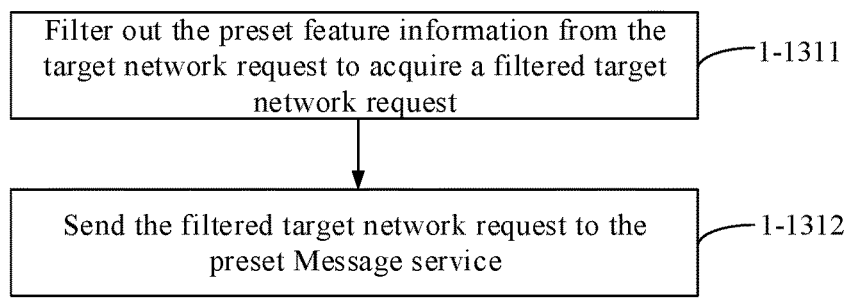
Figures 2, 3, 4, 5, 6, 7, 8, 9:
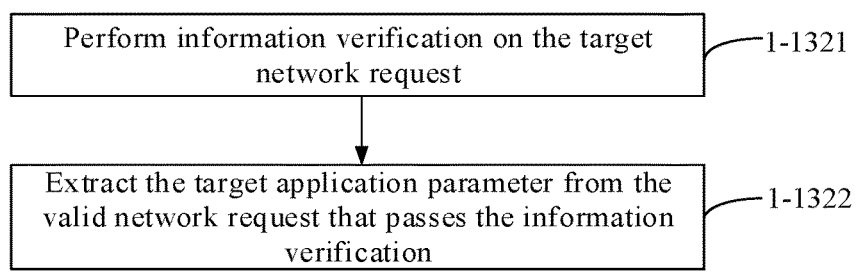
Figures 2, 3, 4, 5, 6, 7, 8, 9, 10:
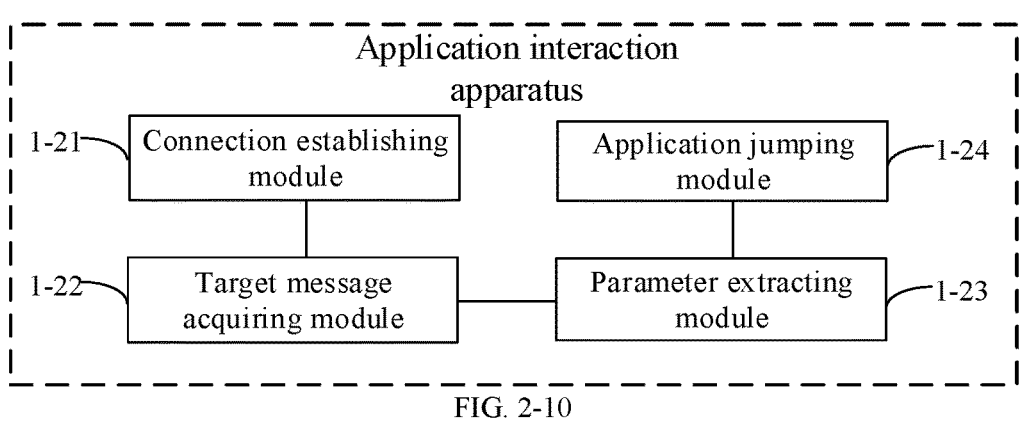
Figures 2, 3, 4, 5, 6, 7, 8, 9, 10, 11:
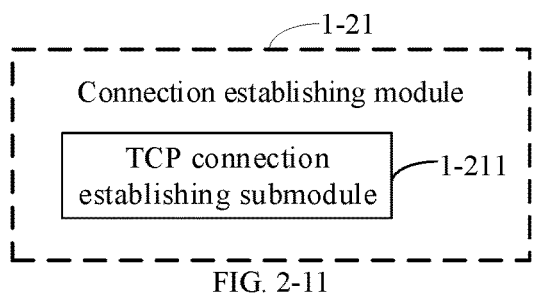
Figures 2, 3, 4, 5, 6, 7, 8, 9, 10, 11, 12:
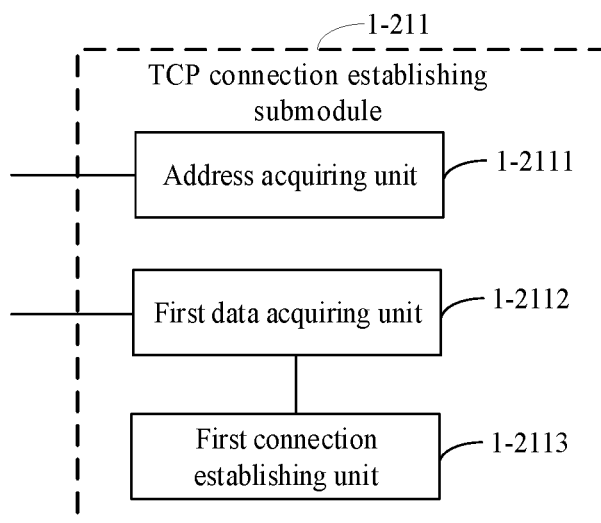
Figures 2, 3, 4, 5, 6, 7, 8, 9, 10, 11, 12, 13:
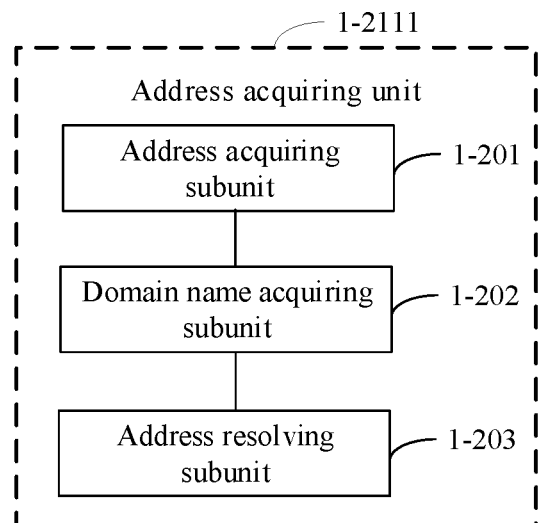
Figures 2, 3, 4, 5, 6, 7, 8, 9, 10, 11, 12, 13, 14:
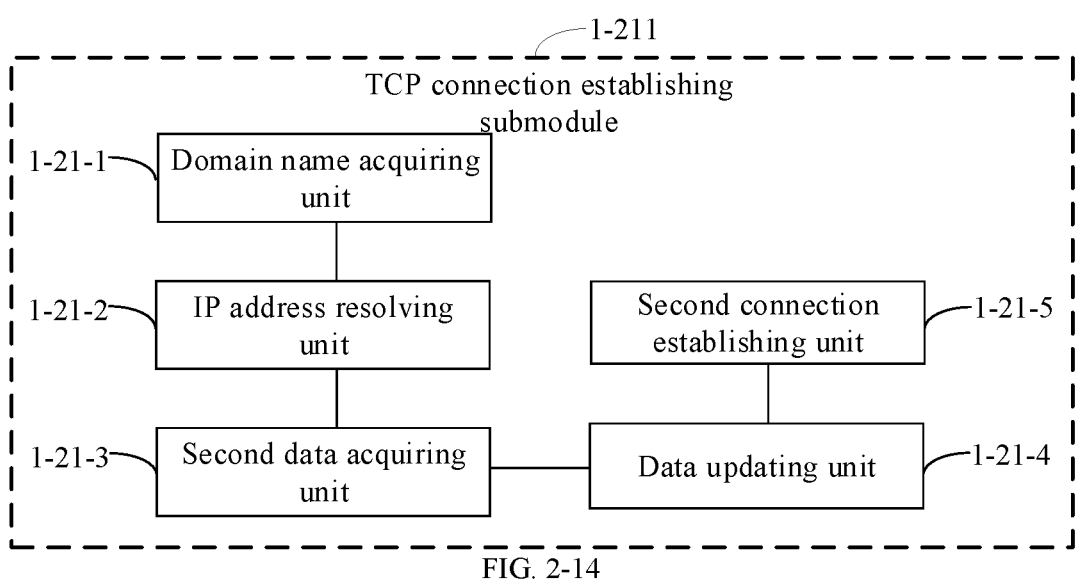
Figures 2, 3, 4, 5, 6, 7, 8, 9, 10, 11, 12, 13, 14, 15:
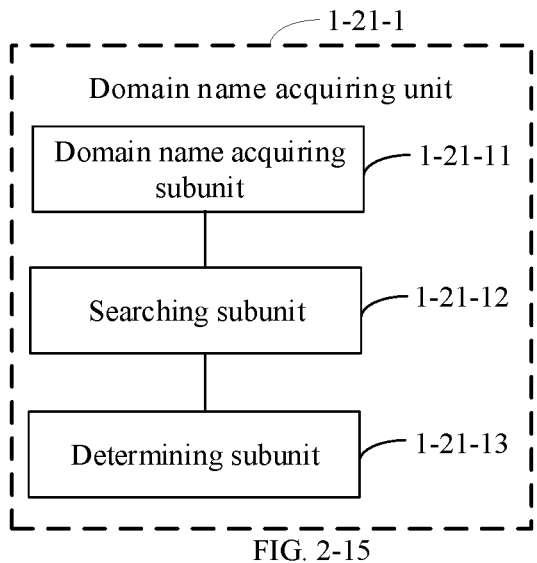
Figures 2, 3, 4, 5, 6, 7, 8, 9, 10, 11, 12, 13, 14, 15, 16:
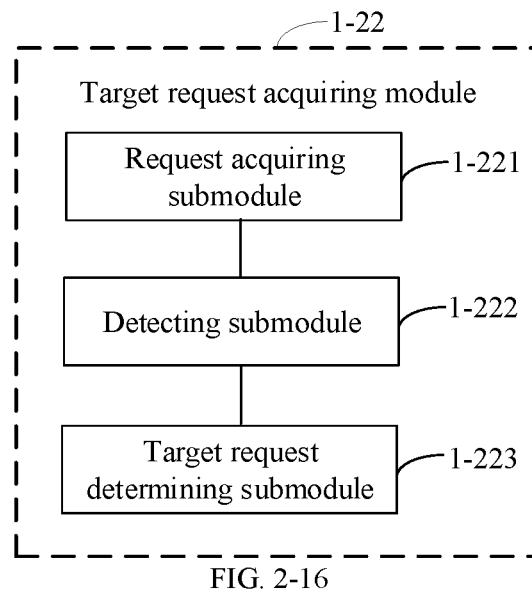
Figures 2, 3, 4, 5, 6, 7, 8, 9, 10, 11, 12, 13, 14, 15, 16, 17:
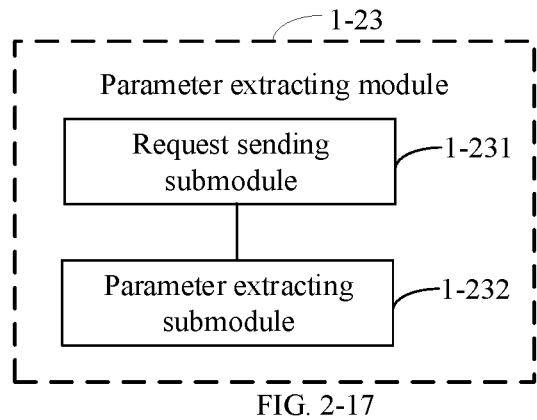
Figures 2, 3, 4, 5, 6, 7, 8, 9, 10, 11, 12, 13, 14, 15, 16, 17, 18:
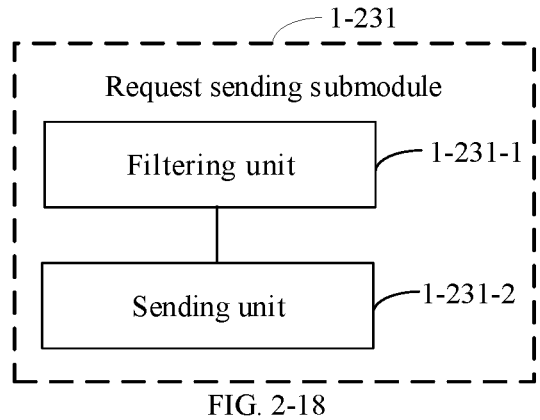
Figures 2, 3, 4, 5, 6, 7, 8, 9, 10, 11, 12, 13, 14, 15, 16, 17, 18, 19:
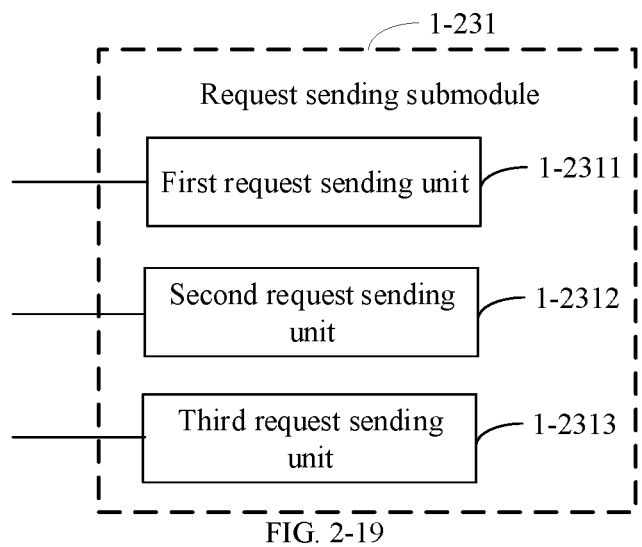
Figures 2, 3, 4, 5, 6, 7, 8, 9, 10, 11, 12, 13, 14, 15, 16, 17, 18, 19, 20:
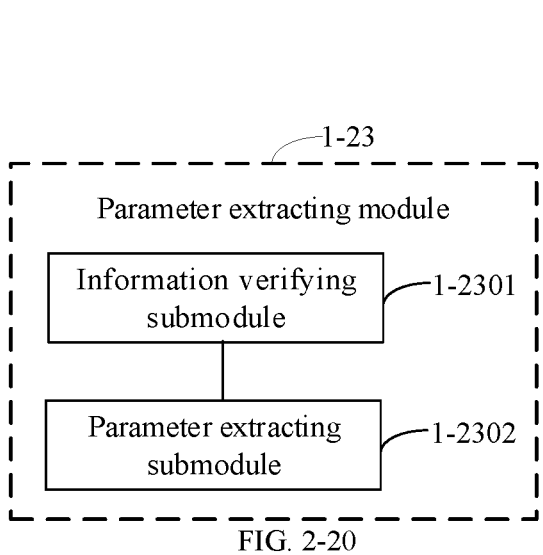
Figures 2, 3, 4, 5, 6, 7, 8, 9, 10, 11, 12, 13, 14, 15, 16, 17, 18, 19, 20, 21:
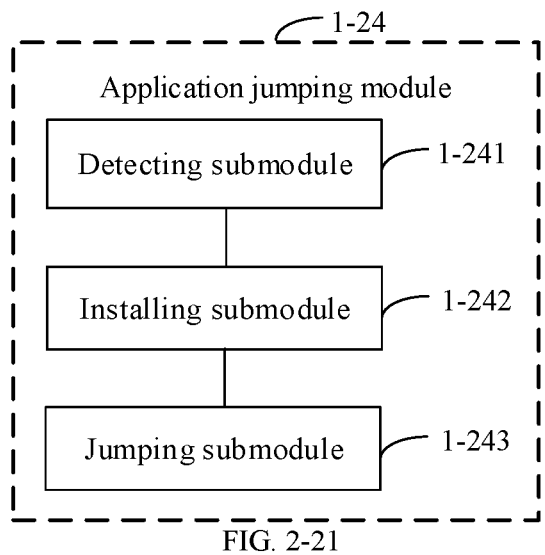
Figures 1, 3:
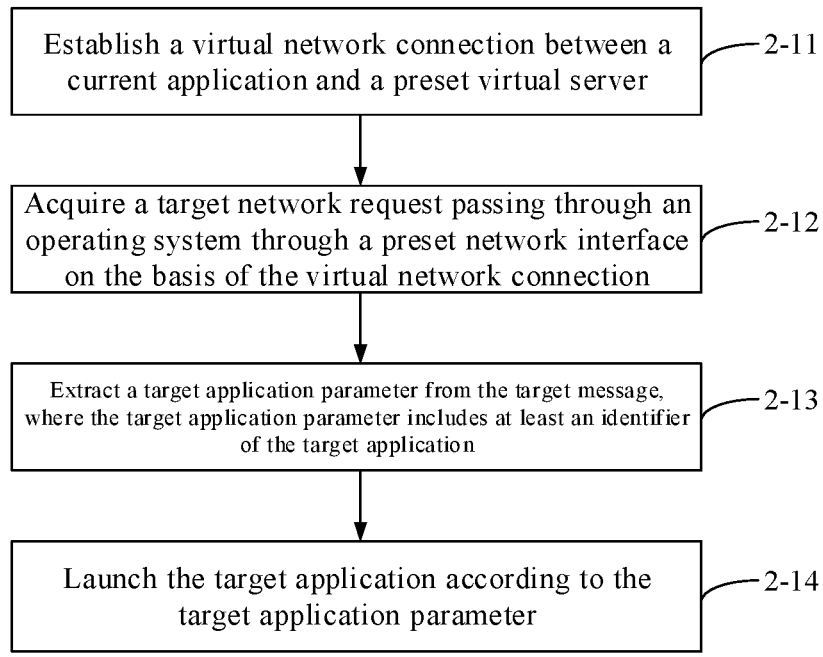
Figures 2, 3:
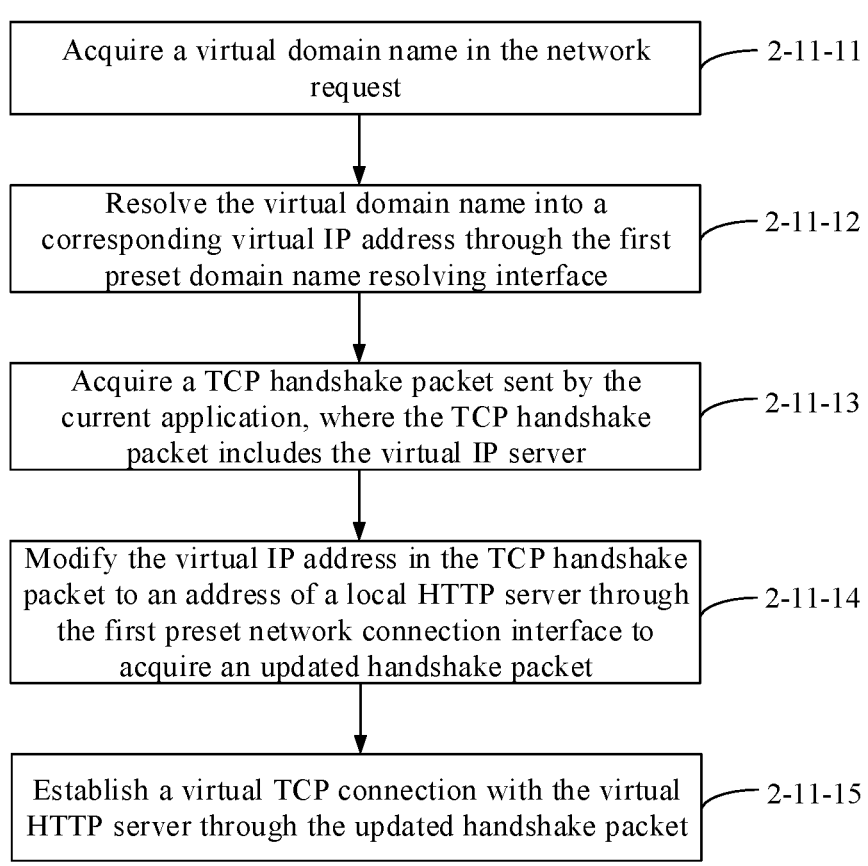
Figures 1, 2, 3:
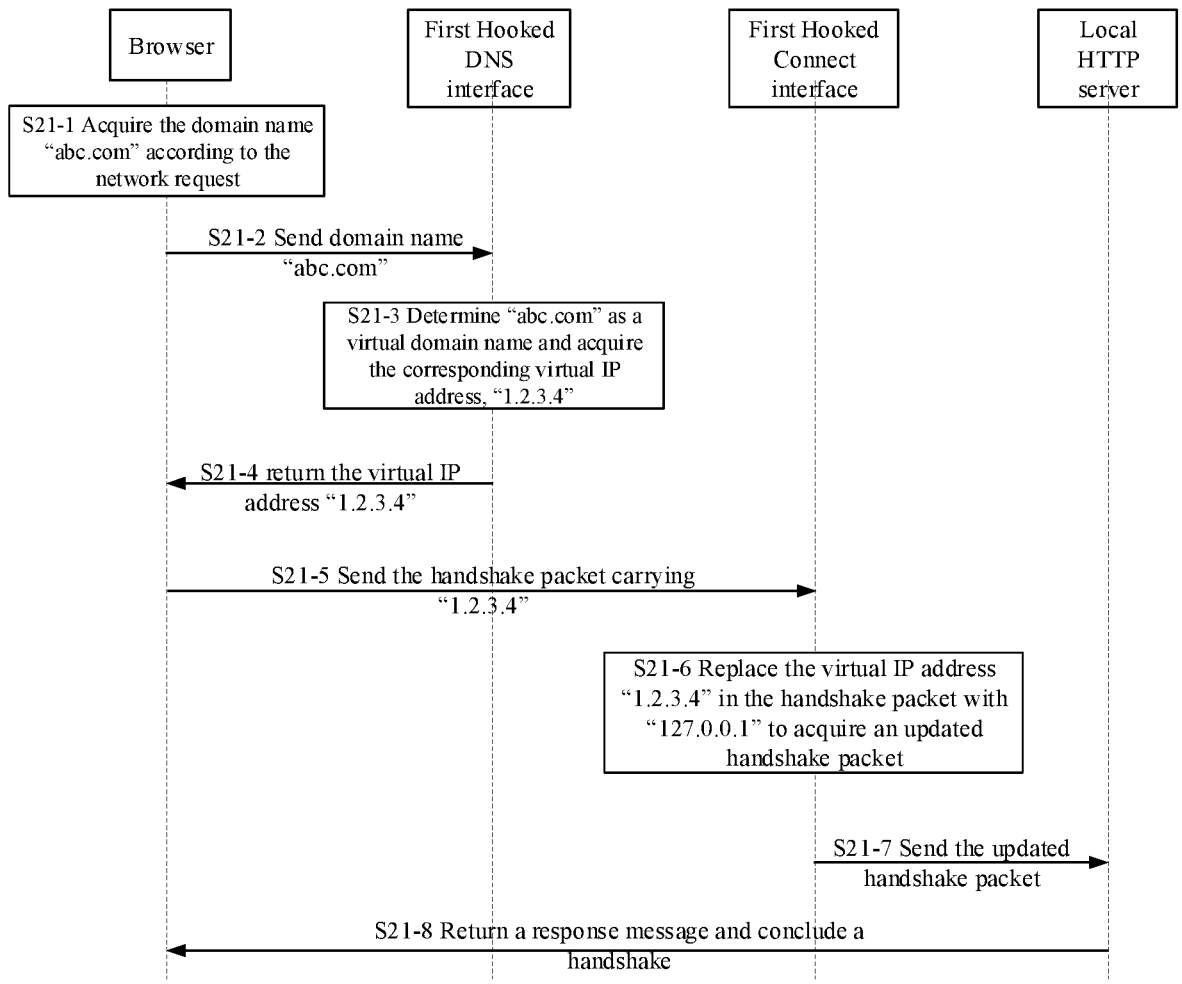
Figure 3:
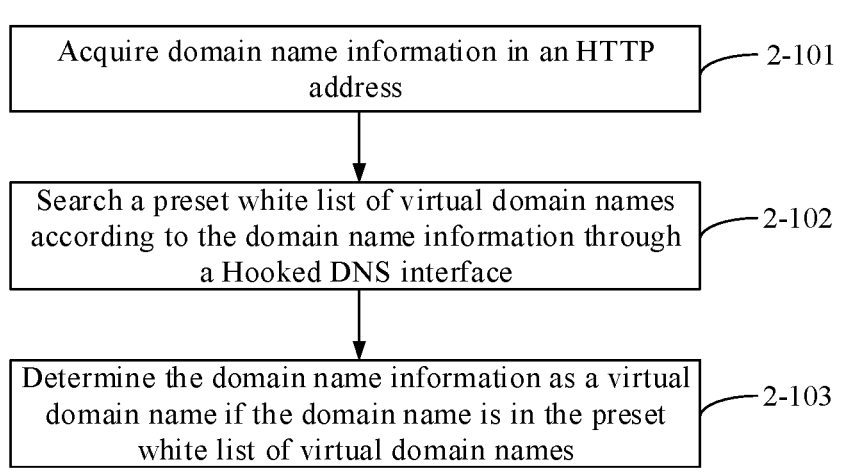
Figures 3, 4:
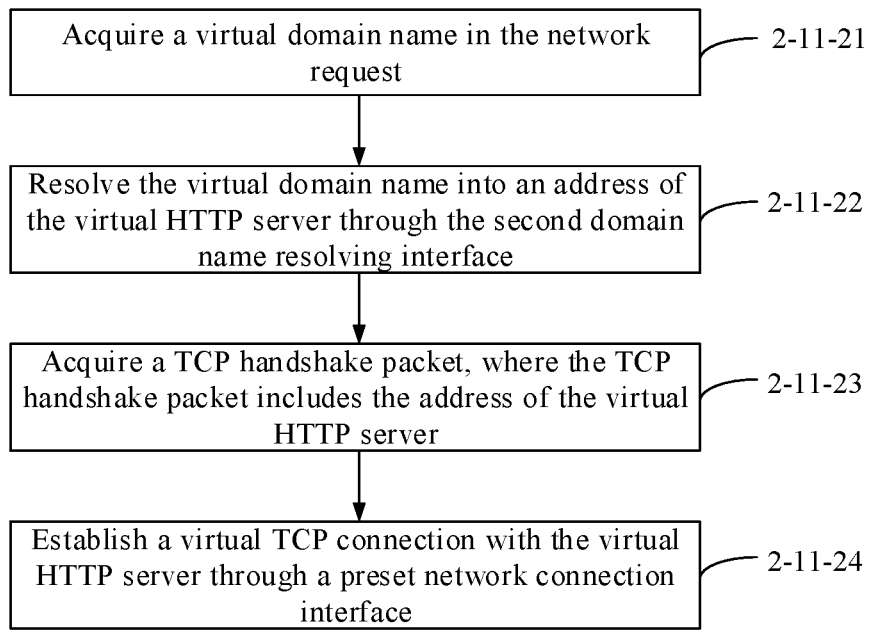
Figures 1, 3, 4:
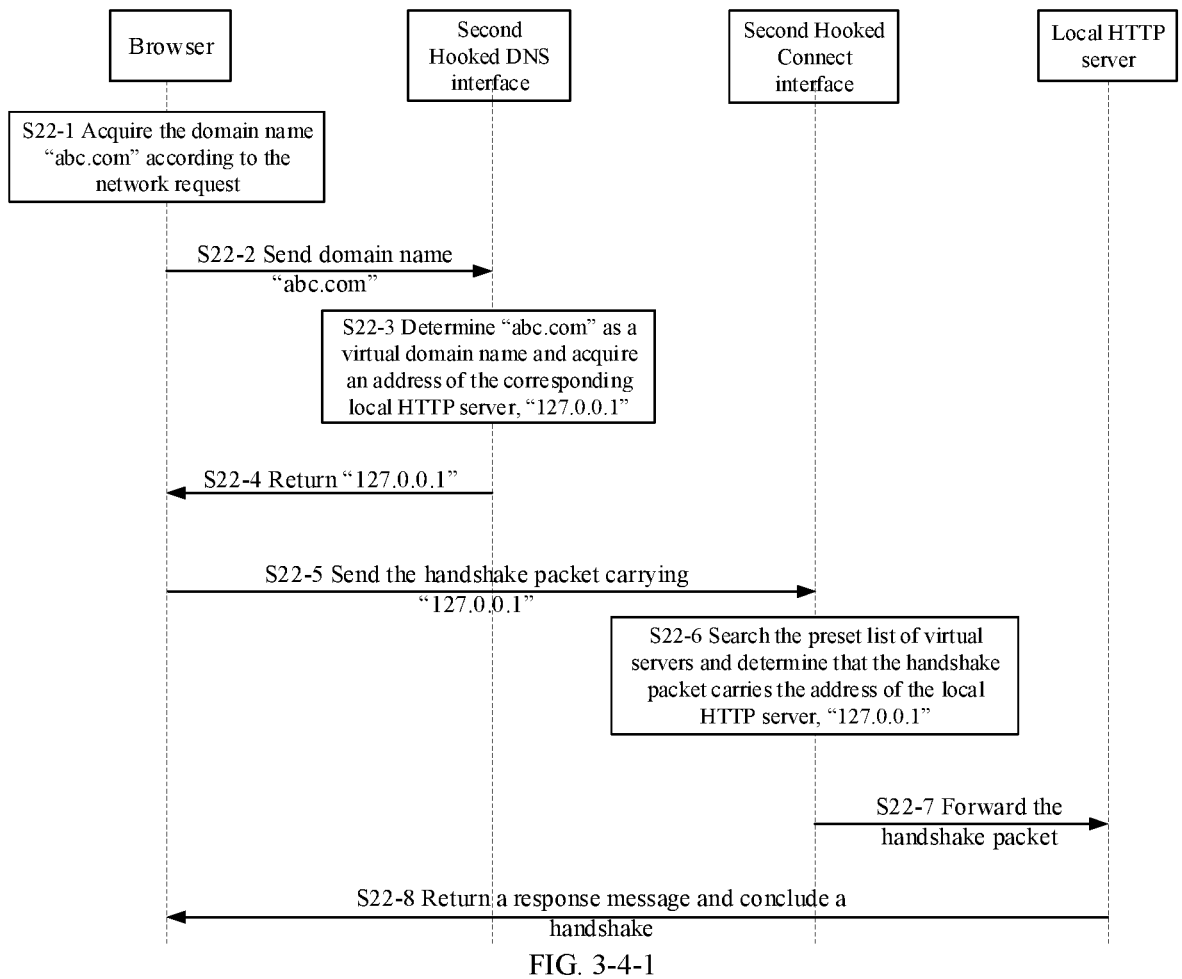
Figures 3, 4, 5:
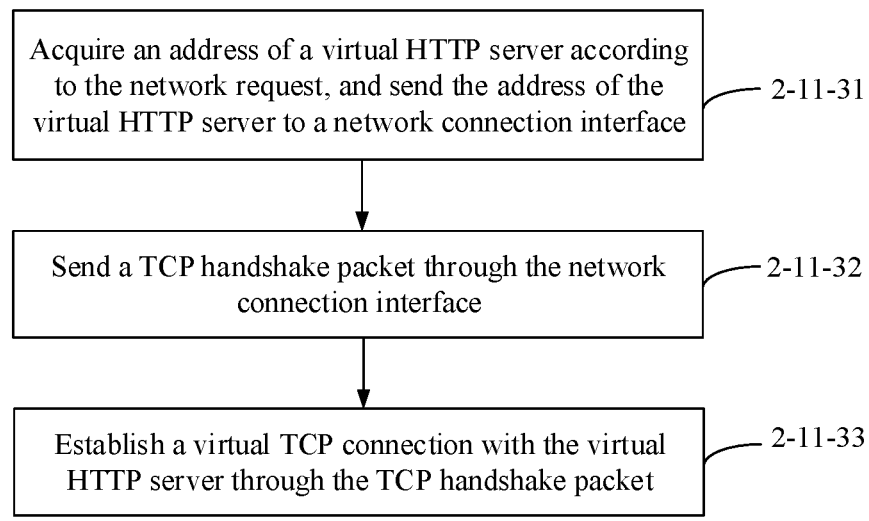
Figures 1, 3, 4, 5:
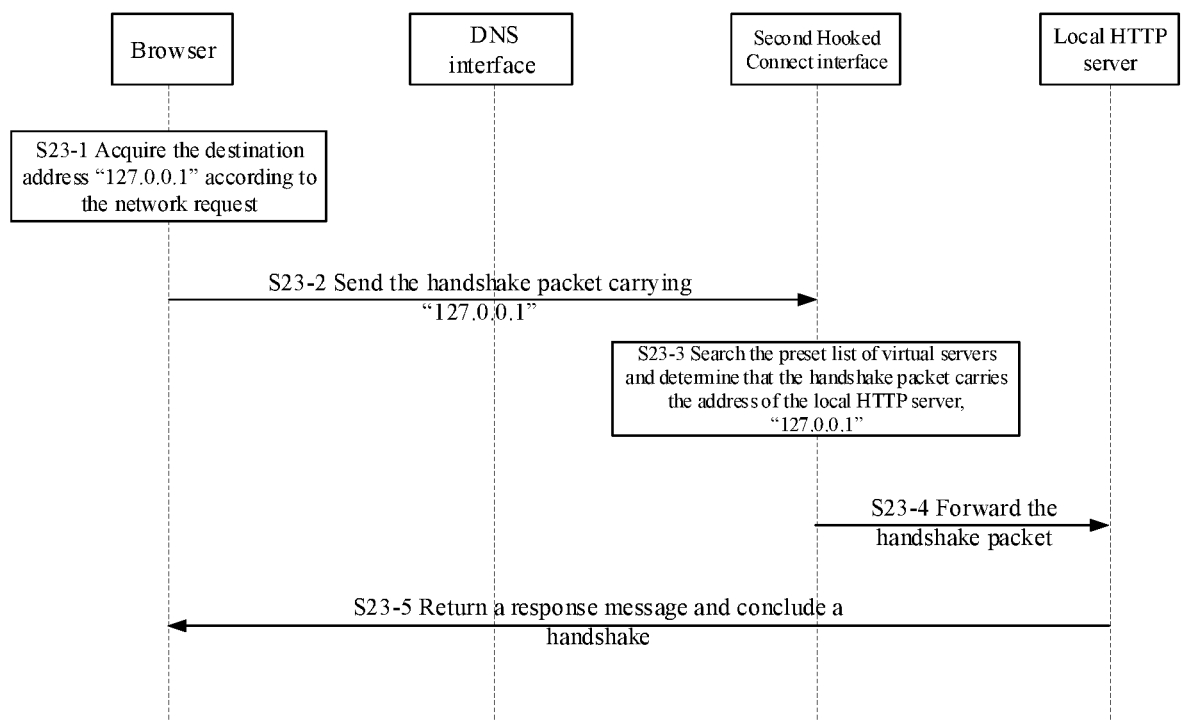
Figures 3, 4, 5, 6:
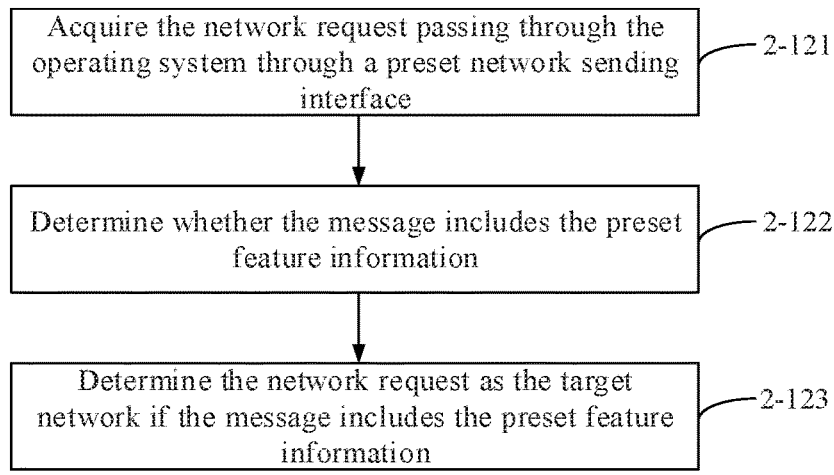
Figures 3, 4, 5, 6, 7:
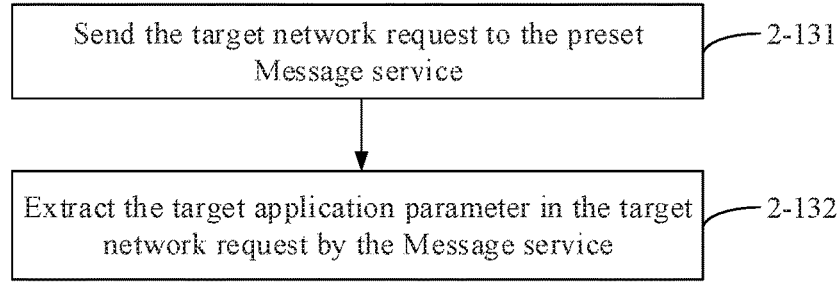
Figures 1, 3, 4, 5, 6, 7, 8:
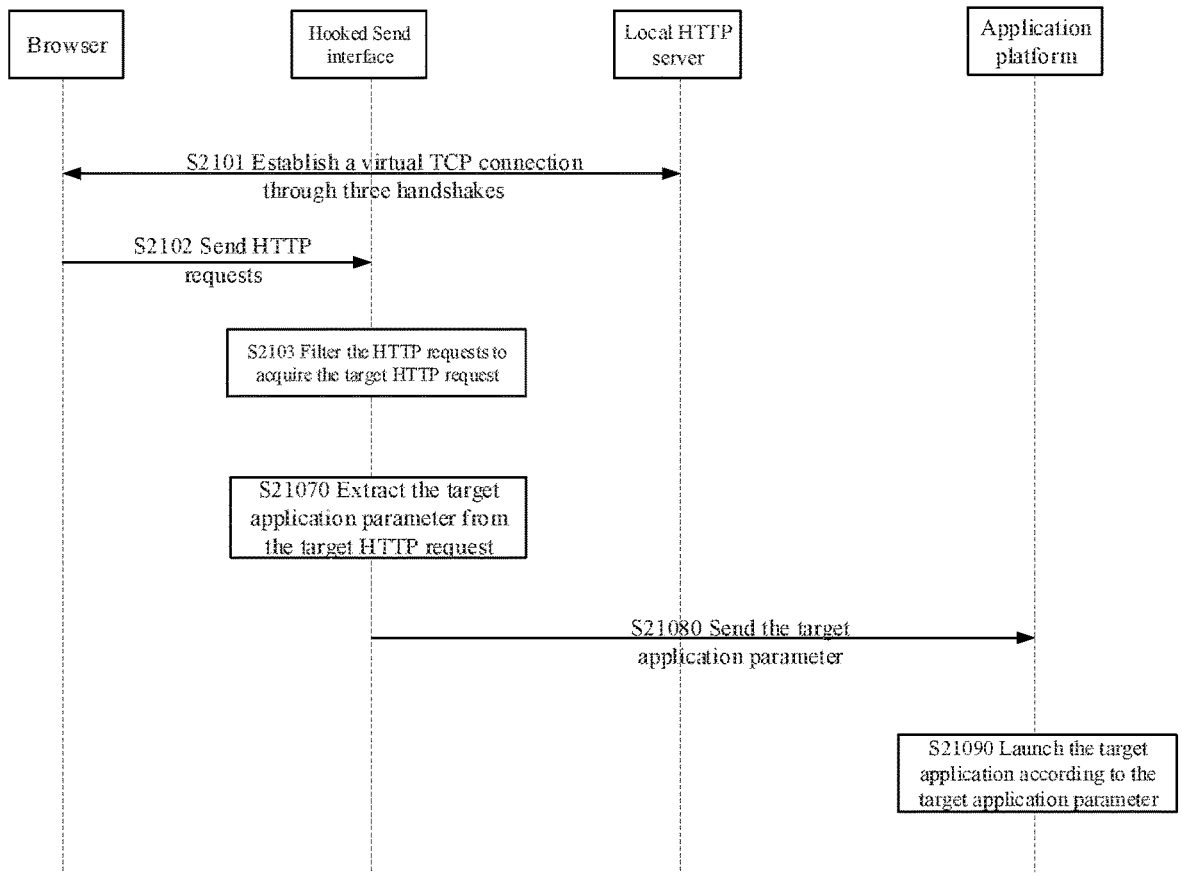
Figures 2, 3, 4, 5, 6, 7, 8:
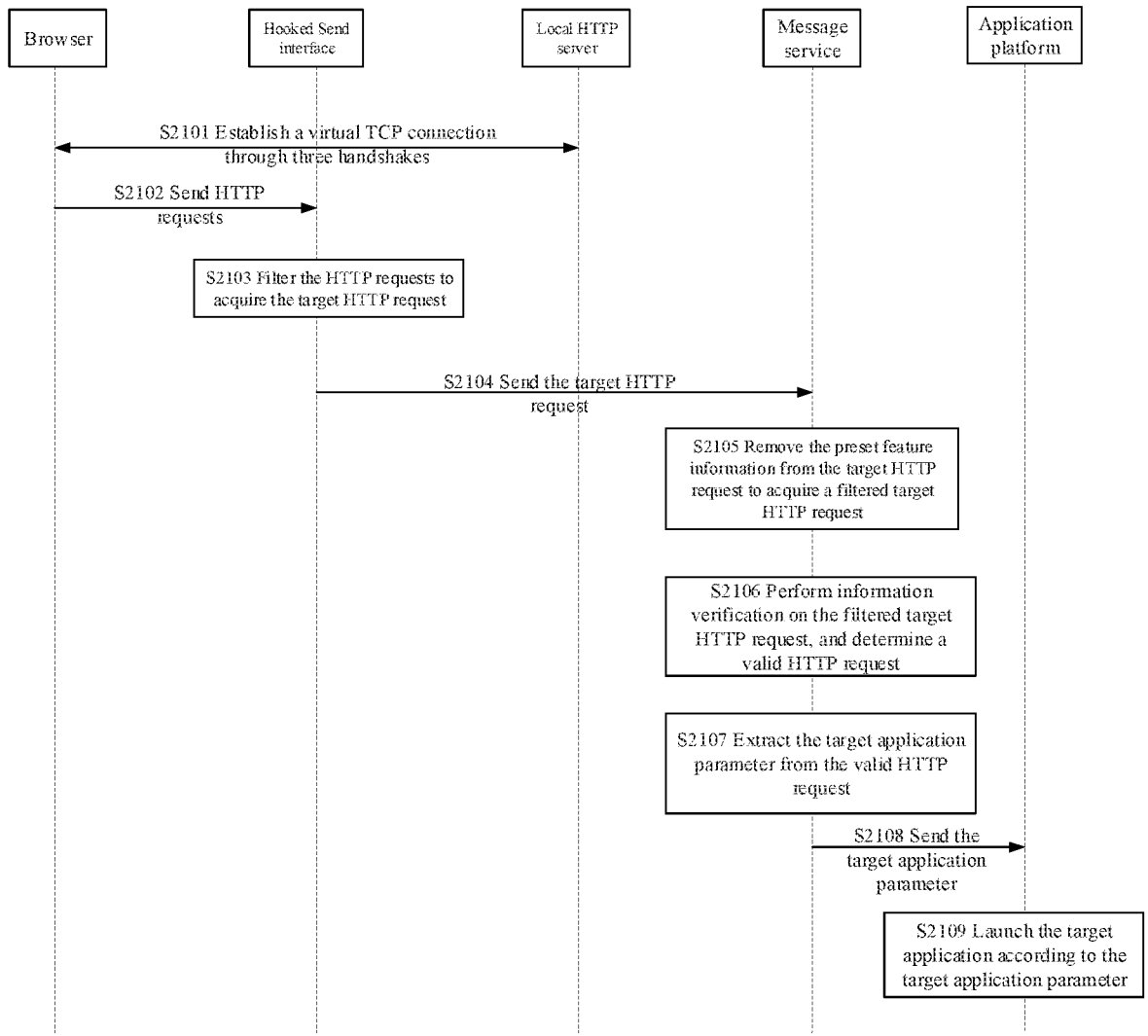
Figures 3, 4, 5, 6, 7, 8:
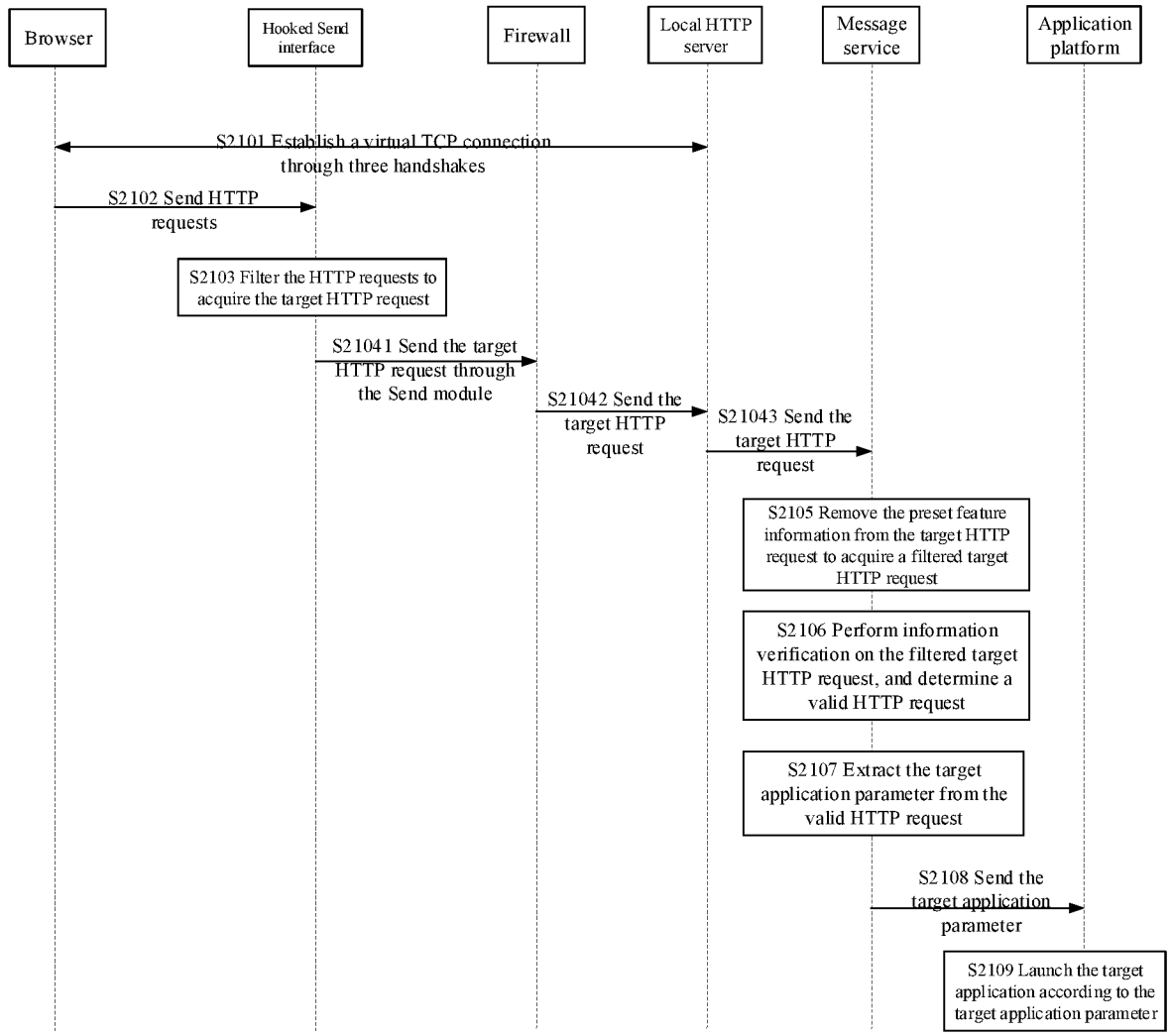
Figures 3, 4, 5, 6, 7, 8, 9:
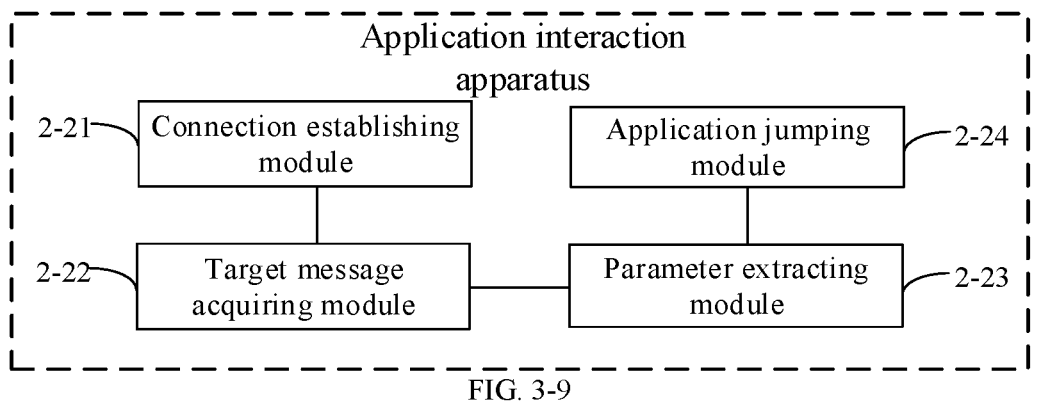
Figures 3, 4, 5, 6, 7, 8, 9, 10:
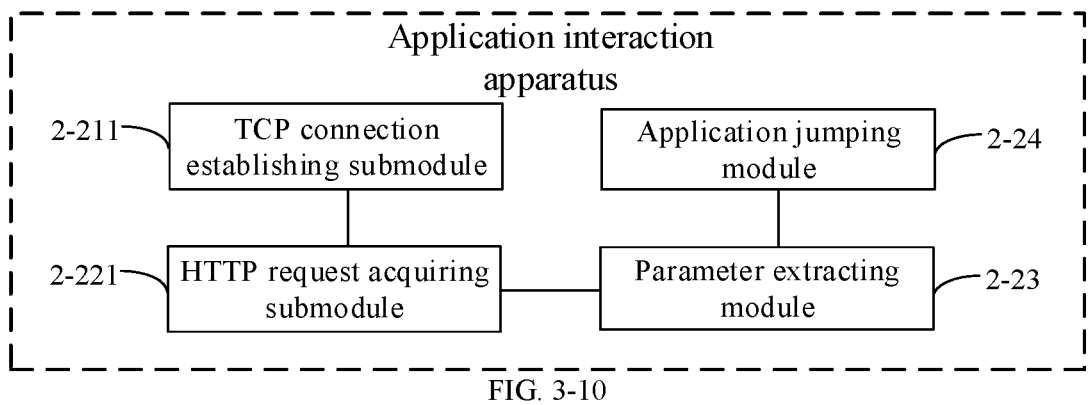
Figures 3, 4, 5, 6, 7, 8, 9, 10, 11:
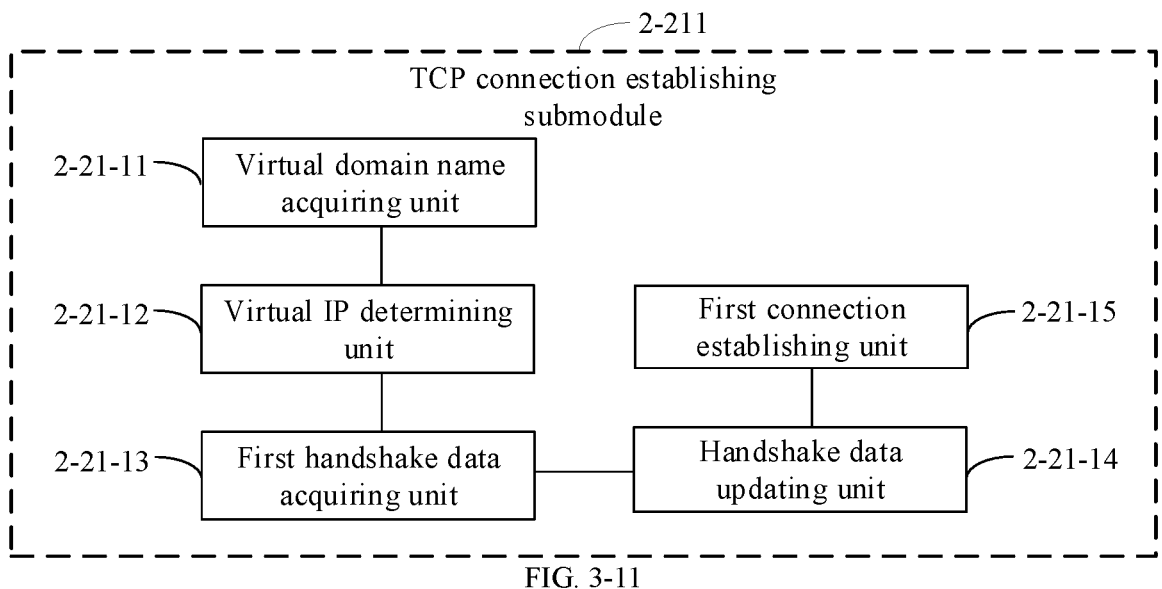
Figures 3, 4, 5, 6, 7, 8, 9, 10, 11, 12:
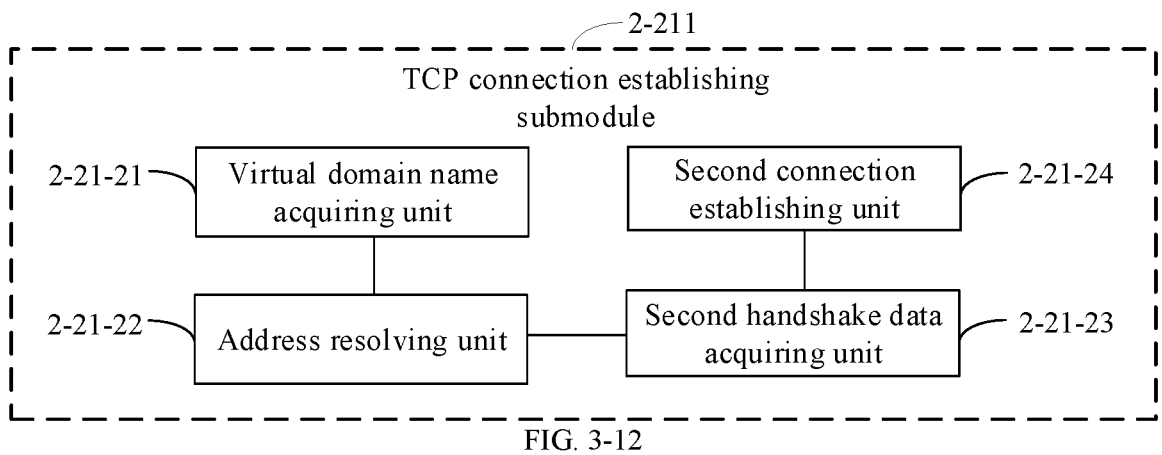
Figures 3, 4, 5, 6, 7, 8, 9, 10, 11, 12, 13:
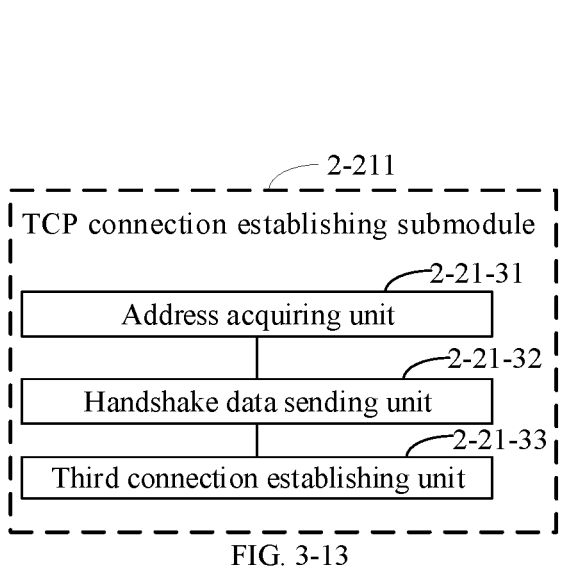
Figures 3, 4, 5, 6, 7, 8, 9, 10, 11, 12, 13, 14:
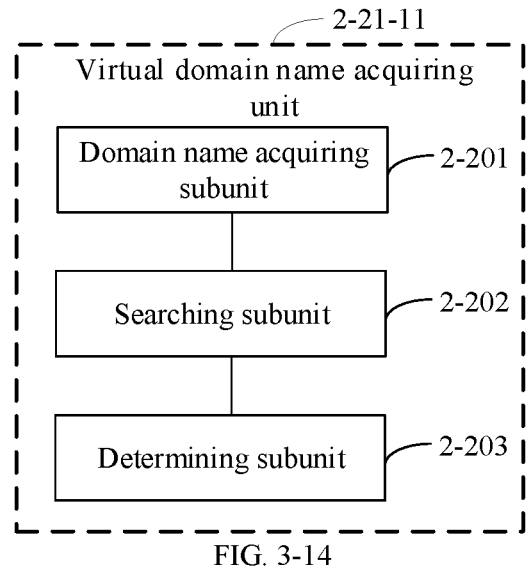
Figures 3, 4, 5, 6, 7, 8, 9, 10, 11, 12, 13, 14, 15:
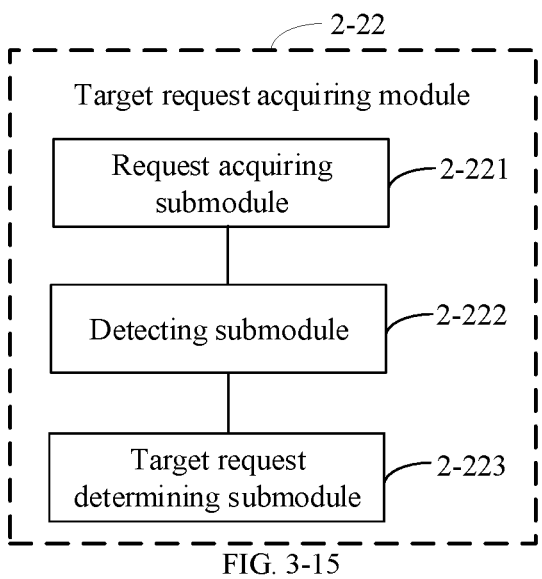
Figures 3, 4, 5, 6, 7, 8, 9, 10, 11, 12, 13, 14, 15, 16:
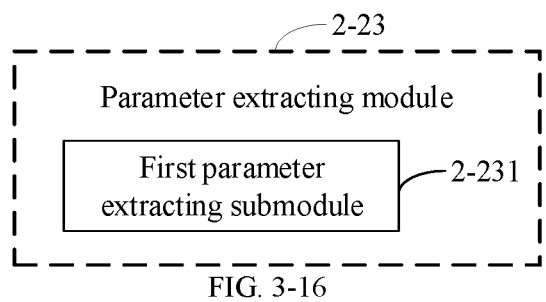
Figures 3, 4, 5, 6, 7, 8, 9, 10, 11, 12, 13, 14, 15, 16, 17:
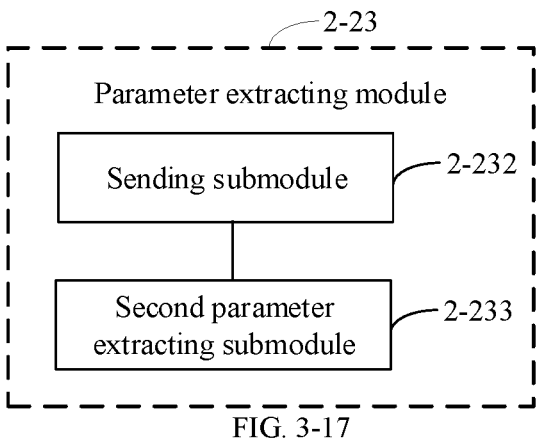
Figures 3, 4, 5, 6, 7, 8, 9, 10, 11, 12, 13, 14, 15, 16, 17, 18:
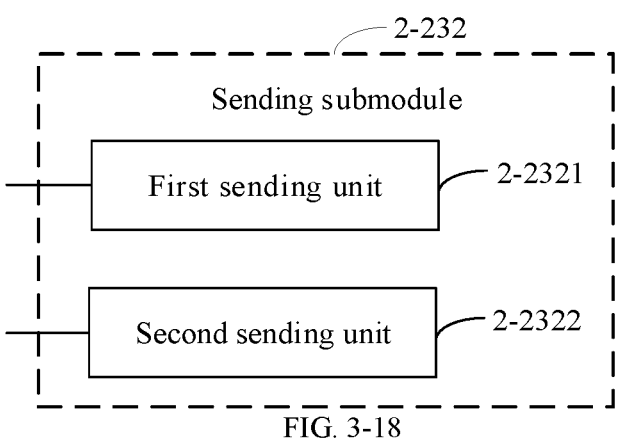
Figures 1, 2, 4:
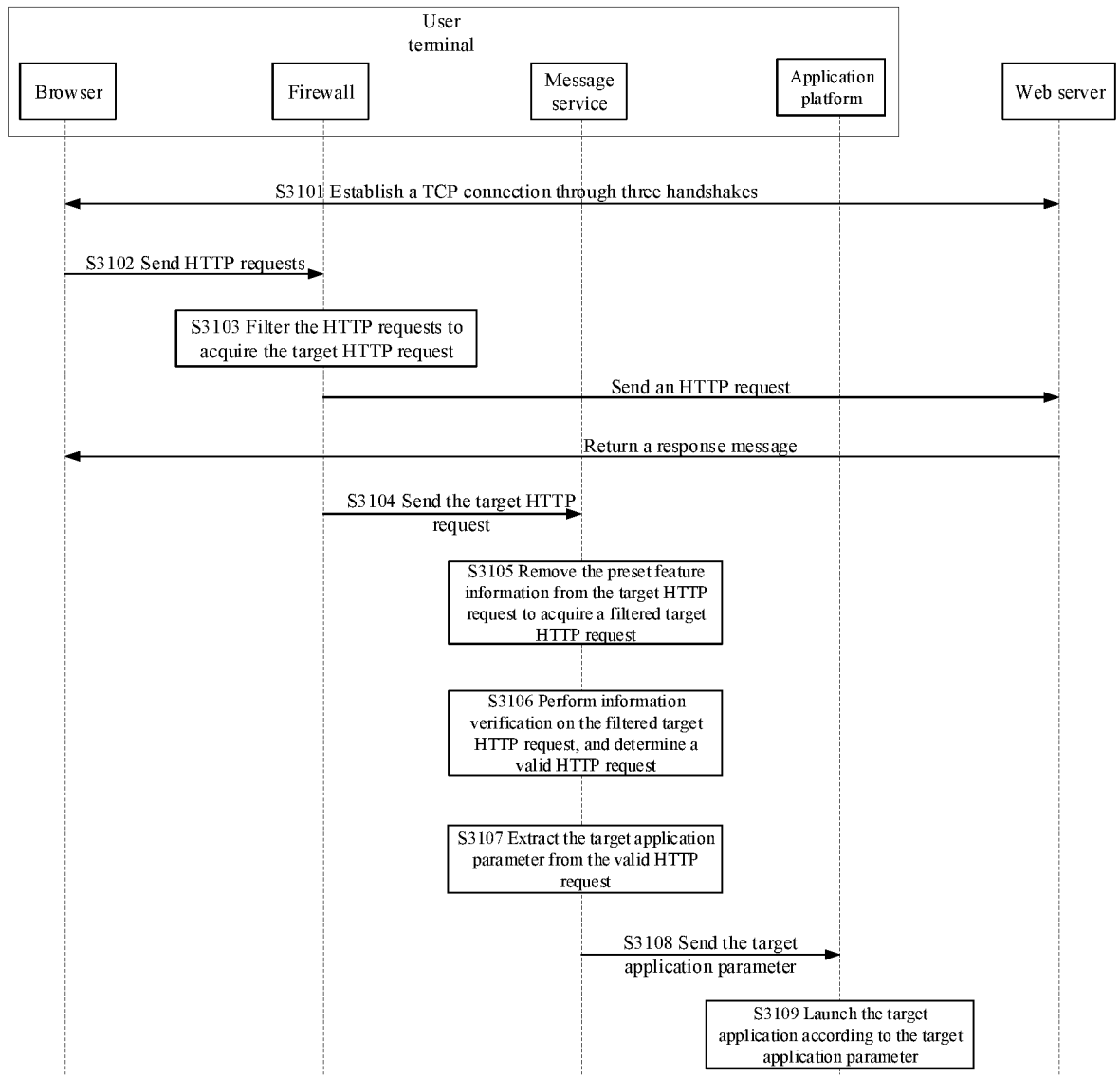
Figures 2, 4:
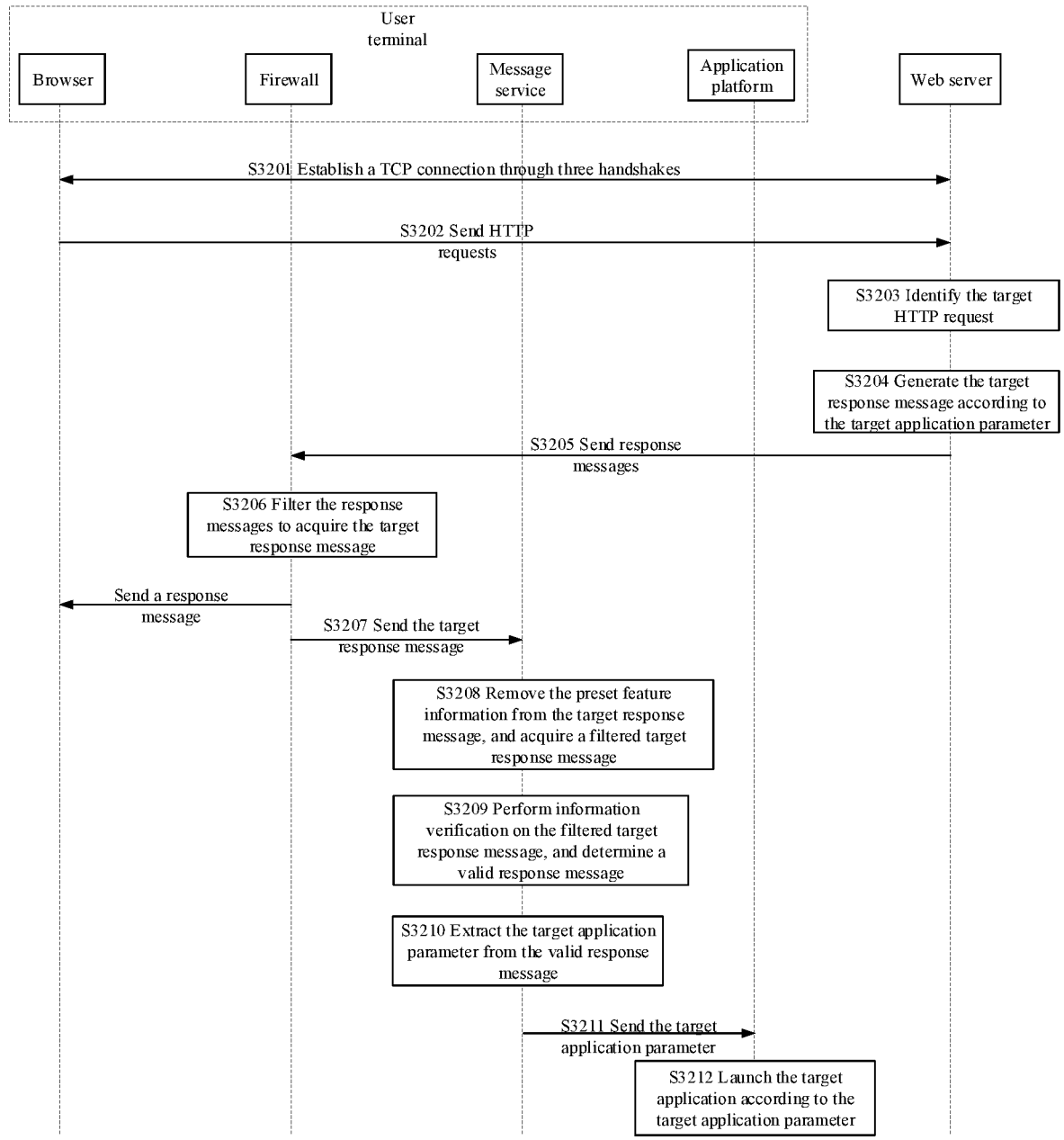
Figures 3, 4:
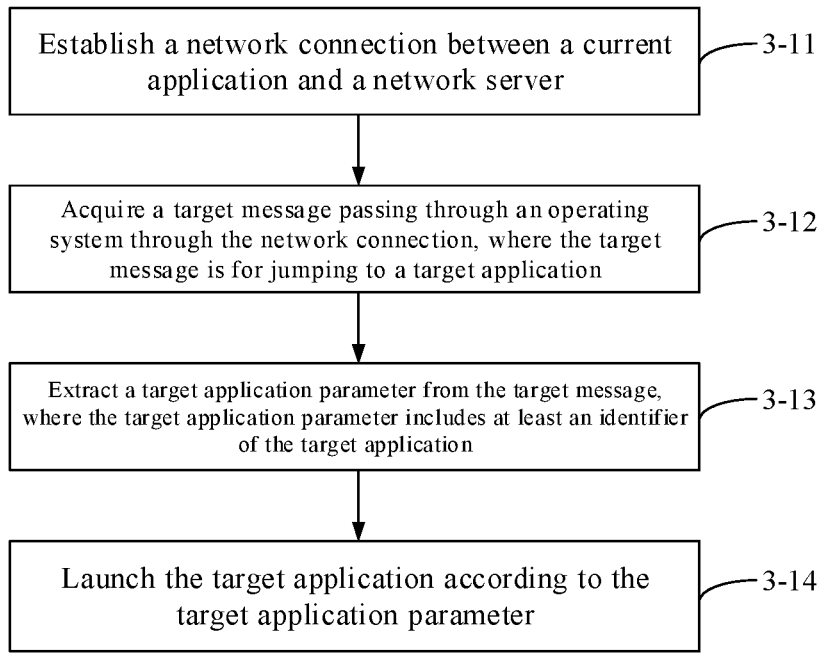
Figure 4:
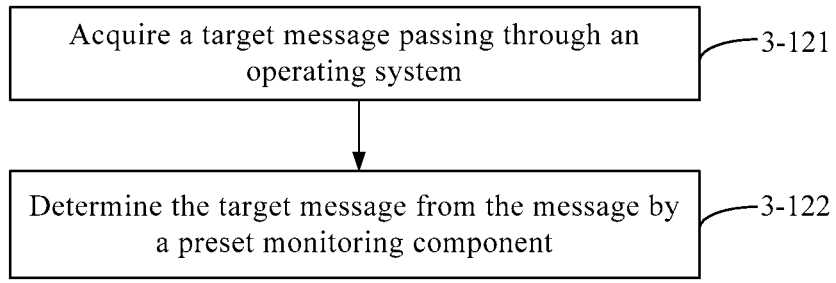
Figures 4, 5:
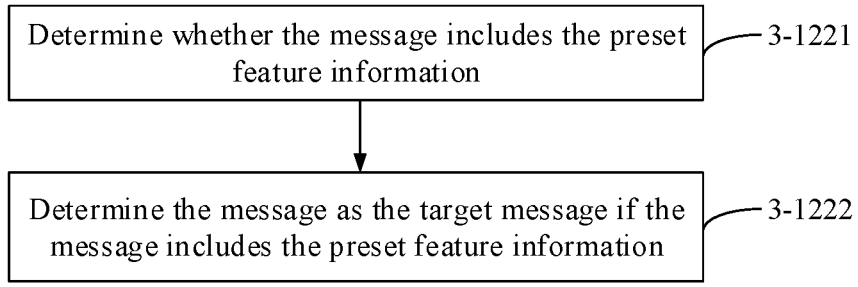
Figures 4, 5, 6:
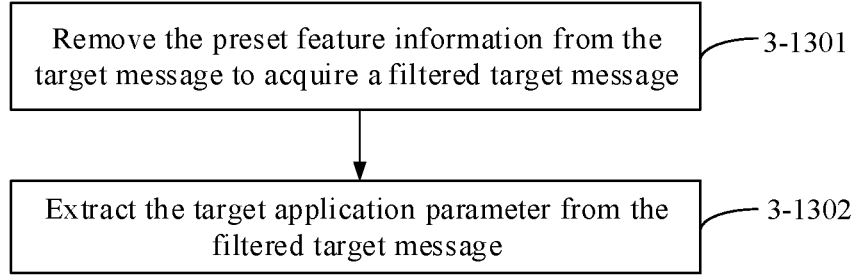
Figures 4, 5, 6, 7:
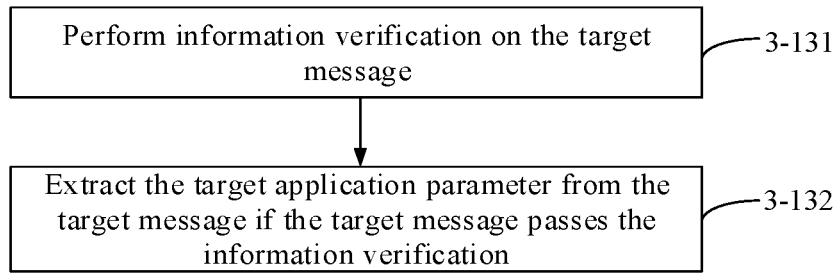
Figures 4, 5, 6, 7, 8:
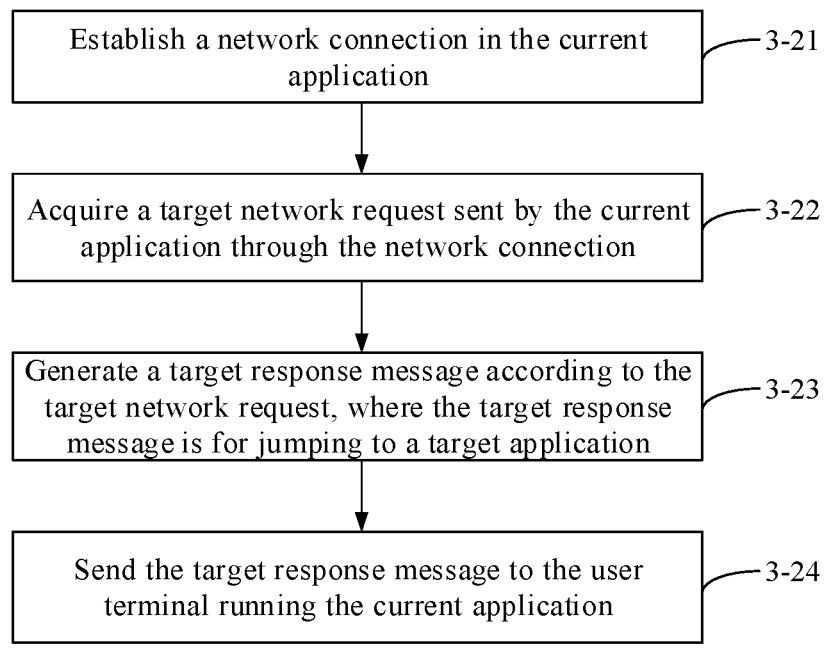
Figures 4, 5, 6, 7, 8, 9:
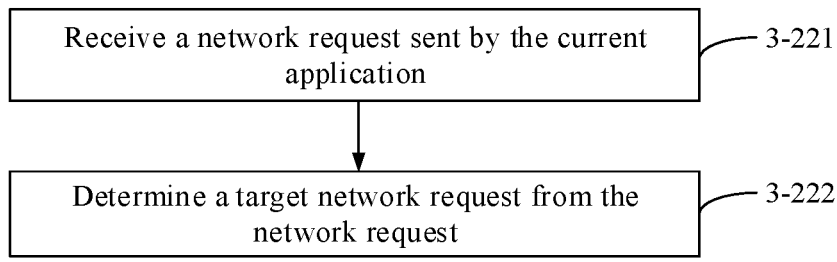
Figures 4, 5, 6, 7, 8, 9, 10:
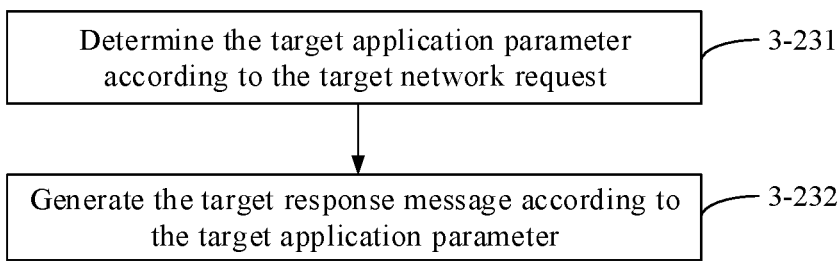
Figures 4, 5, 6, 7, 8, 9, 10, 11:
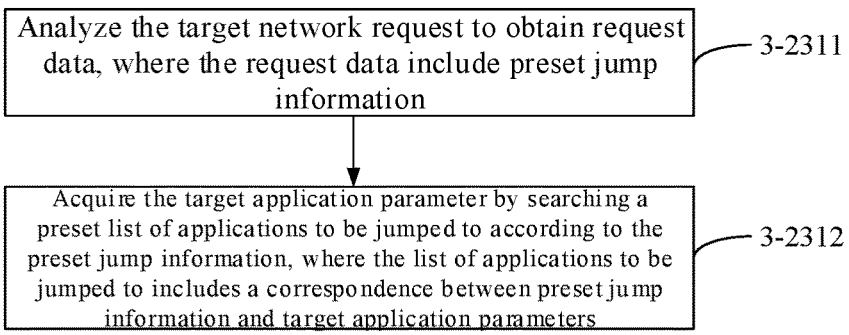
Figures 4, 5, 6, 7, 8, 9, 10, 11, 12:
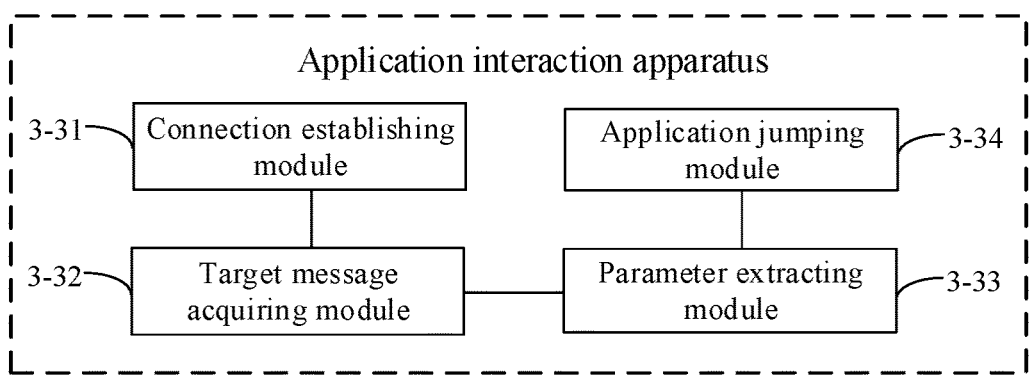
Figures 4, 5, 6, 7, 8, 9, 10, 11, 12, 13:
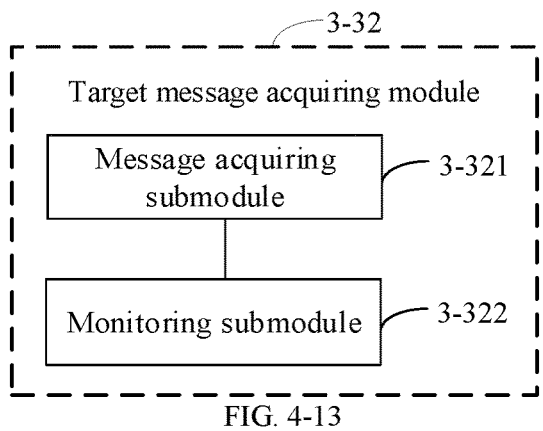
Figures 4, 5, 6, 7, 8, 9, 10, 11, 12, 13, 14:
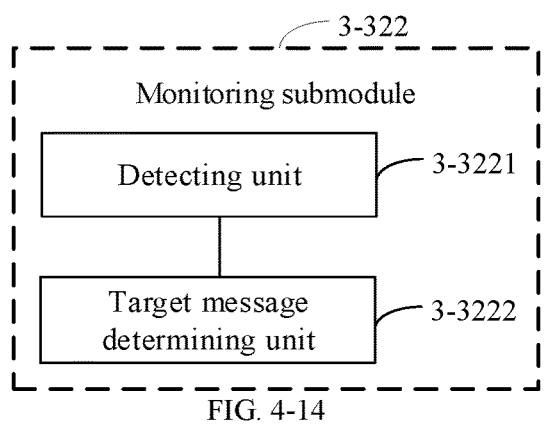
Figures 4, 5, 6, 7, 8, 9, 10, 11, 12, 13, 14, 15:
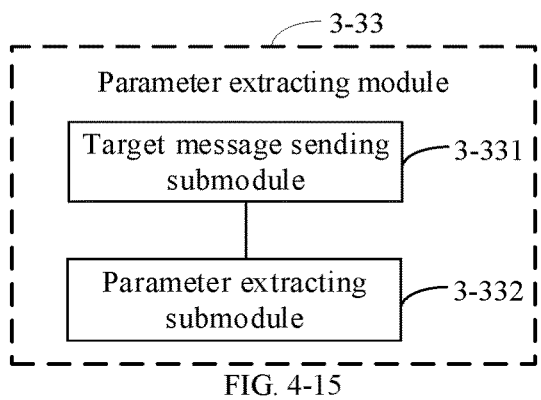
Figures 4, 5, 6, 7, 8, 9, 10, 11, 12, 13, 14, 15, 16:
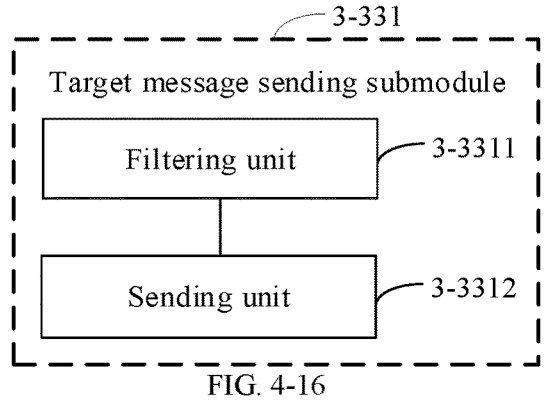
Figures 4, 5, 6, 7, 8, 9, 10, 11, 12, 13, 14, 15, 16, 17:
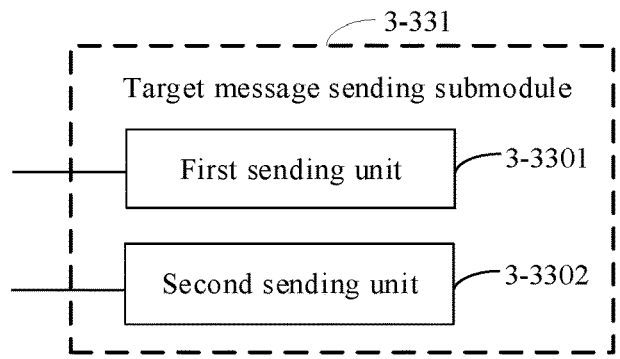
Figures 4, 5, 6, 7, 8, 9, 10, 11, 12, 13, 14, 15, 16, 17, 18:
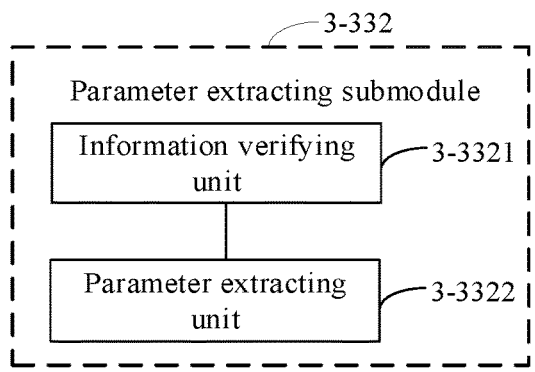
Figures 4, 5, 6, 7, 8, 9, 10, 11, 12, 13, 14, 15, 16, 17, 18, 19:
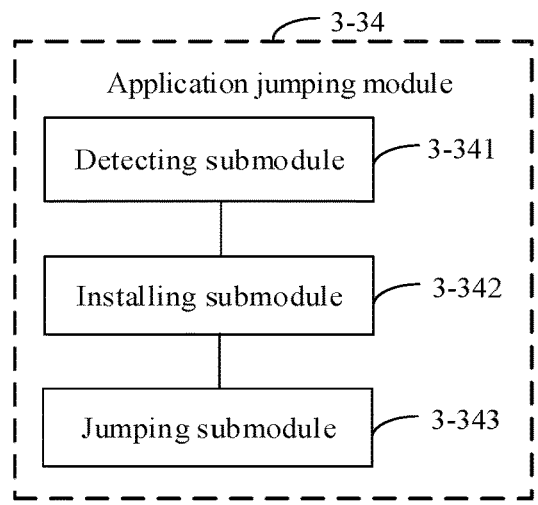
Figures 4, 5, 6, 7, 8, 9, 10, 11, 12, 13, 14, 15, 16, 17, 18, 19, 20:
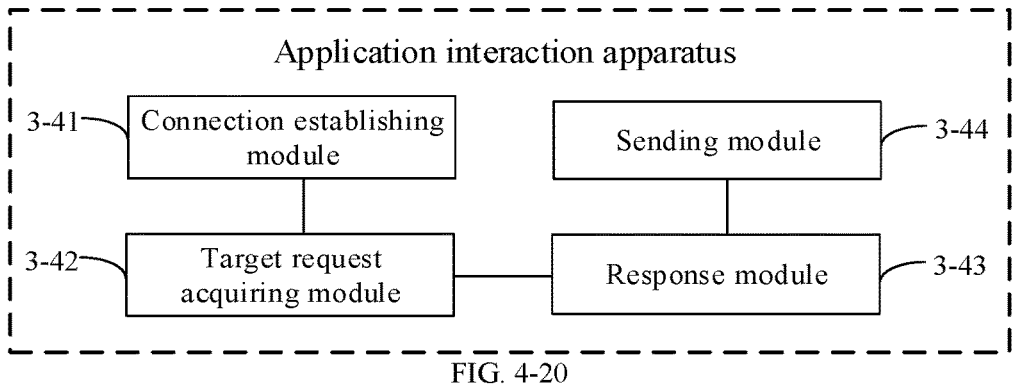
Figures 4, 5, 6, 7, 8, 9, 10, 11, 12, 13, 14, 15, 16, 17, 18, 19, 20, 21:
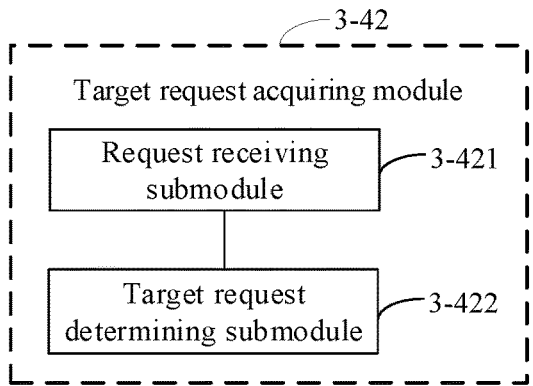
Figures 4, 5, 6, 7, 8, 9, 10, 11, 12, 13, 14, 15, 16, 17, 18, 19, 20, 21, 22:
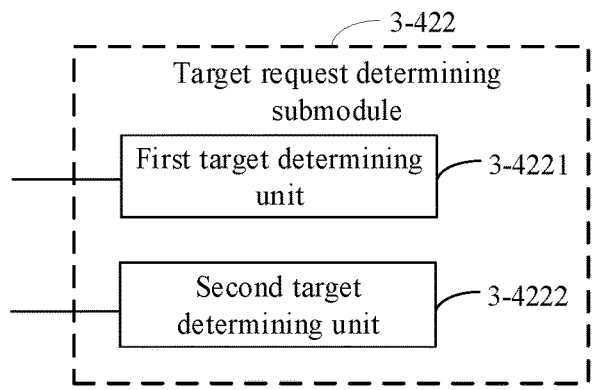
Figures 4, 5, 6, 7, 8, 9, 10, 11, 12, 13, 14, 15, 16, 17, 18, 19, 20, 21, 22, 23:
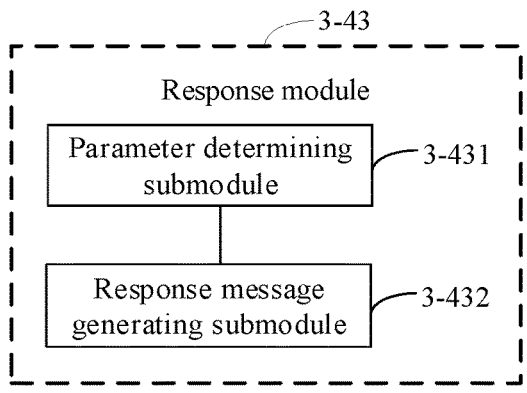
Figures 4, 5, 6, 7, 8, 9, 10, 11, 12, 13, 14, 15, 16, 17, 18, 19, 20, 21, 22, 23, 24:
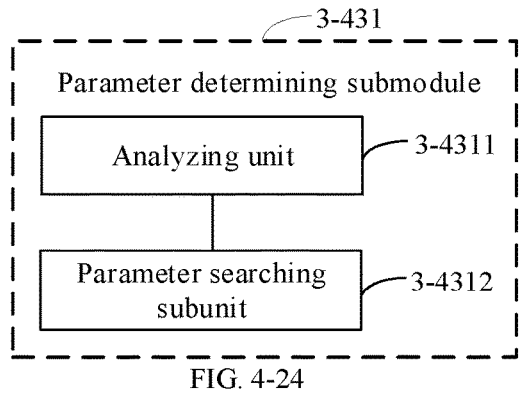
Figures 1, 5:
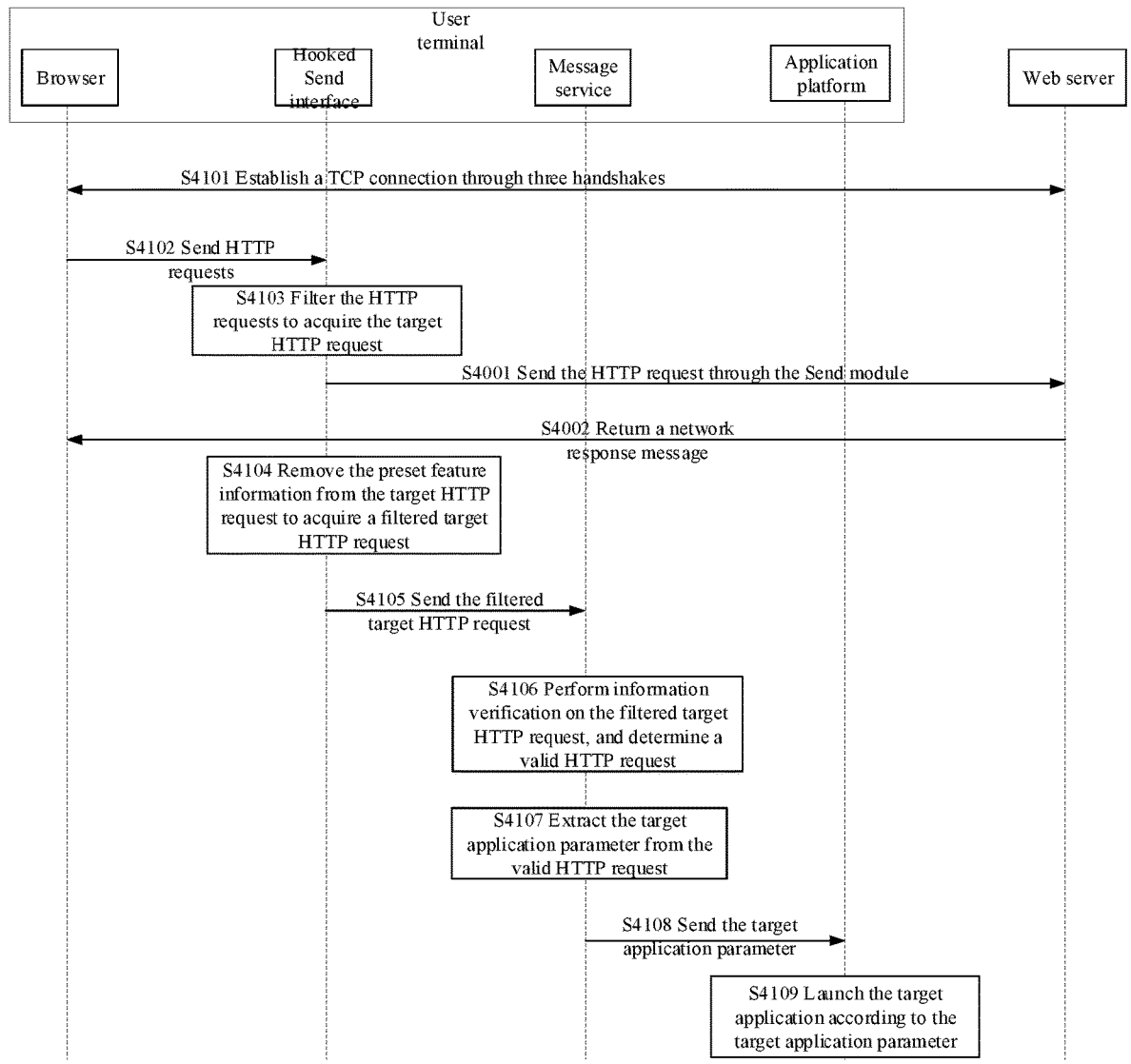
Figures 1, 2, 5:
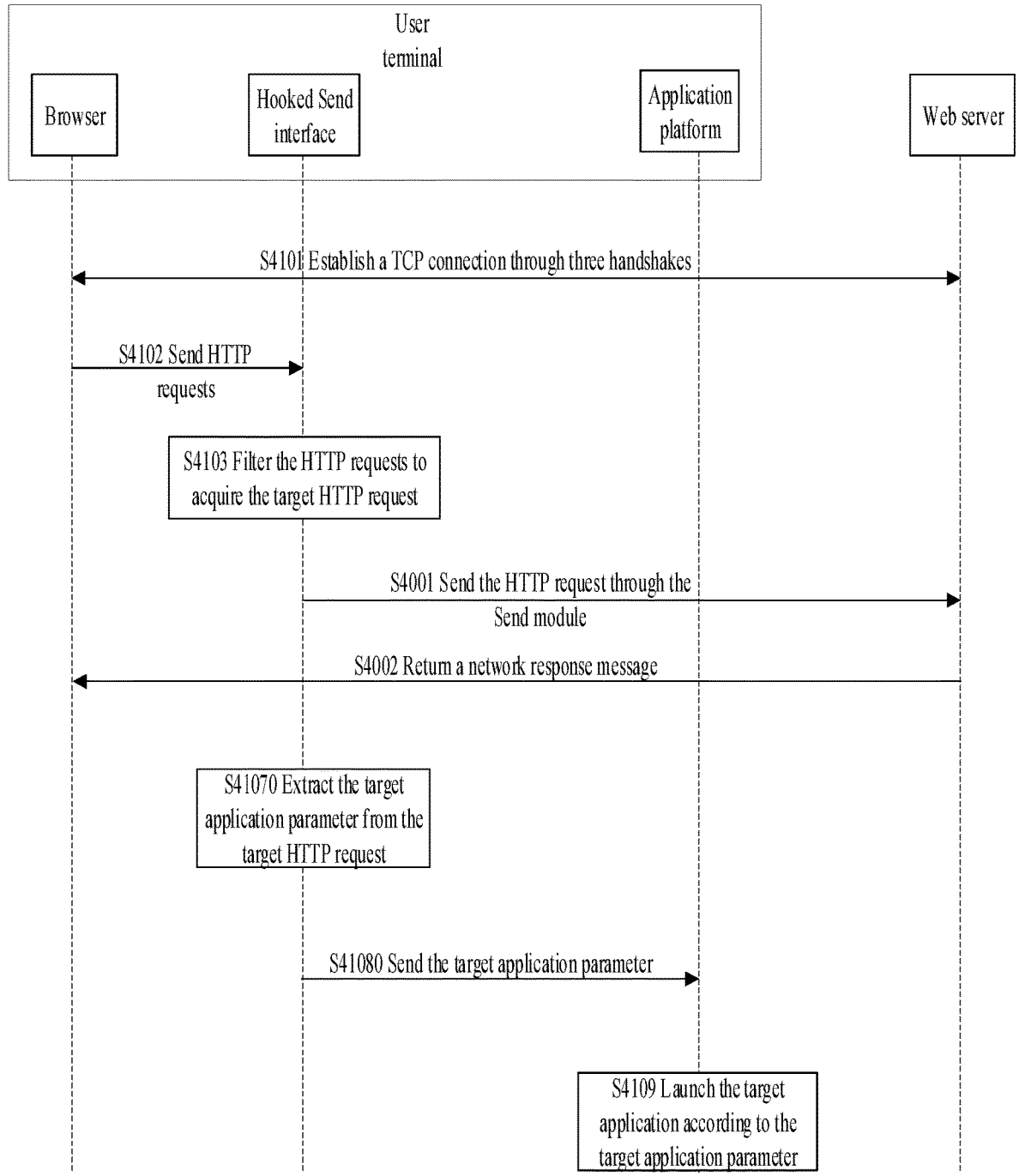
Figures 1, 3, 5:
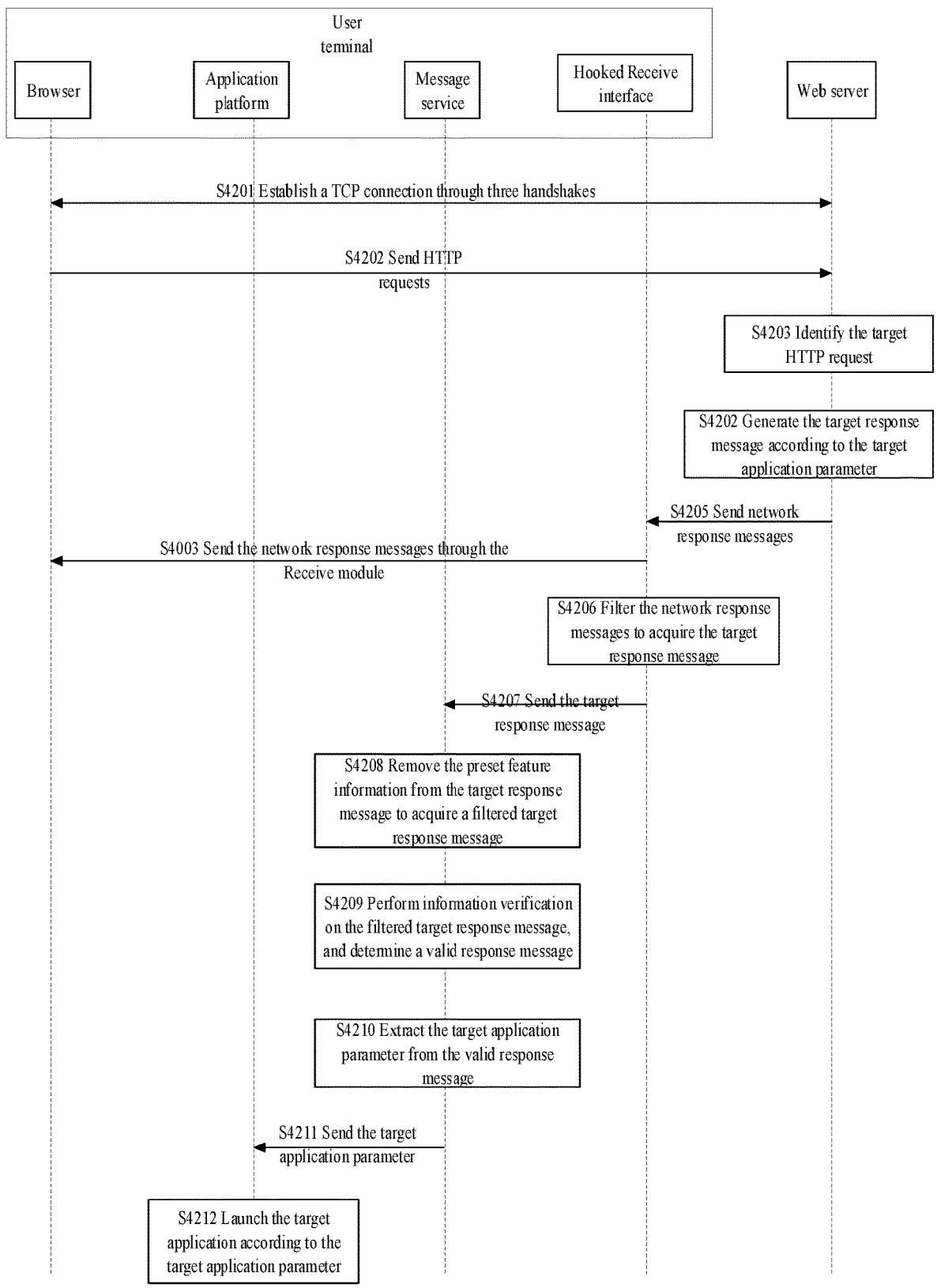
Figures 1, 4, 5:
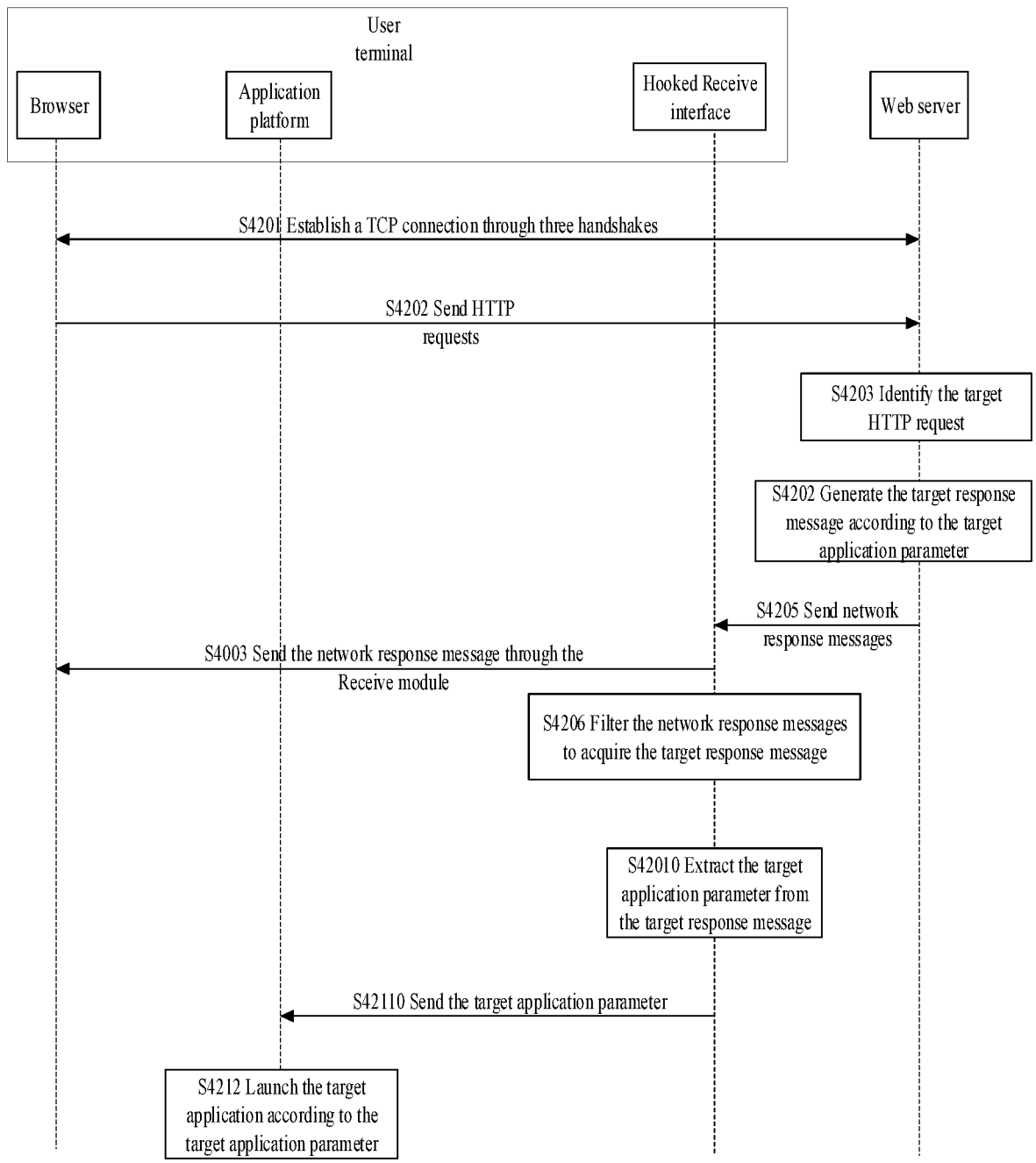
Figures 2, 5:
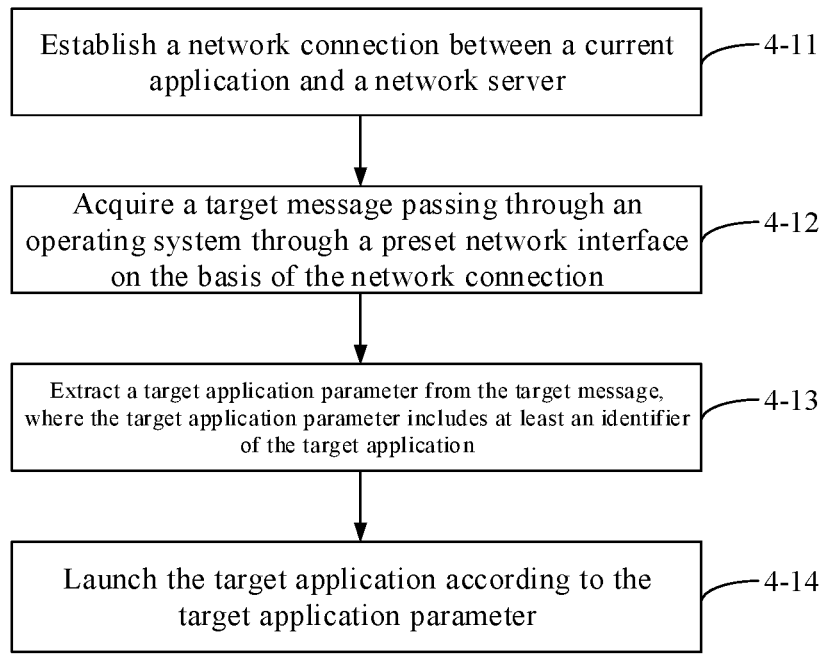
Figures 3, 5:
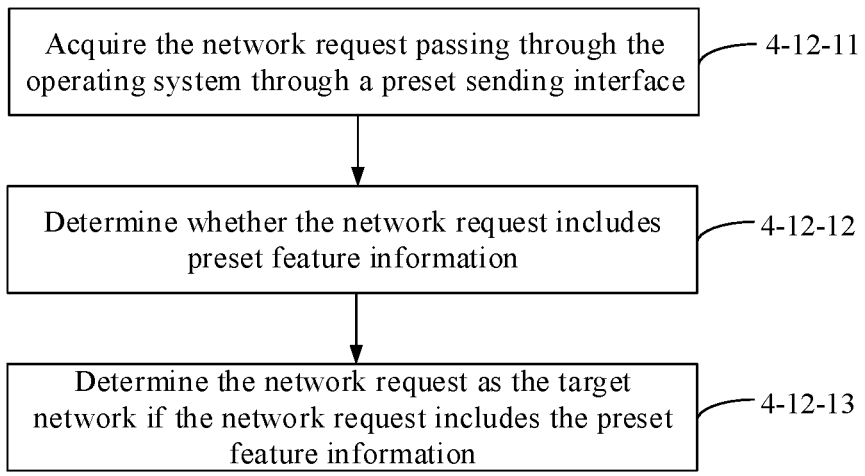
Figures 4, 5:
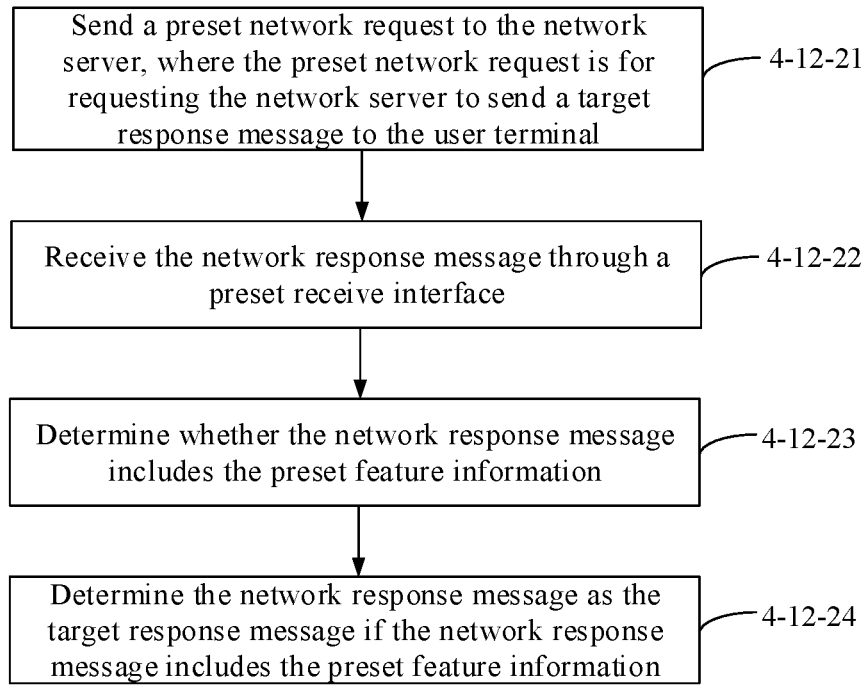
Figure 5:
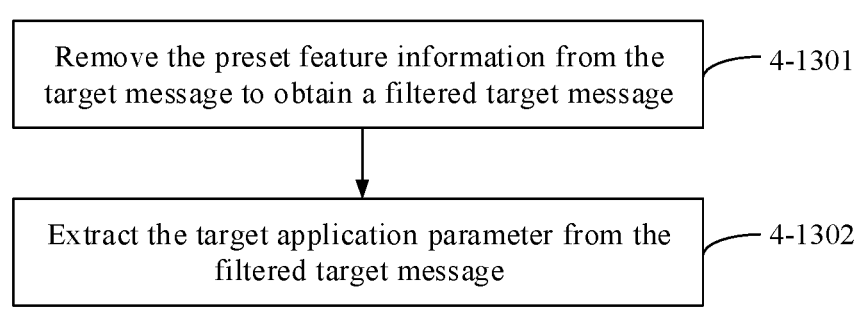
Figures 5, 6:
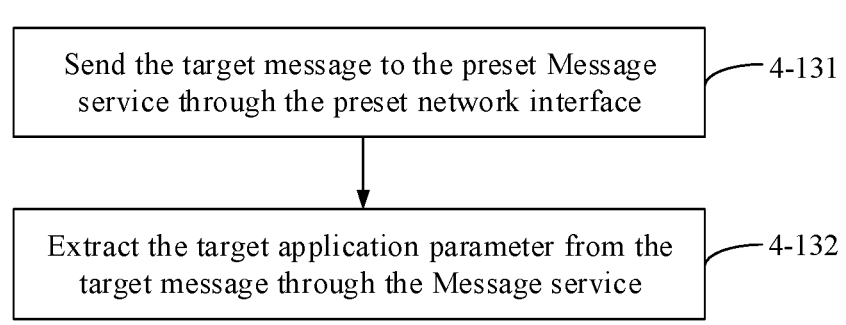
Figures 5, 6, 7:
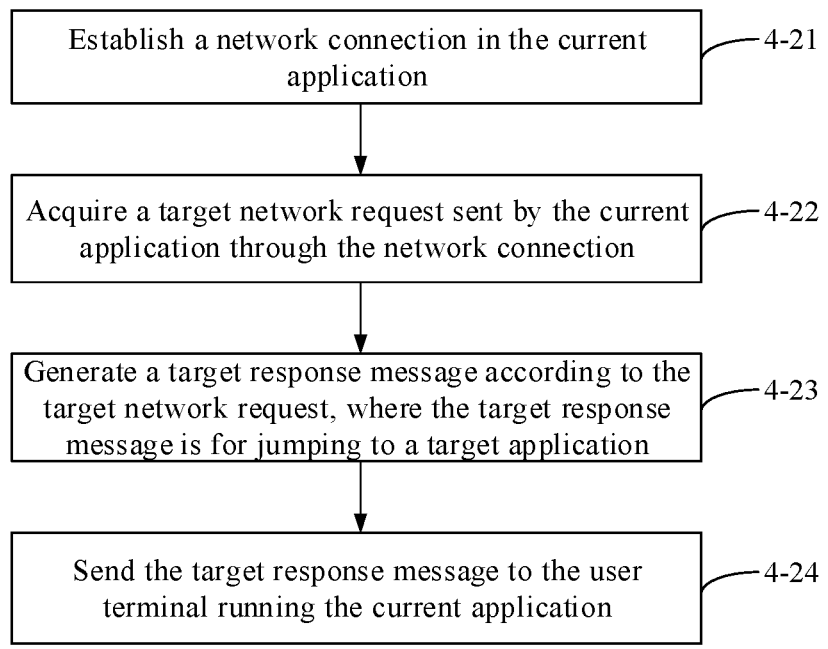
Figures 5, 6, 7, 8:
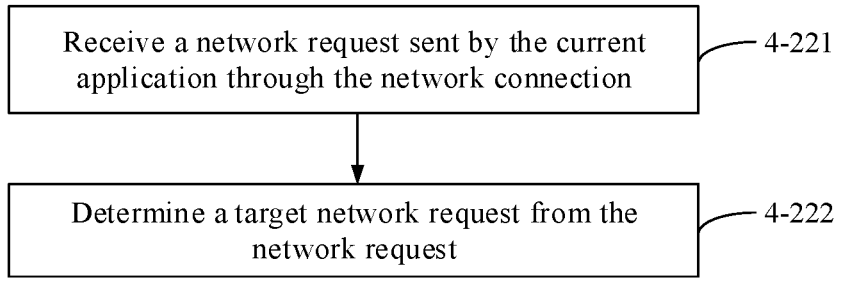
Figures 5, 6, 7, 8, 9:
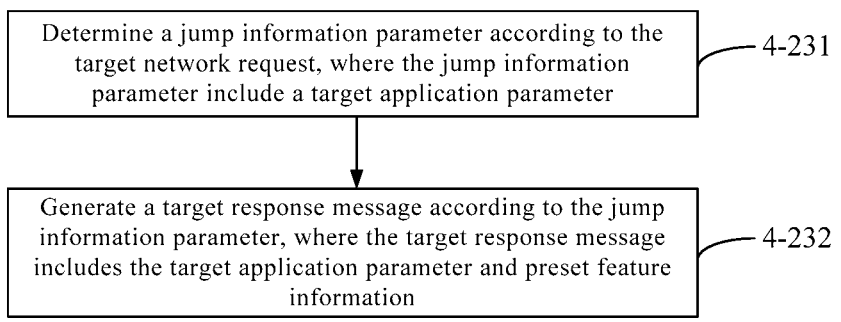
Figures 5, 6, 7, 8, 9, 10:
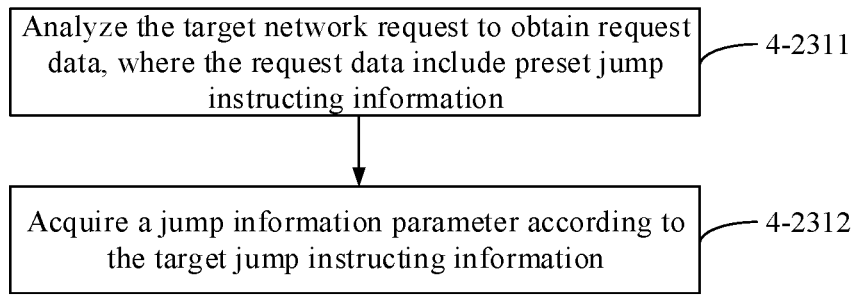
Figures 5, 6, 7, 8, 9, 10, 11:
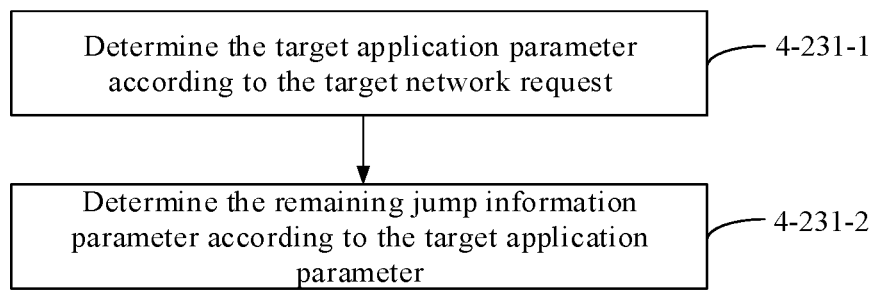
Figures 5, 6, 7, 8, 9, 10, 11, 12:
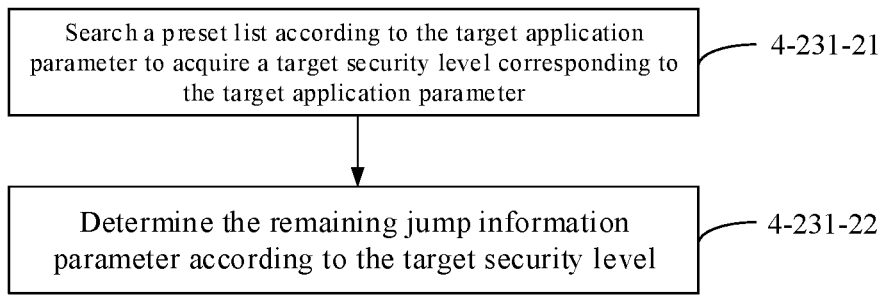
Figures 5, 6, 7, 8, 9, 10, 11, 12, 13:
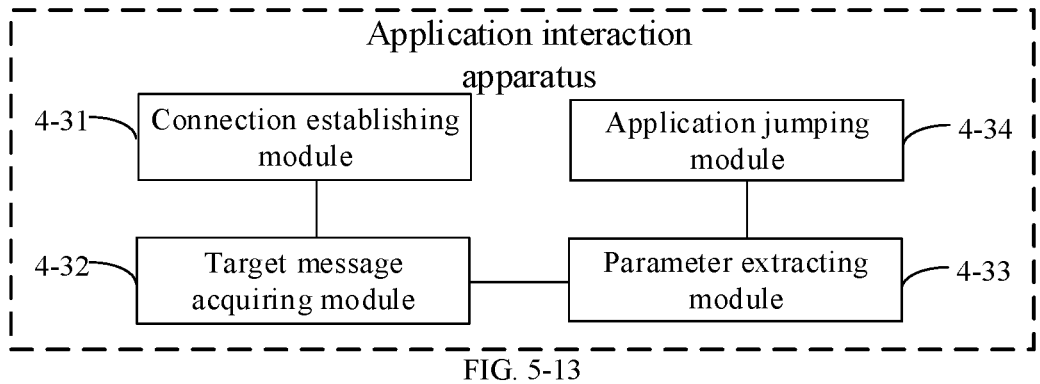
Figures 5, 6, 7, 8, 9, 10, 11, 12, 13, 14, 15:
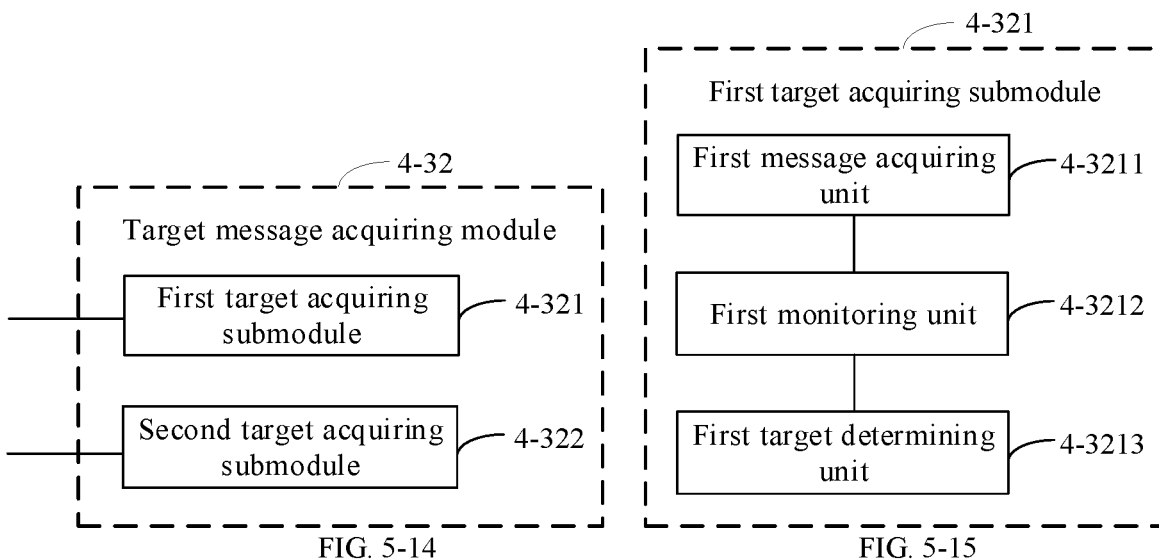
Figures 5, 6, 7, 8, 9, 10, 11, 12, 13, 14, 15, 16:
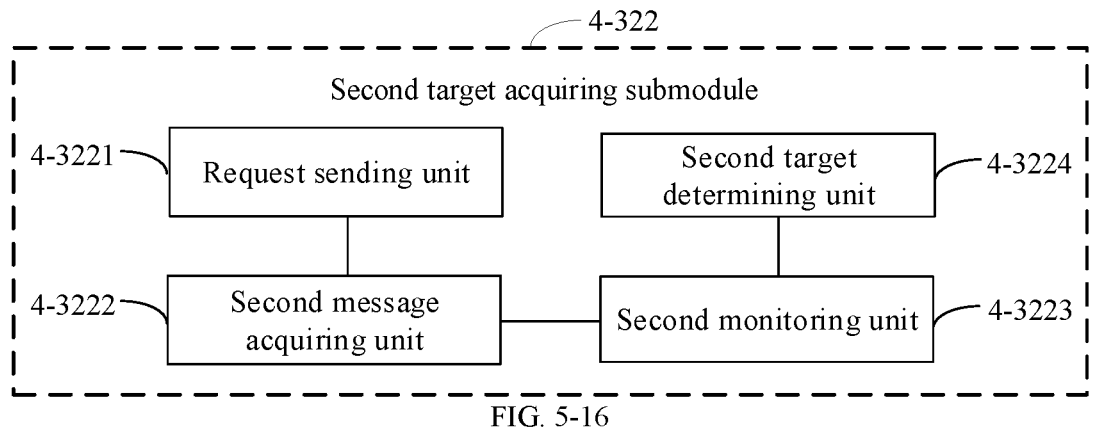
Figures 5, 6, 7, 8, 9, 10, 11, 12, 13, 14, 15, 16, 17:
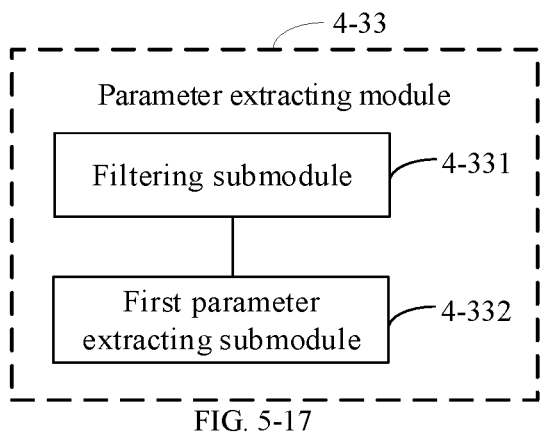
Figures 5, 6, 7, 8, 9, 10, 11, 12, 13, 14, 15, 16, 17, 18:
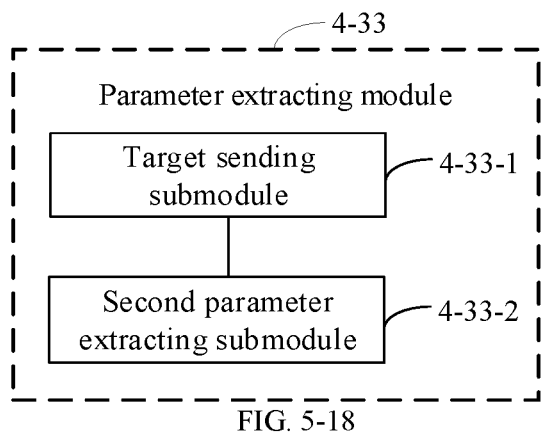
Figures 5, 6, 7, 8, 9, 10, 11, 12, 13, 14, 15, 16, 17, 18, 19:
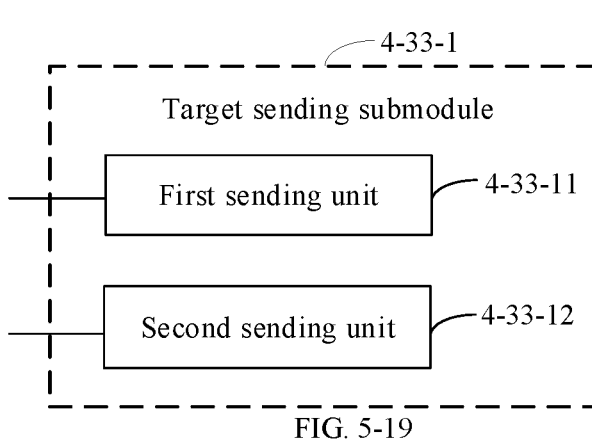
Figures 5, 6, 7, 8, 9, 10, 11, 12, 13, 14, 15, 16, 17, 18, 19, 20:
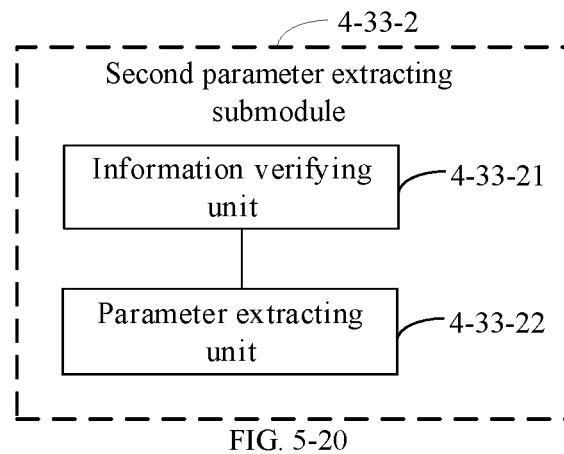
Figures 5, 6, 7, 8, 9, 10, 11, 12, 13, 14, 15, 16, 17, 18, 19, 20, 21:
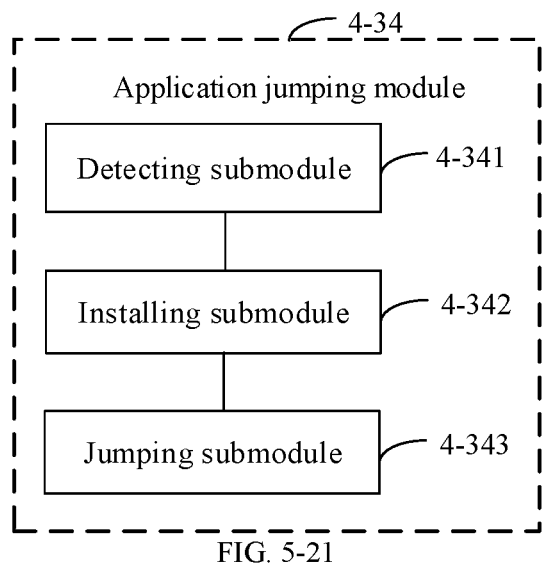
Figures 5, 6, 7, 8, 9, 10, 11, 12, 13, 14, 15, 16, 17, 18, 19, 20, 21, 22:
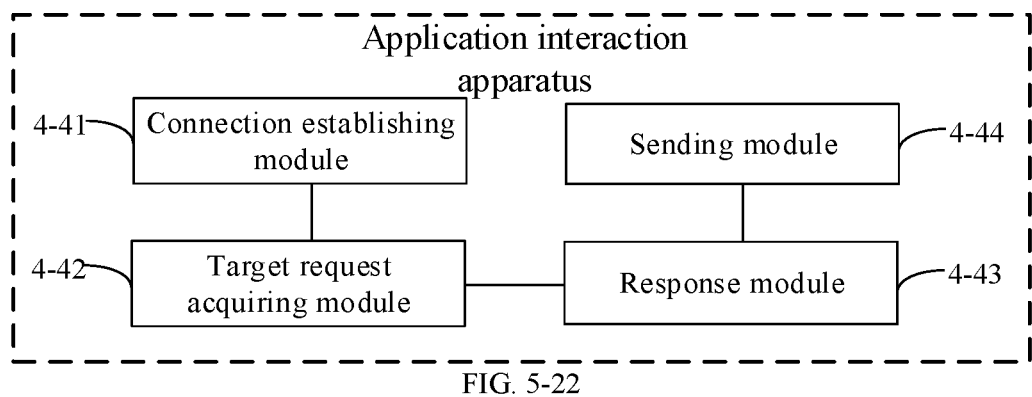
Figures 5, 6, 7, 8, 9, 10, 11, 12, 13, 14, 15, 16, 17, 18, 19, 20, 21, 22, 23:
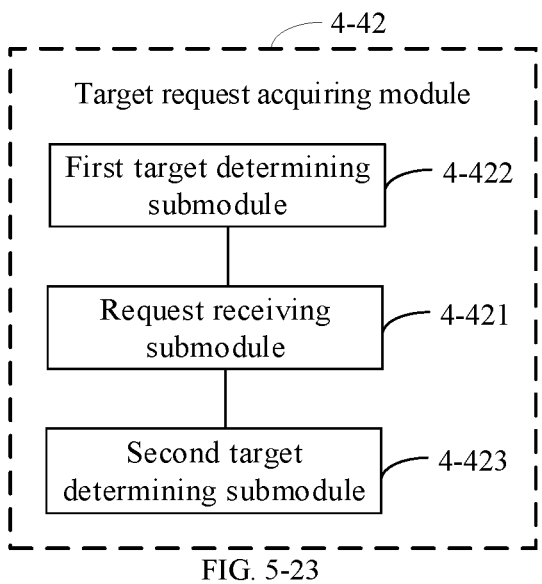
Figures 5, 6, 7, 8, 9, 10, 11, 12, 13, 14, 15, 16, 17, 18, 19, 20, 21, 22, 23, 24:
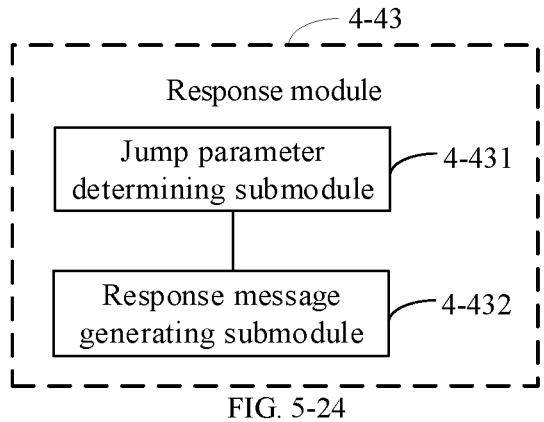
Figures 5, 6, 7, 8, 9, 10, 11, 12, 13, 14, 15, 16, 17, 18, 19, 20, 21, 22, 23, 24, 25:
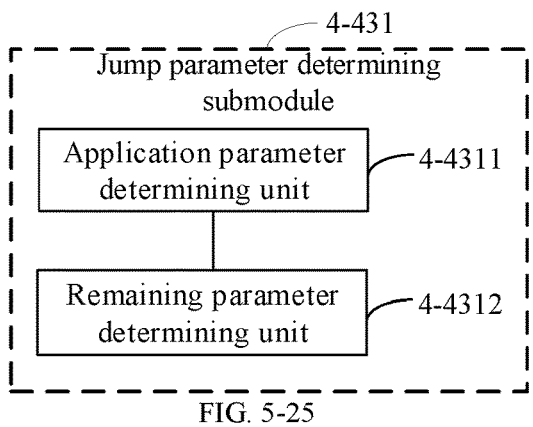
Figures 5, 6, 7, 8, 9, 10, 11, 12, 13, 14, 15, 16, 17, 18, 19, 20, 21, 22, 23, 24, 25, 26:
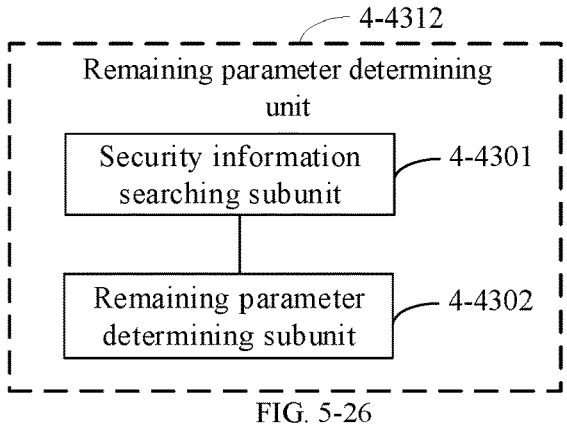
Figures 5, 6, 7, 8, 9, 10, 11, 12, 13, 14, 15, 16, 17, 18, 19, 20, 21, 22, 23, 24, 25, 26, 27:
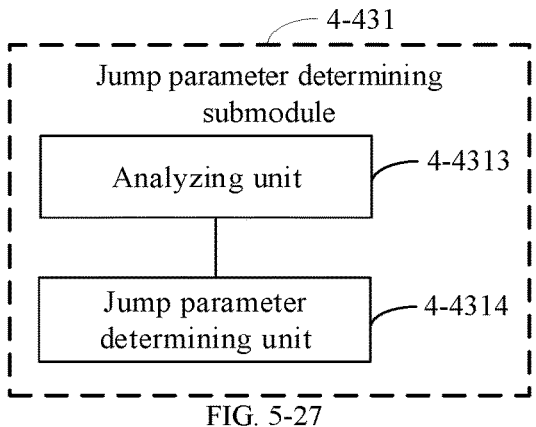
Figures 5, 6, 7, 8, 9, 10, 11, 12, 13, 14, 15, 16, 17, 18, 19, 20, 21, 22, 23, 24, 25, 26, 27, 28:
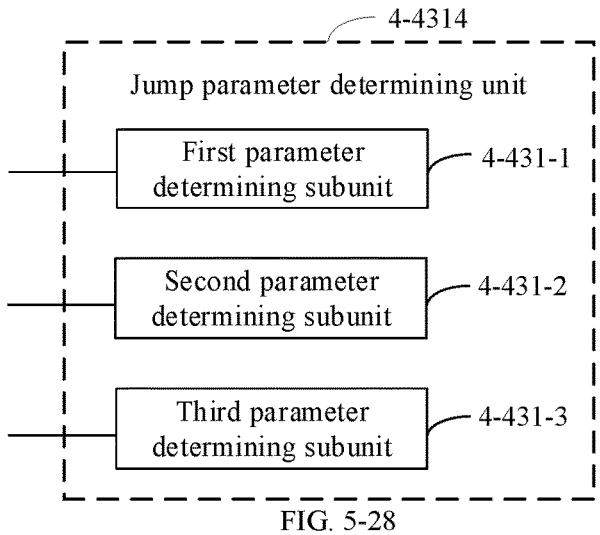
Figures 1, 6:
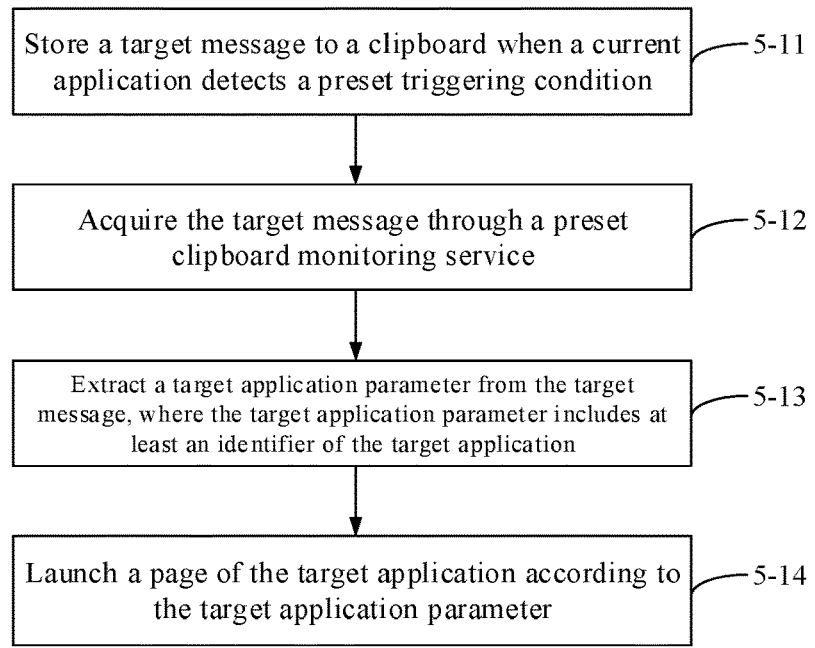
Figures 2, 6:
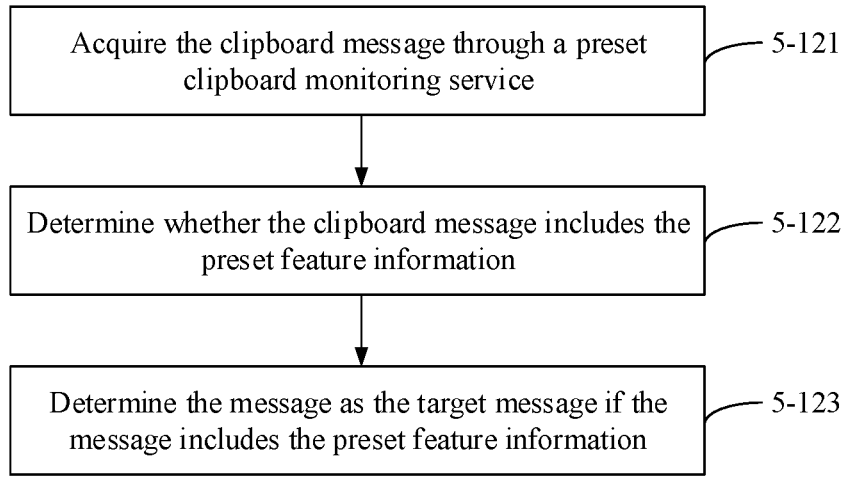
Figures 3, 6:
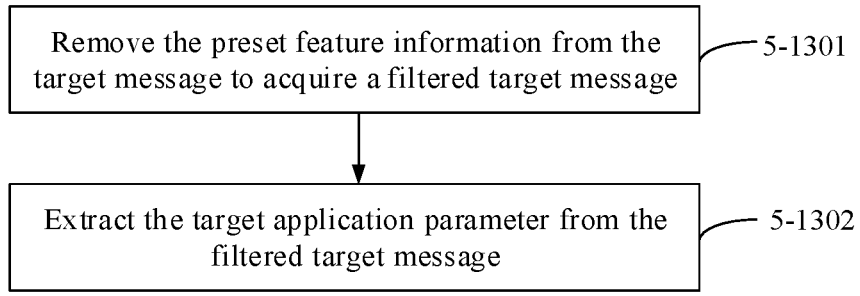
Figures 4, 6:
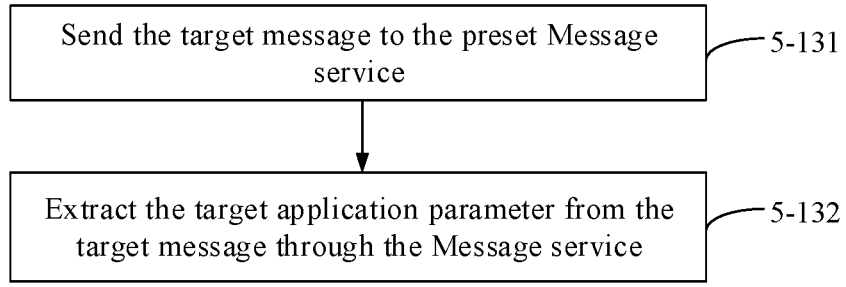
Figures 5, 6:
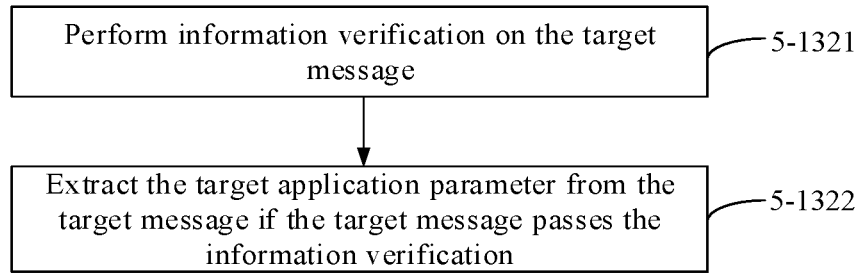
Figure 6:
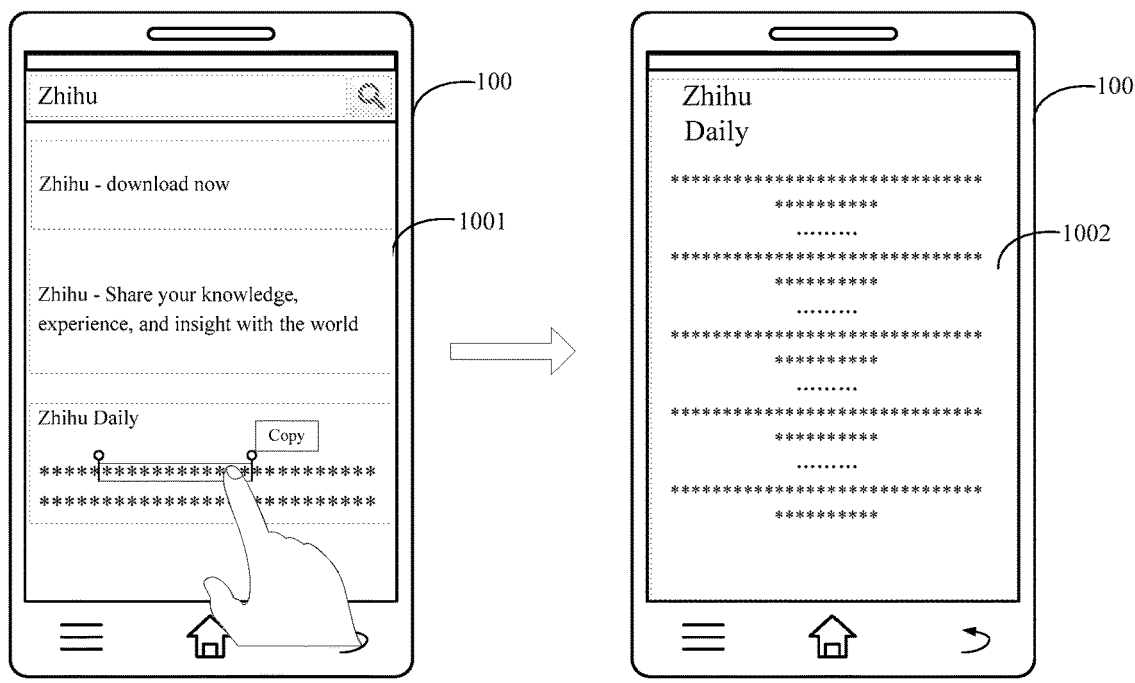
Figures 6, 7:
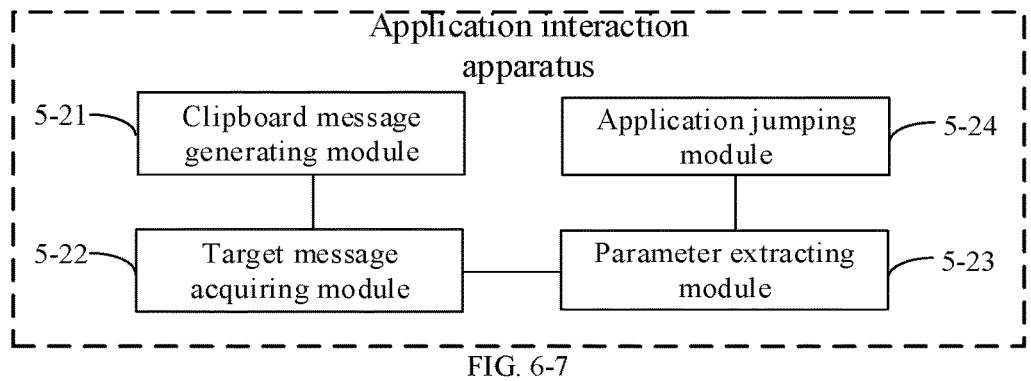
Figures 6, 7, 8, 9:
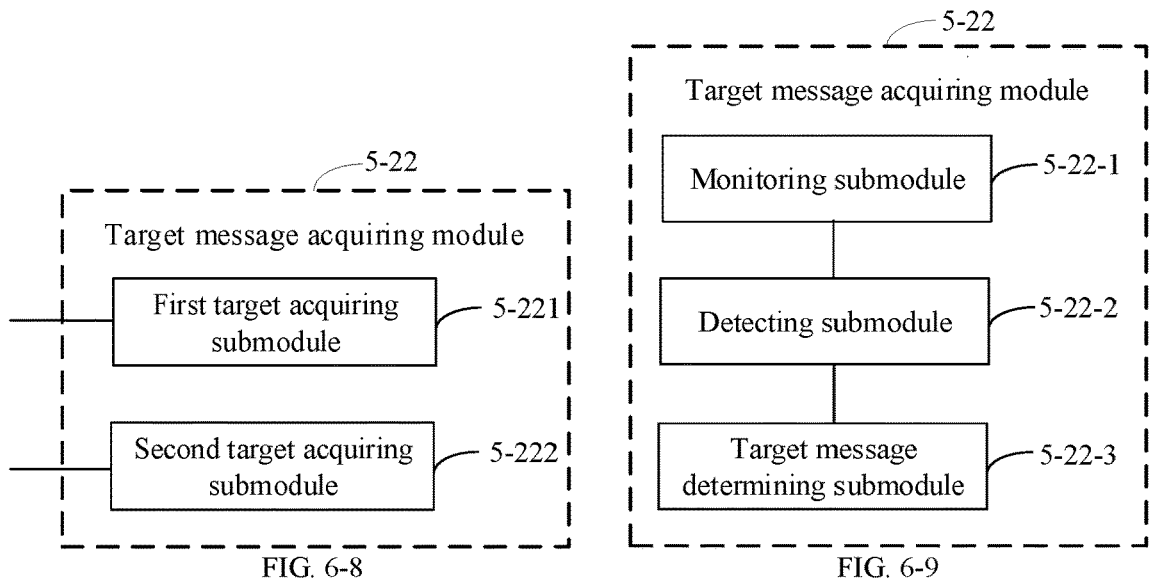
Figures 6, 7, 8, 9, 10:
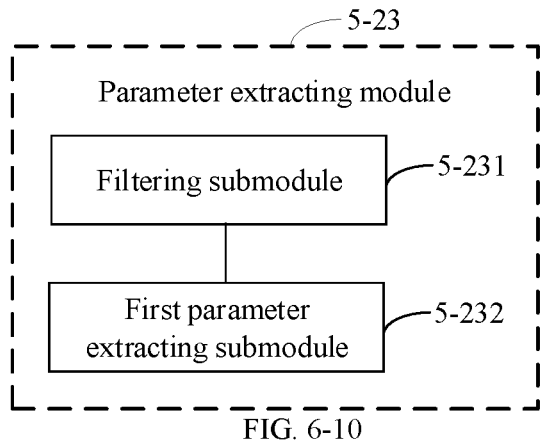
Figures 6, 7, 8, 9, 10, 11:
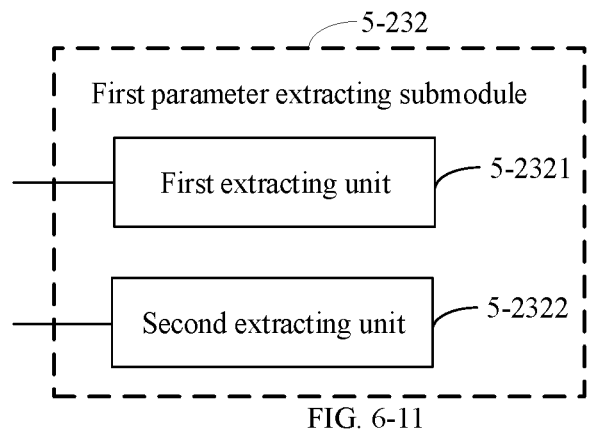
Figures 6, 7, 8, 9, 10, 11, 12:
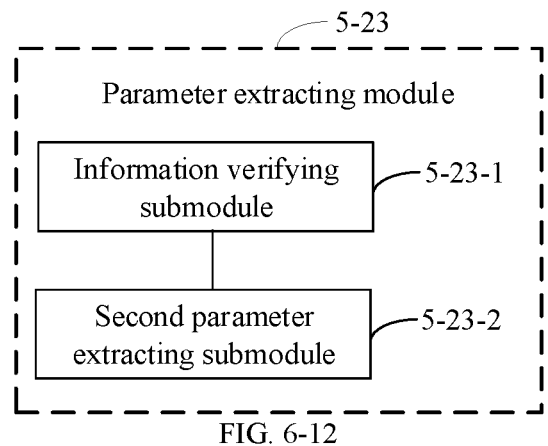
Figures 6, 7, 8, 9, 10, 11, 12, 13:
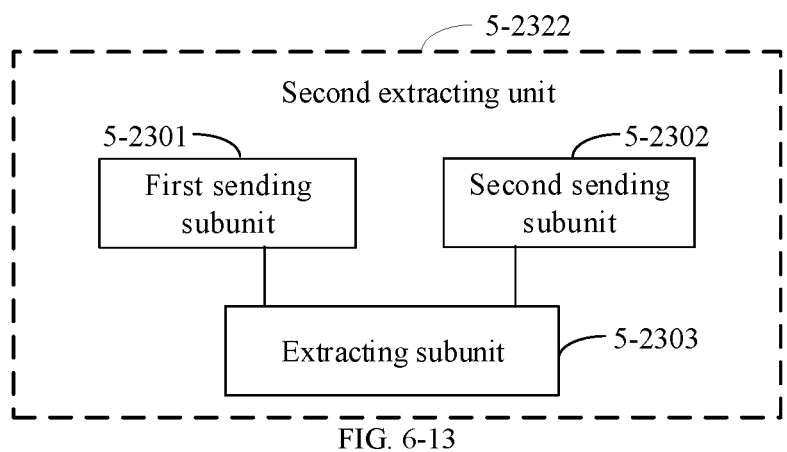
Figures 6, 7, 8, 9, 10, 11, 12, 13, 14:
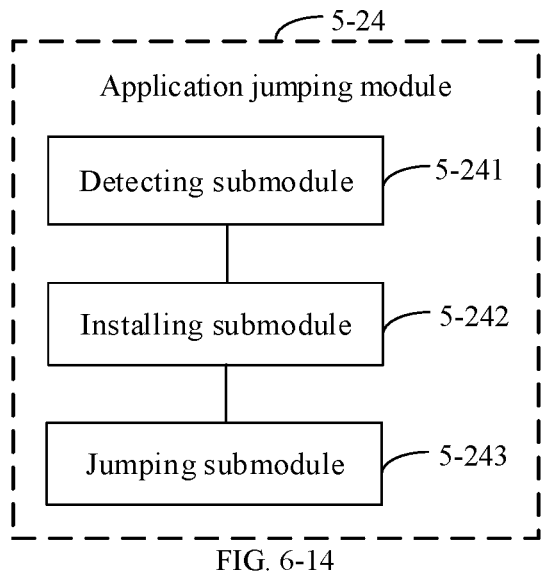
Figures 1, 7:
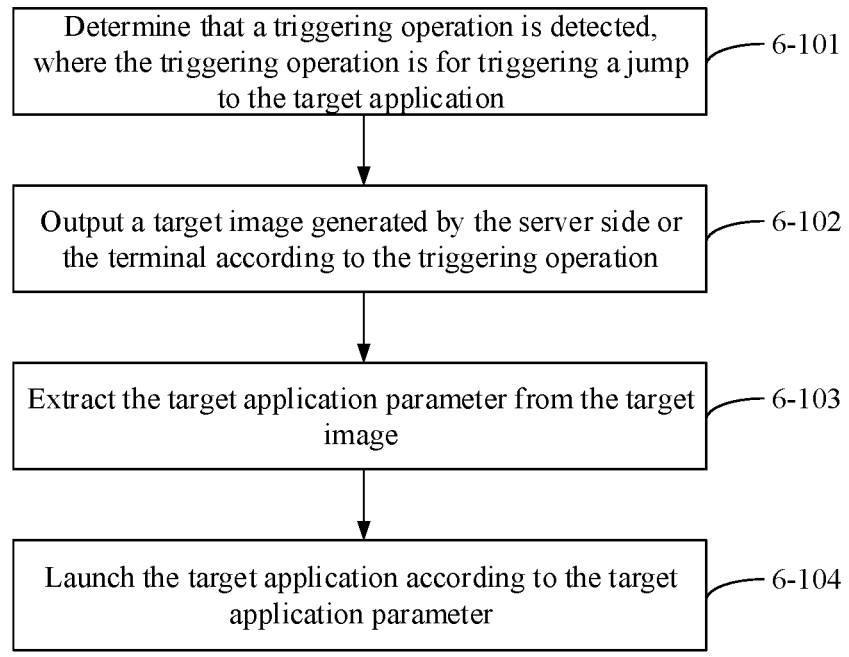
Figures 2A, 7:
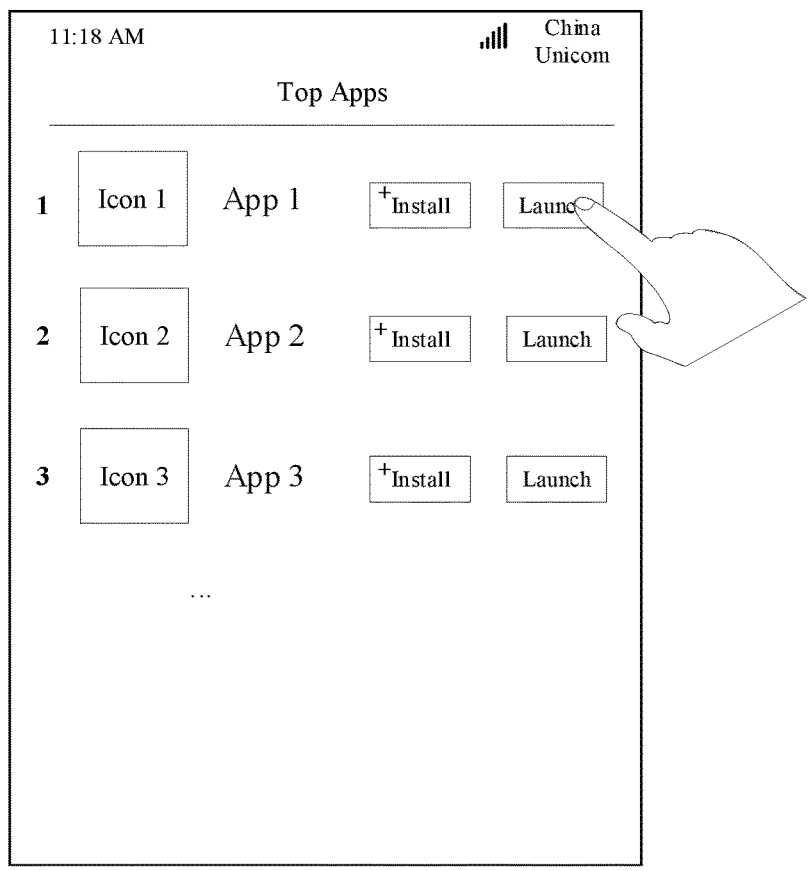
Figures 2B, 7:
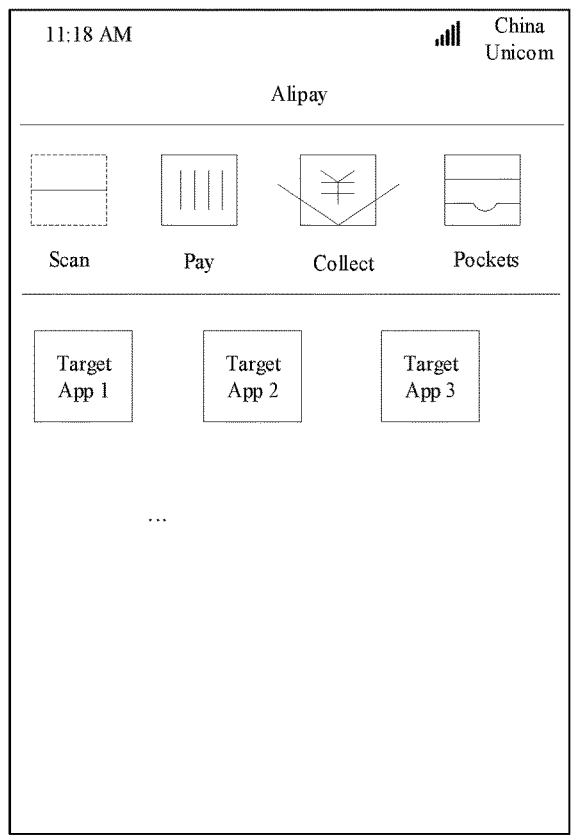
Figures 2C, 7:
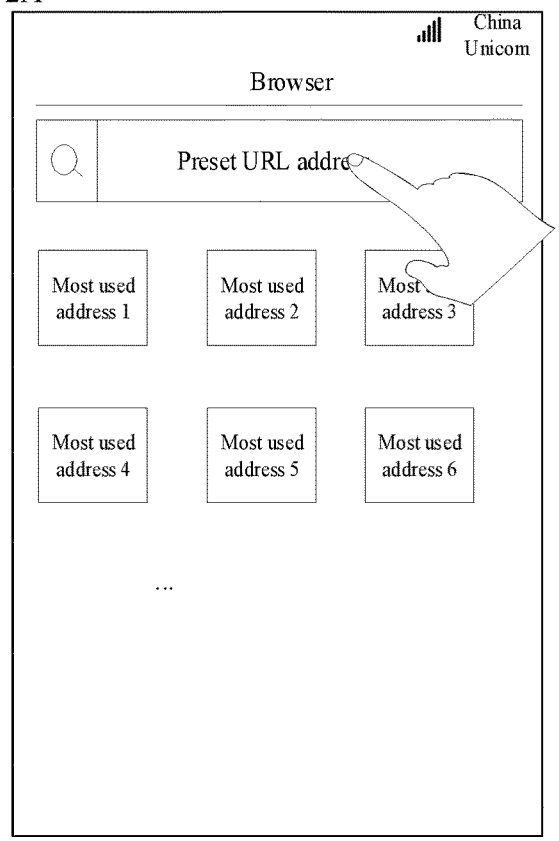
Figures 2D, 7:
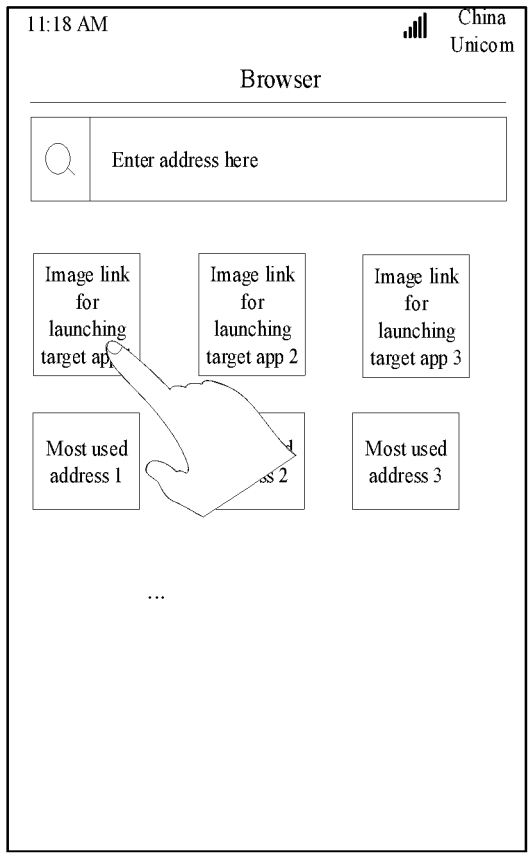
Figures 2E, 7:
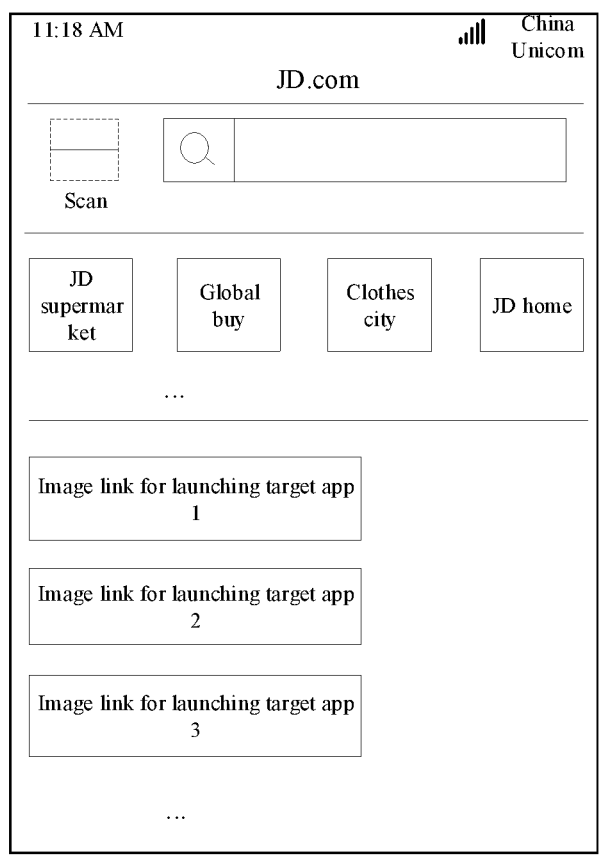
Figures 3, 7:
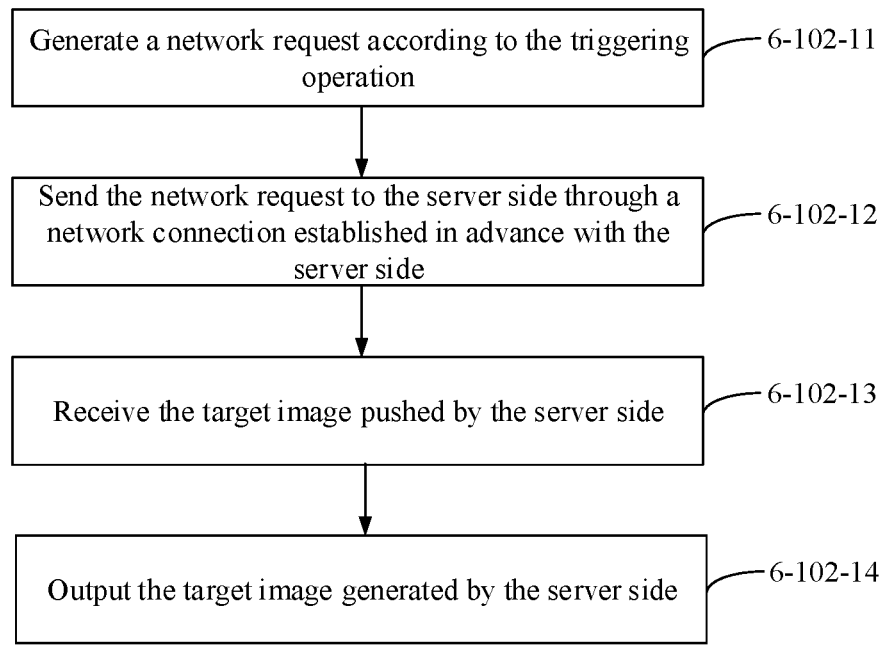
Figures 4A, 7:
Figures 4B, 7:
Figures 4C, 7:
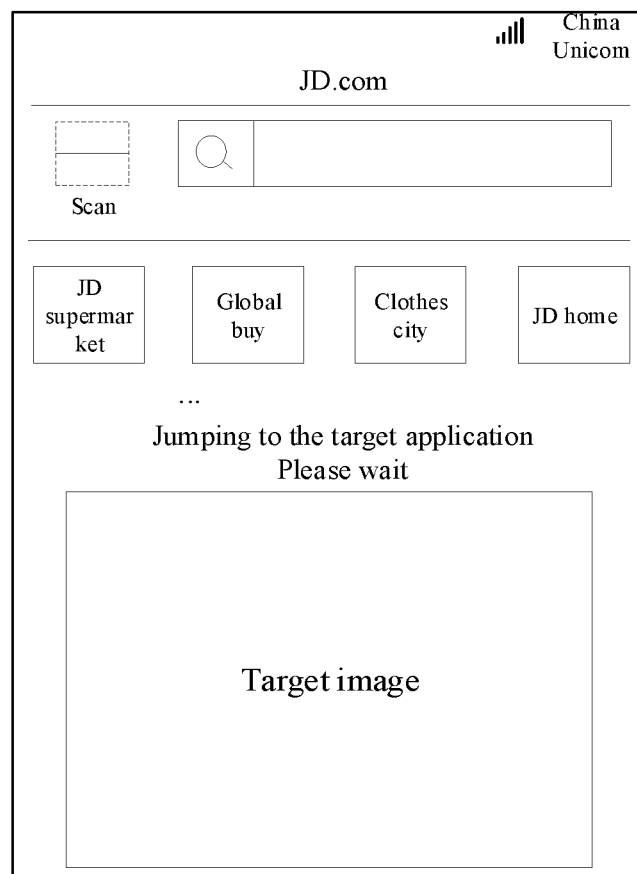
Figures 5, 7:
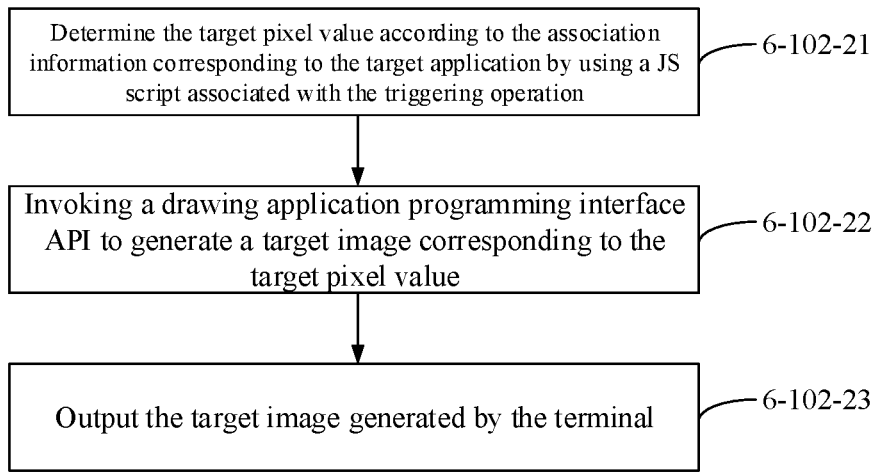
Figures 6, 7:
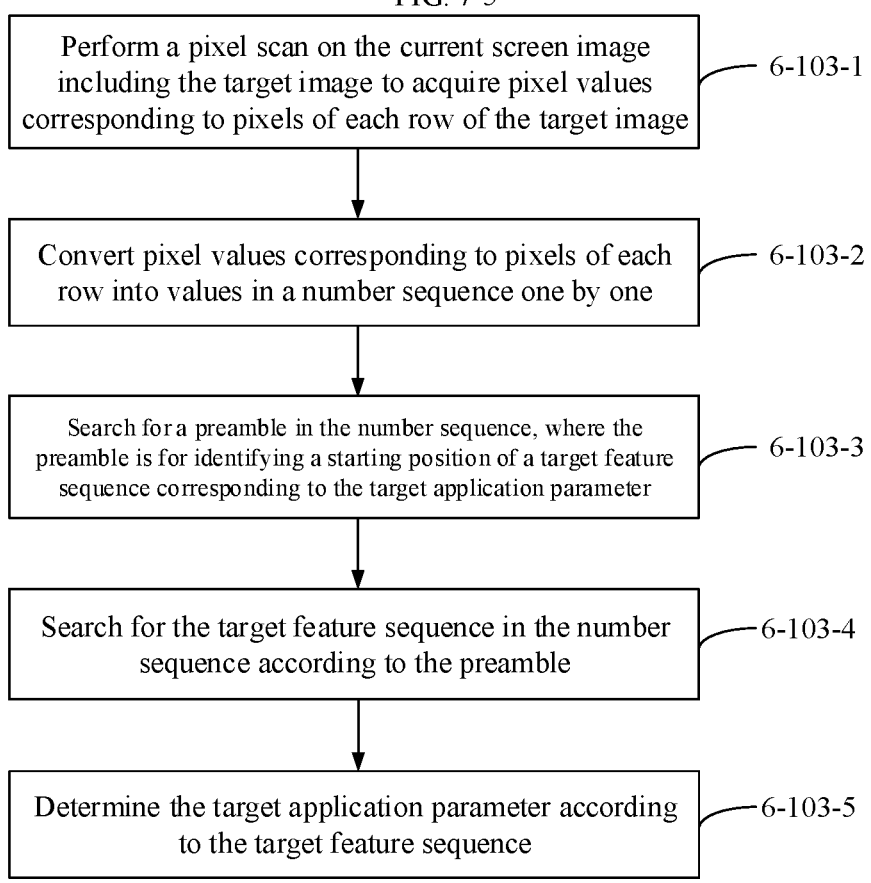
Figure 7:
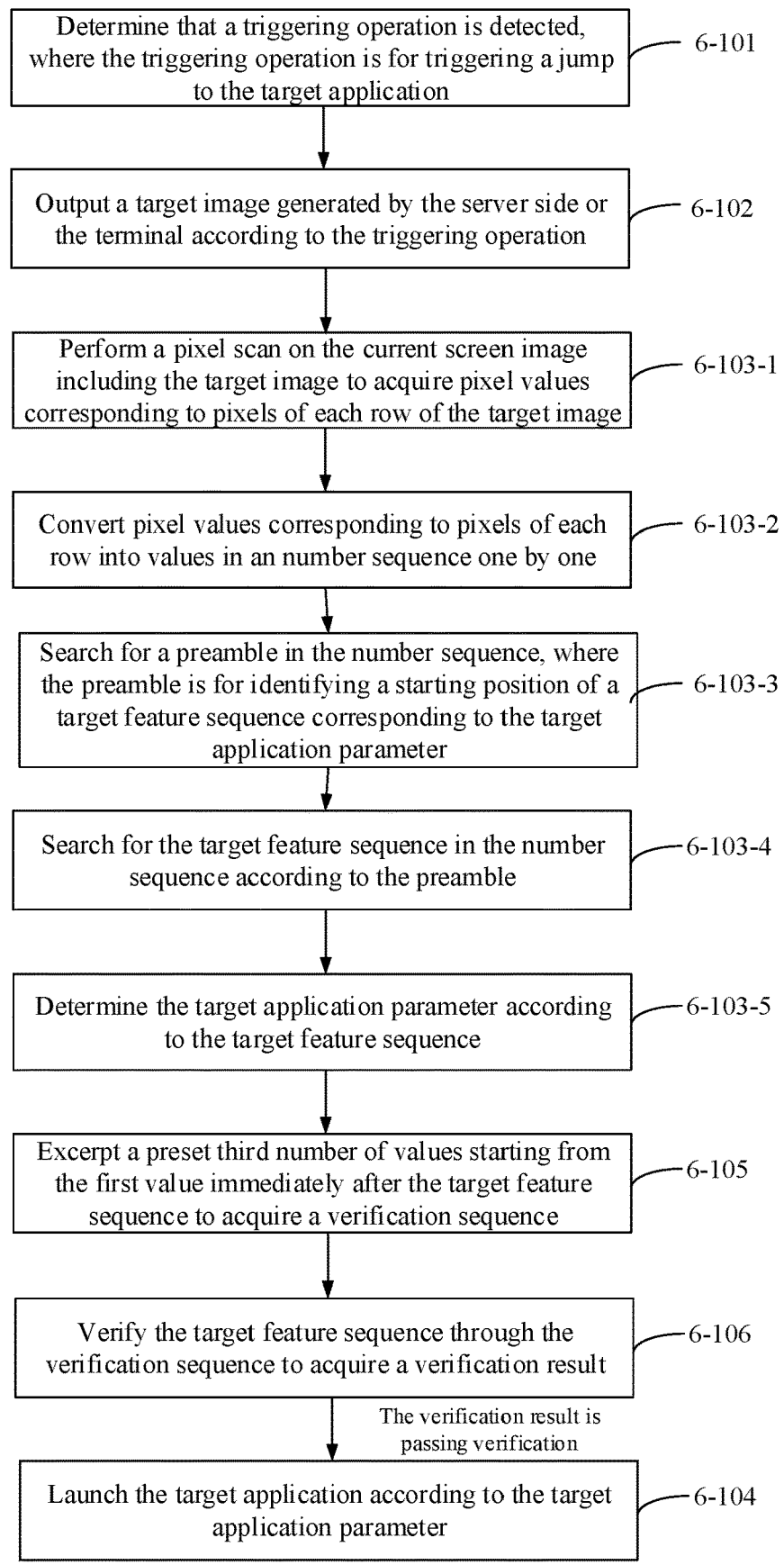
Figures 7, 8:
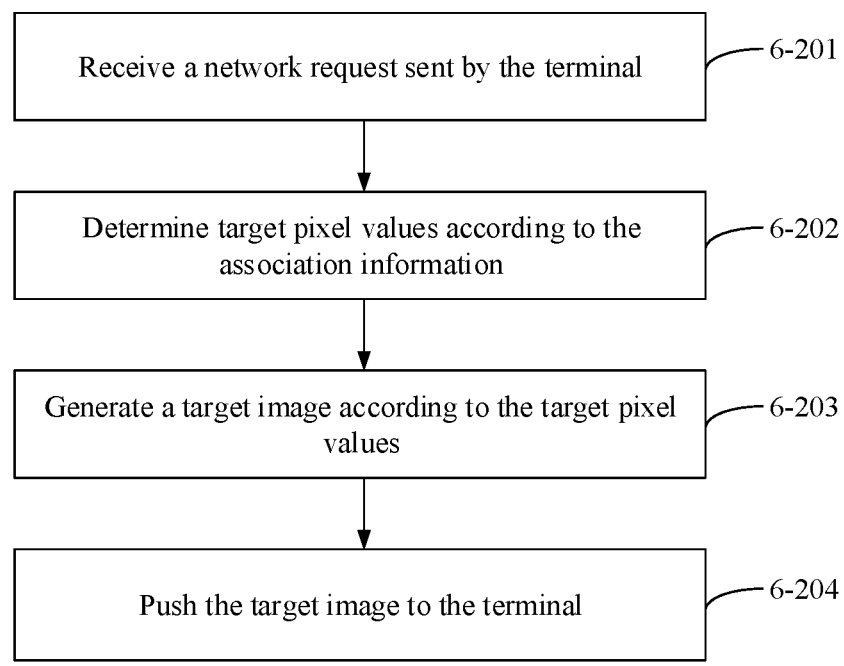
Figures 7, 8, 9:
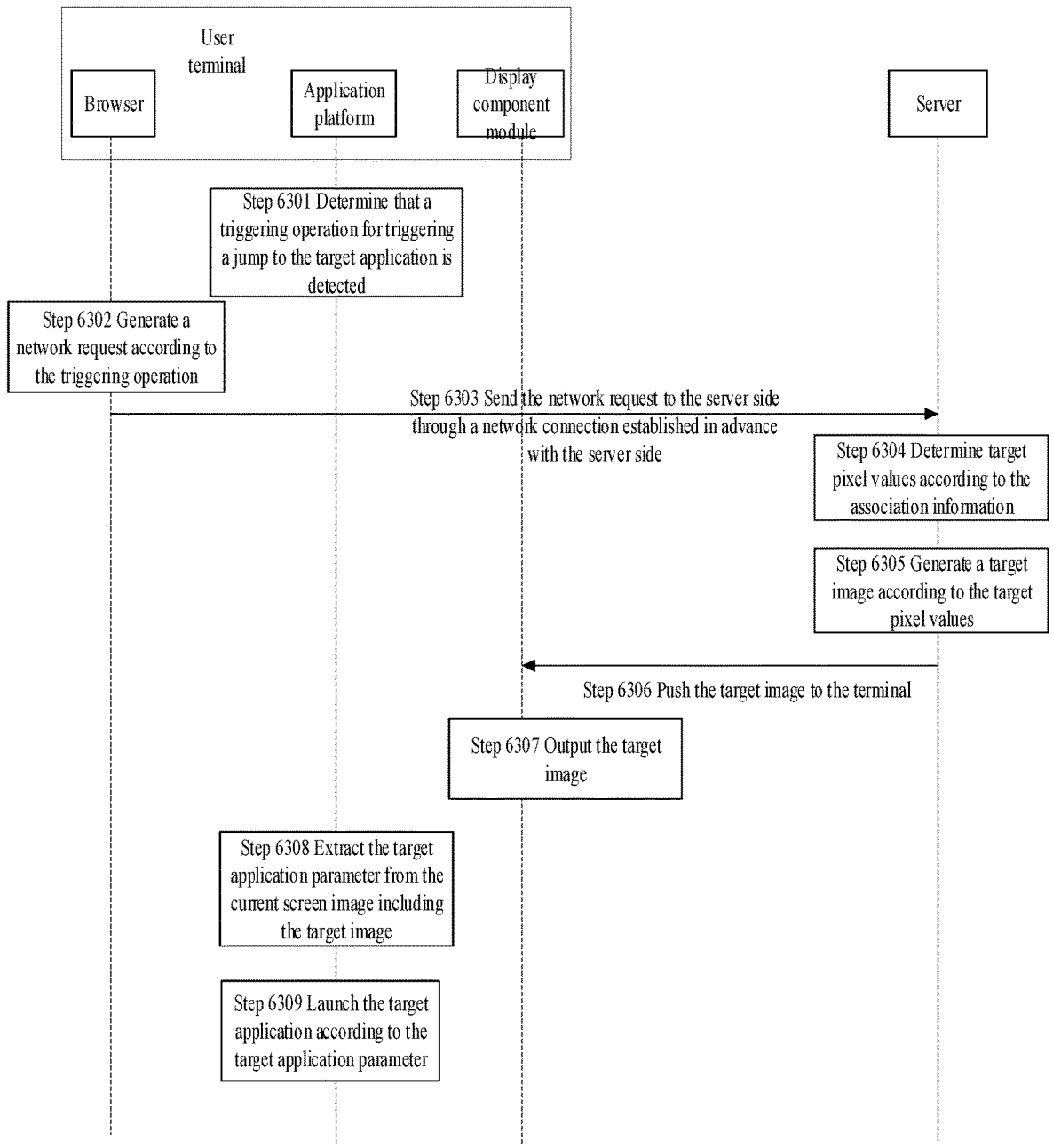
Figures 7, 8, 9, 10:
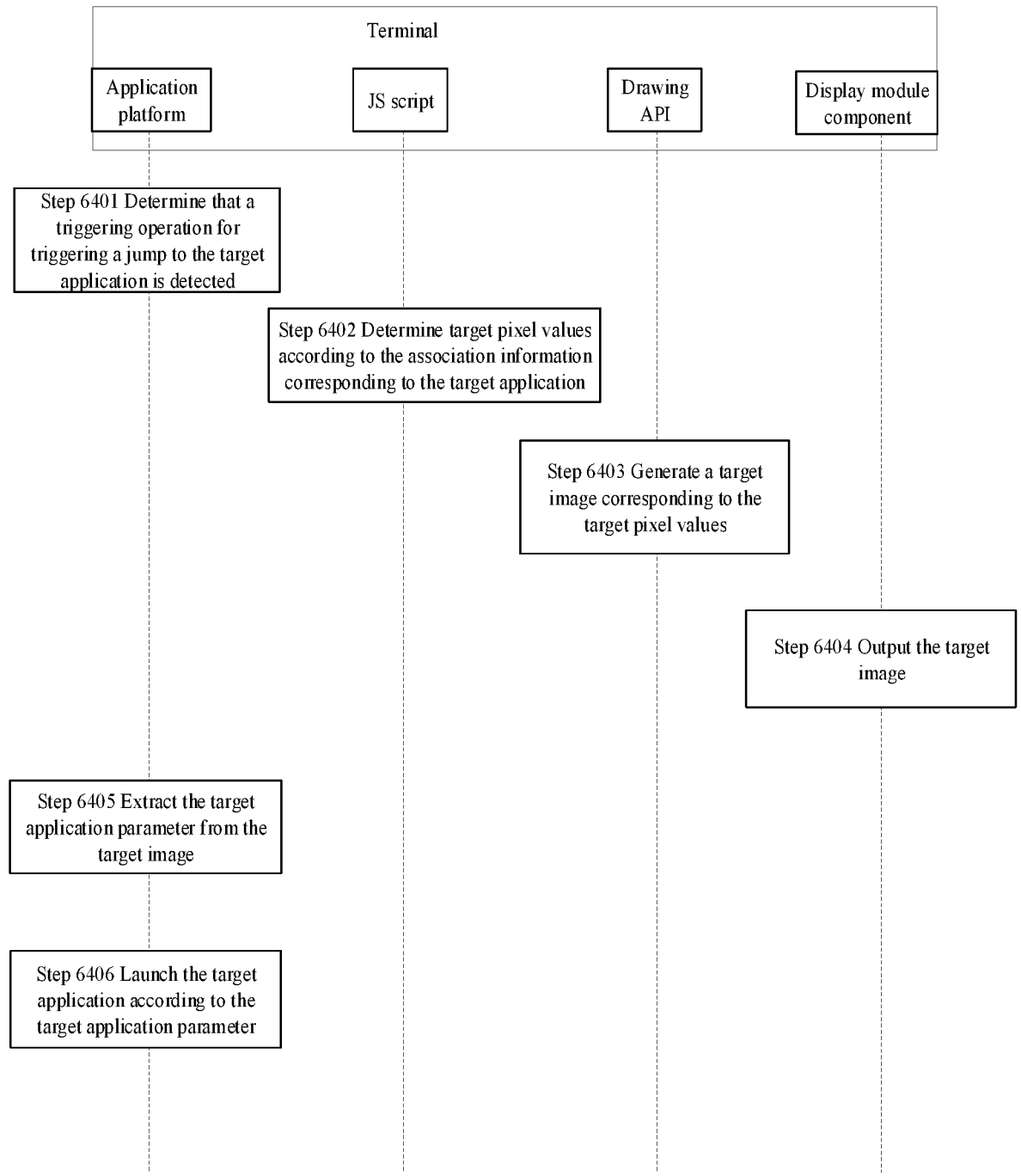
Figures 7, 8, 9, 10, 11:
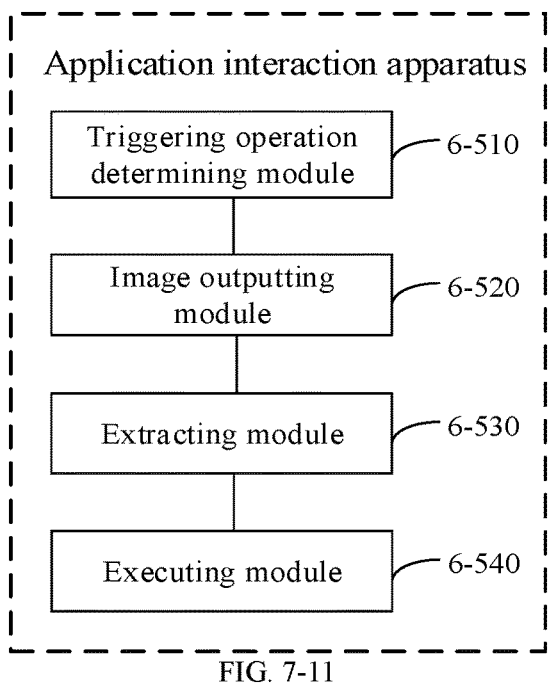
Figures 7, 8, 9, 10, 11, 12:
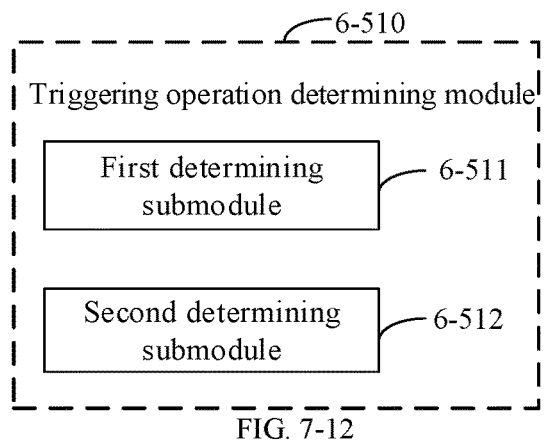
Figures 7, 8, 9, 10, 11, 12, 13:
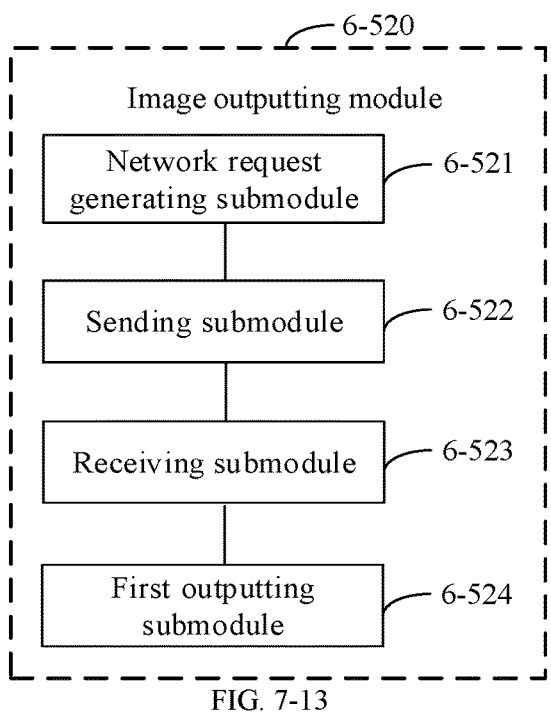
Figures 7, 8, 9, 10, 11, 12, 13, 14:
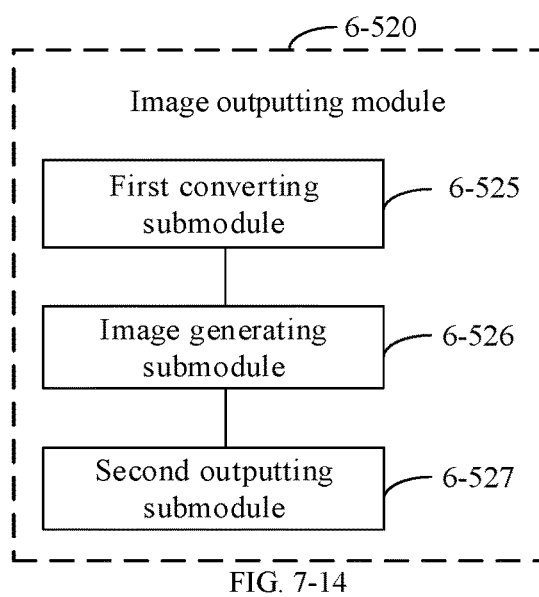
Figures 7, 8, 9, 10, 11, 12, 13, 14, 15, 15A:
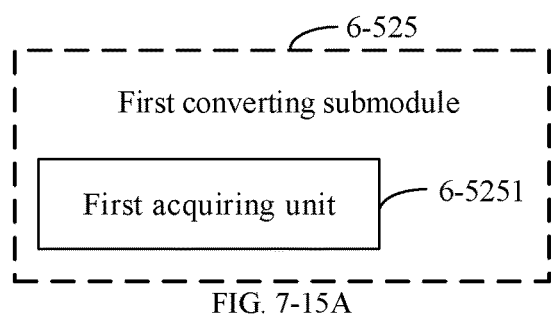
Figures 7, 8, 9, 10, 11, 12, 13, 14, 15, 15B:
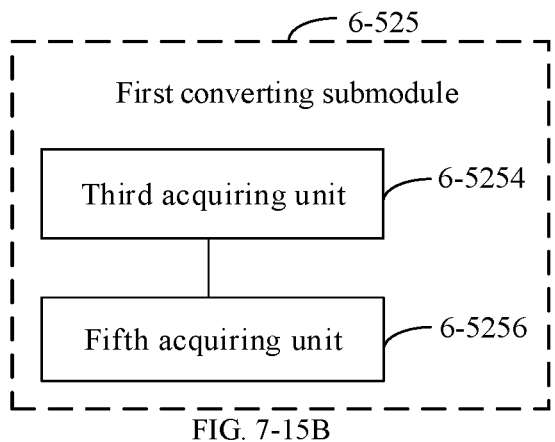
Figures 7, 8, 9, 10, 11, 12, 13, 14, 15, 16, 16A:
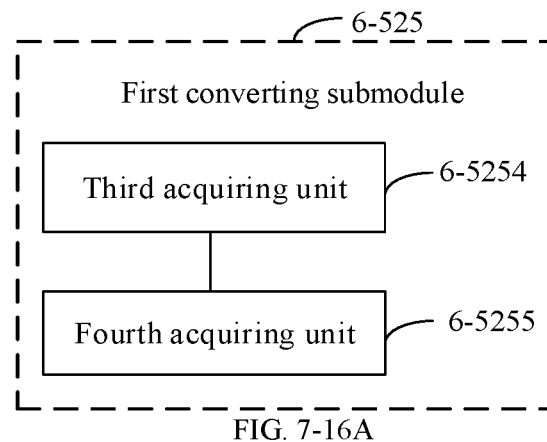
Figures 7, 8, 9, 10, 11, 12, 13, 14, 15, 16, 16B:
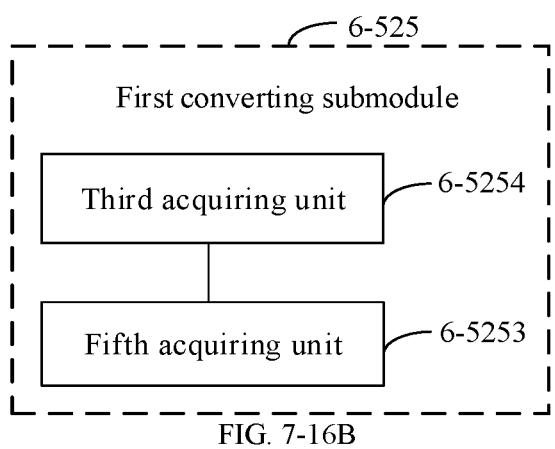
Figures 7, 8, 9, 10, 11, 12, 13, 14, 15, 16, 17:
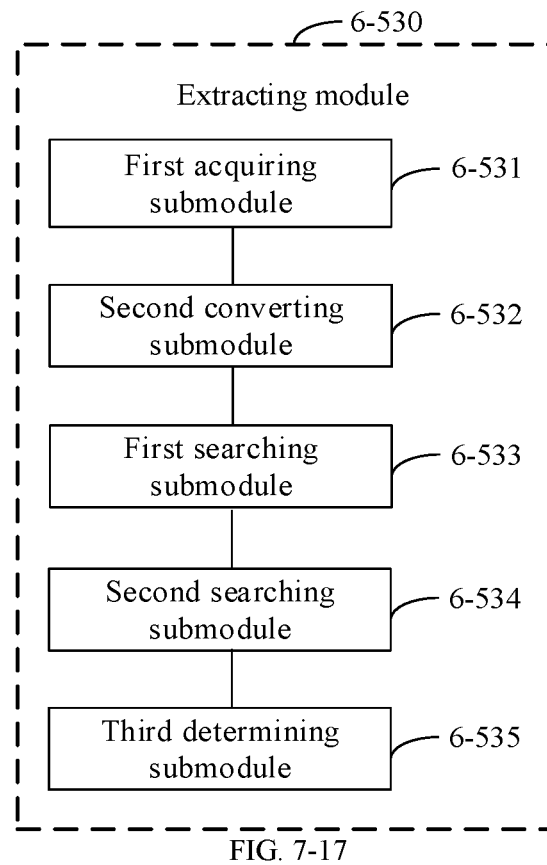
Figures 7, 8, 9, 10, 11, 12, 13, 14, 15, 16, 17, 18:
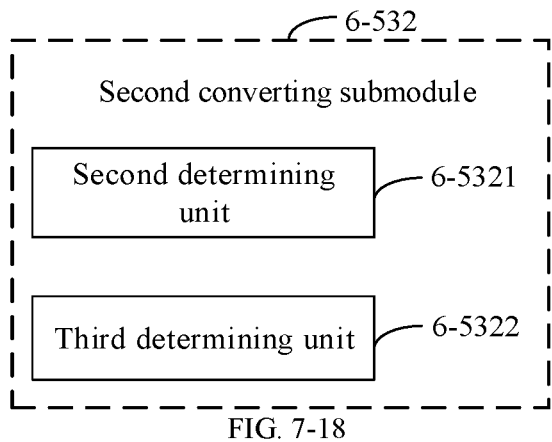
Figures 7, 8, 9, 10, 11, 12, 13, 14, 15, 16, 17, 18, 19:
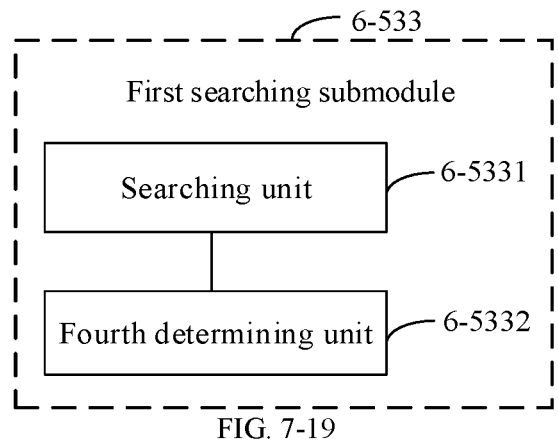
Figures 7, 8, 9, 10, 11, 12, 13, 14, 15, 16, 17, 18, 19, 20:
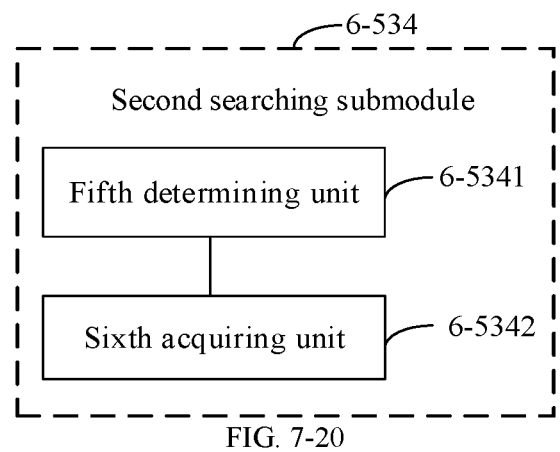
Figures 7, 8, 9, 10, 11, 12, 13, 14, 15, 16, 17, 18, 19, 20, 21:
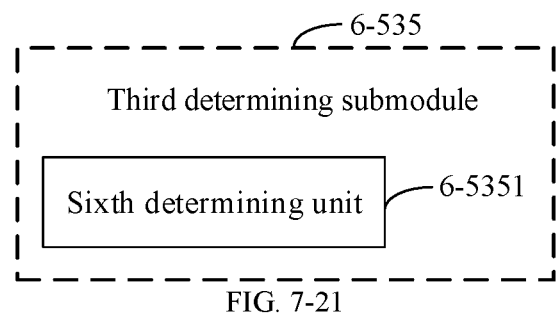
Figures 7, 8, 9, 10, 11, 12, 13, 14, 15, 16, 17, 18, 19, 20, 21, 22:
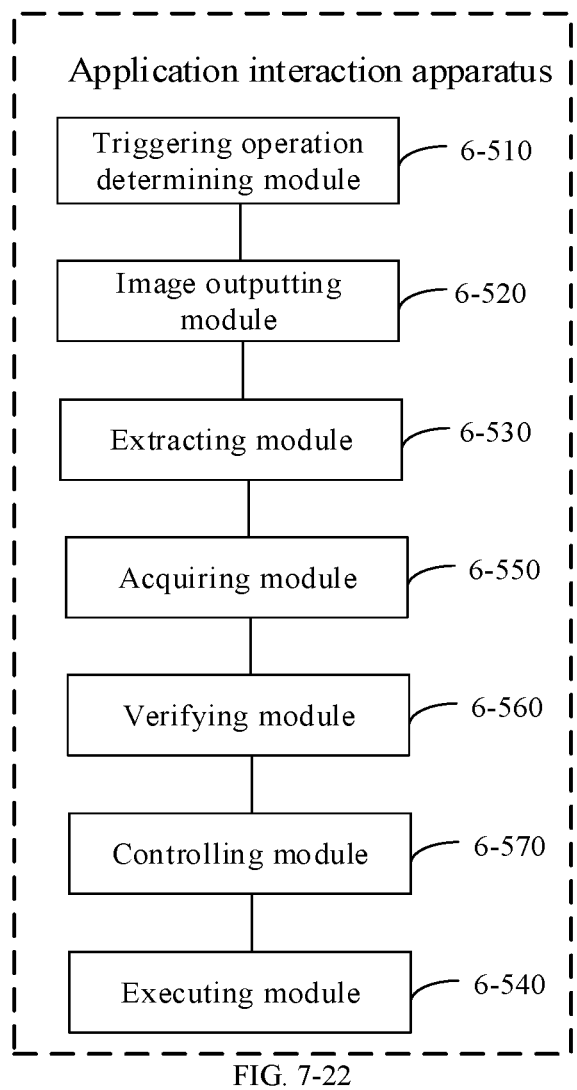
Figures 7, 8, 9, 10, 11, 12, 13, 14, 15, 16, 17, 18, 19, 20, 21, 22, 23:
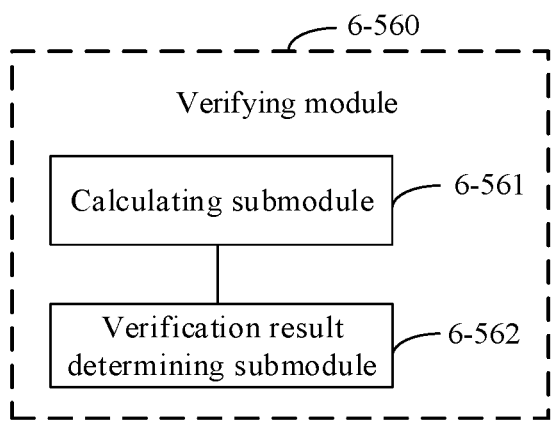
Figures 7, 8, 9, 10, 11, 12, 13, 14, 15, 16, 17, 18, 19, 20, 21, 22, 23, 24:
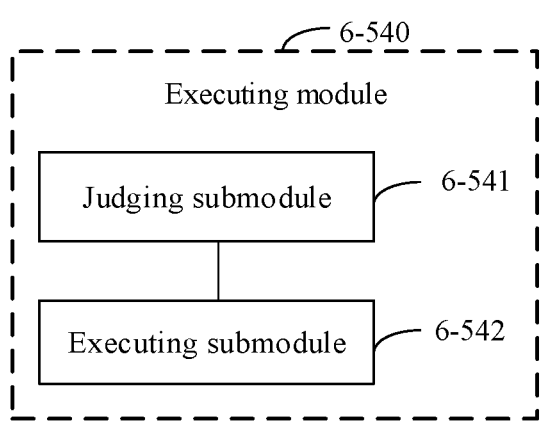
Figures 7, 8, 9, 10, 11, 12, 13, 14, 15, 16, 17, 18, 19, 20, 21, 22, 23, 24, 25:
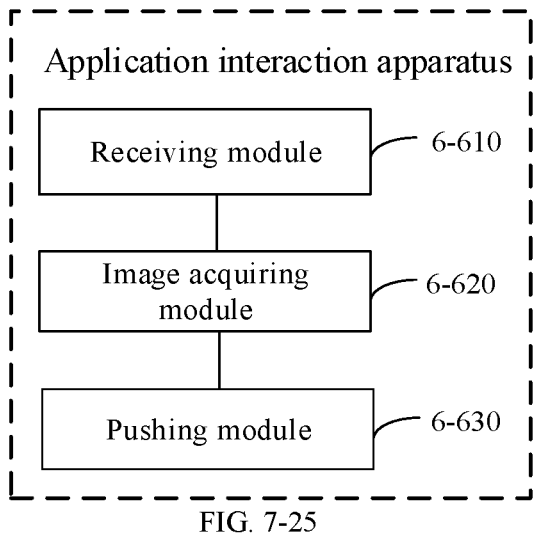
Figures 7, 8, 9, 10, 11, 12, 13, 14, 15, 16, 17, 18, 19, 20, 21, 22, 23, 24, 25, 26, 26A:
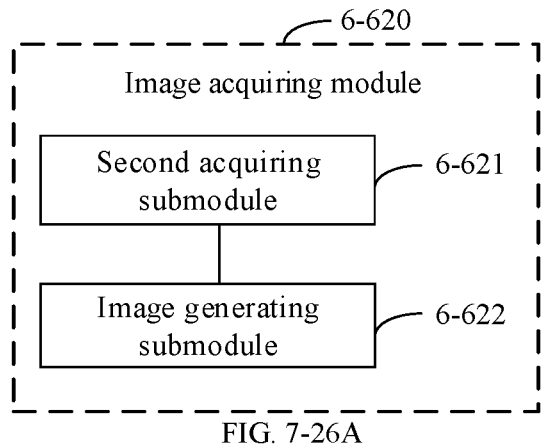
Figures 7, 8, 9, 10, 11, 12, 13, 14, 15, 16, 17, 18, 19, 20, 21, 22, 23, 24, 25, 26, 26B:
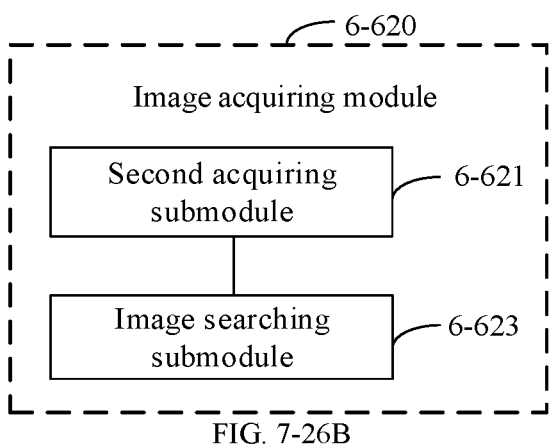
Figures 7, 8, 9, 10, 11, 12, 13, 14, 15, 16, 17, 18, 19, 20, 21, 22, 23, 24, 25, 26, 27, 27A:
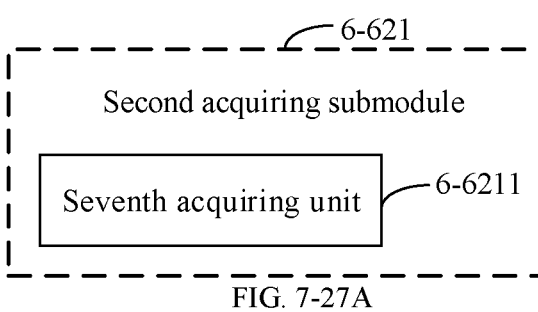
Figures 7, 8, 9, 10, 11, 12, 13, 14, 15, 16, 17, 18, 19, 20, 21, 22, 23, 24, 25, 26, 27, 27B:
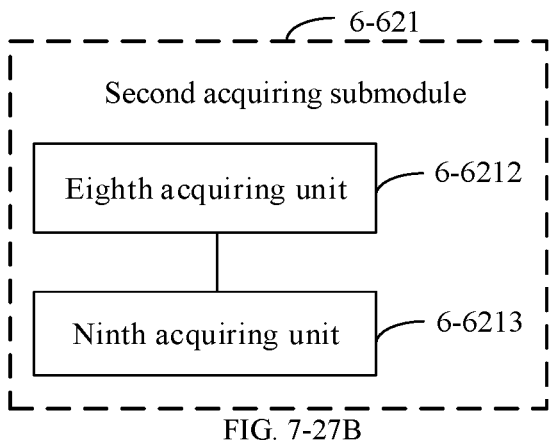
Figures 7, 8, 9, 10, 11, 12, 13, 14, 15, 16, 17, 18, 19, 20, 21, 22, 23, 24, 25, 26, 27, 28:
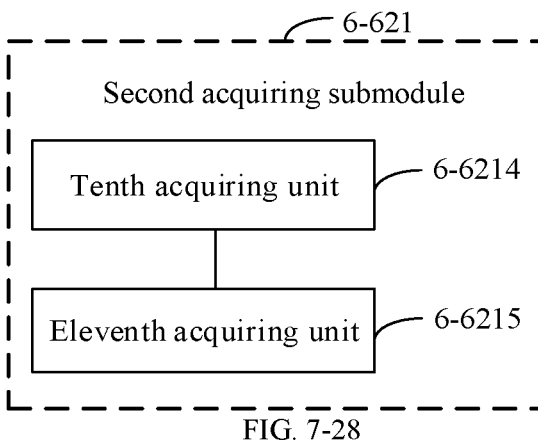
Figures 7, 8, 9, 10, 11, 12, 13, 14, 15, 16, 17, 18, 19, 20, 21, 22, 23, 24, 25, 26, 27, 28, 29:
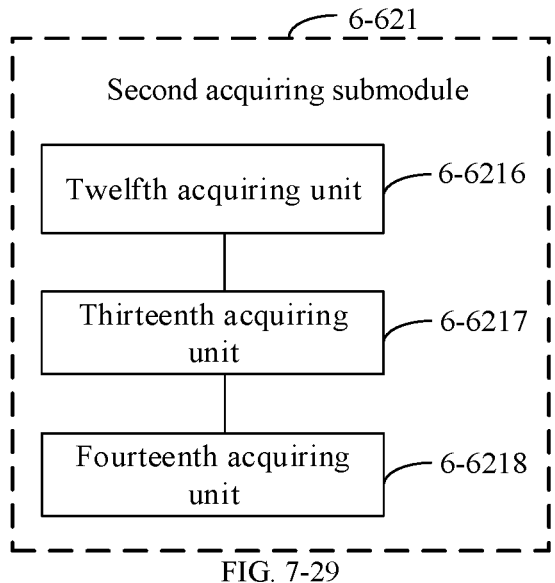
Figures 1, 8:
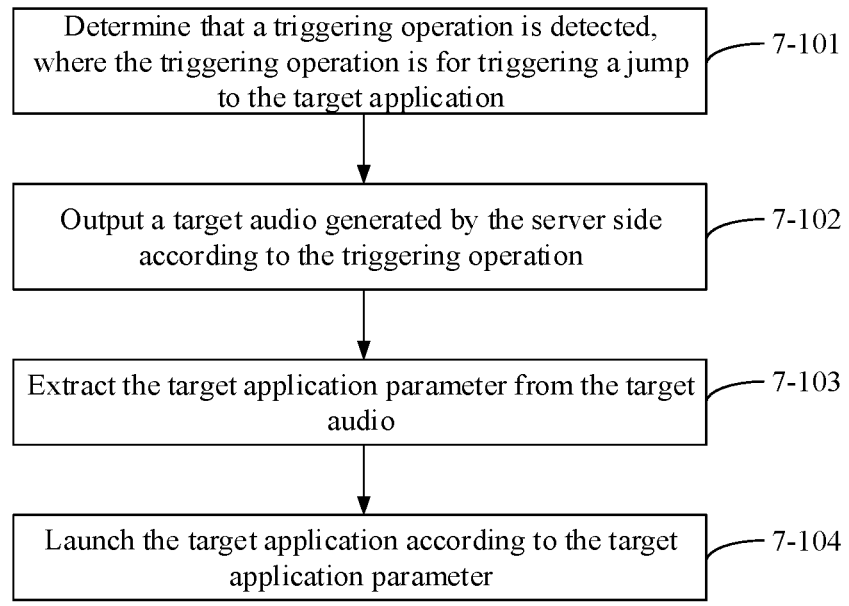
Figures 2A, 8:
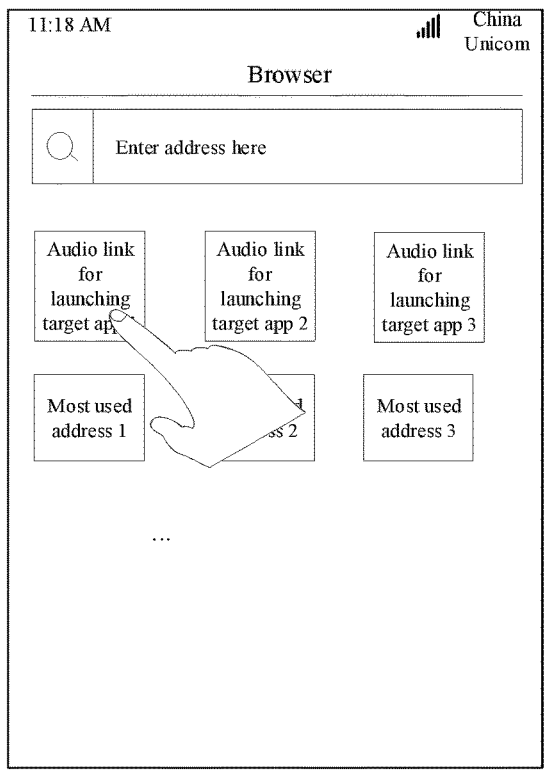
Figures 2B, 8:
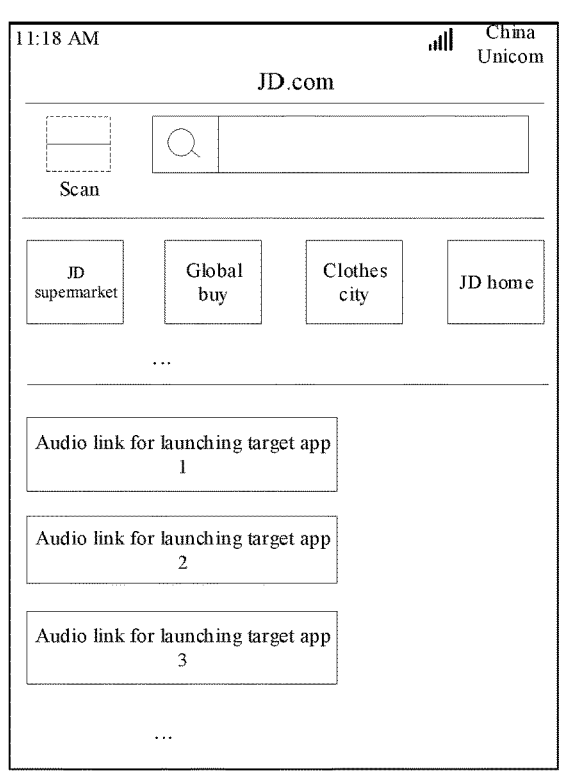
Figures 3, 8:
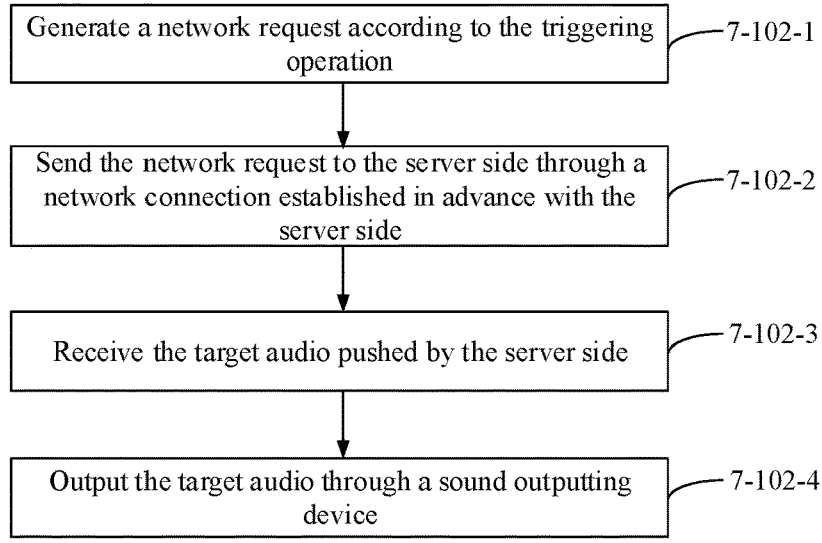
Figures 4, 8:
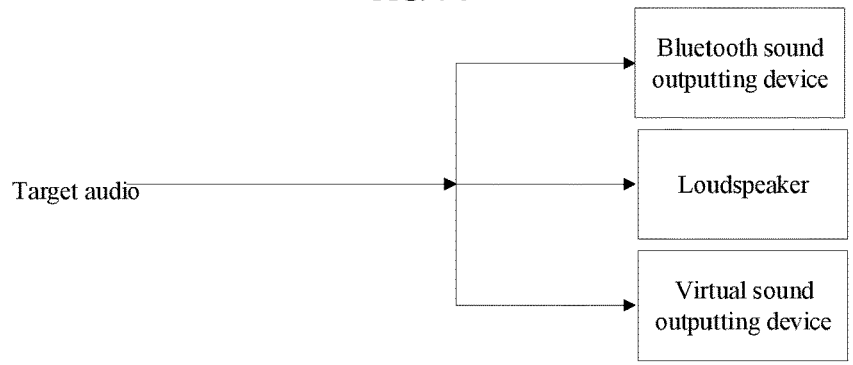
Figures 5, 8:
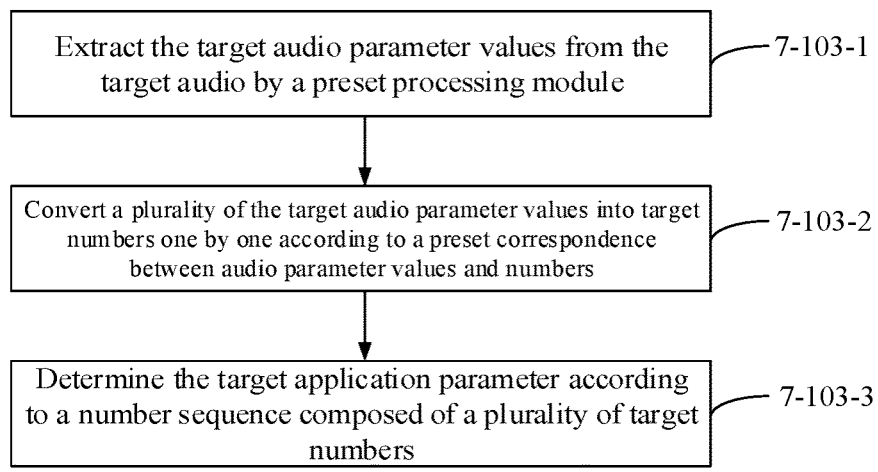
Figures 6, 8:
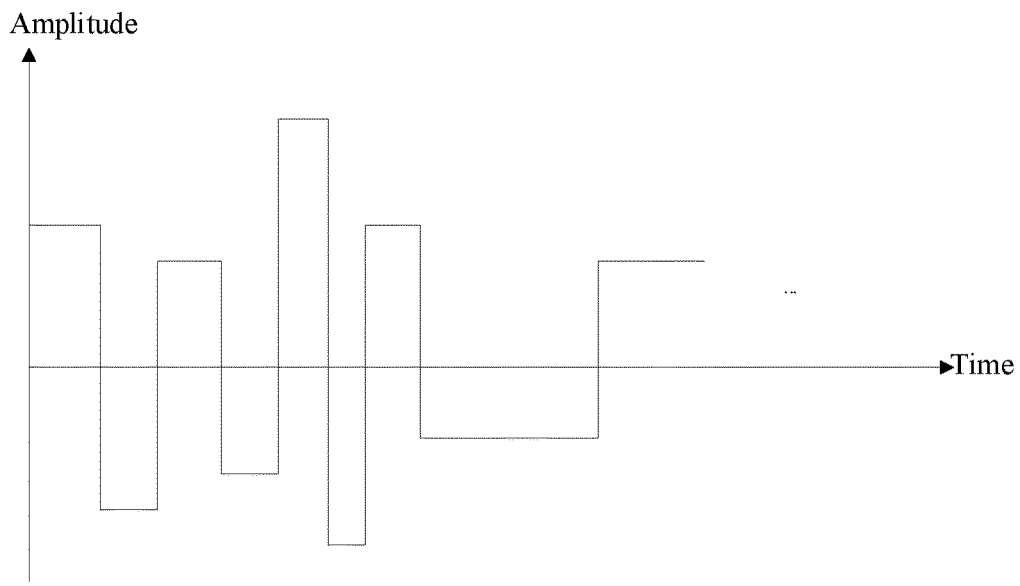
Figures 7, 8:
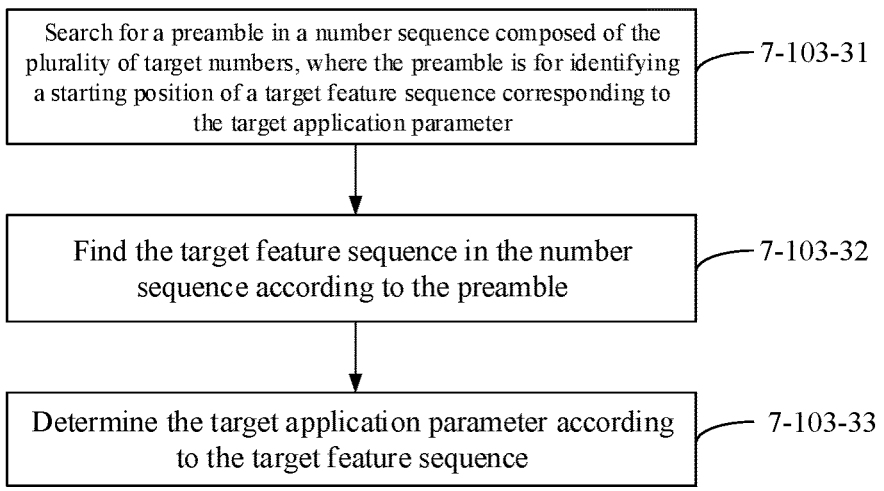
Figure 8:
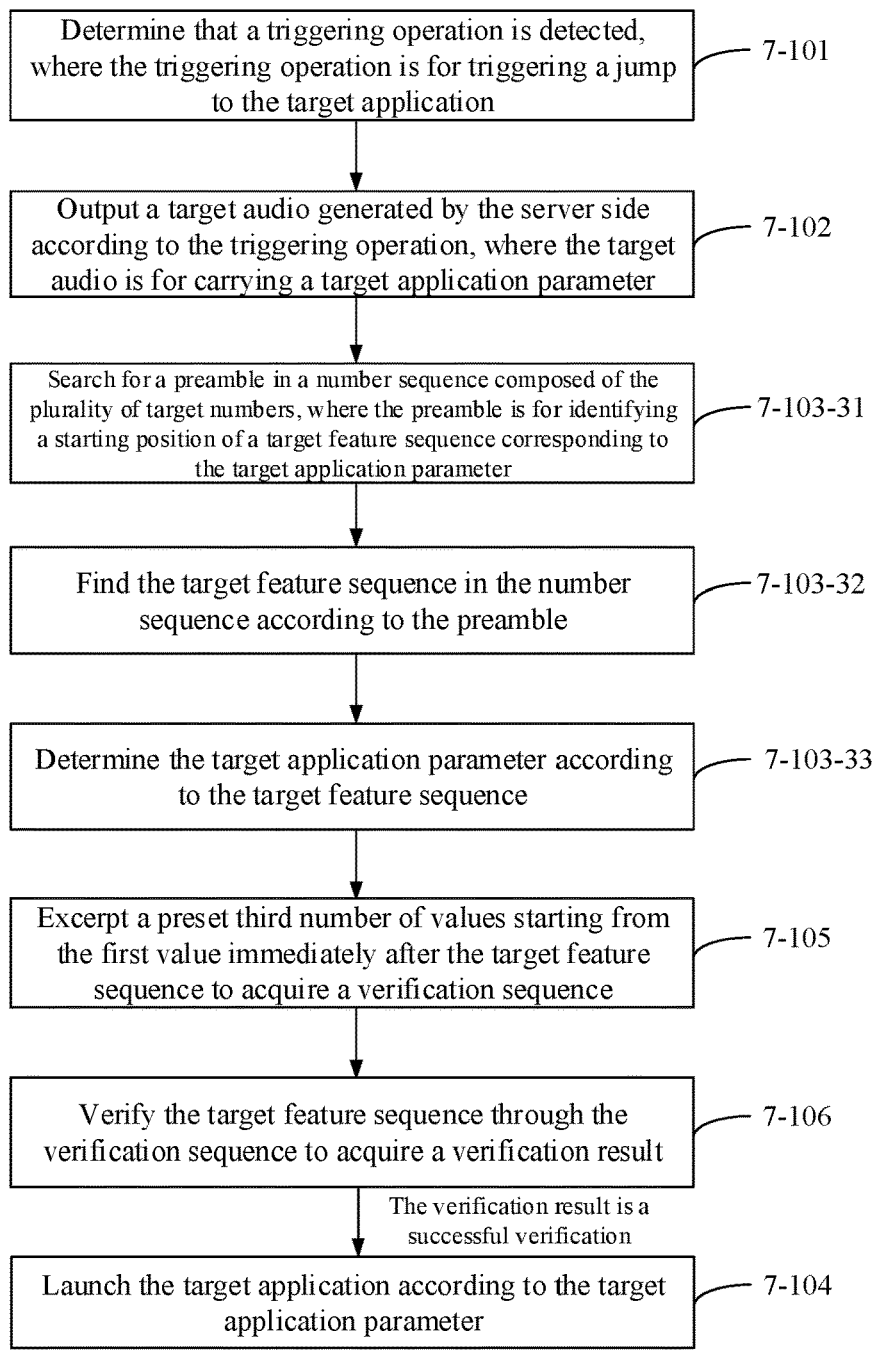
Figures 8, 9:
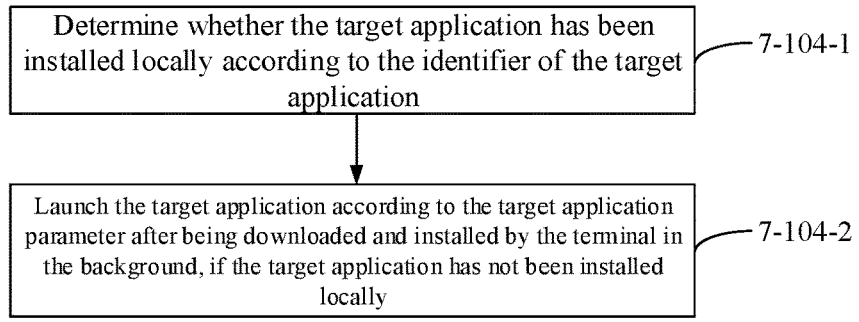
Figures 8, 9, 10:
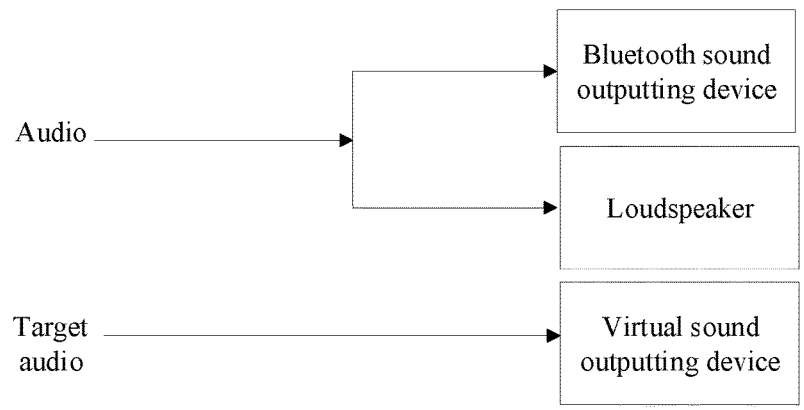
Figures 8, 9, 10, 11:
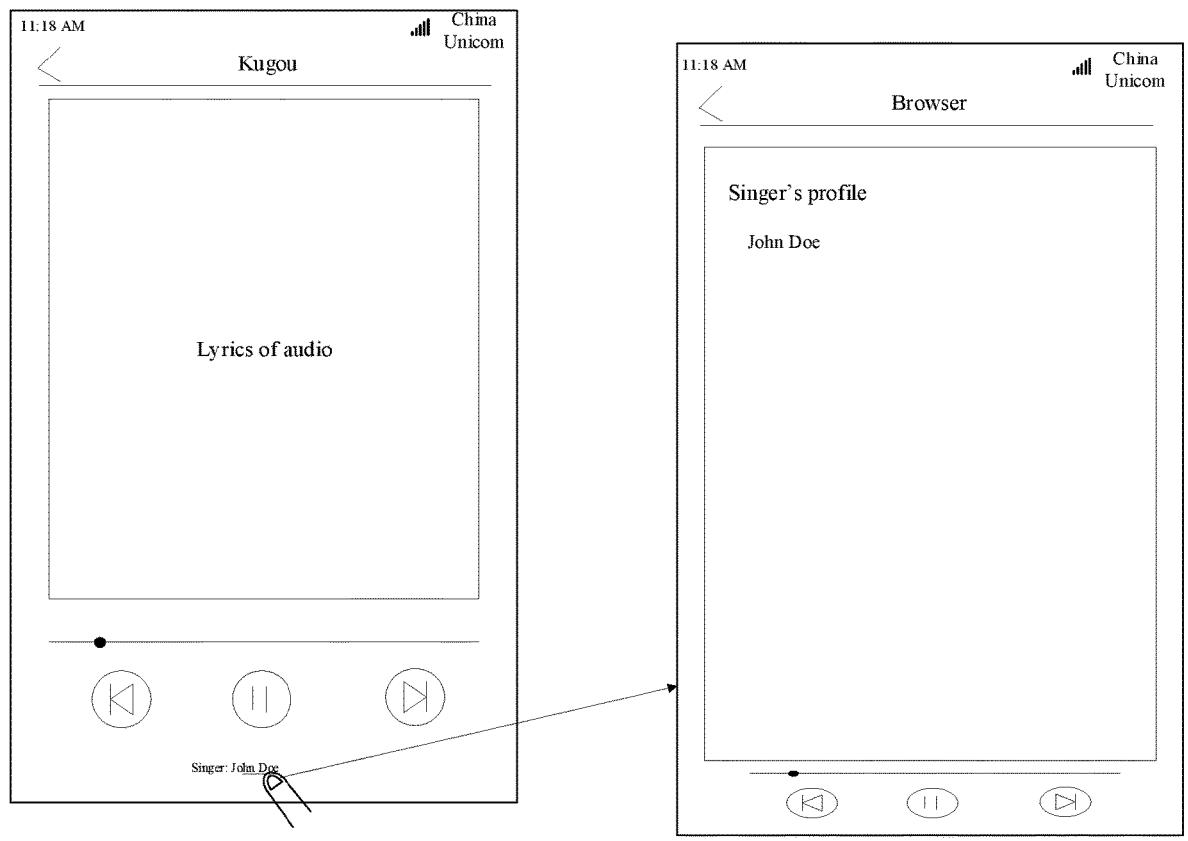
Figures 8, 9, 10, 11, 12:
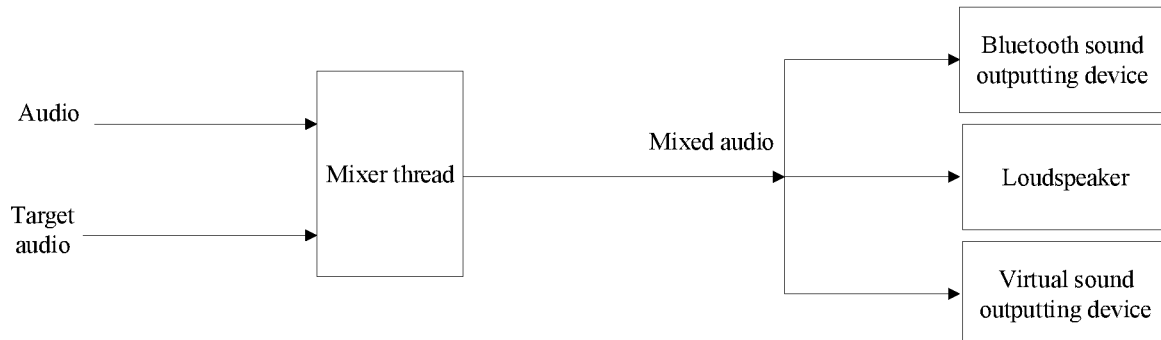
Figures 8, 9, 10, 11, 12, 13:
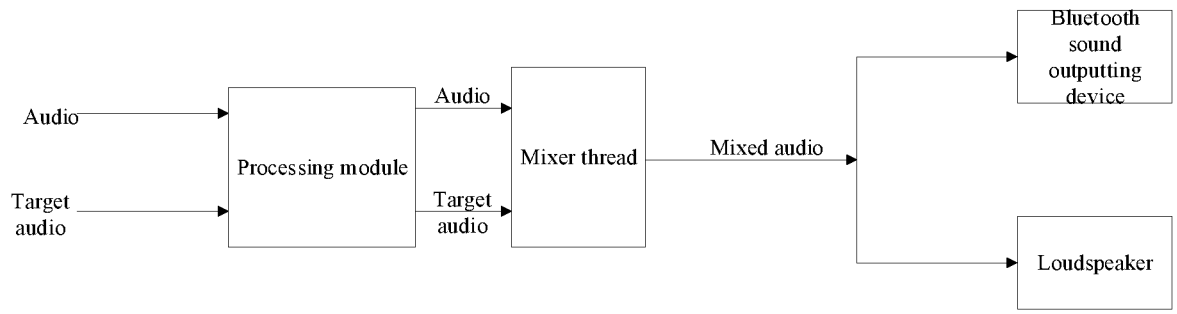
Figures 8, 9, 10, 11, 12, 13, 14:
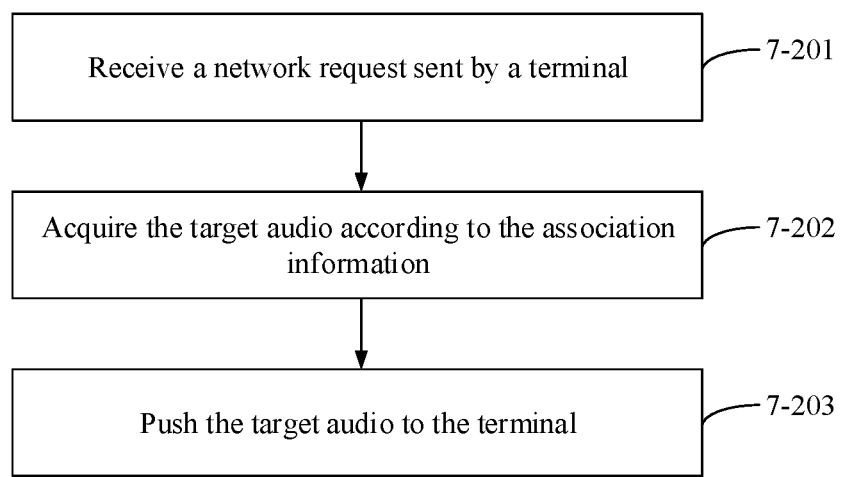
Figures 8, 9, 10, 11, 12, 13, 14, 15:
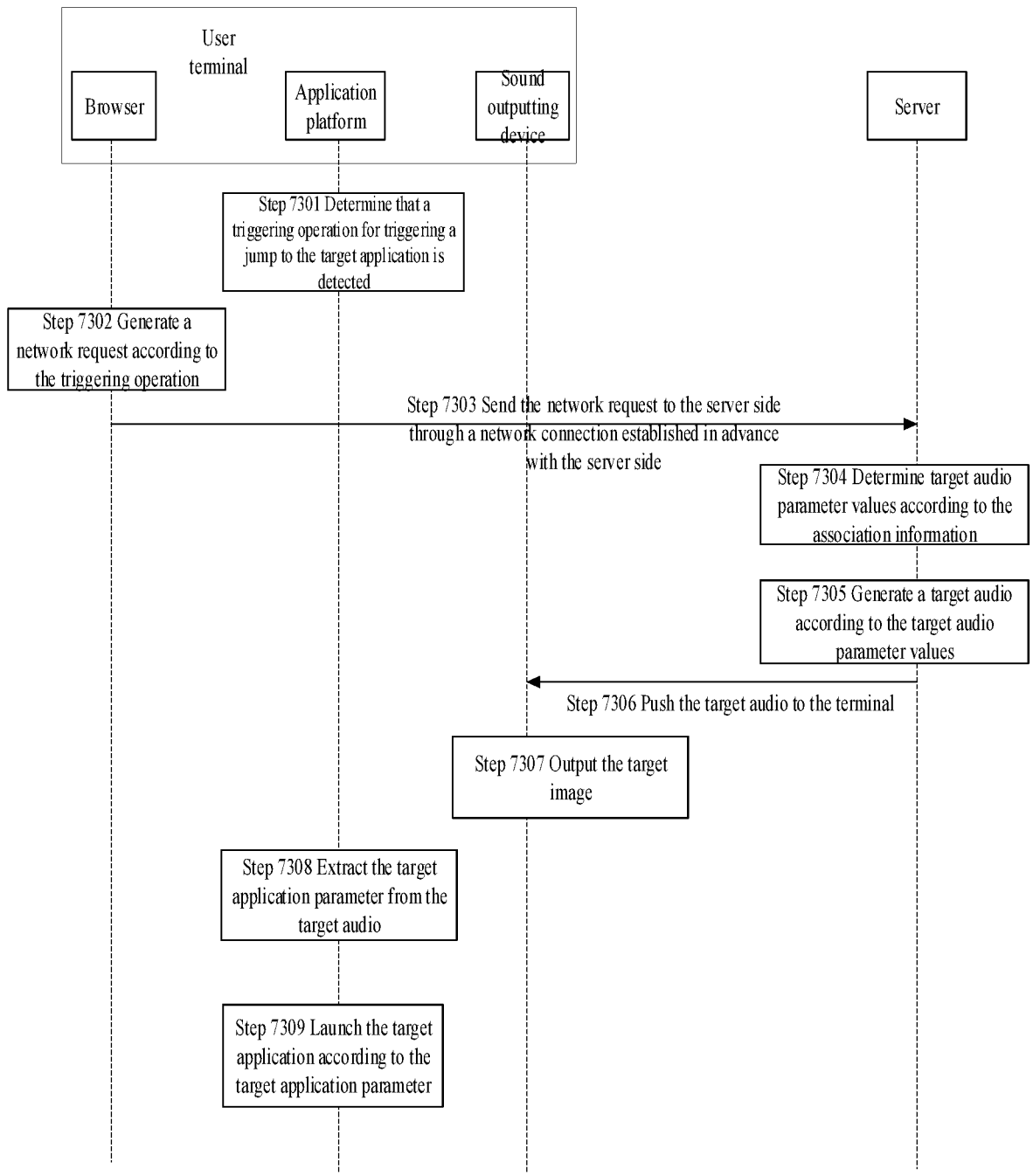
Figures 8, 9, 10, 11, 12, 13, 14, 15, 16:
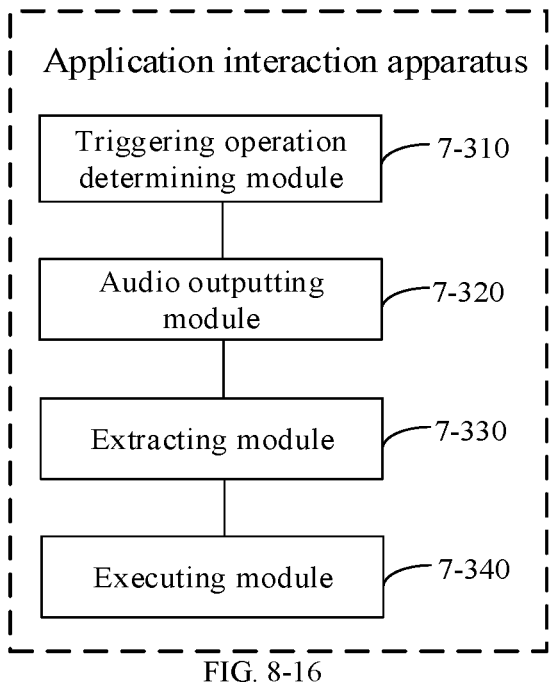
Figures 8, 9, 10, 11, 12, 13, 14, 15, 16, 17:
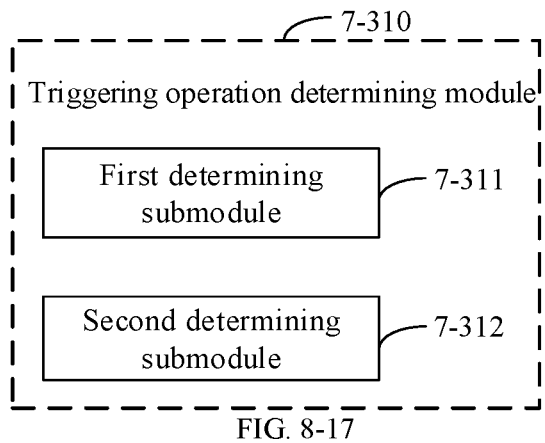
Figures 8, 9, 10, 11, 12, 13, 14, 15, 16, 17, 18:
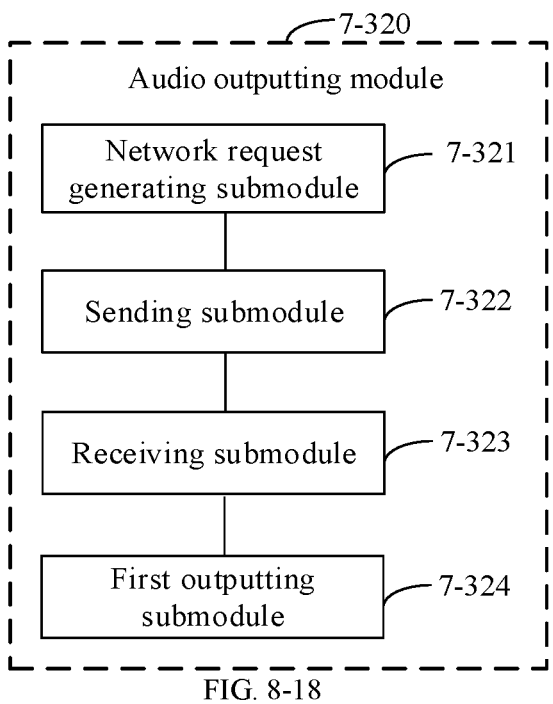
Figures 8, 9, 10, 11, 12, 13, 14, 15, 16, 17, 18, 19:
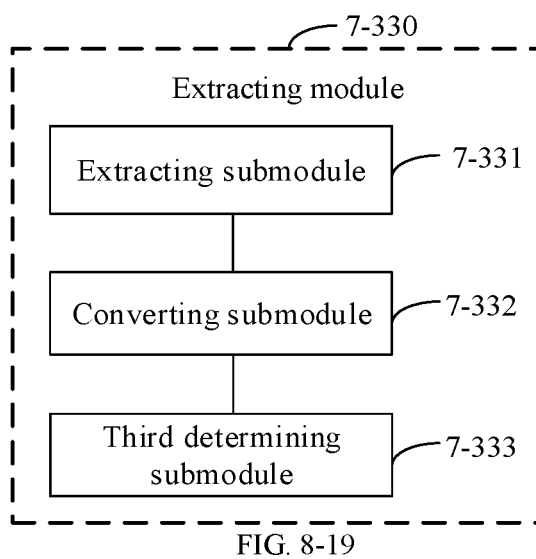
Figures 8, 9, 10, 11, 12, 13, 14, 15, 16, 17, 18, 19, 20:
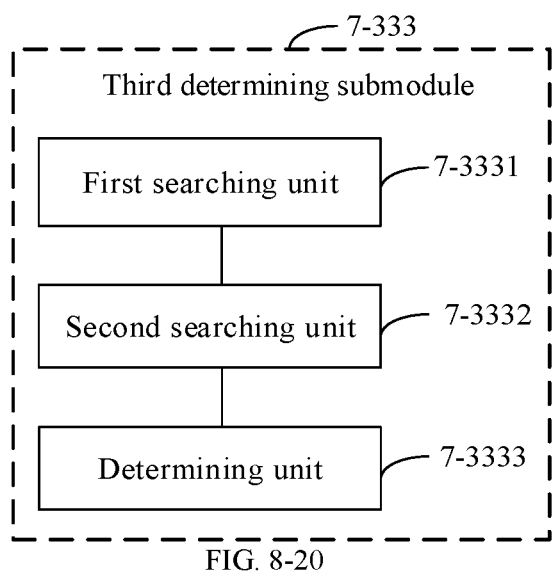
Figures 8, 9, 10, 11, 12, 13, 14, 15, 16, 17, 18, 19, 20, 21:
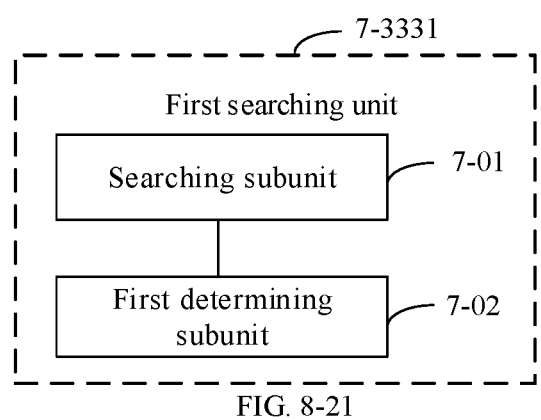
Figures 8, 9, 10, 11, 12, 13, 14, 15, 16, 17, 18, 19, 20, 21, 22:
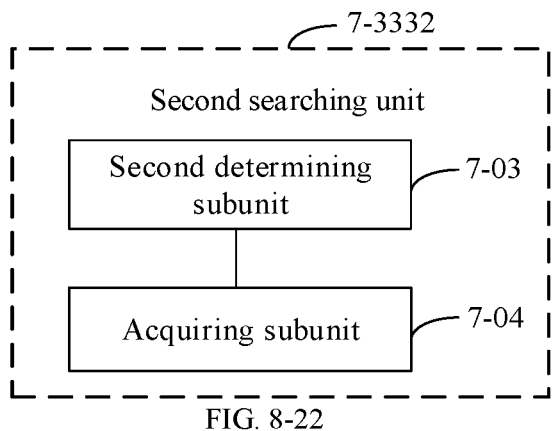
Figures 8, 9, 10, 11, 12, 13, 14, 15, 16, 17, 18, 19, 20, 21, 22, 23:
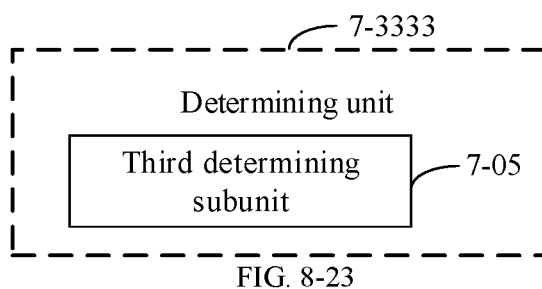
Figures 8, 9, 10, 11, 12, 13, 14, 15, 16, 17, 18, 19, 20, 21, 22, 23, 24, 25, 26, 27, 28:
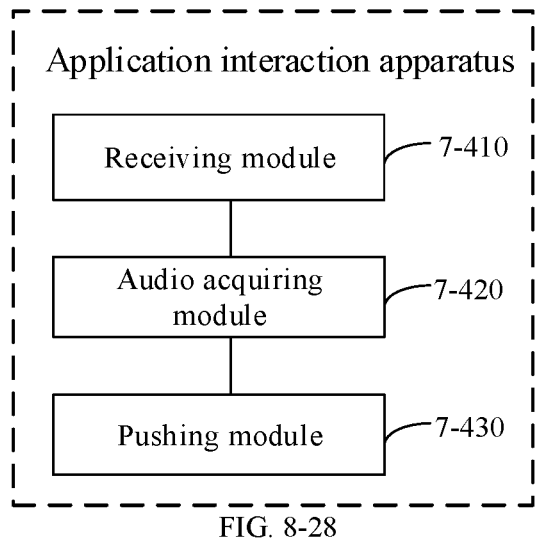
Figures 8, 9, 10, 11, 12, 13, 14, 15, 16, 17, 18, 19, 20, 21, 22, 23, 24, 25, 26, 27, 28, 29, 29A:
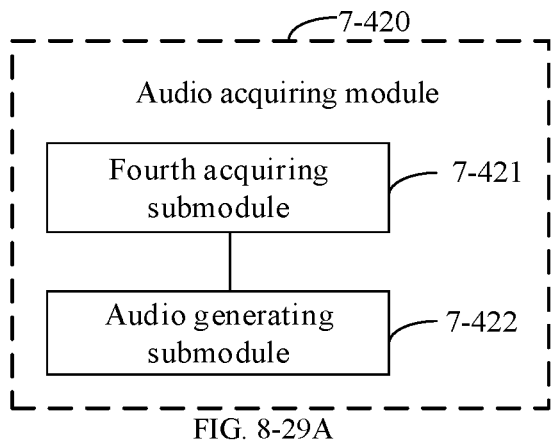
Figures 8, 9, 10, 11, 12, 13, 14, 15, 16, 17, 18, 19, 20, 21, 22, 23, 24, 25, 26, 27, 28, 29, 29B:
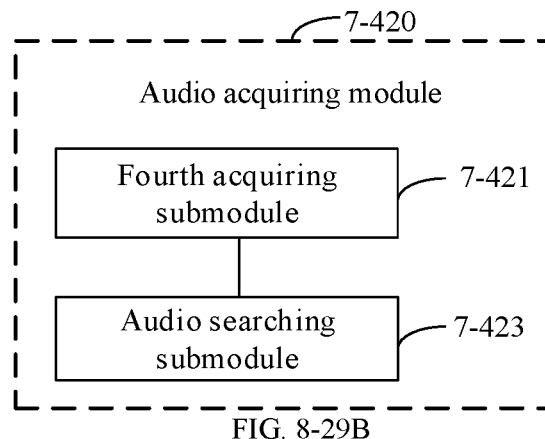
Figures 8, 9, 10, 11, 12, 13, 14, 15, 16, 17, 18, 19, 20, 21, 22, 23, 24, 25, 26, 27, 28, 29, 30:
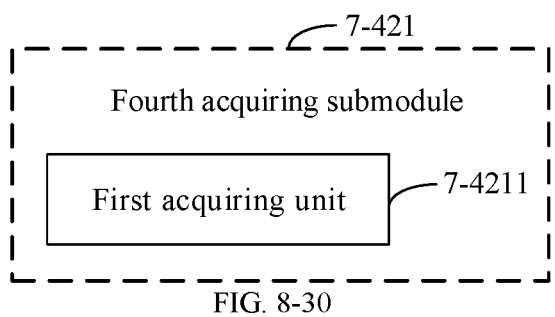
Figures 8, 9, 10, 11, 12, 13, 14, 15, 16, 17, 18, 19, 20, 21, 22, 23, 24, 25, 26, 27, 28, 29, 30, 31:
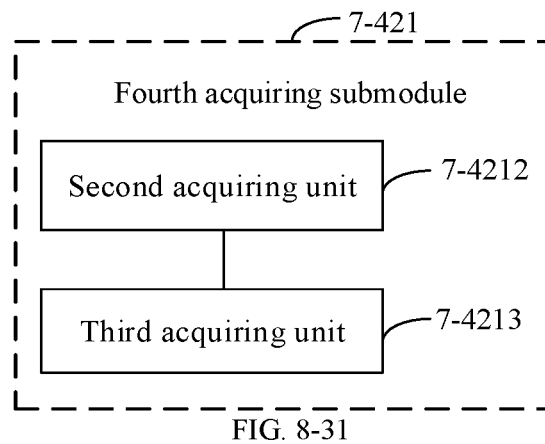
Figures 1, 9:
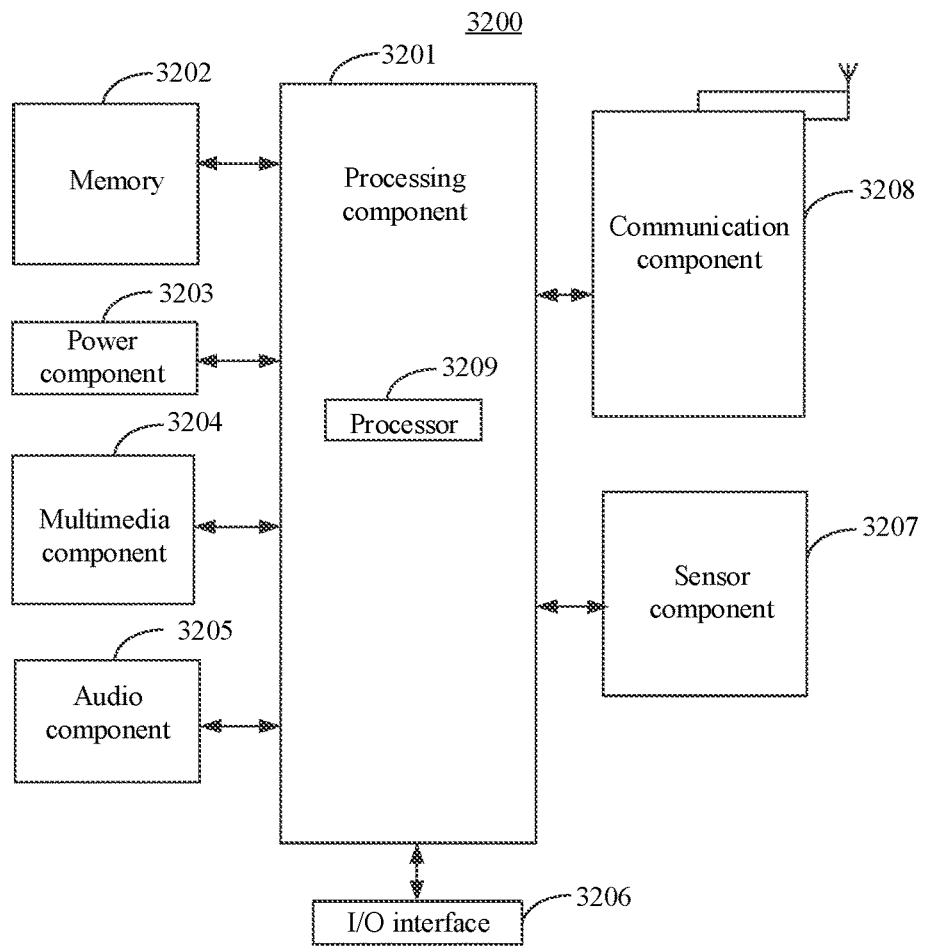
Figures 1, 10:
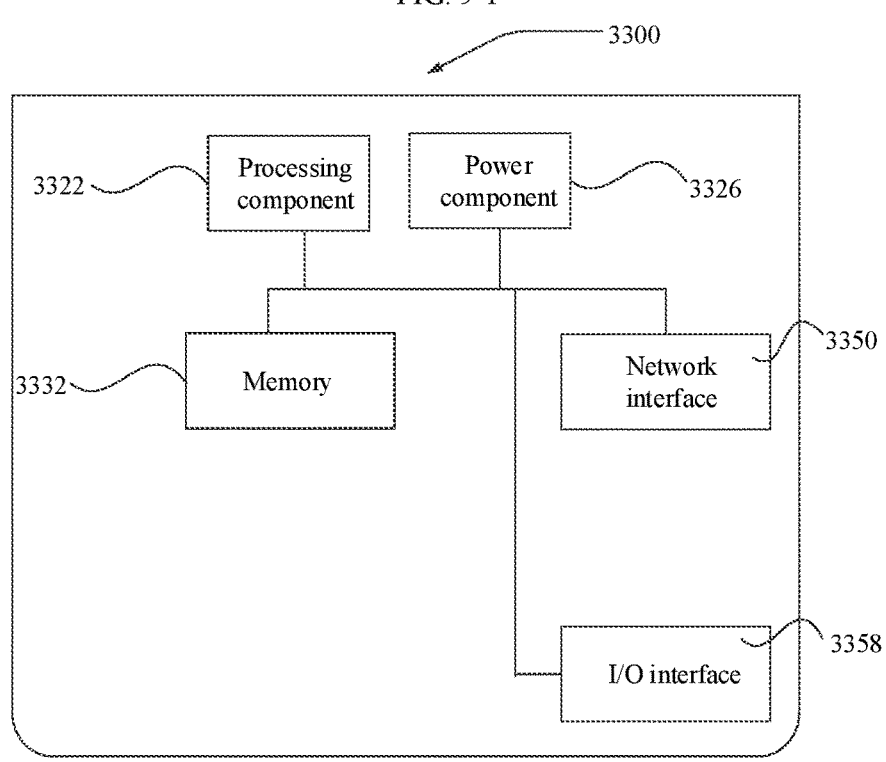

FIG. 6-10 is a block diagram of another application interaction apparatus according to an example of the present disclosure;

FIG. 6-11 is a block diagram of another application interaction apparatus according to an example of the present disclosure;

FIG. 6-12 is a block diagram of another application interaction apparatus according to an example of the present disclosure;

FIG. 6-13 is a block diagram of another application interaction apparatus according to an example of the present disclosure;

FIG. 6-14 is a block diagram of another application interaction apparatus according to an example of the present disclosure;

FIG. 7-1 is a flowchart of an application interaction method according to an example;

FIGS. 7-2A to 7-2E are schematic diagrams of an application interaction scenario according to an example;

FIG. 7-3 is a flowchart of another application interaction method according to an example;

FIGS. 7-4A to 7-4C is a schematic diagram of an application interaction scenario according to an example;

FIG. 7-5 is a flowchart of another application interaction method according to an example;

FIG. 7-6 is a flowchart of another application interaction method according to an example;

FIG. 7-7 is a flowchart of another application interaction method according to an example;

FIG. 7-8 is a flowchart of another application interaction method according to an example;

FIG. 7-9 is a flowchart of another application interaction method according to an example;

FIG. 7-10 is a flowchart of another application interaction method according to an example;

FIG. 7-11 is a block diagram of an application interaction apparatus according to an example;

FIG. 7-12 is a block diagram of another application interaction apparatus according to an example;

FIG. 7-13 is a block diagram of another application interaction apparatus according to an example;

FIG. 7-14 is a block diagram of another application interaction apparatus according to an example;

FIG. 7-15A and FIG. 7-15B are block diagrams of another application interaction apparatus according to an example;

FIG. 7-16A and FIG. 7-16B are block diagrams of another application interaction apparatus according to an example;

FIG. 7-17 is a block diagram of another application interaction apparatus according to an example;

FIG. 7-18 is a block diagram of another application interaction apparatus according to an example;

FIG. 7-19 is a block diagram of another application interaction apparatus according to an example;

FIG. 7-20 is a block diagram of another application interaction apparatus according to an example;

FIG. 7-21 is a block diagram of another application interaction apparatus according to an example;

FIG. 7-22 is a block diagram of another application interaction apparatus according to an example;

FIG. 7-23 is a block diagram of another application interaction apparatus according to an example;

FIG. 7-24 is a block diagram of another application interaction apparatus according to an example;

FIG. 7-25 is a block diagram of another application interaction apparatus according to an example;

FIG. 7-26A and FIG. 7-26B are block diagrams of another application interaction apparatus according to an example;

FIG. 7-27A and FIG. 7-27B are block diagrams of another application interaction apparatus according to an example;

FIG. 7-28 is a block diagram of another application interaction apparatus according to an example;

FIG. 7-29 is a block diagram of another application interaction apparatus according to an example;

FIG. 8-1 is a flowchart of an application interaction method according to an example;

FIG. 8-2A and FIG. 8-2B are schematic diagrams of an application interaction scenario according to an example;

FIG. 8-3 is a flowchart of another application interaction method according to an example;

FIG. 8-4 is a schematic diagram of an application interaction scenario according to an example;

FIG. 8-5 is a flowchart of another application interaction method according to an example;

FIG. 8-6 is a schematic diagram of another application interaction scenario according to an example;

FIG. 8-7 is a flowchart of another application interaction method according to an example;

FIG. 8-8 is a flowchart of another application interaction method according to an example;

FIG. 8-9 is a flowchart of another application interaction method according to an example;

FIG. 8-10 is a flowchart of another application interaction method according to an example;

FIG. 8-11 is a schematic diagram of another application interaction scenario according to an example;

FIG. 8-12 is a flowchart of another application interaction method according to an example;

FIG. 8-13 is a schematic diagram of another application interaction scenario according to an example;

FIG. 8-14 is a flowchart of another application interaction method according to an example;

FIG. 8-15 is a flowchart of another application interaction method according to an example;

FIG. 8-16 is a block diagram of an application interaction apparatus according to an example;

FIG. 8-17 is a block diagram of another application interaction apparatus according to an example;

FIG. 8-18 is a block diagram of another application interaction apparatus according to an example;

FIG. 8-19 is a block diagram of another application interaction apparatus according to an example;

FIG. 8-20 is a block diagram of another application interaction apparatus according to an example;

FIG. 8-21 is a block diagram of another application interaction apparatus according to an example;

FIG. 8-22 is a block diagram of another application interaction apparatus according to an example;

FIG. 8-23 is a block diagram of another application interaction apparatus according to an example;

FIG. 8-24 is a block diagram of another application interaction apparatus according to an example;

FIG. 8-25 is a block diagram of another application interaction apparatus according to an example;

FIG. 8-26 is a block diagram of another application interaction apparatus according to an example;

FIG. 8-27 is a block diagram of another application interaction apparatus according to an example;

FIG. 8-28 is a block diagram of another application interaction apparatus according to an example;

FIG. 8-29A and FIG. 8-29B are block diagrams of another application interaction apparatus according to an example;

FIG. 8-30 is a block diagram of another application interaction apparatus according to an example;

FIG. 8-31 is a block diagram of another application interaction apparatus according to an example;

FIG. 9-1 is a structural diagram of an interaction apparatus according to an example of the present disclosure;

FIG. 10-1 is a structural diagram of an interaction apparatus according to an example of the present disclosure.

DETAILED DESCRIPTION

Examples will be described in detail herein, with illustrations thereof represented in the drawings. When drawings are involved in the description below, like numerals in different drawings refers to like or similar elements unless otherwise indicated. The embodiments described in the following examples do not represent all embodiments consistent with the present disclosure. Instead, they are merely examples of apparatuses and methods consistent with some aspects of the present disclosure as detailed in the appended claims.

The present disclosure provides an interaction method. By using the interaction method, a web page can communicate with the operating system even if the web page is not provided with Deeplink technology, and the operating system can acquire a target message from the web page and accordingly perform a target operation, for example, launching a target application. The interaction method may include steps S1 to S3.

At step S1, a target message passing through an operating system is acquired, where the target message is from a web page and is used to instruct the operating system to perform a target operation.

In the present disclosure, the web page is presented by a browser or a web proxy service program installed in a user terminal. In other words, the target message is from a web page opened by a browser or other web proxy service programs such as MiTalk, WeChat, Weibo, and the like.

In the present disclosure, the carrier of the target message may be of a limited number of types, such as a network request, a clipboard message, an image format file, or an audio format file.

As to how the operating system identifies the target message from a plurality of messages which are from web pages and carried by carriers of the above types, the operating system may first determine whether a message from a web page includes preset feature information that identifies the target message, and then determine the message as the target message when it does. The preset feature information may be any information that can serve as identification, for example a preset keyword, a preset encoding method, a preset encryption method, a preset preamble, and the like.

At step S2, a target parameter is extracted from the target message.

The target parameter is an operational parameter used when the operating system performs the target operation. For example, when the target operation is launching a target application, the target parameter includes at least an identifier of the target application.

At step S3, the target operation is performed according to the target parameter.

In other words, the operating system performs the target operation corresponding to the target parameter. In an example of the present disclosure, the target parameter may be a target application parameter, such as an identifier of a target application. Correspondingly, the target operation may be launching a target application to implement a jump from a web page to the target application.

By taking launching a target application as an example of the target operation, and in combination with various types of carriers of the target message, the following part will discuss in detail how to establish a message channel between a web page and the operating system so as to implement the method of the present disclosure.

FIG. 1-1 is a flowchart of an application interaction method according to an example. The method may include the following step:

At step 11, a target message passing through the operating system is acquired.

The target message is for instructing a jump from a current application to a target application.

In an example of the present disclosure, the target message includes preset feature information and a target application parameter.

The preset feature information is for identifying whether a message contains a target application parameter, which may be a preset keyword, a preset encoding method, or the like. The preset feature information may be provided by provider of the target application and embedded in the user terminal in advance.

The target application parameter includes at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

In the present disclosure, the target message may be specifically a network request, and the carrier of the target message may be a URL (Uniform Resource Locator), such as an HTTP address, an image, an audio file, or the like.

That is to say, if the target message is a network request message, sender of the target message may be a browser or other web proxy service program, such as various instant messaging applications.

FIG. 1-2 is a flowchart of another application interaction method according to an example. Step 11 may include steps 111 to 112:

At step 111, in an interface of a current application, a triggering operation of the user on a preset interface element is received, where the triggering operation is for triggering the current application to send the message passing through the operating system.

In an example of the present disclosure, the current application may be any of the various applications installed in a user terminal. For example, the current application belongs to a first type application in the related art, and downloading and installation of the first type application require user's confirmation. In other words, installation package or update data package of the first type application will only be downloaded or installed when a confirmation message triggered by the user is received. The first type application mentioned above may be a browser, or an instant messaging application such as MiTalk, WeChat, and the like.

It is assumed that the preset interface element is a function button preset in the interface. When the user triggers the preset interface element in the application interface according to a preset operation, such as clicking the button, a message passing through the operating system and associated with the button may be sent. The message may be, for example, a message requesting a jump from the current application to another application. The message may be a network message.

At step 112, a target message passing through the operating system is acquired, where the target message includes preset feature information and the target application parameter.

As described above, the operating system may receive a plurality of messages from the current application, and after the reception, the operating system may identify the target message for jumping to the target application from the plurality of messages.

FIG. 1-3 is a flowchart of another application interaction method according to an example. Step 112 may include steps 1121 to 1123.

At step 1121, the message passing through the operating system is acquired.

For example, the user terminal is a smart phone. In an example of the present disclosure, as a bridge for upper layer application software to send messages to remote servers, the operating system of the smart phone may acquire messages sent by various applications.

In an example of the present disclosure, the message described above or a message of a preset type may be intercepted by a preset monitoring component in the operating system such as a firewall component or a Hook interface. A network request (i.e., a URL) is taken as an example of the message. In an example of the present disclosure, the operating system may monitor the network request sent by a web browser, or a network request sent by other web proxy service programs, such as MiTalk. Here, it should be noted that the message is not necessarily a target message that requests a jump to other applications.

At step 1122, it is determined whether the message includes the preset feature information.

A packet of the target message that requests a jump from the current application to the target application is generated as follows. In generating the packet of the target message according to a preset policy, the current application may add a preset keyword so as to label the packet as a jump requesting packet, or, encode all or part of the message data (for example, the target application parameter) using a preset encoding method, so as to acquire a packet encoded in the preset encoding method. Both of the preset keyword and the preset encoding method belong to the preset feature information for identifying the target message.

Correspondingly, the monitoring component in the operating system may determine, according to the preset feature information, whether the message passing through belongs to the target message. It is assumed that the preset feature information is a preset keyword, which may be a preset tag, a preset string (such as "abc000") and the like. After acquiring the message, the operating system may determine whether the message includes the preset keyword. If it does, step 1123 is performed. If it does not, the message is determined as an invalid message.

At step 1123, if the message includes the preset feature information, it is determined that the message is the target message.

In an example of the present disclosure, if the message acquired by the operating system includes a preset keyword, such as "abc000", it may be decided that the message may include the target application parameter, and the message is a valid message that can be used to launch the target application, i.e., the target message.

At step 12, an application parameter is extracted from the target message, where the target application parameter includes at least an identifier of the target application.

In an example of the present disclosure, after identifying the target message, the monitoring component of the operating system may send the packet of the target message to a preset Message service for analyzing. In this way, the identification process is decoupled from the analyzing process, or in other words, the monitoring component serves only to identify the target message but not to analyze the packet of the target message, thereby improving the detection efficiency of the target message.

In an example of the present disclosure, the monitoring component may be a firewall component. Since the firewall component is an original monitoring component in the operating system, a simple parametric configuration (such as configuring the preset feature information) to the firewall component is sufficient to endow the firewall component with the ability of identifying the target message. In this way, there is no need to additionally provide a new monitoring component to the operating system and it can save system resources.

On the other hand, by extracting the target application parameter through the Message service, the Message service may output the target application parameters in the preset format.

In other words, the Message service may analyze the packet of the target message, extract the target application parameters from the data obtained from analysis, and record the target application parameters in a unified format (for example, a string of a fixed length), so that the target application parameters in the preset format are acquired. It is assumed that the parameters are recorded in three bytes, with length of each byte being generally 8 bits. The first byte is used to record the identifier of the target application. The second byte is used to record the page name. The third byte is used to record the page parameter. If one of the parameters is empty, all bits of the corresponding byte are set to zero. It can be understood that the number of bytes occupied by any one of the preset parameters is set according to the maximum data size of the parameter, and should not be limited to one.

The Message service outputs the target application parameters in a unified format, which can facilitate subsequent programs to quickly open the target application according to the parameters, thereby improving the efficiency in launching applications.

In an example of the present disclosure, step 12 may be implemented in the following two cases.

In the first case, after the target message is determined, no processing is performed, and the target application parameter is directly extracted from the original target message.

In the second case, after the target message is determined, a redundancy removal processing is performed on the original target message, and then the target application parameter is extracted. FIG. 1-4 is a flowchart of another application interaction method according to an example. Step 12 may include steps 1201 to 1202.

At step 1201, the preset feature information is removed from the target message, to acquire a filtered target message.

In an example of the present disclosure, after identifying the target message according to the preset feature information, the monitoring component of the operating system may further remove the preset feature information in the original target message, to obtain a filtered target message.

The preset feature information is mainly for identifying the target message. In subsequent information processing process, the preset feature information becomes redundant information. Therefore, before the target application parameter is extracted, the preset feature information in the original target message may be removed, thereby reducing the burden of subsequent information processing and improving information processing efficiency.

At step 1202, the target application parameter is extracted from the filtered target message.

In an example of the present disclosure, the target application parameter may be extracted from the filtered target message by using the Message service. Since the redundant information won't need to be analyzed, the efficiency of extracting the target application parameter by the Message service can be improved.

In another example of the present disclosure, before the target application parameter is extracted by the operating system (such as through the Message service), information verification may be first performed on the target message. FIG. 1-5 is a flowchart of another application interaction method according to an example. The above step 12 may include steps 121 to 122.

At step 121, information verification is performed on the target message.

In an example of the present disclosure, it should be noted that a message that does not include a target application parameter may also include the preset feature information, for example a preset keyword. In other words, the target message determined at step 1123 does not necessarily include a target application parameter.

After receiving the target message sent by the firewall, the Message service may further perform information verification on the target message according to a preset policy. For example, the Message service may determine whether the target message includes a preset field (such as a field "APP ID:"), and decide that the target message passes the information verification when it does.

Alternatively, in the case where the target application parameter is encoded in a preset encoding method, the Message service may further decode the target message by using a preset decoding method and then verify it. The preset encoding and decoding methods are provided by the provider of the target application and are set in the Message service.

Correspondingly, the target message is generated as follows. The sender of the target message (e.g., a browser) encodes information containing the target application parameter (e.g. a URL) according to a preset encoding method provided by the provider of the target application, so as to generate the target message.

At step 122, if the target message passes the information verification, the target application parameter is extracted from the target message.

In an example of the present disclosure, to ensure that the target message is accurately determined and to reduce the size of data to be analyzed subsequently, after receiving the target message sent by the monitoring component, the Message service built in the user terminal may further perform information verification on the target message before analyzing for the target application parameter. In this way, it is guaranteed that the target message to be subsequently analyzed includes a target application parameter.

At step 13, the target application is launched according to the target application parameter.

The target application may belong to the first type application or a new application. The difference between a new application and a first type application is that a new application is installed and downloaded without confirmation for the user, and the downloading and installation process is in background of the user terminal.

In other words, after being acquired by the user terminal, a compressed package of the new application may be automatically installed or updated in the background, with both its installation process and update process not visible to the user in the foreground.

If the target application belongs to the first type application, and the target application has been installed in the user terminal, step 13 may be implemented specifically as follows.

According to the identifier of the target application in the target application parameter, the operating system launches the target application, opening, for example, a home page, a login page or a registration page of the target application.

In the case where the target application parameter further includes other information, the launched target application may also perform corresponding operations according to such information, such as opening an inner page in the target application (e.g., a detail page of a sales item in an e-commerce platform); playing an audio file, a video file, etc. in a preset interface; or popping up a preset dialog box.

If the target application is not installed in the user terminal, an application store or the like may be launched so as to prompt the user to download and install the target application. Otherwise, the target message may be discarded.

FIG. 1-6 is a flowchart of another application interaction method according to an example. If the target application belongs to the new application, step 13 may include steps 131 to 133.

At step 131, according to the identifier of the target application, it is determined whether the target application has been installed locally.

In an example of the present disclosure, the user terminal may determine whether the new application has been installed locally according to the identifier of the target application through a preset new application platform, or, new application service software. For example, by searching a list of newly installed applications according to the identifier of the target application, it may be determined whether the target new application has been installed locally.

At step 132, if the target application has not been installed locally, the target application is downloaded and installed.

If it is determined that the target new application has not been installed locally, the new application platform may trigger the user terminal to automatically download and install the target new application. Such process is invisible to the user, that is, downloading and installation process is executed without taking receiving a confirmation message triggered by the user in the foreground as a necessary condition.

At step 133, the target application is launched according to the target application parameter through a preset application platform.

After acquiring an installation package or an update data package of a new application, the preset application platform may launch the target new application by directly running the new application program.

In an example of the present disclosure, the preset application platform is a service program preset in the user terminal, and the new application platform may be set in the operating system as system software; still taking a smart phone as an example of the user terminal, the new application platform may be set when the phone is shipped from factory. The preset application platform may also be independently operated in the user terminal as upper layer application software, and the present disclosure does not limit the setting position thereof.

The preset application platform may launch a corresponding target application (i.e., a new application), according to the application parameter of any type of target application. The process of the application platform launching a new application may be implemented as directly launching installation or update package of the new application, opening an interface of the new application specified by the target application parameter (e.g., a home page of the new application), or an inner page thereof.

As an example, it is assumed that the preset application platform at step 133 is a service program C which runs a plurality of new applications, and the target application is a new application named Kuaikan Manhua. In this case, the service program C may directly launch the application Kuaikan Manhua according to the acquired target application parameter, e.g., the identifier of Kuaikan Manhua.

FIG. 1-7-1 is a schematic diagram of an application interaction scenario according to an example. When the user clicks on a link to a page of the target application (e.g., a link to Zhihu Daily) in a browser page 101 of a smart phone 100, the browser page may execute a JS (JavaScript) script in the background. The JS script may generate a target message according to the target application parameters and the preset feature information, for example, the JS script puts together the identifier of the target application, the parameter of the detail page, etc., and the preset feature information into a URL string. The JS script sends the message passing through the operating system (e.g., the URL string) through a system interface. The message is monitored, identified, and determined as the target message, when it passes through the firewall component of the operating system. The firewall component sends the target message to the Message service for extracting the target application parameters. Then, the Message service sends the target application parameters to a preset application platform (i.e., the target application platform). Finally, the preset application platform opens a detail page of the application Zhihu (e.g., detail page 102 of Zhihu Daily) according to the target application parameters, and presents the detail page to the user.

FIG. 1-7-2 is a schematic diagram of an application interaction method in related art. In the related art, if a link to Zhihu Daily is clicked in the browser page 101, the user is not shown directly the page of the target application, i.e., Zhihu Daily of the application Zhihu. Instead, according to the Deeplink technology with which the browser is configured, a floating window 103 prompting the user to select a method to open the page pops up in the browser. If the browser is not configured with the Deeplink technology, it is impossible to jump from the browser to the application Zhihu.

It can be seen that, by using the application interaction method provided by the present disclosure, when the user tries to jump from one application interface to another target application, the operating system of the terminal can detect the target message which contains a target application parameter, and send the target application parameter to the preset application platform, which is used to open the target application for the user. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, during the process of launching the application, the process of interaction between the user and the terminal can be simplified and time can be saved, and user experience of the terminal device is further improved.

For simplicity of description, the foregoing method examples are all expressed as a series of actions, but those skilled in the art should understand that the present disclosure is not limited by the described order of actions, because according to the present disclosure, some steps can be performed in a different order or at the same time.

In addition, those skilled in the art should also understand that the examples described in the specification are optional, and actions and modules involved are not necessarily required by the disclosure.

Correspondingly to the foregoing examples of methods to implement the application methods, the present disclosure also provides examples of apparatuses to implement the application methods and corresponding terminals.

FIG. 1-8 is a block diagram of an application interaction apparatus according to an example. The apparatus may include:

a target message acquiring module 21, configured to acquire a target message passing through an operating system;

a parameter extracting module 22, configured to extract a target application parameter from the target message, where the target application parameter includes at least an identifier of the target application; and an application jumping module 23, configured to launch the target application according to the target application parameter.

FIG. 1-9 is a block diagram of another application interaction apparatus according to an example. On the basis of the apparatus example shown in FIG. 1-8, the target message acquiring module 21 may include:

a triggering receiving submodule 211, configured to receive, in an interface of a current application, a triggering operation of the user on a preset interface element, where the triggering operation is for triggering the current application to send the message passing through the operating system.

an acquiring submodule 212, configured to acquire a target message passing through the operating system, where the target message includes preset feature information and the target application parameter.

FIG. 1-10 is a block diagram of another application interaction apparatus according to an example. On the basis of the apparatus example shown in FIG. 1-9, the triggering receiving submodule 211 may include:

a triggering receiving unit 2111, configured to receive, in an interface of a first type application, a triggering operation of the user on a preset interface element, where downloading and installation of the first type application require user's confirmation.

FIG. 1-11 is a block diagram of another application interaction apparatus according to an example. On the basis of the apparatus example shown in FIG. 1-9, the acquiring submodule 212 may include:

a message acquiring unit 2121, configured to acquire a message passing through an operating system;

a detecting unit 2122, configured to determine whether the message includes preset feature information, where the preset feature information includes a keyword or a preset encoding method; and a target determining unit 2123, configured to determine the message as the target message when the message includes the preset feature information.

In an example of the present disclosure, the message acquired by the message acquiring unit 2121 may include a network request. FIG. 1-12 is a block diagram of another application interaction apparatus according to an example. On the basis of the apparatus example shown in FIG. 1-11, the message acquiring unit 2121 may include:

a first monitoring subunit 21211, configured to monitor a network request sent by the browser; and a second monitoring subunit 21212, configured to monitor a network request sent by the network proxy service program.

FIG. 1-13 is a block diagram of another application interaction apparatus according to an example. On the basis of the apparatus example shown in FIG. 1-8, the parameter extracting module 22 may include:

a parameter extracting submodule 221, configured to extract the target application parameter from the target message through a preset Message service, so as to acquire target application parameters in a preset format.

FIG. 1-14 is a block diagram of another application interaction apparatus according to an example. On the basis of the apparatus example shown in FIG. 1-13, the parameter extracting submodule 221 may include:

an information filtering unit 2211, configured to remove the preset feature information from the target message, to acquire a filtered target message; and a parameter extracting unit 2212, configured to extract the target application parameter from the filtered target message through a preset Message service.

FIG. 1-15 is a block diagram of an application interaction apparatus according to an example. On the basis of the apparatus example shown in FIG. 1-8, the parameter extracting module 22 may include:

a verifying submodule 2201, configured to perform information verification on the target message;

an extracting submodule 2202, configured to extract the target application parameter from the target message when the target message passes the information verification.

FIG. 1-16 is a block diagram of another application interaction apparatus according to an example. On the basis of the apparatus example shown in FIG. 1-8, the application jumping module 23 may include:

a detecting submodule 231, configured to determine, according to the identifier of the target application, whether the target application has been installed locally;

an installing submodule 232, configured to download and install, when the target application has not been installed locally, the target application.

a jumping submodule 233, configured to launch the target application according to the target application parameter through a preset application platform.

Correspondingly, in one aspect, examples of the present disclosure provide an application interaction apparatus, including a processor and a memory for storing processor-executable instructions, where the processor is configured to:

acquiring a target message passing through an operating system;

extracting a target application parameter from the target message, where the target application parameter includes at least an identifier of the target application; and launching the target application according to the target application parameter.

The following seven examples will discuss how the operating system performs the operation of launching the target application, by assuming the carrier is, respectively, a network request, a clipboard message, an image format file, and an audio format file. In examples 1 to 4, the carrier of the target message is a network request; in example 5, the carrier is a clipboard message; in example 6, the carrier is an image format file; and in example 7, the carrier is an audio format file. Following are the examples.

Example 1

FIG. 2-1 is a flowchart of an application interaction method according to an example. The method may include steps 1-11 to 1-14.

At step 1-11, a virtual network connection is established between a current application and a preset virtual server.

In an example of the present disclosure, the current application may be any of the various applications installed in a user terminal. For example, the current application may be a first type application in the related art, which may be application software such as a browser, MiTalk, WeChat, and the like.

The current application may also be of a different type, for example a new application, which is installed and downloaded without user's confirmation.

According to provision of the TCP (Transmission Control Protocol), if a current application is to send a network request, a reliable network connection with the network server is required to be established first. After that, it is possible for the target network request to be monitored by the operating system.

Since the present disclosure mainly aims to make the target network request monitored by the operating system, it is not taken into account whether a receiving party of the network request returns requested information to the current application. Therefore, a virtual network server can be preset, so that the current application may establish a virtual network connection with the virtual network server.

In an example of the present disclosure, the current application may be an application that can request access to the network, such as a web browser or a web proxy service program, where the network proxy service program may be an instant messaging application such as MiTalk, WeChat, QQ, etc., or other applications that can request access to the network.

The virtual server may be an HTTP (Hyper Text Transfer Protocol) server set in the user terminal locally. The current application may establish a virtual TCP connection with the local HTTP server.

The application interaction method provided by the present disclosure will be described in detail below with reference to an example in which the current application is a web browser, the virtual server is virtual HTTP server locally provided.

In an example of the present disclosure, when establishing a virtual TCP connection between the current application and the virtual HTTP server, step 1-11 may be implemented in the following three cases.

In the first case, with reference to FIG. 2-2, a flowchart of another application interaction method according to an example, step 1-11 may include steps 1-111 to 1-113.

At step 1-111, an address of a virtual HTTP server is acquired according to the network request.

According to the related knowledge, before sending an HTTP request to a normal web server, a web server may need to first establish a stable TCP connection through three handshakes. After the TCP connection is successfully established, an HTTP request is sent to the remote web server.

In an example of the present disclosure, by establishing the virtual TCP connection through the preset local HTTP server previously provided in the user terminal, the web browser may subsequently send an HTTP request to the virtual HTTP server through the operating system, so that a preset monitoring service may acquire the HTTP request.

In establishing the virtual TCP connection, an address of the virtual HTTP server can be acquired according to the network request in the following manner.

The address of the virtual HTTP server is not directly included in the network request sent by the browser. FIG. 2-3 is a flowchart of another application interaction method according to an example. Step 1-111 may include steps 1-1111 to 1-1112.

At step 1-1111, a virtual domain name in the network request is acquired.

FIG. 2-4 is a flowchart of another application interaction method according to an example. Step 1-1111 may include steps 1-101 to 1-103.

At step 1-101, domain name information in an HTTP address is acquired.

For example, when the user clicks on a network link in a page of the web browser (it is assumed that an address of the network link, i.e., the HTTP address, is http://abc.com/efg****), the web browser first acquires the domain name information in the HTTP address (i.e., abc.com), and sends the domain name information "abc.com" to a DNS (Domain Name System) module of the user terminal.

At step 1-102, a preset white list of virtual domain names is searched according to the domain name information.

In an example of the present disclosure, a white list of virtual domain names may be preset in the user terminal, and the white list records all virtual domain name information. The DNS module may use the white list of virtual domain names to determine whether a domain name sent by the browser is a virtual domain name.

At step 1-103, if the domain name information is in the preset white list of virtual domain names, it is determined that the domain name information is a virtual domain name.

If the DNS module finds "abc.com" from the preset white list of virtual domain names, it is determined that the domain name "abc.com" is a virtual domain name. In other words, a web server the domain name points to does not physically exist.

At step 1-1112, an address of a corresponding virtual HTTP server is resolved according to the virtual domain name.

In an example of the present disclosure, a list may be preset in the DNS module, and the preset list contains the correspondence between addresses of the virtual HTTP servers and virtual domain names. For example, as shown in Table 1:

TABLE 1

| Virtual domain name | Address of virtual HTTP server |
|---|---|
| abc.com | 127.0.0.1 |

The DNS module may search table 1 according to the virtual domain name "abc.com", and determine the address of the corresponding virtual HTTP server as 127.0.0.1. The address is then returned to the browser so that the browser may take the address as a destination address and send a handshake packet to the address.

At step 1-112, a handshake packet is acquired, where the handshake packet includes the address of the virtual HTTP server.

After acquiring the address of the virtual HTTP server corresponding to "abc.com" (it is assumed that the address is 127.0.0.1), the web browser sends out a TCP handshake packet with the address of the HTTP server. The TCP handshake packet contains the address 127.0.0.1.

At step 1-113, a virtual TCP connection is established with the virtual HTTP server through the handshake packet.

After receiving the handshake packet, the local virtual HTTP server returns a response message to the web browser, and thus a handshake process is completed.

In the TCP/IP protocol, the TCP protocol requires to provide a reliable connection service through three handshakes. In the subsequent two handshakes, steps 1-111 to 1-113 are repeated. After three handshakes all succeed, the virtual TCP connection is successfully established.

In the second case, with reference to FIG. 2-5, a flowchart of another application interaction method according to an example, step 1-11 may include steps 1-11-1 to 1-11-5:

At step 1-11-1, a virtual domain name in the network request is acquired.

This step is implemented similarly to step 1-1111, and details are not described herein again.

At step 1-11-2, the virtual domain name is resolved into a corresponding virtual IP address.

After determining that the domain name "abc.com" is a virtual domain name, the DNS module may output a virtual IP address according to a preset virtual IP address list, and send the virtual IP address to the web browser. The virtual IP address list contains the correspondence between virtual domain names and virtual IP addresses. For example, as shown in Table 2:

TABLE 2

| Virtual domain name | Virtual IP address |
|---|---|
| abc.com | 1.2.3.4 |

The DNS module searches Table 2 according to the domain name "abc.com" and outputs a corresponding virtual IP address 1.2.3.4.

At step 1-11-3, a TCP handshake packet is acquired, where the TCP handshake packet includes the virtual IP address.

After acquiring the address of the virtual IP address corresponding to "abc.com" (it is assumed that the virtual IP address is 1.2.3.4), the web browser sends out a TCP handshake packet with the virtual IP address. The TCP handshake packet contains the virtual IP address 1.2.3.4.

According to related knowledge, as a bridge for upper layer application software to send messages to remote servers, the operating system may acquire messages sent by various applications. Therefore, when passing through the operating system, the TCP handshake packet sent by the web browser can be acquired by a monitoring component preset in the operating system, such as a firewall component.

At step 1-11-4, the virtual IP address in the TCP handshake packet is modified to an address of a local HTTP server, so that an updated handshake packet is acquired.

A firewall is still taken as an example of the monitoring component in the operating system. In an example of the present disclosure, the correspondence between virtual IP addresses and addresses of local virtual HTTP servers is pre-stored in the user terminal, as shown in Table 2:

TABLE 3

| Virtual IP address | Address of virtual HTTP server |
|---|---|
| 1.2.3.4 | 127.0.0.1 |

The firewall can search Table 3, modify the IP address (1.2.3.4) in the original TCP handshake packet from the web browser to the address of the local virtual HTTP server (127.0.0.1), and then send the modified TCP handshake packet, i.e., the updated handshake packet, to the virtual HTTP server.

At step 1-11-5, a virtual TCP connection is established with the virtual HTTP server through the updated handshake packet.

After receiving the updated handshake packet, the local virtual HTTP server returns a response message to the web browser, and then a handshake process is completed.

In the TCP/IP protocol, the TCP protocol requires to provide a reliable connection service through three handshakes. In the subsequent two handshakes, steps 1-11-1 to 1-11-5 are repeated. After three handshakes all succeed, the virtual TCP connection is successfully established.

In the third case, the network request sent by the browser (e.g., a URL) directly contains the address of the virtual HTTP server (e.g., http://127.0.0.1/efg****). The browser may extract the address of the preset local virtual HTTP server from the network request, and then send the handshake packet.

In this case, the handshake packet sent by the browser includes the address of the preset virtual HTTP server, 127.0.0.1. The handshake packet does not need to undergo a domain name resolution by the DNS module, nor any information processing by the firewall, but is directly sent to the preset local virtual HTTP server. In other words, when establishing a virtual TCP connection between the current application and the virtual HTTP server, there is no need to perform any processing on the handshake packet. Compared to the first two cases, the third case may speed up the creation of message channels for sending messages through the operating system.

At step 1-12, a target network request passing through an operating system is acquired through the virtual network connection, where the target network request is for jumping to a target application.

In an example of the present disclosure, the target network request includes preset feature information and a target application parameter.

The preset feature information is for determining whether a network request contains a target application parameter, which may be a preset keyword, a preset encoding method, or the like. The preset feature information may be provided by provider of the target application and embedded in the user terminal in advance.

The target application parameter includes at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

In an example of the present disclosure, the target network request may be a target HTTP request passing through the operating system and acquired through a virtual TCP connection. The carrier of the target HTTP request may be a URL, such as an HTTP address.

FIG. 2-6 is a flowchart of another application interaction method according to an example. At step 1-12, a target network request passing through an operating system is acquired, which may include steps 1-121 to 1-123.

At step 1-121, the network request passing through the operating system is acquired.

As shown above, once a TCP connection is established, the web browser sends a network request, such as an HTTP request to a virtual web server with the domain name "abc.com". When passing through the operating system, the HTTP request can be acquired by a monitoring component provided in the operating system, such as a firewall.

At step 1-122, it is determined whether the network request includes preset feature information.

The web browser can send various HTTP requests to the outside. Depending on the requesting method, the HTTP request may be of any of the methods: GET, POST, HEAD, OPTIONS, PUT, DELETE, TRACE, or the like. A GET request packet is taken as an example. The request data may or may not contain the target application parameter. Therefore, the firewall component needs to primarily determine whether the currently acquired packet contains the target application parameter according to a preset policy.

In an example of the present disclosure, the firewall component may identify the target network request by determining whether the request packet includes the preset feature information. The preset feature information is for determining whether an HTTP request contains a target application parameter, which may be a preset keyword, a preset encoding method, or the like. The preset feature information may be provided by provider of the target application and embedded in the user terminal in advance.

It is assumed that the preset feature information is a preset keyword, which may be a preset tag, a preset string (such as "111") and the like. After acquiring the HTTP request, the firewall may determine whether the request includes the preset keyword. If it does, step 1-123 is performed. If the current request includes the preset keyword, the HTTP request is determined as an invalid message.

At step 1-123, if the network request includes the preset feature information, the network request is determined as the target network request.

As shown above, if the HTTP request includes the preset feature information, it is determined that the HTTP request belongs to the target HTTP request.

At step 1-13, a target application parameter is extracted from the target network request, where the target application parameter includes at least an identifier of the target application.

FIG. 2-7 is a flowchart of another application interaction method according to an example. Step 1-13 may include steps 1-131 to 1-132.

At step 1-131, the target network request is sent to the preset Message service.

In an example of the present disclosure, after identifying the target message, the monitoring component of the operating system may send the packet of the target message to a preset Message service for analyzing. In this way, the identification process is decoupled from the analyzing process, or in other words, the monitoring component serves only to identify the target message but not to analyze the packet of the target message, thereby improving the detection efficiency of the target message.

In an example of the present disclosure, the monitoring component may be a firewall component. Since the firewall component is an original monitoring component in the operating system, a simple parametric configuration (such as configuring the preset feature information) to the firewall component is sufficient to endow the firewall with the ability of identifying the target message. In this way, there is no need to additionally provide a new monitoring component to the operating system and it can save system resources.

Depending on whether the firewall component performs further processing on the target network request, two cases may exist, as described below.

In the first case, the firewall component does not perform further processing on the original target network request and sends the request to the Message service.

In other words, the packet of the target network request determined at step 1-123 does not undergo any processing by the firewall component, and is directly or indirectly sent to the Message service. That is to say, the target network request (e.g., the target HTTP request) sent to the Message service also includes the preset feature information.

In the second case, the firewall component performs a redundancy removal processing on the target network request, and then sends the request to the Message service. FIG. 2-8 is a flowchart of another application interaction method according to an example. Step 1-131 may include steps 1-1311 to 1-1312.

At step 1-1311, the preset feature information is filtered out from the target network request, to acquire a filtered target network request.

In an example of the present disclosure, after determining the target HTTP request according to the preset feature information, the firewall may further remove the preset feature information in the target HTTP request, to acquire a filtered target HTTP request.

At step 1-1312, the filtered target network request is sent to the preset Message service.

The preset feature information is mainly for the identification of the HTTP request. In subsequent information processing process, the preset feature information becomes redundant information. Therefore, in an example of the present disclosure, the preset feature information in the original HTTP request may be removed before the request is sent to the Message service, thereby reducing the burden of data processing of the Message service and improving information processing efficiency of the Message service.

For the above two cases, the target network request may be sent to the Message service in any of the following manners, where the target network request may be the original target HTTP request, or the filtered target HTTP request acquired at step 1-1311.

In the first manner, the firewall component intercepts the packet of the target network request and forwards the packet to the Message service.

In an example of the present disclosure, it may not be of interest whether the local virtual HTTP server returns a response message for the target HTTP request. Therefore, the firewall component intercepts the target HTTP request and forwards the request to the Message service.

In the second manner, the firewall component makes a copy of the packet of the target network request and sends the copy to the Message service.

On the other hand, the firewall component also allows the packet of the target network request to pass through normally and send the packet to the virtual server.

In the third manner, the firewall component allows the packet of target network request to pass through normally, and sends the packet to the local virtual server, and the local virtual server sends the packet of the target network request to the Message service.

The target HTTP request is again taken as an example of the target network request. In the third manner, when releasing the packet of the target HTTP request, the firewall component may add a simple mark (e.g., character "M") to the packet of the target HTTP request, so that after detecting that the packet of the target HTTP request is marked with "M", the local HTTP server may send the packet of the target HTTP request to the Message service.

At step 1-132, the target application parameter in the target network request is extracted by the Message service.

In an example of the present disclosure, the Message service may analyze the packet of the target network request, and extract a target application parameter from the information obtained from analysis.

In addition, the Message service may record the target application parameters in a unified format (for example, a string of a fixed length), so that the target application parameters in the preset format are acquired. It is assumed that the parameters are recorded in three bytes, with length of each byte being generally 8 bits. The first byte is used to record the identifier of the target application. The second byte is used to record the page name. The third byte is used to record the page parameter. If one of the parameters is empty, all bits of its corresponding byte are set to zero. It can be understood that the number of bytes occupied by any one of the preset parameters is set according to the maximum data size of the parameter, and should not be limited to one.

The Message service outputs the target application parameters in a unified format, which can facilitate a subsequent application platform to open a page of the target application according to the parameters, thereby improving the efficiency in launching applications.

In another example of the present disclosure, before the target application parameters are extracted by the Message service, information verification may be first performed on the packet of the network request. FIG. 2-9 is a flowchart of another application interaction method according to an example. Step 1-132 may include steps 1-1321 to 1-1322.

At step 1-1321, information verification is performed on the target network request.

In an example of the present disclosure, it should be noted that a HTTP request that does not include the target application parameter may also include the preset feature information, for example a preset keyword. In other words, the packet of the target network request determined at step 1-123 does not necessarily include the target application parameter.

After receiving the packet of the target HTTP request sent by the firewall, the Message service may further perform information verification on the packet of the target HTTP request according to a preset policy. For example, the Message service may determine whether the target network request obtained from analysis includes a preset field (such as a field "APP ID:"), and decide that the target network request passes the information verification when it does.

Alternatively, in the case where the target application parameter is encoded in a preset encoding method, the Message service may further decode the target network request by using a preset decoding method and then verify it. The preset encoding and decoding methods may be provided by the provider of the target application and set in the Message service.

The packet of the network request is generated as follows: a web browser encodes request data containing the target application parameter according to a preset encoding method provided by the provider of the target application, so as to generate the packet of the HTTP request.

If the Message service successfully decodes the packet of the target HTTP request by using the preset decoding method, then the packet of the target HTTP request is a valid HTTP request, i.e., a valid network request. The preset encoding and decoding methods are provided by the provider of the target application and are set in the Message service.

At step 1-1322, the target application parameter is extracted from the valid network request that passes the information verification.

In an example of the present disclosure, to ensure that the HTTP request is accurately determined and to reduce the size of data to be analyzed subsequently, after receiving the packet of the target HTTP request sent by lower level of the system, the Message service built in the user terminal may further perform information verification on the target HTTP request before analyzing for the target application parameter. In this way, it is guaranteed that the request to be subsequently analyzed includes a target application parameter.

At step 1-14, the target application is launched according to the target application parameter.

Step 1-14 is similar to step 13, specific implementation of which may be referred to each other and is not described herein again.

It can be seen that, by using the application interaction method provided by the present disclosure, when the user tries to jump from one application interface to a detail page of another target application, the operating system of the user terminal can detect the target network request which contains a target application parameter, extract the target application parameter, and send the target application parameter to the preset application platform, which is used to open the target application for the user. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, when the user clicks a link to a page of the target application in an interface of an application (e.g., a web browser), the user terminal can directly and accurately jump to the page of the target application without intervening other human-computer interaction. In this way, the process of interaction between the user and the terminal can be simplified and time can be saved, and user experience of the terminal device is further improved.

It should be noted that, in the present disclosure, after the preset monitoring component (e.g., the firewall component) acquires the target network request, or after the local HTTP server sends the target network request to the Message service, the virtual TCP connection may be closed to release the resource, thereby improving the utilization of system resources. In a another implementation, after the HTTP communication is completed, the virtual TCP connection may also be kept in a connection state, so that the browser may continue to send HTTP requests through the same virtual TCP connection, and accordingly, the firewall component may quickly detect the subsequent target HTTP request. In this way, time required to establish new connections for each request can be saved and detection efficiency of target network requests can be improved.

Correspondingly to the foregoing examples of methods to implement the application methods, the present disclosure also provides examples of apparatuses to implement the application methods and corresponding terminals.

FIG. 2-10 is a block diagram of an application interaction apparatus according to an example. The apparatus may include:

a connection establishing module 1-21, configured to establish a virtual network connection between a current application and a preset virtual server;

a target request acquiring module 1-22, configured to acquire, through the virtual network connection, a target network request passing through an operating system, where the target network request is for jumping to a target application;

a parameter extracting module 1-23, configured to extract a target application parameter from the target network request, where the target application parameter includes at least an identifier of the target application; and an application jumping module 1-24, configured to launch the target application according to the target application parameter.

FIG. 2-11 is a block diagram of another application interaction apparatus according to an example. On the basis of the apparatus example shown in FIG. 2-10, the connection establishing module 1-21 may include:

a TCP connection establishing submodule 1-211, configured to establish a virtual TCP connection between a current application and a preset virtual server.

Correspondingly, the target request acquiring module 1-22 may be configured to acquire, through the virtual TCP connection, a target HTTP request passing through an operating system.

FIG. 2-12 is a block diagram of another application interaction apparatus according to an example. On the basis of the apparatus example shown in FIG. 2-11, the TCP connection establishing submodule 1-211 may include:

an address acquiring unit 1-2111, configured to acquire an address of a virtual HTTP server according to the network request;

a first data acquiring unit 1-2112, configured to acquire a handshake packet, where the handshake packet includes the address of the virtual HTTP server; and a first connection establishing unit 1-2113, configured to establish a virtual TCP connection with the virtual HTTP server through the handshake packet.

FIG. 2-13 is a block diagram of another application interaction apparatus according to an example. On the basis of the apparatus example shown in FIG. 2-12, the address acquiring unit 1-2111 may include:

an address acquiring subunit 1-201, configured to acquire an address of a virtual HTTP server from the network request;

a domain name acquiring subunit 1-202, configured to acquire a virtual domain name in the network request; and an address resolving subunit 1-203, configured to resolve an address of a corresponding virtual HTTP server according to the virtual domain name.

FIG. 2-14 is a block diagram of another application interaction apparatus according to an example. On the basis of the apparatus example shown in FIG. 2-11, the TCP connection establishing submodule 1-211 may include:

a domain name acquiring unit 1-21-1, configured to acquire a virtual domain name in the network request;

an IP address resolving unit 1-21-2, configured to resolve the virtual domain name into a corresponding virtual IP address;

a second data acquiring unit 1-21-3, configured to acquire a TCP handshake packet, where the TCP handshake packet include the virtual IP address;

a data updating unit 1-21-4, configured to modify the virtual IP address in the TCP handshake packet to an address of a virtual HTTP server, so as to acquire an updated handshake packet; and a second connection establishing unit 1-21-5, configured to establish a virtual TCP connection with the virtual HTTP server through the updated handshake packet.

FIG. 2-15 is a block diagram of another application interaction apparatus according to an example. On the basis of the apparatus example shown in FIG. 2-14, the domain name acquiring unit 1-21-1 may include:

a domain name acquiring subunit 1-21-11, configured to acquire domain name information in an HTTP address;

a searching subunit 1-21-12, configured to search a preset white list of virtual domain names according to the domain name information; and a determining subunit 1-21-13, configured to determine, when the domain name information is in the preset white list of virtual domain names, that the domain name information is a virtual domain name.

FIG. 2-16 is a block diagram of another application interaction apparatus according to an example. On the basis of the apparatus example shown in FIG. 2-10, the target request acquiring module 1-22 may include:

a request acquiring submodule 1-221, configured to acquire a network request passing through an operating system;

a detecting submodule 1-222, configured to determine whether the network request includes preset feature information; and a target request determining submodule 1-223, configured to determine, when the network request includes the preset feature information, the network request as the target network request.

FIG. 2-17 is a block diagram of another application interaction apparatus according to an example. On the basis of the apparatus example shown in FIG. 2-10, the parameter extracting module 1-23 may include:

a request sending submodule 1-231, configured to send the target network request to the preset Message service; and a parameter extracting submodule 1-232, configured to extract the target application parameter in the target network request by the Message service.

FIG. 2-18 is a block diagram of another application interaction apparatus according to an example. On the basis of the apparatus example shown in FIG. 2-17, the request sending submodule 1-231 may include:

a filtering unit 1-231-1, configured to filter out the preset feature information from the target network request, so as to acquire a filtered target network request; and a sending unit 1-231-2, configured to send the filtered target network request to the preset Message service.

FIG. 2-19 is a block diagram of another application interaction apparatus according to an example. On the basis of the apparatus example shown in FIG. 2-17, the request sending submodule 1-231 may include:

a first request sending unit 1-2311, configured to send the target network request to the preset Message service through a preset monitoring component;

a second request sending unit 1-2312, configured to make a copy of the target network request through a preset monitoring component, and send the copy of target network request to the Message service;

a third request sending unit 1-2313, configured to send the target network request to the virtual server through the preset monitoring component, where the virtual server sends the target network request to the Message service.

In another example of the present disclosure, the monitoring component includes a firewall component.

FIG. 2-20 is a block diagram of another application interaction apparatus according to an example. On the basis of the apparatus example shown in FIG. 2-10, the parameter extracting module 1-23 may include:

an information verifying submodule 1-2301, configured to perform information verification on the target network request; and a parameter extracting submodule 1-2302, configured to extract the target application parameter from the valid network request that passes the information verification.

FIG. 2-21 is a block diagram of another application interaction apparatus according to an example. On the basis of the apparatus example shown in FIG. 2-10, the application jumping module 1-24 may include:

a detecting submodule 1-241, configured to determine, according to the identifier of the target application, whether the target application has been installed locally;

an installing submodule 1-242, configured to download and install, when the target application has not been installed locally, the target application; and a jumping submodule 1-243, configured to launch the target application according to the target application parameter through a preset application platform.

Correspondingly, in one aspect, examples of the present disclosure provide an application interaction apparatus, including a processor and a memory for storing processor-executable instructions, where the processor is configured to:

establish a virtual network connection between a current application and a preset virtual server;

acquire a target network request passing through an operating system through the virtual network connection, where the target network request is for jumping to a target application;

extract a target application parameter from the target network request, where the target application parameter includes at least an identifier of the target application; and launching the target application according to the target application parameter.

Example 2

The example of the present disclosure provides an application interaction method. When a target network request sent by an application and used for jumping to another application passes through an operating system of a user terminal, the target network request may be detected by a preset network interface and the target application may be jumped to according to the target application parameter contained in the target network request. The preset network interface may be an existing network interface (e.g. a Domain Name System DNS interface, a Connect interface for network connection, or a Send interface for sending) with an additional Hook function, and may be generally named as a Hooked interface. In the present disclosure, in addition to functions provided in the related art, each Hooked interface has a specific function provided by the present disclosure, which will be described in detail below with reference to examples.

FIG. 3-1 is a flowchart of an application interaction method according to an example. The method may include steps 2-11 to 2-14.

At step 2-11, a virtual network connection is established between a current application and a preset virtual server.

When processing a connection-oriented network request, e.g., a TCP (Transmission Control Protocol) request, according to provision of the TCP, before a client that sends the request (i.e., the current application) sends the request data to a network server, a reliable network connection with the network server is required to be established first.

Since the present disclosure mainly aims to make the target network request monitored by the operating system, it is not taken into account whether a receiving party of the network request returns requested information to the current application. Therefore, a virtual network server can be preset, so that the current application may establish a virtual network connection with the virtual network server.

The virtual server may be a virtual network server set in the user terminal locally, for example an HTTP server. The current application may establish a virtual TCP connection with the local HTTP server.

In an example of the present disclosure, the current application may be an application that can request access to the network, such as a web browser or a web proxy service program, where the network proxy service program may be an instant messaging application such as MiTalk, WeChat, QQ, etc., or other applications that can request access to the network.

A web browser is again taken as an example of the current application and a local virtual HTTP server as an example of the virtual server. The application interaction method provided by the present disclosure will be described in detail below.

In an example of the present disclosure, when establishing a virtual TCP connection between the current application and the virtual HTTP server, according to different resolution processes of addresses of virtual HTTP servers, as shown in FIG. 3-2-1, FIG. 3-4-1, FIG. 3-5-1, step 2-11 may at least be implemented in the following three cases.

In the first case, the current application sends a virtual domain name to a first preset domain name resolving interface of the operating system. Below is a detailed description thereof with reference to FIG. 3-2-1, a schematic diagram of establishing a virtual network connection.

FIG. 3-2 is a flowchart of another application interaction method according to an example. Step 2-11 may include steps 2-11-11 to 2-11-15.

At step 2-11-11, a virtual domain name in the network request is acquired.

For example, when the user triggers a preset page element in a page of the web browser and makes the browser to send a network request, for example the user clicking on a network link in a page of the web browser (it is assumed that an address of the network link, i.e., the HTTP address, is http://abc.com/efg****), the web browser first acquires the domain name information in the HTTP address (i.e., abc.com), and sends the domain name information "abc.com" to a preset domain name resolving interface of the operating system, as shown at steps S21-1 to S21-2 in FIG. 3-2-1. The domain name resolving interface has a function of acquiring a virtual domain name. FIG. 3-3 is a flowchart of another application interaction method according to an example. Step 2-11-11 may include steps 2-101 to 2-103.

At step 2-101, domain name information in an HTTP address is acquired.

As shown above, step 2-101 is specifically: receiving the domain name information sent by the current application, such as a web browser, according to the network request.

At step 2-102, a preset white list of virtual domain names is searched according to the domain name information through a Hooked DNS interface.

In an example of the present disclosure, the Hooked DNS interface has a function of identifying a virtual domain name and an actual domain name.

In an example of the present disclosure, a white list of virtual domain names may be preset in the operating system, and the white list records all virtual domain name information. After receiving the domain name information sent by the web browser, the Hooked DNS interface may search the white list of virtual domain names according to the domain name information, and determine whether the domain name "abc.com" sent by the web browser is a virtual domain name.

At step 2-103, if the domain name information is in the preset white list of virtual domain names, it is determined that the domain name information is a virtual domain name.

If the Hooked DNS interface finds an item matching "abc.com" from the preset white list of virtual domain names, it is determined that the domain name "abc.com" is a virtual domain name. In other words, a web server the domain name points to does not exist.

At step 2-11-12, the virtual domain name is resolved into a corresponding virtual IP address through the first preset domain name resolving interface, and the virtual IP address is returned to the current application.

In an example of the present disclosure, the first preset domain name resolving interface may translate the virtual domain name information into a virtual IP address. In an example of the present disclosure, the first preset domain name resolving interface may be a DNS interface with an additional Hook function, and may be represented as a first Hooked DNS interface.

In an example of the present disclosure, the first Hooked DNS interface may search a preset list of virtual IP addresses according to the virtual domain name, output a virtual IP address corresponding to the virtual domain name, and send the virtual IP address to the web browser. The virtual IP address list contains the correspondence between virtual domain names and virtual IP addresses. For example, as shown in Table 4:

TABLE 4

| Virtual domain name | Virtual IP address |
|---|---|
| abc.com | 1.2.3.4 |

The first Hooked DNS interface searches Table 4 according to the domain name "abc.com", outputs the corresponding virtual IP address "1.2.3.4", and sends the virtual IP address to the web browser, as shown at steps S21-3 and S21-4 in FIG. 3-2-1.

It should be noted that, in another example of the present disclosure, the first preset domain name resolving interface may also have functions of identifying virtual domain name information and translating virtual domain name information into a virtual IP address. In other words, steps 2-11-11 and 2-11-12 are both executed by the first preset domain name resolving interface.

At step 2-11-13, the virtual IP address is sent to a first preset network connection interface.

After acquiring the address of the virtual IP address corresponding to "abc.com" (it is assumed that the address is 1.2.3.4), the web browser sends the virtual IP address to the first preset network connection interface, i.e. the Connect interface as shown at step S21-5 in FIG. 3-2-1.

At step 2-11-14, the virtual IP address is converted to an address of a local HTTP server by the first preset network connection interface, and a TCP handshake packet is sent.

In an example of the present disclosure, the first preset network connection interface may modify the virtual IP address sent by the current application to an address of a virtual server. For example, the preset network connection interface may be a Connect interface with an additional Hook function, and may be represented as a Hooked Connect interface.

In an example of the present disclosure, a first virtual address list may be preset in the operating system, and the preset virtual address list contains the correspondence between virtual IP addresses and addresses of virtual servers. In an example of the present disclosure, the first virtual address list may be set in the Hooked Connect interface. After determining that the IP address sent by the current application is a virtual IP address, the Hooked Connect interface may search the first virtual address list so as to acquire an address of a virtual server corresponding to the virtual IP address.

For example, as shown in FIG. 3-2-1, the Hooked Connect interface receives the virtual IP address 1.2.3.4 sent by the web browser, and searches the first virtual address list shown in Table 5:

TABLE 5

| Virtual IP address | Address of virtual HTTP server |
|---|---|
| 1.2.3.4 | 127.0.0.1 |

According to Table 5, the IP address of the local virtual HTTP server is determined as 127.0.0.1; then a TCP handshake packet is generated based on the IP address 127.0.0.1 of the local virtual HTTP server, and the TCP handshake packet is sent to the local HTTP server, as shown at steps S21-6 and S21-7 in FIG. 3-2-1.

At step 2-11-15, a virtual TCP connection is established with the virtual HTTP server through the TCP handshake packet.

In an example of the present disclosure, in addition to the function of modifying the virtual IP address, the Hooked Connect interface has the function of a normal Connect interface, i.e., sending a handshake packet to a local virtual HTTP server.

After receiving the handshake packet, the local virtual HTTP server returns a response message to the web browser, and thus a handshake process is completed, as shown at step S21-8 in FIG. 3-2-1.

In the TCP/IP protocol, the TCP protocol requires to provide a reliable connection service through three handshakes. In the subsequent two handshakes, steps 2-11-11 to 2-11-15 are repeated. After three handshakes all succeed, the virtual TCP connection is successfully established.

In the second case, the current application sends a virtual domain name to a second preset domain name resolving interface. Below is a detailed description thereof with reference to FIG. 3-4-1, another schematic diagram of establishing a virtual network connection.

FIG. 3-4 is a flowchart of another application interaction method according to an example. The method may include steps 2-11-21 to 2-11-24.

At step 2-11-21, a virtual domain name is acquired according to the network request.

This step is implemented similarly to step 2-11-11, and details can be seen at step 2-11-11 and are not described herein again.

At step 2-11-22, the virtual domain name is resolved into an address of the virtual HTTP server through the second domain name resolving interface, and the address of the virtual HTTP server is returned to the current application.

In an example of the present disclosure, the second preset domain name resolving interface may be represented as a second Hooked DNS interface. The second Hooked DNS interface may resolve the virtual domain name sent by the current application into an address of a virtual HTTP server.

In an example of the present disclosure, a second virtual address list may be preset in the operating system, and the virtual address list contains the correspondence between virtual domain names and addresses of virtual HTTP servers. In an example of the present disclosure, the second virtual address list may be set in a second Hooked DNS interface of the operating system. After receiving the domain name information sent by the current application, the second Hooked DNS interface may search the second virtual address list according to the domain name information to acquire a virtual server address corresponding to the virtual domain name.

With reference to step S22-3 in FIG. 3-4-1, after receiving the domain name "abc.com" sent by the web browser, the second Hooked DNS interface searches the following Table 6:

TABLE 6

| Virtual domain name | Address of virtual HTTP server |
|---|---|
| abc.com | 127.0.0.1 |

Address of the virtual HTTP server corresponding to the virtual domain name "abc.com" is determined: 127.0.0.1. The address is further returned to the web browser, as shown at step S22-4 in FIG. 3-4-1.

At step 2-11-23, the address of the virtual HTTP server is sent to a network connection interface.

As shown above, after acquiring the IP address "127.0.0.1" of the virtual HTTP server, the web browser sends the address of the virtual HTTP server to the network connection interface, as shown at step S22-5 in FIG. 3-4-1.

At step 2-11-24, a TCP handshake packet is sent through the network connection interface, where the TCP handshake packet includes the address of the virtual HTTP server.

Since the IP address "127.0.0.1" is an IP address that actually exists, the network interface may send a TCP handshake packet to the local virtual HTTP server based on the IP address of the virtual HTTP server, as shown at step S22-6 in FIG. 3-4-1. The TCP handshake packet contains the address of the virtual HTTP server, 127.0.0.1.

At step 2-11-25, a virtual TCP connection is established with the virtual HTTP server through the handshake packet.

Similar to step 2-11-15, after receiving the handshake packet, the local virtual HTTP server returns a response message to the web browser, and thus a handshake process is completed, as shown at step S22-7 in FIG. 3-4-1.

In the TCP/IP protocol, the TCP protocol requires to provide a reliable connection service through three handshakes. In the subsequent two handshakes, steps 2-11-21 to 2-11-25 are repeated. After three handshakes all succeed, the virtual TCP connection is successfully established.

In the third case, the current application may directly send the address of the virtual HTTP server to a Connect interface. Below is a detailed description thereof with reference to FIG. 3-5-1, another schematic diagram of establishing a virtual network connection.

FIG. 3-5 is a flowchart of another application interaction method according to an example. The method may include steps 2-11-31 to 2-11-32.

At step 2-11-31, an address of a virtual HTTP server is acquired according to the network request, and the address of the virtual HTTP server is sent to a network connection interface.

In an example of the present disclosure, the network request sent by the current application under a preset triggering condition may directly contain the address of the virtual server. For example, as shown in FIG. 3-5-1, the network request such as URL sent by the web browser directly contains the address of the virtual HTTP server (e.g., http://127.0.0.1/efg****).

In the process of establishing a TCP connection by the browser according to the network request, the destination address "127.0.0.1" may be extracted from the network request and sent to the network connection interface, as shown in steps S23-1 and S-23-2 in FIG. 3-5-1.

At step 2-11-32, a TCP handshake packet is sent through the network connection interface, where the TCP handshake packet includes the address of the virtual HTTP server.

This step is similar to step 2-11-24, and details are not described herein again. For example, as shown at step S23-3 in FIG. 3-5-1. At step 2-11-33, a virtual TCP connection is established with the virtual HTTP server through the TCP handshake packet.

Similar to steps 2-11-15 and 2-11-25, after receiving the handshake packet, the local virtual HTTP server returns a response message to the web browser, and thus a handshake process is completed, as shown at step S23-4 in FIG. 3-5-1.

In the TCP/IP protocol, the TCP protocol requires to provide a reliable connection service through three handshakes. In the subsequent two handshakes, steps 2-11-31 to 2-11-33 are repeated. After three handshakes all succeed, the virtual TCP connection is successfully established.

It should be noted that, in the above discussion, establishing a virtual TCP connection is taken as an example of establishing a virtual network connection. In the present disclosure, establishing a virtual network connection is not limited to establishing a virtual TCP connection, but may also include establishing a virtual network connection complying with other network protocols. In the present disclosure, a virtual network server may be set locally, and a virtual network message transmission channel may be established by using a redirection technology, so that a preset network interface in the operating system can detect a target network request including a target application parameter.

At step 2-12, on the basis of the virtual network connection, a target network request passing through an operating system is acquired through a preset network interface, where the target network request is for jumping to a target application.

In an example of the present disclosure, the target network request may be identified from the acquired network request by using a preset network interface, such as a Send interface with an additional Hook function. The target network request is used to request a jump to the target application.

FIG. 3-6 is a flowchart of another application interaction method according to an example. At step 2-12, a target network request passing through an operating system is acquired, which may include steps 2-121 to 2-123.

At step 2-121, the network request passing through the operating system is acquired through a preset network sending interface.

As shown in the above example, once a TCP connection is established, the web browser sends the request data according to the above network request. An HTTP request is taken as an example. Depending on request method, the HTTP request may be of any of the methods: GET, POST, HEAD, OPTIONS, PUT, DELETE, TRACE, or the like. In an example of the present disclosure, the web browser may invoke the Send interface in the operating system so as to send the data of the network request to the server. In an example of the present disclosure, the network sending interface may be a Hooked Send interface.

At step 2-122, it is determined whether the network request includes preset feature information.

In an example of the present disclosure, the target network request includes preset feature information and a target application parameter.

The preset feature information is for determining whether a network request contains a target application parameter, which may be a preset keyword, a preset encoding method, or the like. The preset feature information may be provided by provider of the target application and embedded in the user terminal in advance.

A GET request is taken as an example. The request data may or may not contain a target application parameter. Therefore, the Hooked Send interface needs to primarily determine whether the packet of the current network request contains a target application parameter according to a preset policy, so as to determine the subsequent processing on the network request data.

In an example of the present disclosure, the Hooked Send interface may quickly determine whether the current network request is the target network request by determining whether the network request data sent by the web browser includes the preset feature information.

It is assumed that the preset feature information is a preset keyword, which may be a preset tag, a preset string (such as "111") and the like. After acquiring the HTTP request, the Hooked Send interface may determine whether the request includes the preset keyword. If it does, step 2-123 is performed. If the request does not include the preset keyword, the HTTP request is determined as a regular network request data, which may be sent to the network server through the firewall by using a Send module included in the Hooked Send interface.

At step 2-123, if the network request includes the preset feature information, the network request is determined as the target network request.

As shown above, if the Hooked Send interface determines that the current HTTP request data includes the preset feature information, it is determined that the HTTP request belongs to the target HTTP request.

At step 2-13, a target application parameter is extracted from the target network request, where the target application parameter includes at least an identifier of the target application.

As discussed above, the target network request provided in the present disclosure includes a target application parameter. The target application parameter includes at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

In an example of the present disclosure, a target application parameter may be extracted from the target network request data in any of the following manners.

In the first manner, the target application parameter is extracted from the target network request through the Hooked Send interface. FIG. 3-8-1 is a schematic diagram of an application interaction scenario according to an example.

After identifying the target network request, the Hooked Send interface may analyze the request packet, and then extract the target application parameter from the request data obtained from analysis according to a preset policy, such as a preset key field APP ID. An HTTP request is taken as an example of the target network request. Reference can be made to steps S2103 and S21070 in FIG. 3-8-1 for the foregoing process. After that, the extracted target application parameter is sent to the preset application platform that can run the target application, as shown at step S21080 in FIG. 3-8-1, so that the preset application platform may launch the target application according to the target application parameter. For example, see step S21090 in FIG. 3-8-1.

For example, it is assumed that the target HTTP request sent by the current application is a GET request, and the request data obtained from analyzing by the Hooked Send interface is: GET:/APP ID=efg. Therefore, the Hooked Send interface can extract the identifier ("efg") of the target application from the obtained request data according to the key field APP ID.

In the second manner, the target application parameter is extracted from the target network request by using a preset Message service. Reference can be made to FIG. 3-8-2 and FIG. 3-8-3, two schematic diagrams of another application interaction method according to an example.

FIG. 3-7 is a flowchart of another application interaction method according to an example. Step 2-13 may include steps 2-131 to 2-132.

At step 2-131, the target network request is sent to the preset Message service.

In an embodiment of the present disclosure, after identifying the target network request, the Hooked Send interface of the operating system may send the preset target network request data to the preset Message service. In other words, the target network request (e.g., the target HTTP request) sent by the Hooked Send interface also includes the preset feature information.

In another example of the present disclosure, before sending the target network request data, the Hooked Send interface may also remove the preset feature information in the original target network request data so as to acquire a filtered target network request data, and then send the filtered target network request data to the preset Message service, as shown at step S2105 in FIG. 3-8-2. The preset feature information is mainly for the identification of the network request. In subsequent information processing process, the preset feature information is redundant information. Therefore, in an example of the present disclosure, the preset feature information in the original HTTP request may be removed before the request is sent to the Message service, as shown at S2106 in FIG. 3-8-2, thereby reducing the burden of data processing of the Message service and improving information processing efficiency of the Message service.

In the above example, the target network request may be sent to a preset Message service for analysing. In this way, the identification process of the target network request is decoupled from the analyzing process, or in other words, the Hooked Send interface serves only to identify the target network request but not to analyze the target network request packet, thereby improving the Hooked Send interface's detection efficiency of the target network request.

In the present disclosure, at step 2-131, the implementation of the Hooked Send interface sending the target network request to the Message service may include the following two cases.

In the first case, the Hooked Send interface directly sends the target network request to the Message service. FIG. 3-8-2 is a schematic diagram of another application interaction method according to an example.

In other words, the Hooked Send interface may directly send the original or filtered target network request packet to the Message service via a preset message channel. A target HTTP request data is taken as an example of the target network request. Reference can be made to step S2104 in FIG. 3-8-2 for the foregoing process of sending the target network request.

In this first case, the Hooked Send interface may acquire the target network request data sent to the Message service in the following two manners.

In the first manner, the target network request data is intercepted and forwarded to the Message service.

In an example of the present disclosure, it may not be of interest whether the local virtual HTTP server returns a response message for the target HTTP request. Therefore, the Hooked Send interface intercepts the target HTTP request and forwards the request to the Message service.

In the second manner, a copy of the target network request data is made and directly sent to the Message service.

In an example of the present disclosure, when the target network request further includes normal network request data (which refers to data for requesting a virtual server to provide network service), in order not to affect the transmission of the normal network request data to the virtual server, a further step may be taken. After identifying the target network request data, the Hooked Send may make a copy of the original or filtered target network request data, and directly sends the copy to the Message service for subsequent information processing through the preset message channel.

In the second case, the Hooked Send interface indirectly sends the target network request to the Message service. FIG. 3-8-3 is a schematic diagram of an application interaction scenario according to an example.

In an example of the present disclosure, after determining the target network request, the Hooked Send interface may mark the target network request, for example, by adding a preset tag "M" for instructing to forward it to the Message service, and send the message through a normal message channel to the Message service. In other words, the target network request data is sent to the Send module included in the Hooked Send interface, and is sent to the virtual server through the firewall. Then the virtual server forwards the target network request data to the preset Message service according to the preset tag. An HTTP request is taken as an example of the target network request. Reference can be made to steps S21041 to S21043 in FIG. 3-8-3 for the foregoing process of sending the target network request.

The target HTTP request is again taken as an example of the target network request. In the second case, after identifying the packet of the target HTTP request, the Hooked Send interface may add a simple mark (e.g., character "M") to the packet of the target HTTP request, so that after detecting that the packet of the target HTTP request is marked with "M", the local HTTP server may send the packet of the target HTTP request to the Message service.

In this case, when the target network request further includes normal network request data, the network server may not only acquire the normal network request data, but also send the target network request to the preset Message service for extracting the target application parameter.

At step 2-132, the target application parameter in the target network request is extracted by the Message service.

This step is similar to step 1-132 in example 1, specific implementation of which may be referred to each other and is not described herein again.

At step 2-14, the target application is launched according to the target application parameter.

In an example of the present disclosure, after acquiring the target application parameter, the Hooked Send interface or the preset Message service may send the target application parameter to a preset application platform so as to launch the target application, as shown at steps S2108 and S2109 in FIG. 3-8-2 or FIG. 3-8-3. For the specific implementation of the preset application platform launching the target application according to the target application parameter, reference can be made to the description of step 13 above, and details are not described herein again.

FIG. 1-7-1 is a schematic diagram of an application interaction scenario according to an example. Still taking FIG. 1-7-1 as an example, when the user clicks on a link to a page of the target application (e.g., a link to Zhihu Daily) in a browser page 101 of a smart phone 100, the browser page may execute a JS (JavaScript) script in the background. The JS script may generate a target network request according to the target application parameters and the preset feature information, for example, the JS script puts together the identifier of the target application, the parameter of the detail page, etc., and the preset feature information into a URL string. The JS script invokes a preset network connection interface (e.g. a Hooked DNS interface and/or a Hooked Connect interface), to establish a virtual network connection with the virtual server using the virtual domain name or the address of the virtual server. Then, the JS script invokes the network sending interface (the Hooked Send interface) to send the target network request data to the Message service for extracting the target application parameters. After that, the Message service sends the acquired target application parameters to a preset application platform (i.e., the target application platform). Finally, the preset application platform opens a detail page of the application Zhihu (e.g., a detail page 102 of Zhihu Daily) according to the target application parameters, and presents the detail page to the user.

It can be seen that, by using the application interaction method provided by the present disclosure, a virtual network connection, i.e., a virtual transmission channel for network messages, may be established between the current application and the virtual network server. When the user tries to jump from the current application interface to another target application, the network request may be sent through the virtual transmission channel for network messages. When the network request passes through the operating system of the user terminal, the preset network interface may identify the target network request which contains the target application parameter, send the target network request directly or indirectly to the preset Message service for extracting the target application parameter, and send the target application parameter to the preset application platform, which is used to open the target application for the user. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, when the user clicks a link to a page of the target application in an interface of an application (e.g., a web browser), the user terminal can directly and accurately jump to the designated page of the target application without intervening other human-computer interaction. In this way, the process of interaction between the user and the terminal can be simplified and time can be saved, and user experience of the terminal device is further improved.

It should be noted that, in the present disclosure, after the preset network interface acquires the target network request, or after the local HTTP server sends the target network request to the Message service, the virtual TCP connection may be closed to release the resource, thereby improving the utilization of system resources. In another implementation, after the HTTP communication is completed, the virtual TCP connection may also be remained, so that the current application may continue to send HTTP requests through the same virtual TCP connection, and accordingly, the preset network interface may quickly detect the subsequent target HTTP requests. In this way, time required to establish new connections for each request is saved and detection efficiency of target network requests is improved.

Correspondingly to the foregoing examples of methods to implement the application methods, the present disclosure also provides examples of apparatuses to implement the application methods and corresponding terminals.

FIG. 3-9 is a block diagram of an application interaction apparatus according to an example. The apparatus may include:

a connection establishing module 2-21, configured to establish a virtual network connection between a current application and a preset virtual server;

a target request acquiring module 2-22, configured to acquire, based on the virtual network connection and through a preset network interface, a target network request passing through an operating system, where the target network request is for jumping to a target application;

a parameter extracting module 2-23, configured to extract a target application parameter from the target network request, where the target application parameter includes at least an identifier of the target application; and an application jumping module 2-24, configured to launch the target application according to the target application parameter.

FIG. 3-10 is a block diagram of another application interaction apparatus according to an example. On the basis of the apparatus example shown in FIG. 3-9, the connection establishing module 2-21 may include:

a TCP connection establishing submodule 2-211, configured to establish a virtual Transfer Control Protocol TCP connection between a current application and a preset virtual HTTP server; and the target request acquiring module 2-22 may include a target HTTP request acquiring submodule 2-221, configured to acquire, based on the virtual TCP connection and through a sending interface configured with a Hook function, a target HTTP request passing through an operating system.

FIG. 3-11 is a block diagram of another application interaction apparatus according to an example. On the basis of the apparatus example shown in FIG. 3-10, the TCP connection establishing submodule 2-211 may include:

a virtual domain name acquiring unit 2-21-11, configured to acquire a virtual domain name according to the network request;

a virtual IP determining unit 2-21-12, configured to resolve the virtual domain name into a corresponding virtual IP address through the first preset domain name resolving interface, and return the virtual IP address to the current application;

a virtual address sending unit 2-21-13, configured to send the virtual IP address to a first preset network connection interface;

an address converting unit 2-21-14, configured to convert the virtual IP address to an address of the virtual HTTP server through the first preset network connection interface, and send a TCP handshake packet; and a first connection establishing unit 2-21-15, configured to establish a virtual TCP connection with the virtual HTTP server through the TCP handshake packet.

FIG. 3-12 is a block diagram of another application interaction apparatus according to an example. On the basis of the apparatus example shown in FIG. 3-10, the TCP connection establishing submodule 2-211 may include:

a virtual domain name acquiring unit 2-21-21, configured to acquire a virtual domain name according to the network request;

(In this example, the virtual domain name acquiring unit 2-21-21 has the same function as the virtual domain name acquiring unit 2-21-11 in the example shown in FIG. 3-11. In order to differentiate between the examples, different numerals are used.)

an address resolving unit 2-21-22, configured to resolve the virtual domain name into an address of the virtual HTTP server through the second domain name resolving interface, and return the address of the virtual HTTP server to the current application;

an address sending unit 2-21-23, configured to send the address of the virtual HTTP server to a network connection interface;

a handshake data sending unit 2-21-24, configured to send a TCP handshake packet through the network connection interface, where the TCP handshake packet includes the address of the virtual HTTP server; and a second connection establishing unit 2-21-25, configured to establish a virtual TCP connection with the virtual HTTP server through the TCP handshake packet.

FIG. 3-13 is a block diagram of another application interaction apparatus according to an example. On the basis of the apparatus example shown in FIG. 3-10, the TCP connection establishing submodule 2-211 may include:

an address acquiring unit 2-21-31, configured to acquire an address of a virtual HTTP server according to the network request, and send the address of the virtual HTTP server to a network connection interface;

a handshake data sending unit 2-21-32, configured to send a TCP handshake packet through the network connection interface, where the TCP handshake packet includes the address of the virtual HTTP server; and a third connection establishing unit 2-21-33, configured to establish a virtual TCP connection with the virtual HTTP server through the TCP handshake packet.

In this example, the handshake data sending unit 2-21-32 has the same function as the handshake data sending unit 2-21-24 in the example shown in FIG. 3-12, and the third connection establishing unit 2-21-33 has the same function as the second connection establishing unit 2-21-25 in the example shown in FIG. 3-11. In order to differentiate between the examples, different numerals are used.

FIG. 3-14 is a block diagram of another application interaction apparatus according to an example. On the basis of the apparatus example shown in FIG. 3-11, the virtual domain name acquiring unit 2-21-11 may include:

a domain name acquiring subunit 2-201, configured to acquire domain name information in an HTTP address;

a searching subunit 2-202, configured to search a preset white list of virtual domain names according to the domain name; and a determining subunit 2-203, configured to determine, when the domain name information is in the preset white list of virtual domain names, that the domain name information is a virtual domain name.

FIG. 3-15 is a block diagram of another application interaction apparatus according to an example. On the basis of the apparatus example shown in FIG. 3-9, the target request acquiring module 2-22 may include:

a request acquiring submodule 2-221, configured to acquire, through a preset network sending interface, a network request passing through an operating system;

a detecting submodule 2-222, configured to determine whether the network request includes preset feature information; and a target request determining submodule 2-223, configured to determine, when the network request includes the preset feature information, the network request as the target network request.

FIG. 3-16 is a block diagram of another application interaction apparatus according to an example. On the basis of the apparatus example shown in FIG. 3-9, the parameter extracting module 2-23 may include:

a first parameter extracting submodule 2-231, configured to extract the target application parameter from the target network request through a preset network sending interface.

FIG. 3-17 is a block diagram of another application interaction apparatus according to an example. On the basis of the apparatus example shown in FIG. 3-9, the parameter extracting module 2-23 may include:

a sending submodule 2-232, configured to send the target network request to the preset Message service; and a second parameter extracting submodule 2-233, configured to extract the target application parameter in the target network request by the Message service.

FIG. 3-18 is a block diagram of another application interaction apparatus according to an example. On the basis of the apparatus example shown in FIG. 3-17, the sending submodule 2-232 may include:

a first sending unit 2-2321, configured to send the target network request to the preset Message service through the preset network sending interface; or a second sending unit 2-2322, configured to send the target network request to the preset Message service through successively the network sending interface, the firewall and the virtual HTTP server.

FIG. 3-19 is a block diagram of another application interaction apparatus according to an example. On the basis of the apparatus example shown in FIG. 3-18, the first sending unit 2-2321 may include:

a forwarding subunit 2-23211, configured to forward the target network request to the Message service through the preset network sending interface; or a copy sending subunit 2-23212, configured to make a copy of the target network request through the preset network sending interface, and send the copy of target network request to the Message service.

FIG. 3-20 is a block diagram of another application interaction apparatus according to an example. On the basis of the apparatus example shown in FIG. 3-17, the sending submodule 2-232 may include:

a filtering unit 2-232-1, configured to filter out the preset feature information from the target network request, so as to acquire a filtered target network request; and a sending unit 2-232-2, configured to send the filtered target network request to the preset Message service.

FIG. 3-21 is a block diagram of another application interaction apparatus according to an example. On the basis of the apparatus example shown in FIG. 3-17, the second parameter extracting submodule 2-233 may include:

an information verifying unit 2-2331, configured to perform information verification on the target network request; and a parameter extracting unit 2-2332, configured to extract the target application parameter from the valid network request that passes the information verification.

FIG. 3-22 is a block diagram of another application interaction apparatus according to an example. On the basis of the apparatus example shown in FIG. 3-9, the application jumping module 2-24 may include:

a detecting submodule 2-241, configured to determine, according to the identifier of the target application, whether the target application has been installed locally;

an installing submodule 2-242, configured to download and install the target application when the target application has not been installed locally; and a jumping submodule 2-243, configured to launch the target application according to the target application parameter through a preset application platform.

Correspondingly, in one aspect, examples of the present disclosure provide an application interaction apparatus, including a processor and a memory for storing processor-executable instructions, where the processor is configured to:

establish a virtual network connection between a current application and a preset virtual server;

on the basis of the virtual network connection, a target network request passing through an operating system is acquired through a preset network interface, where the target network request is for jumping to a target application;

extract a target application parameter from the target network request, where the target application parameter includes at least an identifier of the target application; and launch the target application according to the target application parameter.

Example 3

The execution entity involved in the application interaction method provided by examples of the present disclosure includes a user terminal and a network server running all kinds of application software. FIG. 4-1 is a schematic diagram of a scenario of an application interaction method according to an example. With reference to FIG. 4-1, the user terminal may be a smart phone 100, a pocket personal computer (PPC), a palmtop computer, a personal digital assistant (PDA), a laptop computer, a tablet computer, a wearable device, and the like. The network server 200 may be any server that provides network connection and/or network services. In an implementation, the user terminal and the network server are both independent of and in contact with each other, so as to jointly carry out the technical solution provided by the present disclosure. Below is a detailed explanation with reference to FIG. 4-2-1 and FIG. 4-2-2, two schematic diagrams of an application interaction method according to an example, as well as various flowcharts.

FIG. 4-3 is a flowchart of an application interaction method according to an example. The method may include steps 3-11 to 3-14.

At step 3-11, a network connection is established between a current application and a network server.

In the application interaction method provided by the present disclosure, the aim is to launch a corresponding target application by using a target message that is monitored from a network information transmission channel by an operating system of the user terminal, where the target message includes a target application parameter. In the present disclosure, in order to ensure that the target message carrying the target application parameter can be monitored by the operating system of the user terminal, it is first necessary to establish a stable network information transmission channel, that is, a network connection.

In examples of the present disclosure, the user may trigger a network connection between the current application and the network server in an interface of the current application. The network connection may be triggered by receiving user's triggering operation on a preset interface element in an interface of the current application, where the triggering operation is for triggering the current application to send a network request to the network server.

The preset interface element may be a network link address in the interface such as a URL, or may be a preset function button in the interface.

It is assumed that the preset interface element is a function button preset in the interface. When the user performs a preset operation, such as clicking the button, a network request passing through the operating system and associated with the button may be sent. The request may be, for example, a request instructing the network server to generate the target message.

In an example of the present disclosure, the current application may be an application that can request access to the network, such as a web browser or a web proxy service program, where the network proxy service program may be an instant messaging application such as MiTalk, WeChat, QQ, etc., or other applications that can request access to the network.

The current application may be any of the various applications running in a user terminal. For example, the current application belongs to a first type application in the related art, and downloading and installation of the first type application require user's confirmation. In other words, installation package or update package of the first type application will only be launched when a confirmation message triggered by the user is received. The first type application mentioned above may be application software such as a browser, MiTalk, WeChat, and the like.

The current application may also be of a different type, for example a new application, which is installed and downloaded without user's confirmation.

The above network server may be a remote server such as a web server. After receiving a domain name of the remote server (e.g. "abc.com"), the current application establishes a stable TCP connection with the remote server through three handshakes. After the TCP connection is successfully established, a network request (e.g., an HTTP request) may be sent to the remote web server.

For example, the TCP connection may be established as follows: when the user clicks on a network link in a page of the web browser (it is assumed that an address of the network link, i.e., the HTTP address, is http://abc.com/efg****), the web browser first acquires the domain name information in the HTTP address (i.e., abc.com), and sends the domain name information "abc.com" to a DNS module of the user terminal. The DNS module translates the domain name into an IP address of the web server (e.g., 10.0.0.1), and returns it to the web browser; the web browser uses the IP address to send a TCP handshake packet to the web server, where the TCP handshake packet includes 10.0.0.1. After receiving the handshake packet, the web server returns a response message to the web browser, and thus a handshake process is completed.

In the TCP/IP protocol, the TCP protocol requires to provide a reliable connection service through three handshakes. In the subsequent two handshakes, above steps are repeated. After three handshakes all succeed, the TCP connection is successfully established, as shown at S3101 in FIGS. 4-2-1 and S3201 in FIG. 4-2-2.

It should be noted that, in the above discussion, establishing a TCP connection is taken as an example of establishing a network connection. In the present disclosure, establishing a network connection is not limited to establishing a network connection based on TCP, but may also include establishing a network connection based on other network protocols.

At step 3-12, a target message passing through an operating system is acquired through the network connection, where the target message is for jumping to a target application.

As shown above, once a TCP connection is established, the web browser sends a network request to a remote web server, such as an HTTP request to a web server with the domain name "abc.com".

FIG. 4-4 is a flowchart of another application interaction method according to an example. Step 3-12 may include steps 3-121 to 3-122.

At step 3-121, the message passing through the operating system is acquired.

As a bridge for upper layer application software to send messages to remote servers, the operating system may acquire a message sent by various applications and returned by remote servers. Specifically, various messages passing through the operating system can be monitored by using a preset monitoring component (e.g., a firewall component) in the operating system.

In the present disclosure, depending on the sender of the message, the message at step 3-121 may be divided into two types.

The first type of message is a network request sent by the current application to the network server.

In examples of the present disclosure, the network request may be an HTTP request, an FTP request, an SMTP request, or the like. As shown at step S3102 in FIG. 4-2-1, it is assumed that the network request is an HTTP request. The web browser can send various HTTP requests to a web server. Depending on request methods, the HTTP request may be of any of the methods: GET, POST, HEAD, OPTIONS, PUT, DELETE, TRACE, or the like.

The second type of message is a response message generated by the network server after receiving the network request sent by the current application according to the network request, as shown in the response message sent by the web server at step S3205 in FIG. 4-2-2.

It should be noted that the response message returned by the network server according to the network request may be a response message for the network request (i.e., the message requested by the current application and needed to be sent to the current application, as shown in FIG. 4-2-2) or may be not (i.e., a response message not to be sent to the current application). How such a response message is generated will be described in detail when discussing how a network server generates a target response message.

At step 3-122, the target message is determined from the message by a preset monitoring component.

In the present disclosure, the target message for jumping to the target application may be detected by a monitoring component preset in the operating system. In an example of the present disclosure, the monitoring component may be a firewall component with the function of identifying the target message. Corresponding to the above two types of messages, step 3-122 includes two implementations:

In the first implementation, the firewall component identifies the target network request including the target application parameter from the network request sent by the current application, as shown at S3103 in FIG. 4-2-1.

In the second implementation, the firewall component identifies the target response message including the target application parameter from the response message sent by the network server, as shown at S3206 in FIG. 4-2-2.

Since the firewall component is an original monitoring component in the operating system, in the present disclosure, a simple parametric configuration (such as configuring the preset feature information) to the firewall is sufficient to endow the firewall with the ability of identifying the target message. In this way, there is no need to additionally provide a new monitoring component to the operating system and it can save system resources.

A GET request packet is taken as an example of the message. The request data may or may not contain the target application parameter. Therefore, the monitoring component needs to primarily determine whether the currently acquired packet contains a target application parameter according to a preset policy.

FIG. 4-5 is a flowchart of another application interaction method according to an example. Step 3-122 may include steps 3-1221 to 3-1222.

At step 3-1221, it is determined whether the message includes the preset feature information.

A firewall component is taken as an example of the monitoring component. In an example of the present disclosure, the firewall component may identify the target message by determining whether the network request packet or the response packet returned by the network server includes the preset feature information. The preset feature information is for determining whether a network request send by the current application or a response returned by a network server contains a target application parameter, which may be a preset keyword, a preset encoding method, or the like. The preset feature information may be provided by provider of the target application and embedded in the user terminal in advance.

It is assumed that the preset feature information is a preset keyword, which may be a preset tag, a preset string (e.g., "111), or the like. It is assumed that the message passing through the operating system is an HTTP request. After acquiring the HTTP request, the firewall may determine whether the request includes the preset keyword. If it does, step 3-1222 is performed. If it does not, the HTTP request is determined as an invalid message.

At step 3-1222, if the message includes the preset feature information, the message is determined as the target message.

As shown above, if the HTTP request includes the preset feature information, it is determined that the HTTP request belongs to the target HTTP request.

Similarly, if the firewall component detects that the response message returned by the network server includes the preset feature information, the response message is determined as the target response message.

At step 3-13, a target application parameter is extracted from the target message, where the target application parameter includes at least an identifier of the target application.

In an example of the present disclosure, after identifying the target message, the firewall component of the operating system may send the packet of the target message to a preset Message service for analyzing, so that the preset Message service may extract the target application parameter from the target message.

In the example shown in FIG. 4-2-1, after identifying the target HTTP request at step S3103, the firewall component may make a copy of the target HTTP request data and send the copy to the preset Message service, as shown at step S3104.

In the example shown in FIG. 4-2-2, after identifying the target response message in step S3206, the firewall component may make a copy of the target response message and send the copy to the preset Message service, as shown at step S3207.

In examples shown in FIG. 4-2-1 and FIG. 4-2-2, after identifying the target message, the firewall may allow the target message pass through normally, without affecting network communication between the current user and the network server.

In another example of the present disclosure, after identifying the target message, the firewall component may also intercept the target message and forward it to the preset Message service for processing.

In an example of the present disclosure, the identification process is decoupled from the analyzing process, or in other words, the firewall component serves only to identify the target message but not to analyze the packet of the target message, thereby improving the detection efficiency of the target message.

On the other hand, by using the Message service to extract the target application parameter, the target application parameters in a preset format may be output, which can facilitate subsequent program to quickly open the target application according to the parameter in the preset format, thereby improving the efficiency in launching the application.

In an example of the present disclosure, step 3-13 may be implemented in the following two cases.

In the first case, after the target message is determined, the target application parameter is directly extracted from the original target message.

In the second case, after a redundancy removal processing is performed on the target message, the target application parameter is extracted. FIG. 4-6 is a flowchart of another application interaction method according to an example. Step 3-13 may include steps 3-1301 to 3-1302.

At step 3-1301, the preset feature information is removed from the target message, to obtain a filtered target message.

In an example of the present disclosure, after determining the target message according to the preset feature information, the monitoring component of the operating system may further remove the preset feature information in the target message, to obtain a filtered target message. Alternatively, the target message is sent to the preset Message service, and the preset feature information in the target message is removed by the message service, to obtain a filtered target message. Reference can be made to step S3105 in FIG. 4-2-1 or step S3208 in FIG. 4-2-2.

The preset feature information is mainly for the identification of the target message. In subsequent information processing process, the preset feature information is redundant information. Therefore, before the target application parameter is extracted, the preset feature information in the target message may be removed, thereby reducing the burden of the user terminal in subsequent information processing and improving information processing efficiency.

At step 3-1302, the target application parameter is extracted from the filtered target message.

In an example of the present disclosure, the target application parameter may be extracted from the filtered target message by the Message service. Since the redundant information won't need to be analyzed, the efficiency in extracting the target application parameter by the Message service may be improved.

In another example of the present disclosure, before the target application parameter is extracted by the Message service, information verification may be first performed on the target message. FIG. 4-7 is a flowchart of another application interaction method according to an example. Step 13 may include steps 3-131 to 3-132.

At step 3-131, information verification is performed on the target message.

In an example of the present disclosure, it should be noted that a message that does not include a target application parameter may also include preset feature information, for example a preset keyword. In other words, the target message determined at step 3-1222 does not necessarily include the target application parameter.

After receiving the target message sent by the firewall, the Message service may further perform information verification on the target message according to a preset policy. For example, the Message service may determine whether the target message includes a preset field (such as a field "APP ID:"), and decide that the target message passes the information verification when it does.

Alternatively, in the case where the target application parameter is encoded in a preset encoding method, the Message service may further decode the target message by using a preset decoding method and then verify it. The preset encoding and decoding methods are provided by the provider of the target application and are set in the Message service.

The target message is generated as follows: the sender of the target message (e.g., a browser) may encode information containing the target application parameter (e.g. a URL) according to a preset encoding method provided by the provider of the target application, so as to generate the target message. Alternatively, after acquiring the target application parameter, the network server may encode the target application parameter according to a preset encoding method or encode the entire message carrying the target application parameter, so as to extract the target application parameter from the response message.

At step 3-132, if the target message passes the information verification, the target application parameter is extracted from the target message.

In an example of the present disclosure, to ensure that the target message is accurately determined and to reduce the size of data to be analyzed subsequently, after receiving the target message sent by the monitoring component, the Message service built in the user terminal may further perform information verification on the target message before analyzing for the target application parameter. In this way, it is guaranteed that the target message to be subsequently analyzed is a valid message containing a target application parameter.

In an example of the present disclosure, information verification may be performed on the filtered target HTTP request by using the information verification method, to obtain a valid HTTP request, as shown at step S3106 in FIG. 4-2-1; and then, the target application parameters may be extracted on the basis of the valid HTTP request, as shown at step S3107 in FIG. 4-2-1.

In another example of the present disclosure, information verification may be performed on the filtered target response by using the information verification method, to obtain a valid response, as shown at step S3209 in FIG. 4-2-2; and then, the target application parameter may be extracted on the basis of the valid response, as shown at step S3210 in FIG. 4-2-2.

At step 3-14, the target application is launched according to the target application parameter.

In an example of the present disclosure, after acquiring the target application parameter, the preset Message service may send the target application parameter to a preset application platform, so that the application platform may launch the target application according to the target application parameter, as shown at steps S3108 and S3109 in FIG. 4-2-1 or S3211 and S3212 in FIG. 4-2-2. For the specific implementation of the preset application platform launching the target application according to the target application parameter, reference can be made to the description of step 13 above, and details are not described herein again.

FIG. 1-7-1 is a schematic diagram of an application interaction scenario according to an example. Still taking FIG. 1-7-1 as an example, which may be seen as an application scenario of FIG. 4-2-1, when the user clicks on a link to a page of the target application (e.g., a link to Zhihu Daily) in a browser page 101 of a smart phone 100, the browser page may execute a JS script in the background. The JS script may generate a target network request according to the target application parameter and the preset feature information, for example, the JS script puts together the identifier of the target application, the parameter of the detail page, etc., and the preset feature information into a URL string. The JS script sends the message passing through the operating system (e.g., the URL string) through a system interface. The message is monitored, identified, and determined as the target message, when it passes through the firewall component of the operating system. The firewall component sends the target message to the Message service for extracting the target application parameter. Then, the Message service sends the target application parameter to a preset application platform (i.e., the target application platform). Finally, the preset application platform opens a detail page of the application Zhihu (e.g., detail page 102 of Zhihu Daily) according to the target application parameter, and presents the detail page to the user.

It should be noted that, in FIG. 4-2-1, when the network request sent by the current application further includes other request that is not a jump request, the firewall may allow the response message returned by the network server to pass through normally so as to reach the current application. Reference can be made to the unlabeled steps in the figure. Similarly, in FIG. 4-2-2, the firewall can also allow the response message containing normal response information to pass through so as to reach the current application.

It can be seen that, by using the application interaction method provided by the present disclosure, when the user tries to launch another target application in an application interface, the user may trigger a network request in an interface of the current application, so that the current application may first establish a network connection with the network server. Later, when passing through the operating system, the target network request sent by the current application or the target response returned by the network server for the network request may be filtered by the monitoring component preset in the operating system, and the target application parameter may be extracted from the target message by using the preset Message service, and sent to the preset application platform. The application platform may launch the target application for the user. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, during the process of launching the application, the process of interaction between the user and the terminal can be simplified and time can be saved, and user experience of the terminal device is further improved.

Correspondingly, the present disclosure further provides an application interaction method applied to a network server. FIG. 4-8 is a flowchart of an application interaction method according to an example. The method may include steps 3-21 to 3-24.

At step 3-21, a network connection is established with a current application.

Corresponding to step 3-11, in an example of the present disclosure, after receiving the handshake packet of the current application sent by the user terminal, the network server may return a response according to the TCP/IP protocol, so that a stable TCP connection is established with the current application through three handshakes.

At step 3-22, a target network request sent by the current application is acquired through the network connection.

FIG. 4-9 is a flowchart of another application interaction method according to an example. Step 3-22 may include steps 3-221 to 3-222.

At step 3-221, a network request sent by the current application is received.

After establishing a network connection with the current application, the network server may receive the network request sent by the current application. The current application may be a browser, or other network proxy service programs such as WeChat, SMS, QQ, MiTalk, and the like. The network request sent by the current application may be a request of protocols such as HTTP or FTP (File Transfer Protocol).

At step 3-222, a target network request is determined from the network request.

In an example of the present disclosure, the network request sent by the current application may be for requesting a normal network service (e.g., jumping to a web page), or for instructing the network server to send an application jumping message to the user terminal. In view of this, after receiving the network request, the network server needs to identify the target network request according to a preset policy, where the target network request is used to request the network server to send an application jumping message to the user terminal running the current application.

Depending on the different forms of the target network request, two cases as described below may exist.

In the first case, the target network request is determined according to preset jump instructing information.

In examples of the present disclosure, jump instructing information may be predetermined between the current application and the network server, such as a preset encoding method, or preset feature information set in the network request, for example, a string "000" provided in the header of the information.

After receiving the network request sent by the current application, if the network server detects that the network request includes the preset jump instructing information (e.g., detecting that the network request is encoded with the preset encoding method), the network request is determined as the target network request.

By applying the above method, the target network request can be quickly identified without analyzing the data portion of the network request.

In the second case, the target network request is determined according to target application information.

If there is no jump instructing information predetermined between the current application and the network server, then the target network request may be determined according to request data obtained from analysis.

In this case, step 3-222 may be implemented as follows. the network request sent by the current application is analyzed, and if network request data obtained from analysis includes the target application information, the network request is determined as the target network request, where the target application information may be a target application parameter or a preset jump information corresponding to the target application parameter (e.g., a character "A"). The preset jump information is predetermined between the current application and the network server.

At step 3-23, a target response message is generated according to the target network request, where the target response message is for jumping to a target application.

FIG. 4-10 is a flowchart of another application interaction method according to an example. Step 3-23 may include steps 3-231 to 3-232.

At step 3-231, the target application parameter is determined according to the target network request.

In an example of the present disclosure, depending on whether the network request includes the target application parameter, the network server may determine the target application parameter by using any of the following methods.

In the first method, the target application parameter is acquired directly from the target network request.

If the target network request includes the target application parameter, the network server may directly extract the target application parameter in the request data obtained from analysis. For example, it is assumed that the HTTP request sent by the current application is a GET request, and the request data obtained from analysis is: GET:/APP ID=efg. Therefore, the identifier ("efg") of the application to be jumped to may be acquired thereof.

In the second method, the target application parameter is determined according to the preset jump information in the network request.

In another example of the present disclosure, if the network request includes the preset jump information corresponding to the target application parameter instead of including the target application parameter itself, the network server may determine the target application parameter according to the preset jump information.

FIG. 4-11 is a flowchart of another application interaction method according to an example. Step 3-231 may include steps 3-2311 to 3-2312.

At step 3-2311, the target network request is analyzed to obtain request data, where the request data include preset jump information.

A web browser is still taken as an example of the current application. It is assumed that the network request to be sent is a GET request in the HTTP protocol and the GET request is "GET:/A". After acquiring the request data from analyzing, the network server may acquire the preset jump information ("A") included in the request data according to the pre-configured information.

In an example, the pre-configured information may be a white list which is determined in advance between the current application and the network server and in which all the jump information is recorded, for example, a list of jump information A, B, C, D, and the like. After acquiring the request data, the network server may search the white list of jump information to determine whether the target network request includes the preset jump information.

In another example of the present disclosure, the white list of jump information may include a correspondence between names of applications to be jumped to and application parameters. For example, as shown in Table 7:

TABLE 7

| Name of application | Jump information |
|---|---|
| Kuaikan Manhua | A |
| WeChat | B |
| MiTalk | C |

It is assumed that the sender of the network request (i.e., the current application) is a web browser running on a smart phone. If the network request sent by the web browser include preset jump information A, then the application to be jumped to is Kuaikan Manhua.

At step 3-2312, the target application parameter is acquired by searching a preset list of applications to be jumped to according to the preset jump information, where the list of applications to be jumped to includes a correspondence between preset jump information and target application parameters.

In an example of the present disclosure, between the current application and the network server, a correspondence between preset jump information and parameters of the applications to be jumped to may be determined. For example, a list of applications to be jumped to may be preset in the network server, where the list records a correspondence between preset jump information and parameters of the applications to be jumped to. It is assumed that the parameter is an identifier of the application to be jumped to. For example, the list of applications to be jumped to may be represented as Table 8 below:

TABLE 8

| Preset jump information | Identifier of the application to be jumped to |
|---|---|
| A | efg |
| B | bbb |
| C | aaa |

A web browser is still taken as an example of the current application. It is assumed that the network request to be sent to the network server is a GET request in the HTTP protocol and the GET request is "GET:/A". After acquiring the content of the request from analyzing, the network server may search table 8 according to the preset jump information ("A") included in the request content, and determine that the identifier of the target application to be jumped to is "efg".

In the above discussion, only the correspondence between preset jump information and identifiers of target applications is taken as an example. It could be contemplated that, when the target application parameter is not limited to the identifier of the target application, but further includes multiple parameters such as information of a certain page of the target application, or a certain operation (e.g., popping up a preset dialog box), some corresponding information may be added to the preset jump information. For example, the preset jump information may be "A1", in which the additional "1" represents information of a certain page of the target application.

At step 3-232, the target response message is generated according to the target application parameter.

After determining the target application parameter, the network server may encode the target application parameter according to a preset encoding method, so as to generate the target response message.

At step 3-24, the target response message is sent to the user terminal running the current application, so that the target response message is identified and analyzed when passing through the firewall component of the operating system of the user terminal, and the target application is launched with the target application parameter obtained from analysis.

In the present disclosure, the target response message returned by the application server includes at least: a destination address, a target application parameter, and preset feature information. The destination address of the target response message includes at least the identifier of the user terminal running the current application (e.g., an IP address of the smart phone). The destination address may not include the address of the sender of the network request (i.e., a port number of the current application).

If the target response message needs to be sent to the current application, the destination address of the target response message may further include the address of the sender of the network request, i.e., the port number of the current application.

The preset feature information included in the target response message may be a preset encoding method, a preset feature character, or the like, which is used to identify that the response message includes a target application parameter, so that when receiving the response message, the operating system of the user terminal can utilize a preset monitoring component (e.g., a firewall component) to identify the target response message according to the preset feature information. After that, the target response message may be sent to the preset Message service for extraction of the target application parameter, and the target application is launched with the target application parameter.

Correspondingly, the present disclosure also provides an application interaction apparatus, disposed in a user terminal. FIG. 4-12 is a block diagram of an application interaction apparatus according to an example. The apparatus may include:

a connection establishing module 3-31, configured to establish a network connection between a current application and a network server;

a target message acquiring module 3-32, configured to a acquire a target message passing through an operating system through the network connection, where the target message is for jumping to a target application.

a parameter extracting module 3-33, configured to extract a target application parameter from the target message, where the target application parameter includes at least an identifier of the target application; and an application jumping module 3-34, configured to launch the target application according to the target application parameter.

FIG. 4-13 is a block diagram of another application interaction apparatus according to an example. On the basis of the apparatus example shown in FIG. 4-12, the target message acquiring module 3-32 may include:

a message acquiring submodule 3-321, configured to acquire a message passing through an operating system, where the message includes: a network request sent by the current application to the network server, or a response message returned by the network server according to the network request; and a monitoring submodule 3-322, configured to determine the target message from the message by a preset monitoring component. In an example of the present disclosure, the monitoring component is a firewall component.

FIG. 4-14 is a block diagram of another application interaction apparatus according to an example. On the basis of the apparatus example shown in FIG. 4-13, the monitoring submodule 3-322 may include:

a detecting unit 3-3221, configured to determine whether the message includes preset feature information; and a target message determining unit 3-3222, configured to determine the message as the target message, when the message includes the preset feature information.

FIG. 4-15 is a block diagram of another application interaction apparatus according to an example. On the basis of the apparatus example shown in FIG. 4-12, the parameter extracting module 3-33 may include:

a target message sending submodule 3-331, configured to send the target message to the preset Message service; and a parameter extracting submodule 3-332, configured to extract the target application parameter in the target message by the Message service.

FIG. 4-16 is a block diagram of another application interaction apparatus according to an example. On the basis of the apparatus example shown in FIG. 4-15, the target message sending submodule 3-331 may include:

a filtering unit 3-3311, configured to remove the preset feature information from the target message, to acquire a filtered target message; and a sending unit 3-3312, configured to send the filtered target message to the preset Message service.

FIG. 4-17 is a block diagram of another application interaction apparatus according to an example. On the basis of the apparatus example shown in FIG. 4-15, the target message sending submodule 3-331 may include any of the following units:

a first sending unit 3-3301, configured to send the target message to the preset Message service through a preset monitoring component; and a second sending unit 3-3302, configured to make a copy of the target message through a preset monitoring component, and send the copy of the target message to the Message service.

In another apparatus example of the present disclosure, the sending unit 3-3312 may also include any subunit having the same function as the first sending unit 3-3301 or the second sending unit 3-3302.

FIG. 4-18 is a block diagram of another application interaction apparatus according to an example. On the basis of the apparatus example shown in FIG. 4-15, the parameter extracting submodule 3-332 may include:

an information verifying unit 3-3321, configured to perform information verification on the target message; and a parameter extracting unit 3-3322, configured to extract the target application parameter from the target message when the target message passes the information verification.

FIG. 4-19 is a block diagram of another application interaction apparatus according to an example. On the basis of the apparatus example shown in FIG. 4-12, the application jumping module 3-34 may include:

a detecting submodule 3-341, configured to determine, according to the identifier of the target application, whether the target application has been installed locally;

an installing submodule 3-242, configured to download and install, when the target application has not been installed locally, the target application; and a jumping submodule 3-343, configured to launch the target application according to the target application parameter through a preset application platform.

Corresponding to the application interaction method performed by the network server, the present disclosure also provides an application interaction apparatus, disposed in a network server.

FIG. 4-20 is a block diagram of an application interaction apparatus according to an example. The apparatus may include:

a network connection module 3-41, configured to establish a network connection with a current application;

a target request acquiring module 3-42, configured to acquire a target network request sent by the current application through the network connection;

a response module 3-43, configured to generate a target response message according to the target network request, where the target response message is for jumping to a target application; and a sending module 3-44, configured to send the target response message to the user terminal running the current application, so that the target response message is identified and analyzed when passing through the firewall component of the operating system of the user terminal, and the target application is launched with the target application parameter obtained from analysis.

FIG. 4-21 is a block diagram of another application interaction apparatus according to an example. On the basis of the apparatus example shown in FIG. 4-20, the target request acquiring module 3-42 may include:

a request receiving submodule 3-421, configured to receive a network request sent by the current application through the network connection; and a target request determining submodule 3-422, configured to determine the target network request from the network request.

FIG. 4-22 is a block diagram of another application interaction apparatus according to an example. On the basis of the apparatus example shown in FIG. 4-21, the target request determining submodule 3-422 may include any of the following units:

a first target determining unit 3-4221, configured to determine, when the network request includes the preset jump instructing information, the network request as the target network request; and a second target determining unit 3-4222, configured to determine, when the network request includes the target application information, the network request as the target network request.

FIG. 4-23 is a block diagram of another application interaction apparatus according to an example. On the basis of the apparatus example shown in FIG. 4-20, the response module 3-43 may include:

a parameter determining submodule 3-431, configured to determine the target application parameter according to the target network request.

a response message generating submodule 3-432, configured to generate a target response message according to the target application parameter, where the target response message includes a destination address, the target application parameter, and preset feature information, where the destination address includes at least an identifier of the user terminal.

FIG. 4-24 is a block diagram of another application interaction apparatus according to an example. On the basis of the apparatus example shown in FIG. 4-23, the parameter determining submodule 3-431 may include:

an analyzing unit 3-4311, configured to analyze the target network request to obtain request data, where the request data include preset jump information; and a parameter searching unit 3-4312, configured to acquire the target application parameter by searching a preset list of applications to be jumped to according to the preset jump information, where the list of applications to be jumped to includes a correspondence between preset jump information and target application parameters.

Correspondingly, in one aspect, examples of the present disclosure provide an application interaction apparatus, including a processor and a memory for storing processor-executable instructions, where the processor is configured to:

establish a network connection between a current application and a network server;

acquire a target message passing through an operating system through the network connection, where the target message is for jumping to a target application;

extract a target application parameter from the target message, where the target application parameter includes at least an identifier of the target application; and launch the target application according to the target application parameter.

In another aspect, examples of the present disclosure provide an application interaction apparatus, including a processor and a memory for storing processor-executable instructions, where the processor is configured to:

establish a network connection with the current application;

acquire a target network request sent by the current application through the network connection;

generate a target response message according to the target network request, where the target response message is for jumping to a target application; and send the target response message to the user terminal running the current application, so that the target response message is identified and analyzed when passing through the operating system, and the target application is launched with the target application parameter obtained from analysis.

Example 4

Examples of the present disclosure provide another application interaction method. Below is a detailed explanation with reference to FIGS. 5-1-1 to 5-1-4, four schematic diagrams of an application interaction method according to an example, as well as various flowcharts.

FIG. 5-2 is a flowchart of an application interaction method according to an example. The method may include steps 4-11 to 4-14.

At step 4-11, a network connection is established between a current application and a network server.

Step 4-11 is similar to step 3-11 in example 3, specific implementation of which may be referred to and is not described herein again. The process of establishing a TCP connection is exemplarily shown in step S4-110 in FIG. 5-1-1 and FIG. 5-1-2, and step S4201 in FIG. 5-1-3 and FIG. 5-1-4.

At step 4-12, on the basis of the network connection, a target message passing through an operating system is acquired through a preset network interface, where the target message is for jumping to a target application.

After the network connection is established, an information transmission channel between the current application and the remote server is established, and the current application may send a network request to the remote server through the information transmission channel, and the user terminal running the current application may receive various messages sent by the remote network server through the information transmission channel.

The operating system of the user terminal running the current application is a necessary part constituting the information transmission channel. In other words, as a bridge for upper layer application software to send messages to remote servers, the operating system may acquire a message sent by various applications and returned by remote servers.

As an important component of the operating system, the network interface can be divided into a Send interface and a Receive interface, which are respectively used for sending network messages and receiving network messages. In an example of the present disclosure, the target message passing through the operating system may be acquired by using a preset network interface with the function of identifying the target message. The preset network interface may be a network interface with an additional Hook function, for example, a Send interface with a Hook function, i.e., a Hooked Send interface; or a Receive interface with a Hook function, i.e., a Hooked Receive interface.

Depending on the different network interfaces used to identify the target message, step 4-12 may be implemented in the following two cases.

In the first case, the target network request passing through the operating system is acquired through a preset sending interface. For example, as shown in FIG. 5-1-1 and FIG. 5-1-2. In this case, the target message is a target network request. The target network request may include preset feature information and a target application parameter.

In an example of the present disclosure, the preset sending interface has the function of identifying a normal network request and a target network request, where the target network request carries the target application parameter.

FIG. 5-3 is a flowchart of another application interaction method according to an example. Step 4-12 may include steps 4-12-11 to 4-12-13.

At step 4-12-11, the network request passing through the operating system is acquired through a preset sending interface.

A Hooked Send interface is taken as an example of the preset sending interface. In an example of the present disclosure, the current application may invoke the Hooked Send interface to send various network requests, such as an HTTP request, an FTP request, an SMTP request, and the like. As shown at step S4102 in FIG. 5-1-1 and FIG. 5-1-2, it is assumed that the network request is an HTTP request. The web browser can send various HTTP requests to a web server. Depending on request methods, the HTTP request may be of any of the methods: GET, POST, HEAD, OPTIONS, PUT, DELETE, TRACE, or the like.

At step 4-12-12, it is determined whether the network request includes preset feature information.

In an example of the present disclosure, the Hooked Send interface may identify the target network request by determining whether the request includes the preset feature information. The preset feature information is for labeling whether a network request sent by the current application contains a target application parameter, which may be a preset keyword, a preset encoding method, or the like. The preset feature information may be provided by provider of the target application and embedded in the user terminal in advance.

It is assumed that the preset feature information is a preset keyword, which may be a preset tag, a preset string (e.g., "111"), or the like. It is assumed that the message passing through the operating system is an HTTP request or the like. After acquiring the HTTP request, the Hooked Send interface may determine whether the request includes the preset keyword. If it does, step 4-12-13 is performed. If it does not, the HTTP request is determined as a normal network request, and is sent to the network server in a normal transmission manner, which, for example, may be through the Send module and the firewall of the Hooked Send interface, and by using the wireless transmission resource, to the remote network server, as shown at S4001 in FIG. 5-1-1 and FIG. 5-1-2.

At step 4-12-13, if the network request includes the preset feature information, the network request is determined as the target network request.

As shown above, if the HTTP request includes the preset feature information (e.g., string "111"), it is determined that the HTTP request belongs to the target HTTP request, as shown at 54103 in FIG. 5-1-1 and FIG. 5-1-2.

In the second case, the target response message returned by the network server according to the network request is acquired through a preset receiving interface, for example, as shown in FIG. 5-1-3 and FIG. 5-1-4. In this case, the target message is the target response message returned by the network server, and the target response message includes the preset feature information and a target application parameter.

FIG. 5-4 is a flowchart of another application interaction method according to an example. Step 4-12 may include steps 4-12-21 to 4-12-24.

At step 4-12-21, a preset network request is sent to the network server, where the preset network request is used to request the network server to send a target response message to the user terminal.

In an example of the present disclosure, the current application may invoke the Send interface, and send a preset network request to the remote network server through the firewall component of the operating system, so that the network server returns a target response message including at least the target application parameter according to the preset network request. For example, as shown at S4202 in FIG. 5-1-3 and FIG. 5-1-4.

In an example of the present disclosure, the preset network request may include the target application parameter, so that after analyzing the target application parameter, the network server may generate a target response message.

In another example of the present disclosure, the preset network request may include preset jump instructing information. In other words, the preset network request may not include the target application parameter, but only include, according to a prior agreement between the current application and the network server, preset jump instructing information (e.g., a character "A") used for instructing the network server to generate a target response message. How the network server generates the target response message according to the preset jump instructing information will be described in detail on the network server side.

At step 4-12-22, a network response message is received through a preset receiving interface, where the network response message is a response message returned by the network server according to the network request.

A Hooked Receive interface is taken as an example of the preset receiving interface. In an example of the present disclosure, the Hooked Receive interface in the operating system of the user terminal can receive messages sent by various network servers, where the message includes network response messages returned by the network server according to the network request, as shown at step S4205 in FIG. 5-1-3 and FIG. 5-1-4. The network response messages may include the target response message returned by the network server according to the preset network request.

At step 4-12-23, it is determined whether the network response message includes the preset feature information.

In an example of the present disclosure, the preset receiving interface has the function of identifying a normal network response message and a target response message. The normal network response message refers to a network response message that is returned to the sender of the request (i.e., an upper layer application) through a normal message receiving channel, for example, a response message returned to an upperlayer application through the Receive module and the firewall component (not shown in drawing) in the Hooked Receive interface, as shown at step S4003 in FIG. 5-1-3 and FIG. 5-1-4.

The target response message may include preset feature information and a target application parameter. For the specific implementation of the Hooked Receive interface identifying the target response message according to the preset feature information, reference can be made to step 4-12-12 above, and details are not described herein.

At step 4-12-24, if the network response message includes the preset feature information, the network response message is determined as the target response message.

Also, this step is similar to step 4-12-13, reference can be made to for example step S4206 in FIG. 5-1-3 and FIG. 5-1-4.

It should be noted that, although the generation of the target response message is triggered by the current application, the target response message does not necessarily need to be returned to the current application.

At step 4-13, a target application parameter is extracted from the target message, where the target application parameter includes at least an identifier of the target application.

As described above, the target message in the examples of the present disclosure may be a target network request determined by the preset sending interface, or may be a target response message determined by the preset sending interface. The target message referred to in the following discussions may be either of the two messages.

The target application parameter includes at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

The preset feature information in the target message is used to identify the data package of the target message. In subsequent process of analyzing the data package and extracting the target application parameter, the preset feature information is redundant information. Therefore, in an example of the present disclosure, the preset feature information may be removed before the target data is analyzed to reduce calculation of analyzing the data package of the target message. FIG. 5-5 is a flowchart of another application interaction method according to an example. Step 4-13 may include steps 4-1301 to 4-1302.

At step 4-1301, the preset feature information is removed from the target message, to obtain a filtered target message.

This step may be performed by a preset network interface, for example, as shown at step S4104 in FIG. 5-1-1; or may be performed by a preset message service, for example, as shown at step S4208 in FIG. 5-1-3.

At step 4-1302, the target application parameter is extracted from the filtered target message.

The target message involved in the following examples of the present disclosure may be an original target message from which the preset feature information is not filtered out, or may be a filtered target message outputted at step 4-1301.

In an example of the present disclosure, depending on different executing entities of extracting the target application parameter, the target application parameter may be extracted from the target message in any of the following methods.

In the first method, the target application parameter in the target message is extracted through a preset network interface.

Specifically, corresponding to the foregoing two cases of determining the target message, the method may include two implementations.

In the first implementation, the target application parameter is extracted from the target network request through the Hooked Send interface.

After identifying the target network request, the Hooked Send interface may analyze the request packet, and then extract the target application parameter from the request data obtained from analysis according to a preset policy, such as a preset key field APP ID. An HTTP request is taken as an example of the target network request. Reference can be made to step S41070 in FIG. 5-1-2 for the foregoing process.

For example, it is assumed that the target HTTP request sent by the current application is a GET request, and the request data obtained from analyzing by the Hooked Send interface is: GET:/APP ID=efg. Therefore, the Hooked Send interface can extract the identifier ("efg") of the target application from the request data obtained from analysis according to the key field APP ID.

After that, the extracted target application parameter is sent to the preset application platform that can run the target application, as shown at step S21080 in FIG. 5-1-2, so that a preset application platform may launch the target application according to the target application parameter, for example, as shown in step S21090 in FIG. 5-1-2.

In the second implementation, the target application parameter is extracted from the target response message through the Hooked Receive interface.

Similarly, after identifying the target response message, the Hooked Receive interface may analyze the response packet, and then extract the target application parameter from the response data obtained from analyzing according to a preset policy, such as a preset key field APP ID. An HTTP response is taken as an example of the target response message. Reference can be made to step S42010 in FIG. 5-1-4 for the foregoing process.

For example, it is assumed that the response data obtained from analyzing by the Hooked Receive interface includes: APP ID=efg. Therefore, the Hooked Receive interface can extract the identifier ("efg") of the target application from the response data obtained from analysis according to the key field APP ID.

After that, the extracted target application parameter is sent to the preset application platform that can run the target application, as shown at step S42110 in FIG. 5-1-4, so that a preset application platform may launch the target application according to the target application parameter. For example, see step S4212 in FIG. 5-1-4.

In the second method, the target application parameter in the target message is extracted through a preset Message service.

FIG. 5-6 is a flowchart of another application interaction method according to an example. Step 4-13 may include steps 4-131 to 4-132.

At step 4-131, the target message is sent to the preset Message service through the preset network interface.

In an embodiment of the present disclosure, corresponding to the first case, after identifying the target network request, the Hooked Send interface of the operating system may send the preset target network request data to the preset Message service, for example, as shown at step S4105 in FIG. 5-1-1.

Corresponding to the second case, after identifying the target response message, the Hooked Receive interface of the operating system may send the target response message to the preset Message service, for example, as shown at step S4207 in FIG. 5-1-3.

In an example of the present disclosure, depending on whether the current application needs to receive a response from the network server after the network request is sent, the preset network interface may send the target message to the Message service by using at least two sending methods.

In the first sending method, if the current application does not need to receive a response message returned from the network server, the preset network interface may intercept the identified target message, and forward the intercepted target message directly to the Message service.

Corresponding to the first case, if the current application does not need to receive a response from the network server, the Hooked Send interface may intercept the target network request and directly forward it to the Message service.

Corresponding to the second case, if the current application does not need to receive the response message from the network server, the Hooked Receive interface may intercept the target response message and directly forward it to the Message service.

In the second sending method, if the current application needs to receive a response message from the network server, the preset network interface may copy the identified target message and forward the copied target message directly to the Message service.

Similarly, corresponding to the first case, if the current application needs to receive a response message returned from the network server, for example, if the target network request further includes normal network request data (which refers to data for requesting a virtual server to provide network service), in order not to affect the transmission of the normal network request data to the network server, a further step may be taken. After identifying the target network request data, the Hooked Send interface may make a copy of the original target network request data, and directly sends the copy to the Message service for subsequent information processing through the preset message channel.

The original target network request data is still sent to the remote network server in the normal manner, for example, through the Send module and the firewall by using wireless network resources, so that the network server returns the corresponding network response message, for example, as shown at steps S4001 and S4002 in FIG. 5-1-1 and FIG. 5-1-2.

Similarly, for the second case, if the network response message returned by the network server includes normal response data, for example, response information returned for the normal network request data sent by the current application. After identifying the target response message, the Hooked Receive interface may make a copy of the target response message, and send, through a preset message channel, the copy of the target response message to the Message service for subsequent information processing.

The original target response message is still returned to the current application through a normal message channel, for example, through the Receive module of the Hooked Receive interface, as shown at step S003 in FIG. 5-1-3 and FIG. 5-1-4.

In the above example, the target message may be sent to a preset Message service for analyzing. In this way, the identification process of the target network request is decoupled from the analyzing process, or in other words, the preset network interface serves only to identify but not to analyze the target message, thereby improving the detection efficiency of the target message by the preset network interface.

At step 4-132, the target application parameter is extracted from the target message through the Message service.

Step 4-132 is similar to step 1-132 in the example 1, specific implementation of which may be referred to each other and is not described herein again.

The difference is that the target message in this example may be a target network request acquired by the operating system or a target response message returned by the network server. Correspondingly, the implementation process is slightly different: for the step of information verification, reference can be made to step S4106 in FIG. 5-1-1 or step S4208 in FIG. 5-1-3; and for the step of the Message service extracting the target application parameter from the valid message that passes the information verification, reference can be made to step S4107 in FIG. 5-1-1 or step S4210 in FIG. 5-1-3.

At step 4-14, the target application is launched according to the target application parameter.

In an example of the present disclosure, after acquiring the target application parameter, the preset network interface or the preset Message service may send the target application parameter to a preset application platform so as to launch the target application, as shown at step S4109 in FIG. 5-1-1 and FIG. 5-2-2 or at step S4212 in FIG. 5-1-3 or FIG. 5-1-4.

For the specific implementation of the preset application platform launching the target application according to the target application parameter, it is similar to step 13, reference can be made to the description of step 13 above, and details are not described herein again.

FIG. 1-7-1 is a schematic diagram of an application interaction scenario according to an example. When the user clicks on a link to a page of the target application (e.g., a link to Zhihu Daily) in a browser page 101 of a smart phone 100, the browser page may execute a JS script in the background. The JS script may generate a target network request according to the target application parameter and the preset feature information, for example, the JS script puts together the identifier of the target application, the parameter of the detail page, etc., and the preset feature information into a URL string. The JS script invokes a preset network connection interface (e.g. a Hooked DNS interface and/or a Hooked Connect interface), to establish a virtual network connection with the virtual server using the virtual domain name or the address of the virtual server. Then, the JS script invokes a preset sending interface (the Hooked Send interface) to send the target network request data to the Message service for extracting the target application parameter. After that, the Message service sends the acquired target application parameter to a preset application platform (i.e., the target application platform). Finally, the preset application platform opens a detail page of the application Zhihu (e.g., detail page 102 of Zhihu Daily) according to the target application parameter, and presents the detail page to the user.

It can be seen that, by using the application interaction method provided by the present disclosure, when the user tries to launch another target application in an application interface, the user may trigger a network request in an interface of the current application, so that the current application may first establish a network connection with the network server. Later, when passing through the operating system, the target network request sent by the current application or the target response returned by the network server for the network request may be filtered by the network interface in the operating system, and the target application parameter may be extracted from the target message by using the preset Message service, and sent the same to the preset application platform. The application platform may launch the target application for the user. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, during the process of launching the application, the process of interaction between the user and the terminal can be simplified and time can be saved, and user experience of the terminal device is further improved.

Correspondingly, the present disclosure further provides an application interaction method applied to a network server. FIG. 5-7 is a flowchart of an application interaction method according to an example. The method may include steps 4-21 to 4-24.

At step 4-21, a network connection is established with a current application.

Corresponding to step 4-11, in the present disclosure, the network server may establish a network connection with the current application according to a preset network protocol. For example, after receiving the handshake packet sent by the current application of the user terminal by invoking the network connection interface, the network server may return a response according to the TCP/IP protocol, so that a stable TCP connection is established with the current application through three handshakes.

At step 4-22, a target network request sent by the current application is acquired through the network connection.

FIG. 5-8 is a flowchart of another application interaction method according to an example. Step 4-22 may include steps 4-221 to 4-222.

At step 4-221, a network request sent by the current application is received through the network connection.

After establishing a network connection with the current application, the network server may receive the network request sent by the current application. The current application may be a browser, or other network proxy service programs such as WeChat, SMS, QQ, MiTalk, and the like. The network request sent by the current application may be a request of protocols such as HTTP or FTP (File Transfer Protocol).

At step 4-222, a target network request is determined from the network request.

In an example of the present disclosure, the network request sent by the current application may be for requesting a normal network service (e.g., jumping to a web page), or for requesting the network server to send an application jumping message to the user terminal. In view of this, after receiving the network request, the network server needs to identify the target network request according to a preset policy, where the target network request is used to request the network server to send a target response message including the application jumping message to the user terminal running the current application.

Depending on the different forms of the target network request, two cases as described below may exist.

In the first case, the target network request is determined according to preset jump instructing information.

In examples of the present disclosure, preset jump instructing information may be predetermined between the current application and the network server, such as a feature character "A" or a specific encoding method of the network request. The preset jump instructing information is used to instruct the network server to acquire the jump information parameter for generating and/or transmitting target response information.

After receiving and analyzing the network request sent by the current application, if the network server detects that the network request includes the preset jump instructing information, the network request is determined as the target network request.

In the second case, the target network request is determined according to the target application parameter.

In this case, step 4-222 may be implemented as: the network request sent by the current application is analyzed, and if network request data obtained from analysis includes the target application parameter (e.g., the target application ID), the network request is determined as the target network request.

At step 4-23, a target response message is generated according to the target network request, where the target response message is for jumping to a target application.

FIG. 5-9 is a flowchart of another application interaction method according to an example. Step 4-23 may include steps 4-231 to 4-232.

At step 4-231, a jump information parameter is determined according to the target network request.

In an example of the present disclosure, the jump information parameter includes at least a target application parameter for generating a target response message, and may include further information such as preset feature information for generating a target response message, and a sending manner for sending the target response message.

In an example of the present disclosure, depending on whether the network request includes the jump information parameter, the network server may determine the jump information parameter by using the following methods.

In the first method, the jump information parameter is acquired directly from the target network request.

Targeted at the second case of determining the target network request discussed above, if the target network request includes the jump information parameter, the network server may directly extract the jump information parameter in the request data obtained from analysis. The jump information parameter in an example of the present disclosure may include preset feature information for identifying the target response message, in addition to the target application parameter.

For example, it is assumed that the HTTP request sent by the current application is a GET request, and the request data obtained from analysis is: GET:/APP ID=efg. Therefore, the identifier ("efg") of the application to be jumped to (i.e., the identifier of the target application) may be acquired thereof.

In the second method, the jump information parameter is determined according to the preset jump instructing information in the network request.

In another example of the present disclosure, if the network request includes preset jump instructing information which instructs the network server to determine the jump information parameter, rather than directly include the preset jump information parameter, the network server may determine the jump information parameter such as the target application parameter or preset feature information according to the preset jump instructing information.

FIG. 5-10 is a flowchart of another application interaction method according to an example. Step 4-231 may include steps 4-2311 to 4-2312.

At step 4-2311, the target network request is analyzed to obtain request data, where the request data include preset jump instructing information.

In an example of the present disclosure, the preset jump instructing information includes at least parameter acquisition instructing information, used for acquiring the target application parameter, and may further include feature loading instructing information, used for acquiring the preset feature information, and sending method instructing information, used for instructing how the target response message is sent.

It is assumed that the preset jump instructing information includes parameter acquisition instructing information, that is, the target network request acquired by the network server includes parameter acquisition instructing information used for instructing the network server to acquire the target application parameter. A web browser is still taken as an example of the current application. The target HTTP request which is sent by the web browser and received by the network server is a GET request, and it is assumed that the GET request is: GET:/A. After analyzing the requested data, the network server may acquire the preset jump instructing information "A" according to pre-configured information, and determine that character "A" is parameter acquisition instructing information.

In an example, the pre-configured information may be a white list which is determined in advance between the current application and the network server and in which all the jump instructing information is recorded. After analyzing the request data, the network server may search the white list to determine that the targer network request includes preset jump instructing information.

In another example of the present disclosure, the white list of jump information may include a correspondence between names of applications to be jumped to and jump instructing information. For example, as shown in Table 9:

TABLE 9

| Name of application | Jump instructing information |
| --- | --- |
| Kuaikan Manhua | A |
| WeChat | B |
| MiTalk | C |

It is assumed that the network request sent by the sender of the network request include preset jump instructing information A, then the application requested to be jumped to is Kuaikan Manhua.

At step 4-2312, a jump information parameter is acquired according to the target jump instructing information.

In an example of the present disclosure, the preset jump instructing information includes parameter acquisition instructing information, used for acquiring the target application parameter, and may further include feature loading instructing information and sending method instructing information.

Correspondingly, step 4-2312 at least include: a target application parameter is determined according to the parameter acquisition instructing information.

Step 4-2312 may further include:

preset feature information for identifying the target response message is determined according to the feature loading instructing information; and a method of sending the target response message is determined according to the sending method instructing information.

In an example of the present disclosure, a jump response list may be preset in the network server, where the preset jump response list includes a correspondence between preset jump instructing information and jump information parameters. The jump response list is predetermined between the current application and the network server.

After acquiring the jump instructing information, the network server may search the preset jump response list according to the preset jump instructing information, to acquire the jump information parameter corresponding to the preset jump instructing information.

The parameter acquisition instructing information is taken as an example of the preset jump instructing information, and the identifier of the application to be jumped to is taken as an example of the corresponding jump information parameter. For example, the jump response list may be represented as Table 10 below:

TABLE 10

| Parameter acquisition instructing information | Identifier of the application to be jumped to |
| --- | --- |
| A | efg |
| B | bbb |
| C | aaa |

It is assumed that the preset jump instructing information acquired by the network server through analysis is "A". By searching table 10, it may be determined that the identifier of the target application to be jumped to is "efg".

In the above discussion, only the identifier of the target application is taken as an example of the target application parameter. It could be contemplated that, when the target application parameter is not limited to the identifier of the target application, but further includes multiple parameters such as information of a certain page, or a certain performance (e.g., popping up a preset dialog box) of the target application, some corresponding information may be added to the preset jump information. For example, the preset jump information may be "A1", in which the additional "1" represents information of a certain page of the target application.

Similarly, if the preset jump instructing information acquired by analyzing the target network request further includes feature loading instructing information used for acquiring the preset feature information, the preset feature information for identifying the target response message may be determined by searching the list.

If the preset jump instructing information acquired by analyzing the target network request further includes sending method instructing information used for determining the method in which the target response message is sent, the method in which the target response message is sent may be determined by searching the list.

In the above examples, the case where the current application specifies the jump information parameter in the target network request is discussed in detail, or in other words, the current application specifies the acquisition of the remaining jump information parameter in addition to the target application parameter. As to how it is specified, the target network request may either include directly the jump information parameter, or include preset jump instructing information used for instructing the network server to acquire the jump information parameter.

In another example of the present disclosure, the remaining jump information parameter other than the target application parameter, such as the preset feature information and the sending method of the target response message to be generated, may be determined by the network server instead of being specified by the current application in the target network request.

In an example of the present disclosure, after acquiring the target application parameter according to the network request, the network server may determine the remaining jump information parameter by using at least one of the following methods.

In the first method, the network server determines the remaining jump information parameter according to a preset policy.

For example, the network server uses unified preset feature information when generating the target response message, and uses a preset sending method when sending the target response message. Alternatively, the network server randomly determines preset feature information from a database of preset feature information, and the same database of preset feature information is stored in the user terminal, so that the operating system of the user terminal may use the database of preset feature information to identify the target message. Similarly, the network server may also randomly select a method of sending the target response message from selectable sending methods according to a prior agreement with the user terminal.

In the second method, the network server determines the remaining jump information parameter according to the determined target application parameter. FIG. 5-11 is a flowchart of another application interaction method according to an example. Step 4-231 may include steps 4-231-1 to 4-231-2.

At step 4-231-1, the target application parameter is determined according to the target network request.

As shown above, when the target network request includes the target application parameter, the network server may extract the target application parameter from the target network request obtained from analysis. In the case where the target network request includes the parameter acquisition instructing information, the network server determines the target application parameter according to the preset parameter instructing information acquired by analysis.

At step 4-231-2, the remaining jump information parameter is determined according to the target application parameter.

In an example of the present disclosure, after determining the target application parameter, the network server may further determine, according to attribution information corresponding to the target application parameter, for example, security classification information, and determine the preset feature information used for identifying the target response message to be generated and/or the sending method of the target response message to be generated according to the security classification information.

FIG. 5-12 is a flowchart of another application interaction method according to an example. Step 4 4-231-2 may include steps 4-231-21 to 4-231-22.

At step 4-231-21, the target security classification information corresponding to the target application parameter is acquired by searching a preset list according to the target application parameter, where the preset list includes a correspondence between application parameters and security classification information.

In an example of the present disclosure, the security classification information may include a security level and a security factor determined according to the type of the application parameter. The security level is taken as an example, which may be different for different applications. For example, an application involving financial transactions or personal properties, such as an electronic banking application, has a higher security level than a general application, such as an application of an e-commerce platform. In an example of the present disclosure, a list may be preset in the network server, and the list contains a correspondence between application parameters and security levels. The network server may search the preset list according to the target application parameter, and acquire a target security level corresponding to the target application parameter.

It is assumed that the target application parameter is an APP ID. For example, the preset list may be represented as Table 11 below:

TABLE 11

| APP ID | Security Level |
|---|---|
| efg | Advanced |
| aaa | Intermediate |
| bbb | Preliminary |

If the target application parameter determined by the network server according to the target network request is "efg", then it can be acquired by searching the above table 11 that the target security level corresponding to the target application parameter "efg" is "advanced".

At step 4-231-22, the remaining jump information parameter is determined according to the target security level.

In an example of the present disclosure, in view of information security, the network server may generate the target response message by using the preset feature information corresponding to the different security levels, or send the target response message to the user terminal by using different sending methods corresponding to the different security levels after generating the target response message.

The preset feature information is taken as an example of the remaining jump information parameter. It is assumed that the preset feature information is specifically an encoding method, and the network server may be preset with a preset encoding list, where the encoding list includes a correspondence between security levels and encoding methods. For example, as shown in Table 12:

TABLE 12

| Security level | Encoding method |
|---|---|
| Advanced | First encoding method |
| Intermediate | Second encoding method |
| Preliminary | Third encoding method |

Still as shown above, by searching table 12 according to the target security level "advanced" corresponding to the target application parameter "efg", it is known that the corresponding preset feature information, i.e., the encoding method, is: the first encoding method. In this way, the network server may subsequently generate a target response message with a higher security level according to the target application parameter and the preset feature information.

In the above example, the current application may specify only the target application parameter or its acquisition instructing information in the target network request, and the remaining jump information parameter may be flexibly configured by the network server according to an agreement. On the one hand, such a method may reduce the data amount of the network request, thereby reducing the data amount to be analyzed by the network server and improving the efficiency of application interaction. On the other hand, the network server may dynamically configure the remaining jump information parameter, for example, according to the security level of the target application parameter. When an application with a higher demand for security (e.g., a financial application) is needed to be launched, a target response message may be generated with a higher information security level, or sent in a method of higher security, so that the security of the target response message is improved.

At step 4-232, a target response message is generated according to the jump information parameter, where the target response message includes the target application parameter and preset feature information.

After determining the target application parameter, the network server may generate the target response message by combining with the preset feature information. It is assumed that the preset feature information is a preset encoding method. Step 4-232 is implemented specifically as follows. The target application parameter is encoded according to a preset encoding method to generate a target response message.

In an example of the present disclosure, the target response message may be any message with the target application parameter and the preset feature information, for example, text data, image data, audio data, or video data.

At step 4-24, the target response message is sent to the user terminal running the current application, so that the target response message is identified and analyzed when passing through the operating system, and the target application is launched by using the target application parameter obtained from analysis.

In the present disclosure, the target response message returned by the application server includes at least: a destination address, the target application parameter, and the preset feature information. The destination address of the target response message includes at least the identifier of the user terminal running the current application (e.g., an IP address of the smart phone). The destination address may not include the address of the sender of the network request (i.e., a port number of the current application).

If the target response message needs to be sent to the current application, the destination address of the target response message may further include the address of the sender of the network request, i.e., a port number of the current application.

The preset feature information included in the target response message may be a preset encoding method, a preset feature character, or the like, which is used to identify that the response message includes a target application parameter, so that when receiving the response message, a preset receiving interface of the operating system can identify the target response message according to the preset feature information.

In an example of the present disclosure, if the jump information parameter determined by the network server according to the network request includes a sending method, the sending method may be one of the follows: sending after passing a preset verification, instant sending, sending and acquiring a feedback message, and the like. The target response message can be returned to the operating system of the user terminal according to one of the sending methods.

By sending the target response message to the user terminal, a preset component with the function of identifying the target message in the operating system of the user terminal can identify the target response message, and perform subsequent steps related to the terminal side, as shown in FIG. 5-1-3 or FIG. 5-1-4. The preset component that is configured in the user terminal operating system and has the function of identifying the target response message may be a preset receiving interface, such as a Hooked Receive interface; a preset firewall component; an audio decoder with the function of identifying the target response message; or an image processor with the function of identifying the target response message, which is not limited herein.

Correspondingly to the foregoing examples of methods to implement the application methods, the present disclosure also provides examples of apparatuses to implement the application methods and corresponding terminals.

Correspondingly, the present disclosure also provides an application interaction apparatus, disposed in a user terminal. FIG. 5-13 is a block diagram of an application interaction apparatus according to an example. The apparatus may include:

a connection establishing module 4-31, configured to establish a network connection between a current application and a network server;

a target message acquiring module 4-32, configured to a acquire a target message passing through an operating system on the basis of the network connection, where the target message is for jumping to a target application.

a parameter extracting module 4-33, configured to extract a target application parameter from the target message, where the target application parameter includes at least an identifier of the target application; and an application jumping module 4-34, configured to launch the target application according to the target application parameter.

FIG. 5-14 is a block diagram of another application interaction apparatus according to an example. On the basis of the apparatus example shown in FIG. 5-13, the target message acquiring module 4-32 may include any of the following submodules:

a first target acquiring submodule 4-321, configured to acquire a target network request passing through the operating system, where the target network request includes preset feature information and the target application parameter; and a second target acquiring submodule 4-322, configured to acquire a target response message returned by the network server according to the network request through a preset receiving interface, where the target response message includes preset feature information and target application parameter.

FIG. 5-15 is a block diagram of another application interaction apparatus according to an example. On the basis of the apparatus example shown in FIG. 5-14, the first target acquiring submodule 4-321 may include:

a first message acquiring unit 4-3211, configured to acquire, through a preset sending interface, a network request passing through an operating system;

a first monitoring unit 4-3212, configured to determine whether the network request includes preset feature information; and a first target determining unit 4-3213, configured to determine, when the network request includes the preset feature information, the network request as the target network request.

FIG. 5-16 is a block diagram of another application interaction apparatus according to an example. On the basis of the apparatus example shown in FIG. 5-14, the second target acquiring submodule 4-322 may include:

a request sending unit 4-3221, configured to send a preset network request to the network server, where the preset network request is used to request the network server to send a target response message to the user terminal;

a second message acquiring unit 4-3222, configured to receive a network response message through a preset receiving interface, where the network response message is a response message returned by the network server according to the network request; and a second monitoring unit 4-3223, configured to determine whether the network response message includes preset feature information; and a second target determining unit 4-3224, configured to determine the network response message as the target response message when the network response message includes the preset feature information.

FIG. 5-17 is a block diagram of another application interaction apparatus according to an example. On the basis of the apparatus example shown in FIG. 5-13, the parameter extracting module 4-33 may include:

a filtering submodule 4-331, configured to remove the preset feature information from the target message, to acquire a filtered target message; and a first parameter extracting submodule 4-332, configured to extract the target application parameter from the filtered target message.

In an example of the present disclosure, the parameter extracting module 4-33 or the first parameter extracting submodule 4-332 may be configured to extract the target application parameter from the target message through a preset network interface.

FIG. 5-18 is a block diagram of another application interaction apparatus according to an example. On the basis of the apparatus example shown in FIG. 5-13, the parameter extracting module 4-33 may include:

a target sending submodule 4-33-1, configured to send the target message to the preset Message service through a preset network interface; and a second parameter extracting submodule 4-33-2, configured to extract the target application parameter from the target message by the preset Message service.

FIG. 5-19 is a block diagram of another application interaction apparatus according to an example. On the basis of the apparatus example shown in FIG. 5-18, the target message sending submodule 4-33-1 may include:

a first sending unit 4-33-11, configured to send the target message to the preset Message service; and a second sending unit 4-33-12, configured to make a copy of the target message, and send the copy of the target message to the Message service.

FIG. 5-20 is a block diagram of another application interaction apparatus according to an example. On the basis of the apparatus example shown in FIG. 5-18, the second parameter extracting submodule 4-33-2 may include:

an information verifying unit 4-33-21, configured to perform information verification on the target message; and a parameter extracting unit 4-33-22, configured to extract the target application parameter from the target message when the target message passes the information verification.

FIG. 5-21 is a block diagram of another application interaction apparatus according to an example. On the basis of the apparatus example shown in FIG. 5-13, the application jumping module 4-34 may include:

a detecting submodule 4-341, configured to determine, according to the identifier of the target application, whether the target application has been installed locally;

an installing submodule 4-342, configured to download and install, when the target application has not been installed locally, the target application; and a jumping submodule 4-343, configured to launch the target application according to the target application parameter through a preset application platform.

Correspondingly, the present disclosure also provides an application interaction apparatus disposed in a network server. FIG. 5-22 is a block diagram of an application interaction apparatus according to an example. The apparatus may include:

a network connection module 4-41, configured to establish a network connection with a current application;

a target request acquiring module 4-42, configured to acquire a target network request sent by the current application through the network connection;

a response module 4-43, configured to generate a target response message according to the target network request, where the target response message is for jumping to a target application; and a sending module 4-44, configured to send the target response message to the user terminal running the current application, so that the target response message is identified and analyzed when passing through the operating system, and the target application is launched by using the target application parameter obtained from analysis.

FIG. 5-23 is a block diagram of another application interaction apparatus according to an example. On the basis of the apparatus example shown in FIG. 5-22, the target request acquiring module 4-42 may include:

a request receiving submodule 4-421, configured to receive a network request sent by the current application through the network connection;

a first target determining submodule 4-422, configured to determine, when the network request includes the preset jump instructing information, the network request as the target network request; and a second target determining submodule 4-423, configured to determine, when the network request includes the target application parameter, the network request as the target network request.

FIG. 5-24 is a block diagram of another application interaction apparatus according to an example. On the basis of the apparatus example shown in FIG. 5-22, the response module 4-43 may include:

a jump parameter determining submodule 4-431, configured to determine jump information parameter according to the target network request, where the jump information parameter include at least a target application parameter; and a response message generating submodule 4-432, configured to generate a target response message according to the jump information parameter, where the target response message includes the target application parameter and preset feature information.

FIG. 5-25 is a block diagram of another application interaction apparatus according to an example. On the basis of the apparatus example shown in FIG. 5-24, the jump parameter determining submodule 4-431 may include:

a parameter determining unit 4-4311, configured to determine the target application parameter according to the target network request.

a remaining parameter determining unit 4-4312, configured to determine a remaining jump information parameter according to the target application parameter, where the remaining jump information parameter includes preset feature information for identifying a target response message to be generated, and/or, the sending method of the target response message to be generated.

In an example of the present disclosure, the sending module 4-44 may be configured to send the target response message to the operating system of the user terminal according to the sending method of the target response message, when the remaining jump information parameter determined by the remaining parameter determining unit 4-4312 includes the sending method.

FIG. 5-26 is a block diagram of another application interaction apparatus according to an example. On the basis of the apparatus example shown in FIG. 5-25, the remaining parameter determining unit 4-4312 may include:

a security information searching subunit 4-4301, configured to search a preset list according to the target application parameter to acquire the target security classification information corresponding to the target application parameter, where the preset list includes a correspondence between application parameters and security classification information; and a remaining parameter determining subunit 4-4302, configured to determine the remaining jump information parameter according to the target security classification information.

FIG. 5-27 is a block diagram of another application interaction apparatus according to an example. On the basis of the apparatus example shown in FIG. 5-24, the jump parameter determining submodule 4-431 may include:

an analyzing unit 4-4313, configured to analyze the target network request to obtain request data, where the request data include preset jump instructing information; and a jump parameter determining unit 4-4314, configured to acquire the jump information parameter according to the preset jump instructing information.

In an example of the present disclosure, the jump parameter determining unit 4-4314 may be configured to search a preset jump response list according to the preset jump instructing information, and acquire the jump information parameter corresponding to the preset jump instructing information, where the preset jump response list includes a correspondence between preset jump instructing information and jump information parameters, and the preset jump instructing information at least includes parameter acquisition instructing information for acquiring the target application parameter.

In another example of the present disclosure, the preset jump instructing information acquired by the analyzing unit 4-4313 may include, in addition to the parameter acquisition instructing information, at least one kind of the following instructing information: feature loading instructing information and sending method instructing information. Correspondingly, FIG. 5-28 is a block diagram of another application interaction apparatus according to an example. On the basis of the apparatus example shown in FIG. 5-27, the jump parameter determining unit 4-4314 may include:

a first parameter determining subunit 4-431-1, configured to determine the target application parameter according to the parameter acquisition instructing information;

a second parameter determining subunit 4-431-2, configured to determine the preset feature information for identifying the target response message according to the feature loading instructing information; and a third parameter determining subunit 4-431-3, configured to determine a method of sending the target response message according to the sending method instructing information.

Correspondingly, in an example of the present disclosure, the sending module 4-44 may be configured to send the target response message to the operating system of the user terminal according to the sending method of the target response message determined by the third parameter determining subunit 4-431-3.

Correspondingly, in one aspect, examples of the present disclosure provide an application interaction apparatus, including a processor and a memory for storing processor-executable instructions, where the processor is configured to:

establish a network connection between a current application and a network server;

acquire, on the basis of the network connection, a target message passing through an operating system through a preset network interface, where the target message is for jumping to a target application;

extract a target application parameter from the target message, where the target application parameter includes at least an identifier of the target application; and launch the target application according to the target application parameter.

In another aspect, examples of the present disclosure provide an application interaction apparatus, including a processor and a memory for storing processor-executable instructions, where the processor is configured to:

establish a network connection with the current application;

acquire a target network request sent by the current application through the network connection;

generate a target response message according to the target network request, where the target response message is for jumping to a target application; and send the target response message to the user terminal running the current application, so that the target response message is identified and analyzed when passing through the operating system, and the target application is launched by using the target application parameter obtained from analysis.

In the foregoing examples 1 to 4, the type of the carrier that carries the target message is a network request.

Example 5

Examples of the present disclosure provide an application interaction method, which makes jump from a page of one application to another application available according to a clipboard message of a web page displayed on a current application through the operating system of the user terminal.

FIG. 6-1 is a flowchart of an application interaction method according to an example. The method may include steps 5-11 to 5-14.

At step 5-11, when a current application detects a preset triggering condition, a target message is stored to a clipboard.

The target message is for instructing a jump from a current application to a target application.

In an example of the present disclosure, the current application may be any of the various applications installed in a user terminal. For example, the current application may be of the first type application in the related art, or may also be of a different type, for example a new application, which is installed and downloaded without user's confirmation.

The preset triggering condition may be detecting that the user performing a preset operation in an interface of the current application, or the current application detecting that a preset process is started.

A browser is taken as an example of the current application. For the former triggering condition, for example, when the user selects content in a preset area in a web page of a browser and clicks the "copy" button to store the content to the clipboard, the current application may generate a target message for jumping to the target application according to the preset content, and invoke an interface of the clipboard to store the target message to the clipboard.

For the latter triggering condition, for example, when automatically detecting a preset process such as process A is started, the current application generates a target message according to the preset policy, and invokes the interface of the clipboard to store the target message to the clipboard.

At step 5-12, the target message is acquired by a preset clipboard monitoring service.

In an example of the present disclosure, the clipboard monitoring service is set in an operating system of a user terminal running the current application, and the process of writing a message to the clipboard may be monitored by the clipboard monitoring service during or after the process.

Depending on different locations where the preset clipboard monitoring service is set, the preset clipboard monitoring service may acquire the target message in at least the following two cases.

In the first case, the clipboard monitoring service is set in application interface layer of the operating system, for example, in the clipboard interface. Specifically, it can be a clipboard interface with a Hook function, which may be represented as a Hooked clipboard interface. In this case, the above step 5-12 may be specifically: when the clipboard interface is invoked to write the target message to the clipboard, the target message is acquired by the preset clipboard monitoring service.

The executing entity of invoking the clipboard interface may be the current application, or a second application that the current application is started under a preset condition. In the latter case, it is assumed that the current application is instant messaging client software such as MiTalk. When the user clicks on a certain network link in the MiTalk interface, the browser (i.e. the second application) is opened, and the browser executes the preset JS script. The JS script generates a target message for jumping to the target application and invokes the clipboard interface to write the above target message to the clipboard of the operating system.

When the JS script invokes the clipboard interface to write the target message to the clipboard, since the clipboard is to an underlying-layer storage module of the operating system, the target message must be written through application layer interfaces of the operating system. In an example of the present disclosure, any message written to the clipboard can be monitored by a preset clipboard monitoring service set in the application interface layer of the operating system. Therefore, the process of the target message being written to the clipboard can also be monitored by a preset clipboard monitoring service set in the application interface layer.

In the second case, the clipboard monitoring service is set in the underlying layer of the operating system, and then step 5-12 may be specifically: after the target message is written to the clipboard, the target message is acquired by the preset clipboard monitoring service.

In an example of the present disclosure, the preset clipboard monitoring service may be set at the underlying layer of the system, and the preset clipboard monitoring service may read the message that has been written into the clipboard. In other words, the second case is different from the first case in that the preset clipboard monitoring service can read and recognize the target message after the target message is stored in the clipboard.

FIG. 6-2 is a flowchart of another application interaction method according to an example. Step 5-12 may include steps 5-121 to 5-123.

At step 5-121, the clipboard message is acquired by a preset clipboard monitoring service.

In an example of the present disclosure, the clipboard message may be a message that is being written to the clipboard through the clipboard interface, or a message that has been stored in the clipboard.

Corresponding to the first case, step 5-121 may be specifically: monitoring a message passing through the clipboard interface by using a preset clipboard monitoring service.

Corresponding to the second case, step 5-121 may be specifically: reading all the messages written in the clipboard by using a preset clipboard monitoring service.

At step 5-122, it is determined whether the clipboard message includes the preset feature information.

In an example of the present disclosure, the target message may include preset feature information and a target application parameter.

The preset feature information is for determining whether a message contains a target application parameter, which may be a preset keyword, a preset encoding method, or the like. The preset feature information may be provided by provider of the target application and embedded in the user terminal in advance.

The target application parameter includes at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

The target message that requests a jump from the current application to the target application is generated as follows: in generating the target message according to a preset policy, the current application may add a preset keyword so as to label the message as a jump requesting message, or, encode all or part of the message data (for example, the target application parameter) using a preset encoding method, so as to acquire a message encoded in the preset encoding method. Both of the preset keyword and the preset encoding method belong to the preset feature information for identifying the target message.

Correspondingly, the preset clipboard monitoring service may determine, according to the preset feature information, whether the acquired message belongs to the target message. It is assumed that the preset feature information is a preset keyword, which may be a preset tag, a preset string (such as "abc000") and the like. After acquiring the message, the clipboard monitoring service may determine whether the message includes the preset keyword. If it does, step 5-123 is performed. If it does not, the message is determined as an invalid message.

At step 5-123, if the message includes the preset feature information, it is that the message is the target message.

In an example of the present disclosure, if the message acquired by the clipboard monitoring service includes a preset keyword, such as "abc000", it may be decided that the message may include the target application parameter, and the message is a valid message that can be used to launch the target application, i.e., the target message.

At step 5-13, a target application parameter is extracted from the target message, where the target application parameter includes at least an identifier of the target application.

After identifying the target message according to the preset feature information, the preset clipboard monitoring service may analyze the target message and extract the target application parameter.

FIG. 6-3 is a flowchart of another application interaction method according to an example. Step 5-13 may include steps 5-1301 to 5-1302.

At step 5-1301, the preset feature information is removed from the target message, to obtain a filtered target message.

In an example of the present disclosure, if the preset feature information is an additional preset feature code, then in subsequent process of extracting the target application parameter, the preset feature information is redundant information. Therefore, the preset feature information may be removed before the target application parameter is extracted, so as to acquire a filtered target message.

At step-1302, the target application parameter is extracted from the filtered target message.

Subsequently, the target application parameter may be extracted from the target message by analyzing the filtered target message, thereby improving the efficiency of extracting the target application parameter.

In an example of the present disclosure, after acquiring the target message or the filtered target message, the preset clipboard monitoring server may extract the target application parameter in the following methods.

In the first method, the target application parameter is extracted from the target message through the preset clipboard monitoring service.

After identifying the target message, the perset clipboard monitoring service may analyze the message, and then extract the target application parameter from the message obtained from analysis according to a preset policy, such as a preset key field APP ID. For example, it is assumed that the analyzed message is: \*\*\*\*\*\*\*APP ID=efg\*\*\*\*\*\*\*\*. Therefore, the preset clipboard monitoring service can extract the identifier ("efg") of the target application from the message obtained from analysis according to the key field APP ID.

In the second method, the target application parameter is extracted from the target message through a preset Message service.

In an example of the present disclosure, after identifying the target message, a preset clipboard monitoring service may send the target message to a preset Message service for analyzing. In this way, the identification process is decoupled from the analyzing process, or in other words, the preset clipboard monitoring service serves only to identify the target message but not to analyze the target message, thereby improving detection efficiency of the target message by the preset clipboard monitoring service.

FIG. 6-4 is a flowchart of another application interaction method according to an example. Step 5-13 may include steps 5-131 to 5-132.

At step 5-131, the target message is sent to the preset Message service.

In an example of the present disclosure, the preset clipboard monitoring service may send the original target message or the filtered target message to the preset Message service.

In the present disclosure, the target message may be sent to the Message service in the following methods.

In the first method, the target message is intercepted and sent the intercepted target message to the preset Message service.

In an example of the present disclosure, when the target message does not need to be written to the clipboard, or the message stored in the clipboard does not need to be read and rewritten elsewhere subsequently, the first method applies.

Corresponding to the first case, the preset clipboard monitoring service may intercept the target message passing through the clipboard interface, and send the intercepted target message to the preset Message service.

Corresponding to the second case, the preset clipboard monitoring service may perform an erasing-reading on the target message that has been written to the clipboard, or in other words, the preset clipboard monitoring service may first read the target message from the clipboard and then erase the target message, so as to release storage space of the clipboard.

In the second method, a copy of the target message is made and sent to the coped target message to the preset Message service.

In an example of the present disclosure, when the target message needs to be written to the clipboard, or the message stored in the clipboard needs to be read and rewritten elsewhere, the second method applies.

The target message may be copied, and sent to the preset Message service for extraction of the target parameter. The original target message will be processed as usual without being affected in this method.

In other words, corresponding to the first case, the preset clipboard monitoring service may make a copy of the target message passing through the clipboard interface, and send the copied target message to the Message service; the original target message will still be written to the clipboard by the clipboard interface without being affected.

Corresponding to the second case, the preset clipboard monitoring service may read the target message from the clipboard without affecting the storing of the target message in the clipboard, or in other words, the operating system can also invoke other interfaces to read the target message from the clipboard and write the target message to other locations, such as a dialog box of another application.

It should be noted that when the target application parameter is extracted by the preset clipboard monitoring service, the target message can also be acquired by using the above two methods.

At step 5-132, the target application parameter is extracted from the target message through the preset Message service.

Corresponding to the first method, step 5-132 may be specifically: the target application parameter is extracted from the intercepted target message through the preset Message service.

Corresponding to the second method, step 5-132 may be specifically: the target application parameter is extracted from the copied target message through the preset Message service.

In an example of the present disclosure, the target application parameter may be quickly extracted from the target message data obtained from analysis through the preset Message service.

In addition, the Message service may record the target application parameter in a unified format (for example, a string of a fixed length), so that the target application parameter in the preset format are acquired.

The Message service outputs the target application parameter in a unified format, which can facilitate a subsequent application platform to launch the target application according to the parameter, thereby improving the efficiency in launching the application.

In another example of the present disclosure, before the target application parameters are extracted by the preset clipboard monitoring service or the Message service, information verification may also be first performed on the target message.

Below is an explanation with the Message service extracting the target application parameter as an example. FIG. 6-5 is a flowchart of another application interaction method according to an example. Step 5-132 may include steps 5-1321 to 5-1322.

At step 5-1321, information verification is performed on the target network request.

In an example of the present disclosure, it should be noted that a clipboard message that does not include a target application parameter may also include the preset feature information, for example a preset keyword. In other words, the target message determined preliminarily by the clipboard monitoring service through the preset feature information does not necessarily include the target application parameter.

After receiving the target message, the Message service may further perform information verification on the target message according to a preset policy. For example, the Message service may determine whether the message data obtained from analysis includes a preset field (such as a field "APP ID:"), and decide that the target message passes the information verification and is a valid message when it does.

Alternatively, if the target message is acquired after encoding the target application parameter in a preset encoding method, the Message service may further decode the target message by using a preset decoding method and then verify it. The preset encoding and decoding methods are provided by the provider of the target application and are set in the Message service.

If the Message service successfully decodes the target message by using the preset decoding method, then the target message is a valid message.

At step 5-1322, if the target message passes the information verification, the target application parameter is extracted from the target message.

In an example of the present disclosure, to ensure the target message is accurately determined and to reduce the size of data to be analyzed subsequently, after receiving the message, the Message service built in the user terminal may first perform information verification on the target message before analyzing the target application parameter. In this way, it is guaranteed that the target message to be subsequently analyzed includes a target application parameter.

At step 5-14, the target application is launched according to the target application parameter.

In an example of the present disclosure, after acquiring the target application parameter, the preset clipboard monitoring service or the preset Message service may send the target application parameter to a preset application platform so as to launch the target application.

For the specific implementation of the preset application platform launching the target application according to the target application parameter, reference can be made to the description of step 13 above, and details are not described herein again.

FIG. 6-6 is a schematic diagram of an application interaction scenario according to an example. When the user copies a string related to a page of the target application (e.g., a string of characters in the description of Zhihu Daily) in a browser page 1001 of a smart phone 100, the browser page may execute a JS script in the background. The JS script may generate a target message according to the target application parameter and the preset feature information, for example, the JS script puts together the identifier of the target application, the parameter of the detail page, etc., and the preset feature information into a specific string. Then, the JS script invokes the clipboard interface to write the target message to the clipboard. The clipboard monitoring service may identify the target message during or after the target message is written to the clipboard. Then, the target message may be sent to the Message service for extracting the target application parameter. After that, the Message service sends the acquired target application parameter to a preset application platform (i.e., the target application platform). Finally, the preset application platform opens a detail page of the application Zhihu (e.g., detail page 1002 of Zhihu Daily) according to the target application parameter, and presents the detail page to the user.

In the related art, if the user copies a string of characters related to a page of the target application in a browser page 1001, the browser only calls the clipboard interface in the operating system, and writes the selected string of characters to the clipboard, so that other interfaces may read the string of characters and paste them in other specified locations.

It can be seen that, by using the application interaction method provided by the present disclosure, when the user tries to trigger a jump from the current application to another target application, the preset clipboard monitoring service of the operating system can identify the target message which contains the target application parameter, and send the target message to the preset Message service directly or indirectly to extract the target application parameter. After that, the target application is launched for the user with the target application parameter. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, after the user triggers a performance corresponding to the preset triggering condition in an interface of the current application, the user terminal can directly and accurately jump to the page of the target application without intervening other human-computer interaction. In this way, the process of interaction between the user and the terminal can be simplified and time can be saved, and user experience of the terminal device is further improved.

Correspondingly to the foregoing examples of methods to implement the application methods, the present disclosure also provides examples of apparatuses to implement the application methods and corresponding terminals.

FIG. 6-7 is a block diagram of an application interaction apparatus according to an example. The apparatus may include:

a clipboard message generating module 5-21, configured to store a target message to the clipboard when a current application detects a preset triggering condition, where the target message is for jumping to a target application;

a target message acquiring module 5-22, configured to acquire the target message by a preset clipboard monitoring service;

a parameter extracting module 5-23, configured to extract a target application parameter from the target message, where the target application parameter includes at least an identifier of the target application; and an application jumping module 5-24, configured to launch the target application according to the target application parameter.

FIG. 6-8 is a block diagram of another application interaction apparatus according to an example. On the basis of the apparatus example shown in FIG. 6-7, the target message acquiring module 5-22 may include:

a first target acquiring submodule 5-221, configured to acquire the target message by the preset clipboard monitoring service when invoking the clipboard interface to write the target message to the clipboard; or, a second target acquiring module 5-222, configured to acquire the target message by the preset clipboard monitoring service after the target message is written into the clipboard.

In an apparatus example of the present disclosure, the target message includes preset feature information and the target application parameter.

Correspondingly, FIG. 6-9 is a block diagram of another application interaction apparatus according to an example. On the basis of the apparatus example shown in FIG. 6-7, the target message acquiring module 5-22 may include:

a monitoring submodule 5-22-1, configured to acquire the clipboard message by a preset clipboard monitoring service;

a detecting submodule 5-22-2, configured to determine whether the clipboard message includes the preset feature information; and a target message determining submodule 5-22-3, configured to determine the clipboard message as the target message when the clipboard message includes the preset feature information.

FIG. 6-10 is a block diagram of another application interaction apparatus according to an example. On the basis of the apparatus example shown in FIG. 6-7, the parameter extracting module 5-23 may include:

a filtering submodule 5-231, configured to remove the preset feature information from the target message, to acquire a filtered target message; and a first parameter extracting submodule 5-232, configured to extract the target application parameter from the filtered target message.

FIG. 6-11 is a block diagram of another application interaction apparatus according to an example. On the basis of the apparatus example shown in FIG. 6-10, the first parameter extracting submodule 5-232 may include:

a first extracting unit 5-2321, configured to extract the target application parameter through the preset clipboard monitoring service; or a second extracting unit 5-2322, configured to extract the target application parameter through the preset Message service.

In an example of the present disclosure, the second extracting unit 5-2322 may output the target application parameters in a unified preset format.

FIG. 6-12 is a block diagram of another application interaction apparatus according to an example. On the basis of the apparatus example shown in FIG. 6-7, the parameter extracting module 5-23 may include:

an information verifying unit 5-23-1, configured to perform information verification on the target message; and a second parameter extracting submodule 5-23-2, configured to extract the target application parameter from the target message when the target message passes the information verification.

FIG. 6-13 is a block diagram of another application interaction apparatus according to an example. On the basis of the apparatus example shown in FIG. 6-11, the second extracting unit 5-2322 may include:

a first sending subunit 5-2301, configured to intercept the target message, and send the intercepted target message to the preset Message service; or a second sending subunit 5-2302, configured to make a copy of the target message, and send the copy of the target message to the preset Message service; and an extracting subunit 5-2303, configured to extract the target application parameter from the target message by the preset Message service.

FIG. 6-14 is a block diagram of another application interaction apparatus according to an example. On the basis of the apparatus example shown in FIG. 6-7, the application jumping module 5-24 may include:

a detecting submodule 5-241, configured to determine, according to the identifier of the target application, whether the target application has been installed locally;

an installing submodule 5-242, configured to download and install, when the target application has not been installed locally, the target application; and a jumping submodule 5-243, configured to launch the target application according to the target application parameter through a preset application platform.

Correspondingly, in one aspect, examples of the present disclosure provide an application interaction apparatus, including a processor and a memory for storing processor-executable instructions, where the processor is configured to:

store a target message to the clipboard when a current application detects a preset triggering condition, where the target message is for jumping to a target application;

acquire the target message by a preset clipboard monitoring service;

extract a target application parameter from the target message, where the target application parameter includes at least an identifier of the target application; and launch the target application according to the target application parameter.

Example 6

Examples of the present disclosure provide an application interaction method, which will be explained with an image format file as an example of the carrier of the target message. FIG. 7-1 is a flowchart of an application interaction method according to an example. The method may include steps 6-101 to 6-104.

At step 6-101, a triggering operation is detected, where the triggering operation is for triggering a jump to the target application.

At step 6-102, a target image generated by the network server or the user terminal is output according to the triggering operation, where the target image is for carrying a jump request, the jump request includes a target application parameter, and the target application parameter includes at least an identifier of the target application.

At step 6-103, the target application parameter is extracted from the target image.

At step 6-104, the target application is launched according to the target application parameter.

In the above example, after determining that the triggering operation is detected, the user terminal may output the target image according to the triggering operation, where the triggering operation is for jumping to the target application, the target image carries a jump request, and the jump request includes a target application parameter. Further, the user terminal may extract the target application parameter from the target image, and launch the target application according to the target application parameter. Through the above process, jump between applications is made available by extracting target application parameter from the output target image. In this way, the function of the operating system can be enhanced, so that the interaction between the applications is not restricted by whether an application supports the DeepLink technology, thus improving user experience at the user terminal.

For step 6-101, optionally, the user terminal may determine that the target network request is detected in any of the following cases.

In the first case, the application platform determines that a trigger operation is detected on the preset virtual button for launching the target application, for example, as shown in FIG. 7-2A, and then it is determined that a jump to the target application is triggered.

The application platform may be a platform for launching the target application, including but not limited to the platforms described below.

Optionally, the application platform may be a platform directly installed in an operating system, and the operating system may be Android, IOS, and the like; alternatively, the application platform may be a certain application, such as WeChat, Alipay, QQ, and the like. For example, as shown in FIG. 7-2B, the user can launch the target application through the application platform. Alternatively the application platform may also be a browser.

In the second case, the application platform determines that a trigger operation on a preset display element for launching the target application is detected, and then it is determined that a network request for jumping to the target application is triggered to be generated. The network request that is generated may carry a URL address corresponding to the target application, so that the network server or the user terminal may generate a target image according to the URL address, and the user terminal may extract the target application parameter carried in the target image according to the output target image, Optionally, the preset display element may be a URL address, such as shown in FIG. 7-2C. Or the preset display element may be an image link, either provided in a browser, as shown in FIG. 7-2D, or provided in an application, as shown in FIG. 7-2E.

For the above step 6-102, the target image output by the user terminal may be generated by the network server or the user terminal itself.

When the target image is generated by the network server, optionally, reference can be made to FIG. 7-3. FIG. 7-3 shows another application interaction method on the basis of the example shown in FIG. 7-1. Step 6-102 may include steps 6-102-11 to 6-102-14.

At step 6-102-11, a network request is generated according to the triggering operation, where the network request is for requesting a jump to the target application, and the network request carries association information corresponding to the target application.

At this step, the user terminal may generate a network request after determining that the triggering operation is detected according to the related art, where the network request is for requesting a jump to the target application. The network request carries association information corresponding to the target application.

In an example of the present disclosure, optionally, the association information may include: a uniform resource locator (URL) address of the target application, or jump instructing information. The preset jump instructing information may include parameter acquisition instructing information, used for acquiring the target application parameter.

At step 6-102-12, through a network connection established in advance with the network server, the network request is sent to the network server.

At this step, the user terminal may establish a network connection with the network server in advance through a related technology such as three handshakes. Further, the generated network request is sent to the network server through the network connection.

The network server may determine a target pixel value corresponding to the association information currently sent to the network server according to a correspondence between preset association information and pixel values. Further, the target image may be generated according to the target pixel value. Alternatively, the network server may search for a target image including the target pixel in the pre-generated images after determining the target pixel value according to the association information, where the pixel value of the target pixel is the target pixel value.

The target image finally acquired by the network server carries a jump request, and the jump request includes a target application parameter.

At step 6-102-13, the target image pushed by the network server is received.

At this step, after generating the target image, the network server may push the target image to the user terminal according to the acquisition request, and the user terminal may directly receive the target image.

At step 6-102-14, the target image generated by the network server is output.

At this step, the application platform may output the target image by invoking a display component module in the operating system that is responsible for displaying on the screen, and the output target image may completely cover the screen, as shown in FIG. 7-4A, or partially cover the screen and the covered location is not fixed, shown in FIG. 7-4B or FIG. 7-4C.

When the target image is generated by the user terminal itself, optionally, reference can be made to FIG. 7-5. FIG. 7-5 shows another application interaction method on the basis of the example shown in FIG. 7-1. Step 6-102 may include steps 6-102-21 to 6-102-23.

At step 6-102-21, the target pixel value is determined according to the association information corresponding to the target application by using a JS script associated with the triggering operation.

At this step, optionally, the association information may include: a uniform resource locator (URL) address of the target application, or jump instructing information, where the jump instructing information include at least parameter acquisition instructing information for acquiring the target application parameter.

If the association information includes a URL address, the user terminal may directly convert the target character included in the URL address into a target pixel value according to Table 13 by using, but not limited to, a JS script associated with the triggering operation.

TABLE 13

| Character | Pixel value |
| --- | --- |
| a | 0, 0, 0, 125, 124, 0 |
| A | 120, 120, 120, 250, 250, 0 |
| / | 250, 250, 250, 100, 100, 180 |
| ... | ... |

Alternatively, the user terminal may first convert the target character into a target pixel difference value according to Table 14, and then determines the target pixel value according to the target pixel difference value.

TABLE 14

| Character | Pixel difference value |
| --- | --- |
| a | 0, 0, 0, 1, 2 |
| A | 1, 2, 3, 4, 5 |
| / | 2, 2, 2, 3, 6 |
| ... | ... |

The user terminal may determine, according to Table 14, a plurality of target pixel difference values corresponding to the target character, which is included in the URL address corresponding to the target application. Further, a difference between target pixel values corresponding to two pixels whose relative positions satisfy a preset positional requirement may be acquired as the target pixel difference value, so as to acquire the target pixel value. The preset positional requirement may include being spaced by a preset number of pixels, where the preset number may be 0, 1, 2, or the like.

For example, if the pixel difference value of the target pixel corresponding to the target character "a" is "0, 0, 0, 1, 2", then the target pixel values that may be generated are, sequentially, "255, 255, 255, 255, 254, 252".

If the association information includes the jump instructing information, the user terminal may also acquire, according to a pre-stored correspondence between parameter acquisition instructing information and application parameters, the target application parameter corresponding to the parameter acquisition instructing information.

For example, the jump instructing information includes parameter acquisition instructing information A. The user terminal may acquire the target application parameter APP ID 1 corresponding to the parameter acquisition instructing information according to table 15.

TABLE 15

| Jump instructing information | Application parameter |
| --- | --- |
| A | APP ID 1 |
| B | APP ID 2 |
| C | APP ID 3 |
| ... | ... |

Further, the user terminal may acquire the target pixel value corresponding to the target application parameter according to a pre-stored correspondence between application parameters and pixel values, for example, as shown in table 16.

TABLE 16

| Application parameter | Pixel value |
| --- | --- |
| APP ID 1 | 0, 255, 255, 0 ... |
| APP ID 2 | 255, 255, 255, 255 ... |
| APP ID 3 | 0, 0, 0, 255 ... |
| ... | ... |

Alternatively, the user terminal may acquire the target pixel difference value corresponding to the target application parameter according to a pre-stored correspondence between application parameters and pixel difference values, for example, as shown in table 17.

TABLE 17

| Application parameter | Pixel difference value |
|---|---|
| APP ID 1 | 1, 1, 1 . . . |
| APP ID 2 | 2, 0, 0 . . . |
| APP ID 3 | 5, 6, 7 . . . |
| . . . | . . . |

Further, the user terminal may determine a difference between target pixel values corresponding to two pixels whose relative positions satisfy a preset positional requirement, as the target pixel difference value, so as to determine the target pixel value. The preset positional requirement may include being spaced by a preset number of pixels, where the preset number may be 0, 1, 2, or the like.

At step 6-102-22, a drawing application programming interface (API) is invoked to generate a target image corresponding to the target pixel value.

At this step, after all the target pixel values are determined and a target pixel value array is acquired, the target pixel values may be used as pixel values corresponding to the pixels in the target image so as to generate a target image. When generating the target image, the application platform may invoke the canvas tag in the JS script through the browser, so that the canvas label may invoke the drawing API in the operating system to finally generate the target image.

At step 6-102-23, the target image generated by the user terminal is output.

At this step, the application platform may output the target image by invoking a display component module in the operating system that is responsible for displaying on the screen, and the output target image may completely cover the screen, as shown in FIG. 7-4A, or partially cover the screen and the covered location is not fixed, shown in FIG. 7-4B or FIG. 7-4C.

In an example of the present disclosure, optionally, a preset image may also be provided, and all pixel values corresponding to the preset image constitute a pixel value array. After finally converting the association information into target pixel values in the above manner, the application platform may replace a plurality of pixel values at preset positions in the pixel value array with the target pixel values one by one, so that a target pixel value array is acquired.

For example, the pixel value array includes {255, 255, 255, 160, 124, 124, 0, 0 . . . }, and the application platform can replace a plurality of pixel values at starting positions in the pixel value array with the target pixel values one by one. It is assumed that the plurality of target pixel values are 254, 250, 254, 250, 254, respectively, and then the pixel values at the first 5 positions 255, 255, 255, 160, 124 can be replaced with 254, 250, 254, 250, 254, one by one. The target pixel value array finally acquired is {254, 250, 254, 250, 254, 0, 0 . . . }.

In an example of the present disclosure, if it is necessary to replace the plurality of pixel values in the pixel value array with the target pixel values, then after determining the target pixel difference values according to table 14, preferably, the acquired target pixel values may be as close to the original pixel values as possible.

For example, the pixel value array is {125, 125, 125, 125, 125, 124, 0, 0 . . . }. If the pixel difference values between the first 5 pixels are 1, 2, 3, 4, then there would be many possibilities for the acquired target pixel value array, for example, {125, 126, 128, 131, 125, 124, 0, 0 . . . }, {0, 1, 3, 6, 10, 124, 0, 0 . . . }, or {200, 201, 203, 206, 210, 124, 0, 0 . . . }.

In an example of the present disclosure, preferably, the array of {125, 126, 128, 131, 125, 124, 0, 0 . . . } may be used as the final target pixel value array.

By taking all pixel values in the target pixel value array as the target pixel values of the target image, and by invoking the canvas tag in the JS script through the browse so as to invoke the drawing API in the operating system, the target image is finally generated.

For step 6-103, reference can be made to FIG. 7-6. FIG. 7-6 shows another application interaction method on the basis of the example shown in FIG. 7-1. Step 6-103 may include steps 6-103-1 to 6-103-5.

At step 6-103-1, a pixel scan is performed on the current screen image including the target image, to obtain pixel values corresponding to pixels of each row of the target image.

At this step, the application platform may invoke the display component module, and in the process of converting the output current screen image including the target image by the image video memory, for example, converting from back buffer to front buffer, a row-by-row pixel scan on the current screen image including the target image is performed.

The back buffer and the front buffer are both parts of the video memory, with the front buffer used for display and the back buffer used for backup. The video card uses the front buffer to store the frame currently being displayed, while the next frame is stored in the back buffer to be displayed later. Then the video card swaps the two buffers, so that the frame stored in the back buffer is displayed, and the next frame is stored in the front buffer prepared for display, thereby forming a complementary operation manner, which can quickly respond to graphic changes.

In an example of the present disclosure, in the process of converting the output current screen image by the video memory, a row-by-row pixel scan may be performed on the current screen image, so as to acquire pixel values corresponding to pixels of every row in the current screen image.

It should be noted that, regardless of whether the target image completely covers the screen of the user terminal, since the specific position of the target image on the current screen cannot be determined, the display component module may scan the entire current screen image when performing pixel scan.

At step 6-103-2, pixel values corresponding to pixels of each row are converted into values in a number sequence one by one.

At this step, pixel values corresponding to pixels of each row can be converted into values in a number sequence one by one by using any one of the following methods.

In the first method, pixel values corresponding to pixels of each row are directly taken as values constituting the number sequence.

A display component module at the underlying layer of the system may directly take pixel values corresponding to pixels of each row as values in the number sequence.

For example, if there are 100 pixels in a row, the number sequence includes pixel values corresponding to the 100 pixels.

In the second method, pixel difference values between two pixels whose relative positions satisfy a preset positional requirement are taken as values constituting the number sequence.

The display component module at the underlying layer of the system may calculate a pixel difference value corresponding to two pixels whose relative positions satisfy a preset positional requirement, and use the pixel difference value as a value in the number sequence.

For example, if there are 100 pixels in a row, the number sequence includes pixel difference values between every two pixels of the 100 pixels. In an example of the present disclosure, the pixel difference value may be an absolute value of the pixel difference value. For example, the preset positional requirement is an interval of 0 pixels, i.e., the two pixels are adjacent. When two adjacent pixel values are 100 and 105, the absolute value of the pixel difference value is 5. When two adjacent pixel values are 200 and 199, the absolute value of the pixel difference value is 1.

At step 6-103-3, a preamble in the number sequence is searched for, where the preamble is for identifying a starting position of a target feature sequence corresponding to the target application parameter.

At this step, the display component module may search in the number sequence for a series of values that exactly matches values included in a target array. If there is a series of values in the number sequence that matches the values included in the target array, then the series of values in the number sequence that matches the values included in the target array is taken as the preamble. Optionally, the target array may be composed of a first preset number of preset values. For example, if the target array is {1, 2, 3, 4}, then the display module component can search in the number sequence for a series of values that matches the values included in the target array. If the current number sequence is {0, 1, 1, 2, 3, 4, 5, 0, . . . }, then {1, 2, 3, 4} is used as the preamble.

If the current number sequence does not include a series of values that matches the values included in the target array, then a number sequence corresponding to the next row of pixels will be searched until the preamble is found or all of the images have been scanned.

At step 6-103-4, according to the preamble, the number sequence is searched for the target feature sequence.

At this step, the display component module may use the first value immediately after the preamble in the number sequence as the starting position of the target feature sequence, and further, excerpt a second preset number of values in the number sequence starting from the starting position, to obtain the target feature sequence.

For example, it is assumed that the number sequence is {0, 1, 1, 2, 3, 4, 0, 0, 2, 6, 5, 4 . . . }, the preamble has been determined as {1, 2, 3, 4}, and the second preset number is 4. The target feature sequence excerpted from the number sequence is {0, 0, 2, 6}.

At step 6-103-5, the target application parameter is determined according to the target feature sequence.

At this step, the display component module may directly determine the target application parameter corresponding to the target feature sequence according to a correspondence between pre-stored feature sequences and application parameters.

Optionally, the target application parameter may include at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

For example, the application parameter is the identifier of the application, i.e., the APP ID. The correspondence between feature sequences and application parameters is as shown in table 18.

TABLE 18

| Feature sequence | Application parameter |
| --- | --- |
| 1, 2, 3, 4 | APP ID 1 |
| 2, 3, 4, 5 | APP ID 2 |
| 5, 6, 7, 1 | APP ID 3 |
| 0, 0, 2, 6 | APP ID 4 |
| . . . | . . . |

If the target feature sequence is {0, 0, 2, 6}, the display component module may determine the target application parameter as APP ID 4 according to table 18.

In an example, optionally, to ensure the accuracy of the extracted target feature parameter, reference can be made to FIG. 7-7. FIG. 7-7 shows another application interaction method on the basis of the example shown in FIG. 7-6. The application interaction method may further include steps 6-105 to 6-106.

At step 6-105, a preset third number of values are excerpted starting from the first value immediately after the target feature sequence, to obtain a verification sequence.

At this step, a preset third number of values may be excerpted starting from the first value immediately after the target feature sequence, to obtain a verification sequence.

For example, it is assumed that the number sequence is {0, 1, 1, 2, 3, 4, 0, 0, 2, 6, 5, 4 . . . }, the preamble has been determined as {1, 2, 3, 4}, and the target feature sequence is {0, 0, 2, 6}. The third preset number is 2, and the verification sequence is {5, 4}.

At step 6-106, the target feature sequence is verified by the verification sequence, to obtain a verification result.

In an example of the present disclosure, optionally, all values of the verification sequence and of the target feature sequence may be calculated according to a preset calculation method, to obtain a target value. The preset calculation method may include, but is not limited to, calculating a sum, calculating a difference and the like. If the target value resulted from the calculation is identical with the preset value, it may be determined that the verification result is passing the verification, otherwise the verification result is failing the verification.

Calculating a sum is taken as an example of the preset calculation method. All values included in the verification sequence and all values included in the target feature sequence are summed, for example, summing up all values of the target feature sequence {0, 0, 2, 6} and of the verification sequence {5, 4}, and the sum is 0+0+2+6+5+4=17.

If the sum is identical with a preset sum, it is determined that the verification result is passing the verification, otherwise the verification result is failing the verification.

If the preset sum is 17, which is identical with the calculated sum, then the verification result is passing the verification. If the preset sum is 18, the verification result is determined as failing the verification.

In an example of the present disclosure, it proceeds to step 6-104 when the verification result is passing the verification.

Through the above process, a further verification is performed on the excepted target feature sequence by using the verification sequence. In this way, it can avoid cases where a preamble is excerpted from an image not including the target application parameter so that a target feature sequence is mistakenly extracted, thereby ensuring the accuracy of the extracted target feature sequence.

For step 6-104, after extracting the target application parameter, the user terminal may launch the target application according to the target application parameter based on the jump request carried in the target image.

In an example of the present disclosure, the target application may be an application whose installation needs to be manually triggered by the user in related art, or a new application. The difference between the new application and the application in related art is that the new application is installed in the background of the user terminal.

In other words, after being acquired by the user terminal, a compressed package of the new application may be automatically installed or updated in the background, with both its installation process and update process not visible to the user in the foreground.

If the target application belongs to the application in related art, and the target application is installed in the user terminal, step 6-104 may be implemented specifically as follows.

According to the identifier of the target application in the target application parameter, the operating system launches the target application, opening, for example, a home page, a login page or a registration page of the target application.

In the case where the target application parameter further includes other information, the launched target application may also perform corresponding operation according to such information, such as opening an inner page in the target application (e.g., a detail page of a sales item in an e-commerce platform); playing an audio file, a video file, etc. in a preset interface; or popping up a preset dialog box.

If the target application is not installed in the user terminal, an application store or the like may be launched so as to prompt the user to download and install the target application; otherwise, the target message may be discarded.

If the target application is an application which is installed in the background, i.e., a new application, for the specific implementation of the operating system launching the target new application according to the target application parameter, reference can be made to the description of step 13 above concerning the new application platform launching a target new application, and details are not described herein again. In an example of the present disclosure, after the user terminal detects the triggering operation for jumping to the target application, an image for carrying a jump request, i.e., the target image, may be generated by the network server or the user terminal, where the jump request includes the target application parameter. Further, by extracting target application parameter from the target image to launch the target application, jump between applications is made available. In this way, function of the operating system is enhanced, so that the interaction between the applications is not restricted by whether an application supports the DeepLink technology, thus improving user experience at the user terminal.

FIG. 7-8 is a flowchart of another application interaction method according to an example. The method is applied in a network server, which may include steps 6-201 to 6-204.

At step 6-201, a network request sent by a user terminal is received, where the network request is used to request a jump to the target application, and the network request carries association information corresponding to the target application.

At step 6-202, the target image is acquired according to the association information, where the target image is for carrying a jump request, the jump request includes a target application parameter, and the target application parameter includes at least an identifier of the target application.

At step 6-203, the target image is push to the user terminal, so that after outputting the target image, the user terminal may launch the target application according to the target application parameter extracted from the target image.

In the above example, the server may acquire the target image according to the association information carried in the network request sent by the user terminal, where the target image is for carrying a jump request, the jump request includes a target application parameter, and the target application parameter includes at least an identifier of the target application. Further, the server may push the target image to the user terminal, so that the user terminal may launch the target application according to the target application parameter extracted from the target image. Through the above process, a target image carrying the jump request may be generated by the network server, so that the user terminal may extract the target application parameter from the target image to perform a jump between applications.

For step 6-201, after detecting the triggering operation for jumping to the target application, the user terminal may generate a network request, where the network request is for requesting a jump to the target application, and the network request carries association information corresponding to the target application. Through a network connection established in advance with the network server, the network request may be sent by the user terminal to the network server, and directly received by the server.

For step 6-202, the server may acquire a target pixel value corresponding to the association information and carried in the network request according to a correspondence between association information and pixel values.

The association information may include: a uniform resource locator (URL) address of the target application, or jump instructing information. The preset jump instructing information may include parameter acquisition instructing information, used for acquiring the target application parameter.

When the target pixel value corresponding to the association information carried in the network request is acquired according to the correspondence between association information and pixel values, if the association information includes a URL address, the server may convert the target characters included in the URL address into target pixel values according to a pre-stored correspondence between characters and pixel values.

Optionally, the target characters may be directly converted into corresponding target pixel values according to the correspondence shown in table 13. The target characters may be converted into corresponding target pixel difference values according to the correspondence shown in table 14. Further, a difference between target pixel values corresponding to two pixels whose relative positions satisfy a preset positional requirement may be acquired as the target pixel difference value, so as to acquire the target pixel values. The preset positional requirement may include being spaced by a preset number of pixels, where the preset number may be 0, 1, 2, or the like.

If the association information carried in the network request includes the jump instructing information, the server may also acquire, according to a pre-stored correspondence between parameter acquisition instructing information and application parameters, the target application parameter corresponding to the parameter acquisition instructing information.

For example, the association information carried in the network request sent by the user terminal and received by the server includes jump instructing information, and the jump instructing information includes parameter acquisition instructing information A. The server may acquire the target application parameter APP ID 1 corresponding to the parameter acquisition instructing information according to table 15.

Further, the server may acquire the target pixel value corresponding to the target application parameter according to a pre-stored correspondence between application parameters and pixel values, for example, as shown in table 16.

Alternatively, after acquiring the target application parameter, the server may acquire the target pixel difference value corresponding to the target application parameter according to table 17. Further, a difference between target pixel values corresponding to two pixels whose relative positions satisfy a preset positional requirement as the target pixel difference value may be determined, so as to determine the target pixel value. The preset positional requirement may include being spaced by a preset number of pixels, where the preset number may be 0, 1, 2, or the like.

After acquiring the target pixel values, the server may further generate a target image in real time by using the target pixel values, and the pixel values corresponding to the pixels included in the target image include at least the target pixel values.

Alternatively, the server may search for the target image including the target pixels in pre-generated images according to the target pixel values, where the target pixels are pixels whose pixel values are the target pixel values.

For step 6-203, the server may push the generated target image to the user terminal, and after being output by the user terminal, extract the target application parameter in the target image, so as to launch the target application according to the target application parameter.

In an example, the jump instructing information may further include any one of the following:

feature loading instructing information, for instructing the generation of a target image carrying the jump request; or sending method instructing information, for instructing the sending method of the target image.

Before sending the target image to the user terminal, the server may send the feature loading instructing information to the user terminal. After receiving the feature loading instructing information, the user terminal may determine that the target image to be sent by the server carries a jump request, and the target application parameter can be extracted from the jump request, thereby so that the target application may be launched according to the target application parameter. In addition, the server may push the generated target image to the user terminal according to the sending method instructed by the sending method instructing information.

In the above examples, the target image carrying the jump request may be generated by the network server, so that the user terminal may extract the target application parameter from the target image to perform a jump between applications.

FIG. 7-9 is a flowchart of an application interaction method according to an example. The method may include steps 6301 to 6309.

At step 6301, the application platform in the user terminal determines that a triggering operation for triggering a jump to the target application is detected.

At step 6302, a network request is generated by the user terminal according to the triggering operation, where the network request is for requesting a jump to the target application, and the network request carries association information corresponding to the target application.

Alternatively, the network request may be generated by a browser or any application that can generate a network request.

At step 6303, through a network connection established in advance with the network server, the network request is sent by the browser in the user terminal to the network server.

At step 6304, target pixel values are determined by the network server according to the association information.

At step 6305, the target image is generated by the network server according to the target pixel values, where the target image is for carrying a jump request, the jump request includes a target application parameter, and the target application parameter includes at least an identifier of the target application.

At step 6306, the target image is pushed to the user terminal by the network server.

At step 6307, the target image is output by the display component module of the user terminal.

At step 6308, the target application parameter is extracted from the current screen image including the target image by an application platform in the user terminal.

At step 6309, the target application is launched according to the target application parameter by the application platform in the user terminal.

In the above example, by extracting the target application parameter from the output target image, which is generated by the server and pushed to the user terminal, jump between applications is made available. In this way, function of the operating system is enhanced, so that the interaction between the applications is not restricted by whether an application supports the DeepLink technology, thus improving user experience at the user terminal.

FIG. 7-10 is a flowchart of an application interaction method according to an example. The method may include steps 6401 to 6406.

At step 6401, the application platform in the user terminal determines that a triggering operation for triggering a jump to the target application is detected.

At step 6402, the target pixel value is determined according to the association information corresponding to the target application by using a JS script associated with the triggering operation.

At step 6403, a drawing application programming interface (API) is invoked by the user terminal to generate a target image corresponding to the target pixel value.

At step 6404, the target image is output by the display component module of the user terminal.

At step 6405, the target application parameter is extracted from the target image by an application platform in the user terminal.

At step 6406, the target application is launched according to the target application parameter by the application platform in the user terminal.

In the above example, by extracting the target application parameter from the output target image, which is generated and output by the user terminal, jump between applications is made available. In this way, function of the operating system is enhanced, so that the interaction between the applications is not restricted by whether an application supports the DeepLink technology, thus improving user experience at the user terminal. Correspondingly to the foregoing examples of methods to implement the application methods, the present disclosure also provides examples of apparatuses to implement the application methods and corresponding terminals.

FIG. 7-11 is a block diagram of an application interaction apparatus according to an example. The apparatus is applied to the user terminal and may include:

a triggering operation determining module 6-510, configured to determine that a triggering operation is detected, where the triggering operation is for triggering a jump to the target application;

an image outputting module 6-520, configured to output a target image generated by the network server or the user terminal according to the triggering operation, where the target image is for carrying a jump request, the jump request includes a target application parameter, and the target application parameter includes at least an identifier of the target application;

an extracting module 6-530, configured to extract the target application parameter from the target image; and an executing module 6-540, configured to launch the target application according to the target application parameter.

FIG. 7-12 is a block diagram of another application interaction apparatus on the basis of the example shown in FIG. 7-11, where the triggering operation determining module 6-510 may include:

a first determining submodule 6-511, configured to determine that a trigger operation is detected on the preset virtual button for launching the target application; and a second determining submodule 6-512, configured to determine that a trigger operation on a preset display element for launching the target application is detected.

FIG. 7-13 is a block diagram of another application interaction apparatus on the basis of the example as shown in FIG. 7-11, where the image outputting module 6-520 may include:

a network request generating submodule 6-521, configured to generate a network request according to the triggering operation, where the network request is for requesting a jump to the target application, and the network request carries association information corresponding to the target application;

a sending submodule 6-522, configured to send the network request to the network server through a network connection established in advance with the network server, so that the network server may acquire the target image according to the association information;

a receiving submodule 6-523, configured to receive the target image pushed by the network server; and a first outputting submodule 6-524, configured to output the target image generated by the network server.

FIG. 7-14 is a block diagram of another application interaction apparatus on the basis of the example shown in FIG. 7-11, where the image outputting module 6-520 may include:

a first converting submodule 6-525, configured to determine the target pixel value according to the association information corresponding to the target application by using a JS script associated with the triggering operation;

an image generating submodule 6-526, configured to invoke a drawing API to generate a target image corresponding to the target pixel value; and a second outputting submodule 6-527, configured to output the target image generated by the user terminal.

Optionally, the association information may include:

a URL address of the target application, or jump instructing information, where the jump instructing information may include parameter acquisition instructing information, used for acquiring the target application parameter.

FIG. 7-15A is a block diagram of another application interaction apparatus on the basis of the example shown in FIG. 7-14, where the image outputting submodule 6-525 may include:

a first acquiring unit 6-5251, configured to acquire a target pixel value corresponding to the target character included in the URL address according to a correspondence between preset characters and pixel values, if the association information includes a URL address.

FIG. 7-15B is a block diagram of another application interaction apparatus on the basis of the example shown in FIG. 7-14, where the first converting submodule 6-525 may include:

a second acquiring unit 6-5252, configured to acquire a target pixel difference value corresponding to the target character included in the URL address according to a preset correspondence between preset characters and pixel difference values; and a first determining unit 6-5253, configured to acquire a target pixel value, where the target pixel difference value is the difference between target pixel values corresponding to two pixels whose relative positions satisfy a preset positional requirement.

FIG. 7-16A is a block diagram of another application interaction apparatus on the basis of the example shown in FIG. 7-11, where the first converting submodule 6-525 may include:

a third acquiring unit 6-5254, configured to acquire the target application parameter corresponding to the parameter acquisition instructing information according to a correspondence between parameter acquisition instructing information and application parameters, if the association information includes the jump instructing information; and a fourth acquiring unit 6-7255, configured to acquire the target pixel value corresponding to the target application parameter according to a correspondence between application parameters and pixel values.

FIG. 7-16B is a block diagram of another application interaction apparatus on the basis of the example shown in FIG. 7-11 B, where the first converting submodule 6-525 may include:

a third acquiring unit 6-5254, configured to acquire the target application parameter corresponding to the parameter acquisition instructing information according to a correspondence between parameter acquisition instructing information and application parameters, if the association information includes the jump instructing information; and a fifth acquiring unit 6-5256, configured to acquire the target pixel value after acquiring the target pixel difference value corresponding to the target application parameter according to a correspondence between application parameters and pixel difference values, where a difference between target pixel values corresponding to two pixels whose relative positions satisfy a preset positional requirement is the target pixel difference value.

FIG. 7-17 is a block diagram of another application interaction apparatus on the basis of the example shown in FIG. 7-11, where the extracting module 6-530 may include:

a first acquiring submodule 6-531, configured to perform a pixel scan on the current screen image including the target image, and acquire pixel values corresponding to pixels of each row of the target image;

a second converting submodule 6-532, configured to convert pixel values corresponding to pixels of each row into values in a number sequence one by one;

a first searching submodule 6-533, configured to search for a preamble in the number sequence, where the preamble is for identifying a starting position of a target feature sequence corresponding to the target application parameter;

a second searching submodule 6-534, configured to locate the target feature sequence in the number sequence according to the preamble; and a third determining submodule 6-535, configured to determine the target application parameter according to the feature sequence.

FIG. 7-18 is a block diagram of another application interaction apparatus on the basis of the example shown in FIG. 7-17, where the second converting submodule 6-532 may include any of the following units:

a second determining unit 6-5321, configured to take pixel values corresponding to pixels of each row directly as values constituting the number sequence; and a third determining unit 6-5322, configured to take pixel difference values between two pixels whose relative positions satisfy a preset positional requirement as values constituting the number sequence.

FIG. 7-19 is a block diagram of another application interaction apparatus on the basis of the example shown in FIG. 7-17, where the first searching submodule 6-533 may include:

a searching unit 6-5331, configured to search in the number sequence for a series of values that matches the values included in the target array; and a fourth determining unit 6-5332, configured to take the series of values in the number sequence that matches the values included in the target array as the preamble if there is a series of values in the number sequence that matches the values included in the target array, where the target array may be composed of preset values of a first preset number.

FIG. 7-20 is a block diagram of another application interaction apparatus according to an example. On the basis of the apparatus example shown in FIG. 3-17, the second parameter extracting submodule 6-534 may include:

a fifth determining unit 6-5341, configured to take a value in the number sequence immediately after the preamble as the starting value of the target feature sequence; and a sixth acquiring unit 6-5342, configured to excerpt values of a second preset number in the number sequence starting from the starting value to acquire the target feature sequence.

FIG. 7-21 is a block diagram of another application interaction apparatus on the basis of the example shown in FIG. 7-17, where the third determining submodule 6-535 may include:

a sixth determining unit 6-5351, configured to determine the target application parameter corresponding to the target feature sequence according to a correspondence between pre-stored feature sequences and application parameters.

FIG. 7-22 is a block diagram of another application interaction apparatus on the basis of any of the examples shown in FIGS. 7-17 to 7-21, where the apparatus may further include:

an acquiring module 6-550, configured to excerpt values of a preset third number starting from the first value immediately after the target feature sequence, so as to acquire a verification sequence;

a verifying module 6-560, configured to verify the target feature sequence by the verification sequence, so as to acquire a verification result; and a controlling module 6-570, configured to control the executing module 6-540 to launch the target application according to the target application parameter if the verification result is passing the verification.

FIG. 7-23 is a block diagram of another application interaction apparatus on the basis of the example shown in FIG. 7-22, where the verifying module 6-560 may include:

a calculating submodule 6-561, configured to calculate all values of the verification sequence and of the target feature sequence may according to a preset calculation method, so as to acquire a target value; and a verification result determining submodule 6-562, configured to determine that the verification result is passing the verification if the target number is identical with a preset value, otherwise the verification result is failing the verification.

FIG. 7-24 is a block diagram of another application interaction apparatus on the basis of the example shown in FIG. 7-11, where the executing module 6-540 may include:

a judging submodule 6-541, configured to determine, according to the identifier of the target application, whether the target application has been installed locally;

an executing submodule 6-542, configured to launch the target application, after being downloaded and installed by the user terminal in the background, according to the target application parameter if the target application has not been installed locally.

FIG. 7-25 is a block diagram of an application interaction apparatus according to an example. The apparatus is applied to the network server and may include:

a receiving module 6-610, configured to receive a network request sent by a user terminal, where the network request is used to request a jump to the target application, and the network request carries association information corresponding to the target application;

an image acquiring module 6-620, configured to acquire the target image according to the association information, where the target image is for carrying a jump request, the jump request includes a target application parameter, and the target application parameter includes at least an identifier of the target application; and a pushing module 6-630, configured to push the target image to the user terminal, so that after outputting the target image, the user terminal may launch the target application according to the target application parameter extracted from the target image.

FIG. 7-26A is a block diagram of another application interaction apparatus on the basis of the example shown in FIG. 7-25 A, where the image acquiring module 6-620 may include:

a second acquiring submodule 6-621, configured to acquire a target pixel value corresponding to the association information and carried in the network request according to a correspondence between association information and pixels; and an image generating submodule 6-622, configured to generate a target image in real time according to the target pixel value.

FIG. 7-26B is a block diagram of another application interaction apparatus on the basis of the example shown in FIG. 7-25, where the image acquiring module 6-620 may include:

a second acquiring submodule 6-621, configured to acquire a target pixel value corresponding to the association information and carried in the network request according to a correspondence between association information and pixels; and an image searching submodule 6-623, configured to search for the target image including the target pixels in pre-generated images according to the target pixel values, where the target pixels are pixels whose pixel values are the target pixel values.

Optionally, the association information may include: a URL address of the target application, or jump instructing information, where the jump instructing information include at least parameter acquisition instructing information for acquiring the target application parameter.

FIG. 7-27A is a block diagram of another application interaction apparatus on the basis of the example shown in FIG. 7-25, where the second acquiring submodule 6-621 may include:

a seventh acquiring unit 6-6211, configured to acquire a target pixel value corresponding to the character in the URL address according to a correspondence between characters and pixel values, if the association information carried in the network request includes a URL address.

FIG. 7-27B is a block diagram of another application interaction apparatus on the basis of the example shown in FIG. 7-25, where the second acquiring submodule 6-621 may include:

an eighth acquiring unit 6-6212, configured to acquire a target pixel difference value corresponding to the target character in the URL address according to a preset correspondence between characters and pixel difference values; and a ninth acquiring unit 6-6213, configured to acquire a target pixel value, where the target pixel difference value is the difference between target pixel values corresponding to two pixels whose relative positions satisfy a preset positional requirement.

FIG. 7-28 is a block diagram of another application interaction apparatus according to an example. On the basis of the apparatus example shown in FIG. 3-25, the second acquiring submodule 6-621 may include:

a tenth acquiring unit 6-6214, configured to acquire the target application parameter corresponding to the parameter acquisition instructing information according to a correspondence between parameter acquisition instructing information and application parameters, if the association information carried in the network request includes the jump instructing information; and an eleventh acquiring unit 6-6215, configured to acquire the target pixel value corresponding to the target application parameter according to a correspondence between application parameters and pixel values.

FIG. 7-29 is a block diagram of another application interaction apparatus according to an example. On the basis of the apparatus example shown in FIG. 3-25, the second acquiring submodule 6-621 may include:

a twelfth acquiring unit 6-6216, configured to acquire the target application parameter corresponding to the parameter acquisition instructing information according to a correspondence between parameter acquisition instructing information and application parameters, if the association information carried in the network request includes the jump instructing information;

a thirteenth acquiring unit 6-6217, configured to acquire the target pixel difference value corresponding to the target application parameter according to a correspondence between application parameters and pixel difference values; and a fourteenth acquiring unit 6-6218, configured to acquire a target pixel value, where the target pixel difference value is the difference between target pixel values corresponding to two pixels whose relative positions satisfy a preset positional requirement.

Correspondingly, examples of the present disclosure further provides an application interaction apparatus applied to a user terminal, including a processor and a memory for storing processor-executable instructions, where the processor is configured to:

determine that a triggering operation is detected, where the triggering operation is for triggering a jump to the target application;

output a target image generated by the network server or the user terminal according to the triggering operation, where the target image is for carrying a jump request, the jump request includes a target application parameter, and the target application parameter includes at least an identifier of the target application;

extract the target application parameter from the target image; and launch the target application according to the target application parameter.

In another aspect, examples of the present disclosure further provide an application interaction apparatus applied to a network server, including a processor and a memory for storing processor-executable instructions, where the processor is configured to:

receive a network request sent by a user terminal, where the network request is used to request a jump to the target application, and the network request carries association information corresponding to the target application;

acquire the target image according to the association information, where the target image is for carrying a jump request, the jump request includes a target application parameter, and the target application parameter includes at least an identifier of the target application; and push the target image to the user terminal, so that after outputting the target image, the user terminal may launch the target application according to the target application parameter extracted from the target image.

Example 7

The present disclosure provides an application interaction method, which will be explained with an audio format file as an example of the carrier of the target message.

FIG. 8-1 is a flowchart of an application interaction method according to an example. The method is applied to a user terminal and includes steps 7-101 to 7-104.

At step 7-101, a triggering operation is detected, where the triggering operation is for triggering a jump to the target application.

At step 7-102, a target audio generated by a network server is output according to the triggering operation, where the target audio is for carrying a jump request, the jump request includes a target application parameter, and the target application parameter includes at least an identifier of the target application.

At step 7-103, the target application parameter is extracted from the target audio.

At step 7-104, the target application is launched according to the target application parameter.

In the above example, after determining that the triggering operation is detected, the user terminal may output the target audio generated by the network server according to the triggering operation, where the triggering operation is for jumping to the target application, the target audio carries a jump request, and the jump request includes the target application parameter. Further, the user terminal may extract the target application parameter from the target audio, and launch the target application according to the target application parameter. Through the above process, jump between applications is made available by extracting target application parameter from the output target audio. In this way, function of the operating system is enhanced, so that the interaction between the applications is not restricted by whether an application supports the DeepLink technology, thus improving user experience at the user terminal.

For step 7-101, optionally, the user terminal may determine that the triggering operation is detected in any of the following cases.

In the first case, the application platform may determine that a trigger operation is detected on the preset virtual button for launching the target application. For example, as shown in FIG. 7-2A, the user triggers the preset virtual button, and then the application platform determines that a triggering operation is detected, where the triggering operation is for triggering the generation of the network request for jumping to the target application.

The application platform may be a platform for launching the target application, including but not limited to the platforms described below.

Optionally, the application platform may be a platform directly installed in an operating system, and the operating system may be Android, IOS, and the like; alternatively, the application platform may be a certain application, such as WeChat, Alipay, QQ, and the like. For example, as shown in FIG. 7-2B, the user can launch the target application through the application platform. Alternatively the application platform may also be a browser.

In the second case, a trigger operation on a preset display element for launching the target application is detected.

Optionally, the preset display element may be a URL address, such as shown in FIG. 7-2C. Or the preset display element may be an audio link, either provided in a browser, as shown in FIG. 8-2A, or provided in an application, as shown in FIG. 8-2B.

After determining that the triggering operation is detected, the user terminal further performs step 7-102, and outputs the target audio generated by the network server according to the triggering operation. Optionally, reference can be made to FIG. 8-3. FIG. 8-3 shows another application interaction method on the basis of the example shown in FIG. 8-1. Step 7-102 may include steps 7-102-1 to 7-102-4.

At step 7-102-1, a network request is generated according to the triggering operation, where the network request is for requesting a jump to the target application, and the network request carries association information corresponding to the target application.

At this step, a network request for requesting a jump to the target application may be generated by using the triggering operation according to related art, where the network request may carry association information corresponding to the target application. Optionally, the association information may be a URL address corresponding to the target application, or jump instructing information. At step 7-102-2, through a network connection established in advance with the network server, the network request is sent to the network server.

At this step, the user terminal may establish a network connection in advance with the network server through protocols such as three-way handshake, and then the network request is sent to the network server through the network connection.

After receiving the associated information, the network server may determine a target audio parameter value, so as to generate the target audio in real time according to the target audio parameter. Alternatively, after determining the target audio parameter value, the network server may search for a target audio which has a parameter value identical to the target audio parameter value in pre-generated audios. The target image finally acquired is an audio for carrying a jump request, the jump request includes a target application parameter, and the target application parameter includes at least an identifier of the target application.

At step 7-102-3, the target audio pushed by the network server is received.

At this step, after generating the target audio, the network server may push the target audio to the user terminal, and the user terminal may directly receive the target image.

At step 7-102-4, the target audio is output through a sound outputting device.

In an example of the present disclosure, the target audio may be output through a Bluetooth sound outputting device or a speaker already existed in the user terminal.

Alternatively, a virtual sound outputting device may also be preset in the user terminal, as shown in FIG. 8-4. The target audio is sent to a preset virtual sound outputting device by the audio flinger service in the system service in the user terminal, and is output by the virtual sound outputting device.

For step 7-103, reference can be made to FIG. 8-5. FIG. 8-5 shows another application interaction method on the basis of the example shown in FIG. 8-1. Step 7-103 may include steps 7-103-1 to 7-103-3.

At step 7-103-1, the target audio parameter value is extracted from the target audio by a preset processing module.

At this step, a processing module may be added to the audio service for extracting the target audio parameter value from the target audio. The user terminal may perform an analog to digital conversion on the target audio output by the Bluetooth sound outputting device, the speaker, or the preset virtual sound outputting device by the processing module, for example, by using Fourier transform, so as to acquire a waveform corresponding to the target audio, for example, as shown in FIG. 8-6.

Further, the processing module may extract a plurality of target audio parameter values from FIG. 8-6. Optionally, the target audio parameter value may include an amplitude value. For example, the processing module may extract all amplitude values in FIG. 8-6 as the target audio parameter value.

At step 7-103-2, a plurality of the target audio parameter values are converted into target numbers one by one according to a correspondence between preset audio parameter values and numbers.

At this step, the correspondence between preset audio parameter values and numbers can be as shown in table 19.

TABLE 19

| Amplitude value | Number (binary) |
|---|---|
| 0 | 0 |
| Greater than 0 and less than preset threshold | 1 |

Alternatively, the amplitude values may be divided into ranges, and amplitude values in different ranges correspond to different numbers, as shown in table 20.

TABLE 20

| Amplitude value | Number |
| --- | --- |
| From 0 to first preset threshold | 0 |
| From first preset threshold to second preset threshold | 1 |
| From second preset threshold to third preset threshold | 2 |
| ... | ... |

The processing module can convert the plurality of target audio parameter values into the target numbers one by one according to table 19 or table 20.

At step 7-103-3, the target application parameter is determined according to a number sequence composed of a plurality of target numbers.

At this step, the number sequence is composed of a plurality of target numbers determined previously. Further, the processing module may determine the target application parameter according to the number sequence.

Optionally, reference can be made to FIG. 8-7. FIG. 8-7 shows another application interaction method on the basis of the example shown in FIG. 8-5. Step 7-103-3 may include steps 7-103-31 to 7-103-33.

At step 7-103-31, a preamble in a number sequence composed of the plurality of target numbers is searched for, where the preamble is for identifying a starting position of a target feature sequence corresponding to the target application parameter.

At this step, the processing module may search in the number sequence for a series of values that exactly matches values included in a target array. if there is a series of values in the number sequence that matches the values included in the target array, then the series of values in the number sequence that matches the values included in the target array is taken as the preamble. Optionally, the target array may be composed of preset values of a first preset number.

For example, if the target array is {1, 2, 3, 4}, then the virtual sound outputting device can search in the number sequence for a series of values that matches the values included in the target array. If the current number sequence is {0, 1, 1, 2, 3, 4, 5, 0, . . . }, then {1, 2, 3, 4} is used as the preamble.

At step 7-103-32, according to the preamble, the target feature sequence is found in the number sequence.

At this step, the processing module may use the first value immediately after the preamble in the number sequence as the starting position of the target feature sequence, and further, excerpt values of a second preset number in the number sequence starting from the starting position, so that the target feature sequence is acquired.

For example, it is assumed that the number sequence is {0, 1, 1, 2, 3, 4, 0, 0, 2, 6, 5, 4 . . . }, the preamble has been determined as {1, 2, 3, 4}, and the second preset number is 4. The target feature sequence excerpted from the number sequence is {0, 0, 2, 6}.

At step 7-103-33, the target application parameter is determined according to the target feature sequence.

At this step, the processing module may directly determine the target application parameter corresponding to the target feature sequence according to a correspondence between pre-stored feature sequences and application parameters.

Optionally, the target application parameter may include at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

For example, the application parameter is the identifier of the application, i.e., the APP ID. The correspondence between feature sequences and application parameters is as shown in table 21.

TABLE 21

| Feature sequence | Application parameter |
| --- | --- |
| 1, 2, 3, 4 | APP ID 1 |
| 2, 3, 4, 5 | APP ID 2 |
| 5, 6, 7, 1 | APP ID 3 |
| 0, 0, 2, 6 | APP ID 4 |
| ... | ... |

If the target feature sequence is {0, 0, 2, 6}, the virtual sound outputting device may determine the target application parameter as APP ID 4 according to table 21.

After extracting the target application parameter from the target audio, the user terminal may go on executing step 7-104, and launch the target application according to the target application parameter.

In an example, optionally, to ensure the accuracy of the extracted target feature parameter, reference can be made to FIG. 8-8. FIG. 8-8 shows another application interaction method on the basis of the example shown in FIG. 8-7. The application interaction method may further include steps 7-105 to 7-106.

At step 7-105, a preset third number of values are excerpted starting from the first value immediately after the target feature sequence, so that a verification sequence is acquired.

At this step, values of a preset third number may be excerpted starting from the first value immediately after the target feature sequence, so that a verification sequence is acquired.

For example, it is assumed that the number sequence is {0, 1, 1, 2, 3, 4, 0, 0, 2, 6, 5, 4 . . . }, the preamble has been determined as {1, 2, 3, 4}, and the target feature sequence is {0, 0, 2, 6}. The third preset number is 2, and the verification sequence is {5, 4}.

At step 7-106, the target feature sequence is verified by the verification sequence, to obtain a verification result.

In an example of the present disclosure, optionally, all values of the verification sequence and of the target feature sequence may be calculated according to a preset calculation method, to obtain a target value. The preset calculation method may include, but is not limited to, summing, subtracting, and the like.

For example, the processing module may sum up all values included in the verification sequence and all values included in the target feature sequence, so as to acquire a target number. It is assumed that all values of the target feature sequence {0, 0, 2, 6} and of the verification sequence {5, 4} are summed, and the target number is 0+0+2+6+5+4=17.

If the target number is identical with a preset value, it is determined that the verification result is passing the verification, otherwise the verification result is failing the verification.

If the preset value is 17, which is identical with the calculated sum, then the verification result is passing the verification. If the preset value is 18, the verification result is determined as a failed verification.

In an example of the present disclosure, step 7-104 may be executed when the verification result is passing the verification.

Through the above process, a further verification is performed on the excepted target feature sequence by using the verification sequence. In this way, cases where a preamble is excerpted from an audio not including the target application parameter so that a target feature sequence is mistakenly extracted are avoided, thereby ensuring the accuracy of the extracted target feature sequence.

For step 7-104, after extracting the target application parameter, the user terminal may launch the target application according to the target application parameter based on the jump request carried by the target audio.

In an example of the present disclosure, the target application may be an application whose installation needs to be triggered by the user in related art, or a new application. The difference between the new application and the application in related art is that the new application is installed in the background of the user terminal.

In other words, after being acquired by the user terminal, a compressed package of the new application may be automatically installed or updated in the background, with both its installation process and update process not visible to the user in the foreground.

If the target application belongs to the application in related art, and the target application is installed in the user terminal, step 7-104 may be implemented specifically as follows.

According to the identifier of the target application in the target application parameters, the operating system launches the target application, opening, for example, a home page, a login page or a registration page of the target application.

In the case where the target application parameter further includes other information, the launched target application may also perform corresponding operations according to such information, such as opening an inner page in the target application (e.g., a detail page of a sales item in an e-commerce platform); playing an audio file, a video file, etc. in a preset interface; or popping up a preset dialog box.

If the target application is not installed in the user terminal, an application store or the like may be launched so as to prompt the user to download and install the target application; otherwise, the target message may be discarded.

If the target application is an application installed in the background, reference can be made to FIG. 8-9. FIG. 8-9 shows another application interaction method on the basis of the example shown in FIG. 8-1. Step 7-104 may include steps 7-104-1 to 7-104-2.

At step 7-104-1, according to the identifier of the target application, it is determined whether the target application has been installed locally.

In an example of the present disclosure, the user terminal may determine whether the new application is installed locally according to the identifier of the target application by using an application platform, that is, a platform or a service software for running the target application. For example, by searching through a list of installed applications according to the identifier of the target application, it is determined whether the target new application is installed locally.

At step 7-104-2, if the target application has not been installed locally, after being downloaded and installed by the user terminal in the background, the target application is launched according to the target application parameter.

If it is determined that the target application is not installed locally, the application platform may trigger the user terminal to automatically download and install the target application. Such process is invisible to the user, that is, downloading and installation process is executed without taking receiving a confirmation message triggered by the user in the foreground as a necessary condition.

After acquiring an installation package of a new application or an update data package, the application platform may launch the target new application directly.

In an example of the present disclosure, the application platform is a service program preset in the user terminal, and may be set in the operating system as a system software; still taking a smart phone as an example of the user terminal, the application platform may be set when the phone is shipped from factory. The preset application platform may also be independently operated in the user terminal as an upper layer application software, and the present disclosure does not limit the setting position thereof.

The application platform may launch a corresponding target application, according to application parameters of any one of the target applications. The process of the application platform launching an application may be implemented as directly launching installation or update package of the application, opening an interface of the application specified by the target application parameter (e.g., a home page of the new application), or an inner page thereof. For example, according to the identifier of the application Kuaikan Manhua, the application Kuaikan Manhua is directly launched.

In an example of the present disclosure, after the user terminal detects the target network request for jumping to the target application, an audio for carrying a target application parameter corresponding to the target application, i.e., the target audio, may be acquired by the network server or dynamically generated by the user terminal. Further, by extracting target application parameter from the target audio to launch the target application, jump between applications is made available. In this way, function of the operating system is enhanced, so that the interaction between the applications is not restricted by whether an application supports the DeepLink technology, thus improving user experience at the user terminal.

In an example, step 7-101 may specifically include:

It is determined that a trigger operation is detected when the audio is played.

In an example of the present disclosure, if it is determined that a triggering operation is detected on a preset virtual button for launching the target application when the audio is played, or it is determined that a triggering operation is detected on a preset display element for launching the target application when the audio is played, the user terminal may also generate the network request according to the triggering operation. The network request may carry association information corresponding to the target application.

Through a network connection established in advance with the network server, the network request is sent to the network server by the user terminal. At this step, after acquiring the target audio according to the method described above, the network server may push the target audio to the user terminal. The user terminal may preset a virtual sound outputting device, so that the target audio acquired according to the triggering operation is output through the virtual sound outputting device, and the audio currently being played may still be output through an existing Bluetooth sound outputting device or a speaker, as shown in FIG. 8-10.

The processing module added in the audio service may process only the target audio output by the virtual sound outputting device, and extract the target application parameter from the target audio. Subsequently, based on the jump request carried by the target audio, the application platform may launch the target application according to the target application parameter.

For example, as shown in FIG. 8-11, when an audio is played by the application Kugou, the user triggers a triggering operation for launching the browser application in the application Kugou. If the triggering operation is viewing the singer's profile, then the user terminal may send the network request to the network server according to the network request generated by the triggering operation. After acquiring the target audio pushed by the network server, the target audio is output through the virtual sound outputting device, and the audio currently being played may still be output through an existing Bluetooth sound outputting device or a speaker. Further, the processing module extracts the target application parameter from the target audio to launch the browser for a detail page of the singer's profile. In an example, after acquiring the target audio generated by the network server, the user terminal may mix the audio being played and the target audio pushed by the network server through a mixer thread in the system according to related art, so as to acquire a mixed audio.

The user terminal may also output the mixed audio through a sound outputting device, as shown in FIG. 8-12. The sound outputting device may be a Bluetooth sound outputting device, a speaker or a virtual sound outputting device.

Further, the processing module may first perform an analog to digital conversion on the mixed audio according to related art, so as to acquire a waveform of the mixed audio. The mixed audio is sampled according to a preset frequency, and the sampled time domain data is further converted into frequency domain signals through related art, such as a fast Fourier transform algorithm.

The processing module may select a frequency domain signal located in a preset value range in the converted frequency domain signals, and after removing noises, convert the frequency domain signal located in the preset value range into time domain data, so as to acquire the target audio parameter value corresponding to the target audio.

At this time, the processing module can convert the target audio parameter values into the target numbers one by one according to table 19 or table 20. In the sequence of numbers consisting of a plurality of target numbers, the preamble is first located according to the method provided in the above example. The target feature sequence is located by using the preamble, so as to determine the target application parameter corresponding to the target feature sequence according to table 21.

Optionally, a verification sequence may be extracted from the number sequence, and the target feature sequence is verified by using the verification sequence, so that after the verification is successful, the target application parameter corresponding to the target feature sequence is determined according to table 21.

After extracting the target application parameter, the processing module may go on executing step 7-104, and launch the target application according to the target application parameter according to the method provided in the example above.

In the above example, if it is determined that a triggering operation is detected during playing of audio, a network request may be generated according to the trigger operation. After the network request is sent to the network server, the network server may acquire the target audio according to the association information carried in the network request. After receiving the target audio, the user terminal may mix the target audio and the audio so as to output the mixed audio. Further, the user terminal may extract the target application parameter from the mixed audio, and launch the target application according to the target application parameter.

In the above process, by extracting target application parameter from the output mixed audio, jump between applications is made available. In this way, function of the operating system is enhanced, so that the interaction between the applications is not restricted by whether an application supports the DeepLink technology without interfering the playing of the current audio, thus improving user experience at the user terminal.

It should be noted that, in examples of the present disclosure, the processing module may also extract target application parameters from the target audio that needs to be played currently before the mixer thread mixes all the audio data, as shown in FIG. 8-13. However, this requires the processing module to try to extract the target application parameters from all audios received, and the demand for the processing efficiency of the processing module is relatively high. Once the processing module does not process in time, the normal playing of the audio signal may be affected, thus impacting the user experience.

FIG. 8-14 is a flowchart of another application interaction method according to an example. The method is applied in a network server, which may include steps 7-201 to 7-203.

At step 7-201, a network request sent by a user terminal is received, where the network request is used to request a jump to the target application, and the network request carries association information corresponding to the target application.

At step 7-202, the target audio is acquired according to the association information, where the target audio is for carrying a jump request, the jump request includes a target application parameter, and the target application parameter includes at least an identifier of the target application.

At step 7-203, the target audio is push to the user terminal, so that after outputting the target audio, the user terminal may launch the target application according to the target application parameter extracted from the target audio.

In the above example, the server may acquire the target audio according to the association information carried in the network request sent by the user terminal, where the target audio is for carrying a jump request, the jump request includes a target application parameter, and the target application parameter includes at least an identifier of the target application. Further, the server may push the target audio to the user terminal, so that the user terminal may launch the target application according to the target application parameter extracted from the target audio. Through the above process, a target audio carrying the jump request may be generated by the network server, so that the user terminal may extract the target application parameter from the target audio to perform a jump between applications.

For step 7-201, after detecting the triggering operation for jumping to the target application, the user terminal may generate a network request, where the network request is for requesting a jump to the target application, and the network request carries association information corresponding to the target application. Through a network connection established in advance with the network server, the network request may be sent by the user terminal to the network server, and directly received by the server.

For step 7-202, the server may acquire a target audio parameter value corresponding to the association information and carried in the network request according to a correspondence between association information and audio parameter values.

The association information may include: a uniform resource locator (URL) address of the target application, or jump instructing information.

The preset jump instructing information may include at least a parameter acquisition instructing parameter, used for acquiring the target application parameter.

If the association information carried in the network request includes a URL address, then the server may convert the characters included in the URL address into an encoded audio sequence composed of a plurality of audio parameter values according to a pre-stored correspondence between characters and audio parameter values. Optionally, the audio parameter values may be amplitude values.

The character may correspond to at least one audio parameter value, and the upper and lower case characters may correspond to different application parameter values. For example, the lowercase character "a" and the uppercase character "A" correspond to different amplitude values.

It is assumed that the URL address is "www.abc.com", the network server converts each character in the URL address into an amplitude value according to the above correspondence, which is assumed to be "1, 1, 1, 0, 2, 3, 4, 0, 4, 8, 5, . . . ", so as to acquire a plurality of target audio parameter values.

If the association information carried in the network request includes the jump instructing information, the server may also acquire, according to a pre-stored correspondence between parameter acquisition instructing information and application parameters, the target application parameter corresponding to the parameter acquisition instructing information.

For example, the association information carried in the network request sent by the user terminal and received by the server includes jump instructing information, and the jump instructing information includes parameter acquisition instructing information A.

The server may acquire the target application parameter APP ID 1 corresponding to the parameter acquisition instructing information according to table 22.

TABLE 22

| Jump instructing information | Application parameter |
|---|---|
| A | APP ID 1 |
| B | APP ID 2 |
| C | APP ID 3 |
| . . . | . . . |

Further, the server may acquire the target audio parameter value corresponding to the target application parameter according to a pre-stored correspondence between application parameters and audio parameter values, for example, as shown in table 23.

TABLE 23

| Application parameter | Audio parameter value |
|---|---|
| APP ID 1 | 1, 1, 1 . . . |
| APP ID 2 | 2, 0, 0 . . . |
| APP ID 3 | 5, 6, 7 . . . |
| . . . | . . . |

In an example of the present disclosure, the server may acquire the target audio parameter value by any one of the methods described above. The target audio parameter value may include an amplitude value.

After acquiring the target audio parameter value, the server may further perform a digital to analog conversion to convert the target audio parameter value into an audio signal according to related art, and compress the audio signal according to an audio compression technique, for example, according to the MP3 format, so as to acquire a target audio generated in real time.

Alternatively, the server may search for a target audio which has a parameter value identical to the target audio parameter value in pre-generated audios according to the target audio parameter value.

For step 7-203, the server may push the generated target audio to the user terminal, and after being output by the user terminal, extract the target application parameter in the target audio, so as to launch the target application according to the target application parameter.

In an example, the jump instructing information may further include any one of the following:

feature loading instructing information, for instructing the generation of a target audio carrying the jump request; or sending method instructing information, for instructing the sending method of the target audio.

Before sending the target audio to the user terminal, the server may send the feature loading instructing information to the user terminal. After receiving the feature loading instructing information, the user terminal may determine that the target audio to be sent by the server carries a jump request, and the target application parameter can be extracted from the jump request, thereby so that the target application may be launched according to the target application parameter. In addition, the server may push the generated target audio to the user terminal according to the sending method instructed by the sending method instructing information.

In the above examples, the target audio carrying the jump request may be generated by the network server, so that the user terminal may extract the target application parameter from the target audio to perform a jump between applications.

FIG. 8-15 is a flowchart of an application interaction method according to an example. The method may include steps 7301 to 7309.

At step 7301, the application platform in the user terminal determines that a triggering operation for triggering a jump to the target application is detected.

At step 7302, a network request is generated by the user terminal according to the triggering operation, where the network request is for requesting a jump to the target application, and the network request carries association information corresponding to the target application.

Alternatively, the network request may be generated by a browser or any application that can generate a network request.

At step 7303, through a network connection established in advance with the network server, the network request is sent by the browser in the user terminal to the network server.

At step 7304, target audio parameter values are determined by the network server according to the association information.

At step 7305, the target audio is generated by the network server according to the target audio parameter values, where the target audio is for carrying a jump request, the jump request includes a target application parameter, and the target application parameter includes at least an identifier of the target application.

At step 7306, the target audio is pushed to the user terminal by the network server.

At step 7307, the target audio is output by a sound outputting device in the user terminal.

At step 7308, the target application parameter is extracted from the target audio by an application platform in the user terminal.

At step 7309, the target application is launched according to the target application parameter by the application platform in the user terminal.

In the above example, by extracting the target application parameter from the output target audio, which is generated by the server and pushed to the user terminal, jump between applications is made available. In this way, function of the operating system is enhanced, so that the interaction between the applications is not restricted by whether an application supports the DeepLink technology, thus improving user experience at the user terminal.

Correspondingly to the foregoing examples of methods to implement the application methods, the present disclosure also provides examples of apparatuses to implement the application methods and corresponding terminals.

FIG. 8-16 is a block diagram of an application interaction apparatus according to an example. The apparatus is applied to the user terminal and may include:

a triggering operation determining module 7-310, configured to determine that a triggering operation is detected, where the triggering operation is for triggering a jump to the target application;

a audio outputting module 7-320, configured to output the target audio generated by a network server according to the triggering operation, where the target audio is for carrying a jump request, the jump request includes a target application parameter, and the target application parameter includes at least an identifier of the target application;

an extracting module 7-330, configured to extract the target application parameter from the target audio; and an executing module 7-340, configured to launch the target application according to the target application parameter.

FIG. 8-17 is a block diagram of another application interaction apparatus on the basis of the example shown in FIG. 8-16, where the triggering operation determining module 7-310 may include:

a first determining submodule 7-311, configured to determine that a trigger operation is detected on the preset virtual button for launching the target application; and a second determining submodule 7-312, configured to determine that a trigger operation on a preset display element for launching the target application is detected.

FIG. 8-18 is a block diagram of another application interaction apparatus on the basis of the example shown in FIG. 8-16, where the audio outputting module 7-320 may include:

a network request generating submodule 7-321, configured to generate a network request according to the triggering operation, where the network request is for requesting a jump to the target application, and the network request carries association information corresponding to the target application;

a sending submodule 7-322, configured to send the network request to the network server through a network connection established in advance with the network server;

a receiving submodule 7-323, configured to receive the target audio pushed by the network server, where the target audio is acquired by the network server according to the association information; and a first outputting submodule 7-324, configured to output the target audio through a sound outputting device.

Optionally, the sound outputting device includes a Bluetooth sound outputting device, a speaker or a preset virtual sound outputting device.

FIG. 8-19 is a block diagram of another application interaction apparatus on the basis of the example shown in FIG. 8-16, where the extracting module 7-330 may include:

an extracting submodule 7-331, configured to extract a plurality of audio parameter values from the target audio by using a preset processing module;

a converting submodule 7-332, configured to convert the plurality of the target audio parameter values into target numbers one by one according to a correspondence between preset audio parameter values and numbers; and a third determining submodule 7-333, configured to determine the target application parameter according to the feature sequence composed of a plurality of target numbers.

FIG. 8-20 is a block diagram of another application interaction apparatus on the basis of the example shown in FIG. 8-19, where the third determining submodule 7-333 may include:

a first searching unit 7-3331, configured to search for a preamble in the number sequence composed of a plurality of target numbers, where the preamble is for identifying a starting position of a target feature sequence corresponding to the target application parameter;

a second searching unit 7-3332, configured to locate the target feature sequence in the number sequence according to the preamble; and a determining submodule 7-3333, configured to determine the target application parameter according to the feature sequence.

FIG. 8-21 is a block diagram of another application interaction apparatus on the basis of the example shown in FIG. 8-20, where the first searching unit 7-3331 may include:

a searching subunit 7-01, configured to search in the number sequence composed of a plurality of target numbers for a series of values that matches the values included in the target array; and a first determining subunit 7-02, configured to take the series of values in the number sequence that matches the values included in the target array as the preamble if there is a series of values in the number sequence that matches the values included in the target array, where the target array may be composed of preset values of a first preset number.

FIG. 8-22 is a block diagram of another application interaction apparatus on the basis of the example shown in FIG. 8-20, where the second searching unit 7-3332 may include:

a second determining subunit 7-03, configured to take a value in the number sequence immediately after the preamble as the starting value of the target feature sequence; and an acquiring subunit 7-04, configured to excerpt values of a second preset number in the number sequence starting from the starting value to acquire the target feature sequence.

FIG. 8-23 is a block diagram of another application interaction apparatus on the basis of the example shown in FIG. 8-20, where the determining unit 7-3333 may include:

a third determining subunit 7-05, configured to determine the target application parameter corresponding to the target feature sequence according to a correspondence between pre-stored feature sequences and application parameters.

FIG. 8-24 is a block diagram of another application interaction apparatus on the basis of any of the examples shown in FIGS. 8-20 to 8-23, where the apparatus may further include:

an acquiring module 7-350, configured to excerpt values of a preset third number starting from the first value immediately after the target feature sequence, so as to acquire a verification sequence;

a verifying module 7-360, configured to verify the target feature sequence by the verification sequence, so as to acquire a verification result; and a controlling module 7-370, configured to control the executing module 7-340 to launch the target application according to the target application parameter if the verification result is passing the verification.

FIG. 8-25 is a block diagram of another application interaction apparatus on the basis of the example shown in FIG. 8-24, where the verifying module 7-360 may include:

a calculating submodule 7-361, configured to calculate all values of the verification sequence and of the target feature sequence may according to a preset calculation method, so as to acquire a target value; and a fourth determining submodule 7-362, configured to determine that the verification result is passing the verification if the target number is identical with a preset value, otherwise the verification result is failing the verification.

FIG. 8-26 is a block diagram of another application interaction apparatus on the basis of the example shown in FIG. 8-16, where the triggering operation determining module 7-310 may include:

a fifth determining submodule 7-313, configured to determine that a trigger operation is detected when an audio is played.

FIG. 8-26 is a block diagram of another application interaction apparatus on the basis of the example shown in FIG. 8-16, where the audio outputting module 7-320 may include:

a second outputting submodule 7-325, configured to output the target audio through a preset virtual sound outputting device according to the triggering operation.

FIG. 8-27 is a block diagram of another application interaction apparatus on the basis of the example shown in FIG. 8-16, where the executing module 7-340 may include:

a judging submodule 7-341, configured to determine, according to the identifier of the target application, whether the target application has been installed locally; and an executing submodule 7-342, configured to launch the target application, after being downloaded and installed by the user terminal in the background, according to the target application parameter if the target application has not been installed locally.

FIG. 8-28 is a block diagram of an application interaction apparatus according to an example. The apparatus is applied to the network server and may include:

a receiving module 7-410, configured to receive a network request sent by a user terminal, where the network request is used to request a jump to the target application, and the network request carries association information corresponding to the target application;

an audio acquiring module 7-420, configured to acquire the target audio according to the association information, where the target audio is for carrying a jump request, the jump request includes a target application parameter, and the target application parameter includes at least an identifier of the target application; and a pushing module 7-430, configured to push the target audio to the user terminal, so that after outputting the target audio, the user terminal may launch the target application according to the target application parameter extracted from the target audio.

FIG. 8-29A is a block diagram of another application interaction apparatus on the basis of the example shown in FIG. 8-28, where the extracting module 7-420 may include:

a fourth acquiring submodule 7-421, configured to acquire a audio parameter value corresponding to the association information and carried in the network request according to a correspondence between association information and audio parameter values; and An audio generating submodule 7-422, configured to generate a target audio in real time according to the target audio parameter value.

FIG. 8-29B is a block diagram of another application interaction apparatus on the basis of the example shown in FIG. 8-28, where the extracting module 7-420 may include:

a fourth acquiring submodule 7-421, configured to acquire a audio parameter value corresponding to the association information and carried in the network request according to a correspondence between association information and audio parameter values; and An audio searching submodule, configured to search for a target audio which has a parameter value identical to the target audio parameter value in pre-generated audios according to the target audio parameter value.

Optionally, the association information may include: a URL address of the target application, or jump instructing information, where the jump instructing information may include at least a parameter acquisition instructing parameter, used for acquiring the target application parameter.

FIG. 8-30 is a block diagram of another application interaction apparatus on the basis of the example shown in FIG. 8-29A or FIG. 8-29B, where the fourth acquiring module 7-421 may include:

a first acquiring unit 7-4211, configured to acquire a target audio parameter value corresponding to the character in the URL address according to a correspondence between characters and audio parameter values, if the association information carried in the network request includes a URL address.

FIG. 8-31 is a block diagram of another application interaction apparatus on the basis of the example shown in FIG. 8-29A or FIG. 8-29B, where the fourth acquiring submodule 7-421 may include:

a second acquiring unit 7-4212, configured to acquire the target application parameter corresponding to the parameter acquisition instructing information according to a correspondence between parameter acquisition instructing information and application parameters, if the association information carried in the network request includes the jump instructing information; and a third acquiring unit 7-4213, configured to acquire the target audio parameter value corresponding to the target application parameter according to a correspondence between application parameters and audio parameter values.

Correspondingly, examples of the present disclosure further provides an application interaction apparatus applied to a user terminal, including a processor and a memory for storing processor-executable instructions, where the processor is configured to:

determine that a triggering operation is detected, where the triggering operation is for triggering a jump to the target application;

output a target audio generated by a network server according to the triggering operation, where the target audio is for carrying a jump request, the jump request includes a target application parameter, and the target application parameter includes at least an identifier of the target application;

extract the target application parameter from the target audio; and launch the target application according to the target application parameter.

Correspondingly, examples of the present disclosure provide an application interaction apparatus, including a processor and a memory for storing processor-executable instructions, where the processor is configured to:

receive a network request sent by a user terminal, where the network request is used to request a jump to the target application, and the network request carries association information corresponding to the target application;

acquire the target audio according to the association information, where the target audio is for carrying a jump request, the jump request includes a target application parameter, and the target application parameter includes at least an identifier of the target application; and push the target audio to the user terminal, so that after outputting the target audio, the user terminal may launch the target application according to the target application parameter extracted from the target audio.

Technical principles and effects of the present disclosure are further described below.

In the interaction method provided by the present disclosure, the current application for presenting a webpage, such as a browser, does not need to add an API (Application Programming Interface), for example, to be configured with the Deeplink technology. The target message can be carried in a carrier of a preset type and smoothly transmitted to the operating system, so that the operating system can extract the target parameter from the target message, and perform operations other than the operation corresponding to the type of the carrier of the target message according to the target parameter.

The type of the carrier carrying the target message corresponds to types of operating system capabilities that are accessible to the webpage in related art. In related art, preset communication protocols allow a browser or a network proxy service program to grant access of a limited variety of operating system capabilities to a web page. That is to say, in the related communication protocols, types of carriers of messages that the operating system can receive from a web page is limited, as shown in the above examples, including: a network request, a clipboard message, an image format file, and an audio format file.

A network request is taken as an example of the carrier type of the target message. In related art, when the network request outputted by the web page passes through the operating system, the operating system establishes a network connection with the designated network server according to the network request, communicates based on the network connection, and receives information returned by the network server according to the network request. In other words, in related art, the operations corresponding to the carrier type of a network request include: establishing a network connection, and acquiring request information.

In the present disclosure, after acquiring the target network request, the operating system may perform a target operation according to the target network request, such as launching a target application. The above target operation is different from the operations corresponding to the carrier type of a network request, i.e., establishing a network connection and acquiring request information. That is to say, the target operation is an operation other than the operations corresponding to the type of the carrier of the target message.

Similarly, in related art, if the type of the carrier of the target message is a clipboard message, the corresponding operation is writing information into clipboard cache. If the type of the carrier of the target message is an image format file, the corresponding operation is displaying image. If the type of the carrier of the target message is an audio format file, the corresponding operation is outputting audio. If the type of the carrier of the target message is a video format file, the corresponding operation is playing video. In the present disclosure, after acquiring the target message carried in the carriers described above, the operating system may perform operations other than the operations corresponding to the type of the carrier according to the target message, such as launching a target application or executing a command, such as shutting down, rebooting, start timer, etc., which is not limited in the present disclosure. For details on how to perform the target operation, reference can be made to related art, which belongs to capabilities of the operating system and/or the applications installed therein.

It can be seen that, in the present disclosure, by using a target message from a web page and carried in a carrier of limited types, the operating system is enabled to perform a target operation other than operations corresponding to the carriers of limited types such as transmitting a network request, displaying a image and/or text information, outputting audio information, playing video information, and acquiring a user's input. The operating system may be triggered by a web page to perform more operations, so that the functionality of a web page is enhanced and the user experience at the terminal is effectively improved.

It should be noted that, in the foregoing examples, modules, units, subunits, and the like having the same name should be distinguished according to their specific functions and reference numbers, and cannot be simply considered to have the same functions only because the names are identical.

For simplicity of description, the foregoing method examples are all expressed as a series of actions, but those skilled in the art should understand that the present disclosure is not limited by the described order of actions, because according to the present disclosure, some steps can be performed in a different order or at the same time.

In addition, those skilled in the art should also understand that the examples described in the specification are optional, and actions and modules involved are not necessarily required by the disclosure.

Correspondingly, examples of the present disclosure also provide an interaction apparatus applied to a user terminal, which includes a target message acquiring module, a parameter extracting module, and an operation performing module.

A target message acquiring module, configured to acquire a target message passing through an operating system, where the target message is from a web page and is used to instruct the operating system to perform a target operation.

As shown above, the target message acquiring module provided by the examples of the present disclosure may be any of the followings: the target message acquiring module 21; the connection establishing module 1-21 and the target request acquiring module 1-22; the connection establishing module 2-21 and the target message acquiring module 2-22; the connection establishing module 3-31 and the target message acquiring module 3-32; the connection establishing module 4-31 and the target message acquiring module; the clipboard message generating module 5-21 and the target message acquiring module 5-22; the triggering operation determining module 6-510 and the image outputting module 6-520; or, the triggering operation determining module 7-310 and the audio outputting module 7-320. Launching the target application is taken as an example, and the target message acquired by the target message acquiring module is for jumping to the target application. In practice, depending on different application scenarios, i.e., different target operations, the purpose and the content of the target message may be different accordingly, for example, executing a certain command. However, the manners in which the target message acquiring modules acquire the target messages are the same, and as to how the target message is acquired, reference may be made to the detailed description of corresponding modules in the above examples.

A parameter extracting module, configured to extract a target parameter from the target message.

Similarly, as shown above, the parameter extracting module may be any of the following: the parameter extracting module 22; the parameter extracting module 1-23; the parameter extracting module 2-23; the parameter extracting module 3-33; the parameter extracting module 4-33; the parameter extracting module 5-23; the extracting module 6-530; or the extracting module 7-330. Launching the target application is taken as an example, and the target parameter extracted by the parameter extracting from the target message module is a target application parameter. In practice, depending on different application scenarios, i.e., different target operations, the purpose and the content of the target message may be different accordingly, for example, executing a certain command. Thus, accordingly, the target parameter carried by the target message may be different. For example, in another example of the present disclosure, the target operation is performing a shutdown operation, and the target parameter may be a parameter related to the shutdown operation, such as a shutdown waiting time, a shutdown time information, and the like. With respect to the foregoing examples, although the target parameter changes, the manner in which the parameter extracting module extracts the target parameter from the target message is the same. As to how the target parameter is extracted, reference may be made to the detailed description of corresponding modules in the above examples.

An operation performing module, configured to perform the target operation according to the target parameter.

Similarly, when the target operation is launching the target application, the operation executing module may be the application jumping module 22 described above.

Depending on the different types of carriers of target messages, the operation executing module may be any of the following: the application jumping module 1-24; the application jumping module 2-24; the application jumping module 3-34; the application jumping module 4-34; and the application jumping module 5-24; the executing module 6-540; or the executing module 7-340. Same as described above, since the target operation in the present disclosure is not limited to opening the target application, the operation executing module may include, but is not limited to, the modules shown in the above examples.

Correspondingly, in the following apparatus examples, submodules and lower-level functional units included in the foregoing modules may be, but are not limited to, the corresponding functional modules, submodules, units, sub-units, etc. described in the above examples 1 to 7, details of which will not be redundantly described one by one.

In another apparatus example of the present disclosure, the target message acquiring module may include:

a message acquiring submodule, configured to acquire a message passing through an operating system;

a detecting submodule, configured to determine whether the message includes preset feature information, where the preset feature information includes a keyword or a preset encoding method; and a target determining submodule 2123, configured to determine the message as the target message when the message includes the preset feature information.

In another apparatus example of the present disclosure, the parameter extracting module may include:

a parameter extracting submodule, configured to extract target parameter from the target message by using a preset Message service, so as to acquire target parameter in a preset format.

In another apparatus example of the present disclosure, the parameter extracting submodule may include:

an information filtering unit, configured to remove the preset feature information from the target message, to acquire a filtered target message; and a parameter extracting unit, configured to extract the target parameter from the filtered target message by using a preset Message service.

In another apparatus example of the present disclosure, the parameter extracting module may include:

a verifying submodule, configured to perform information verification on the target message; and an extracting submodule, configured to extract the target parameter from the target message when the target message passes the information verification.

In another apparatus example of the present disclosure, the target message acquiring module may include:

a connection establishing module, configured to establish a virtual network connection between a current application which displays web pages and a preset virtual server;

a target request acquiring module, configured to acquire a target network request passing through the operating system through the virtual network connection; and a parameter extracting module, configured to extract a target parameter from the target network request.

In another apparatus example of the present disclosure, the connection establishing module may include:

a TCP connection establishing submodule 1-211, configured to establish a virtual TCP connection between a current application for displaying web pages and a preset virtual server; and The target request acquiring module, configured to acquire, a target HTTP request passing through an operating system through the virtual TCP connection.

In another apparatus example of the present disclosure, the TCP connection establishing submodule may include:

an address acquiring unit, configured to acquire an address of a virtual HTTP server according to the network request;

a first data acquiring unit, configured to acquire a handshake packet, where the handshake packet includes the address of the virtual HTTP server; and a first connection establishing unit, configured to establish a virtual TCP connection with the virtual HTTP server through the handshake packet.

In another apparatus example of the present disclosure, the address acquiring unit may include:

an address acquiring subunit, configured to extract an address of a virtual HTTP server from the network request;

a domain name acquiring subunit, configured to acquire a virtual domain name in the network request; and an address resolving subunit, configured to resolve an address of a corresponding virtual HTTP server according to the virtual domain name.

In another apparatus example of the present disclosure, the TCP connection establishing submodule may include:

a domain name acquiring unit, configured to acquire a virtual domain name in the network request; and an IP address resolving unit, configured to resolve the virtual domain name into a corresponding virtual IP address;

a second data acquiring unit, configured to acquire a TCP handshake packet, where the TCP handshake packet include the virtual IP address;

a data updating unit, configured to modify the virtual IP address in the TCP handshake packet to an address of a local HTTP server, so as to acquire an updated handshake packet; and a second connection establishing unit, configured to establish a virtual TCP connection with the virtual HTTP server through the updated handshake packet.

In another apparatus example of the present disclosure, the domain name acquiring unit may include:

a domain name acquiring subunit, configured to acquire domain name information in an HTTP address;

a searching subunit, configured to search a preset white list of virtual domain names according to the domain name; and a determining subunit, configured to determine, when the domain name information is in the preset white list, that the domain name information is a virtual domain name.

In another apparatus example of the present disclosure, a target request acquiring module configured to acquire a target network request passing through the operating system through the preset network interface.

In another apparatus example of the present disclosure, the connection establishing module may include:

a TCP connection establishing submodule, configured to establish a virtual TCP connection between a current application which displays web pages and a preset virtual server; and the target request acquiring module may include a target HTTP request acquiring submodule, configured to acquire, based on the virtual TCP connection and through a sending interface configured with a Hook function, a target HTTP request passing through an operating system.

In another apparatus example of the present disclosure, the TCP connection establishing submodule may include:

a virtual domain name acquiring unit, configured to acquire a virtual domain name according to the network request;

a virtual IP determining unit, configured to resolve the virtual domain name into a corresponding virtual IP address through the first preset domain name resolving interface, and return the virtual IP address to the current application;

a virtual address sending unit, configured to send the virtual IP address to a first preset network connection interface;

an address converting unit, configured to convert the virtual IP address to an address of the local HTTP server, and send a TCP handshake packet; and a first connection establishing unit, configured to establish a virtual TCP connection with the virtual HTTP server through the TCP handshake packet.

In another apparatus example of the present disclosure, the TCP connection establishing submodule may include:

a virtual domain name acquiring unit, configured to acquire a virtual domain name according to the network request;

an address resolving unit, configured to resolve the virtual domain name into an address of the virtual HTTP server through the second domain name resolving interface, and return the address of the virtual HTTP server to the current application;

an address sending unit, configured to send the address of the virtual HTTP server to a network connection interface;

a handshake data sending unit, configured to send a TCP handshake packet through the network connection interface, where the TCP handshake packet includes the address of the virtual HTTP server; and a second connection establishing unit, configured to establish a virtual TCP connection with the virtual HTTP server through the TCP handshake packet.

In another apparatus example of the present disclosure, the TCP connection establishing submodule may include:

an address acquiring unit, configured to acquire an address of a virtual HTTP server according to the network request, and send the address of the virtual HTTP server to a network connection interface;

a handshake data sending unit, configured to send a TCP handshake packet through the network connection interface, where the TCP handshake packet includes the address of the virtual HTTP server; and a third connection establishing unit, configured to establish a virtual TCP connection with the virtual HTTP server through the TCP handshake packet.

In another apparatus example of the present disclosure, the virtual domain name acquiring unit may include:

a domain name acquiring subunit, configured to acquire domain name information in an HTTP address;

a searching subunit, configured to search a preset white list of virtual domain names according to the domain name; and a determining subunit, configured to determine, when the domain name information is in the preset white list, that the domain name information is a virtual domain name.

In another apparatus example of the present disclosure, the parameter extracting module may include:

a first parameter extracting submodule, configured to extract the target parameter from the target network request through a preset network sending interface.

In another apparatus example of the present disclosure, the parameter extracting module may include:

a first sending submodule, configured to send the target network request to the preset Message service through the preset network sending interface; or a second sending submodule, configured to send the target network request to the preset Message service through successively the network sending interface, the firewall and the virtual HTTP server; and a second parameter extracting submodule, configured to extract the target parameter in the target network request by the preset Message service.

In another apparatus example of the present disclosure, the first sending submodule may include a forwarding subunit, configured to forward the target network request to the Message service through the preset network sending interface; or a copy sending subunit, configured to make a copy of the target network request through the preset network sending interface, and send the copy of target network request to the Message service.

In another apparatus example of the present disclosure, the apparatus may further include:

a connection establishing module, configured to establish a network connection between a current application which displays web pages and a network server; and the target message acquiring module, configured to acquire the target message passing through an operating system through the network connection.

In another apparatus example of the present disclosure, the target message acquiring module may include:

a message acquiring submodule, configured to acquire a message passing through an operating system, where the message includes: a network request sent by the current application to the network server, or a response message returned by the network server according to the network request; and a monitoring submodule, configured to determine the target message from the message by a preset monitoring component.

In another apparatus example of the present disclosure, the monitoring component is a firewall component.

In another apparatus example of the present disclosure, a target message acquiring module configured to acquire a target message passing through the operating system through the preset network interface.

In another apparatus example of the present disclosure, the target message acquiring module may include:

a first target acquiring submodule, configured to acquire, through a preset sending interface, a target network request passing through an operating system.

In another apparatus example of the present disclosure, the target message acquiring module may include:

a second target acquiring submodule, configured to acquire a target response message returned by the network server according to the network request through a preset receiving interface.

In another apparatus example of the present disclosure, the second target acquiring submodule may include:

a request sending unit, configured to send a preset network request to the network server, where the preset network request is used to request the network server to send a target response message to the user terminal;

a second message acquiring unit, configured to receive a network response message through a preset receiving interface, where the network response message is a response message returned by the network server according to the network request;

a second monitoring unit, configured to determine whether the network response message includes preset feature information; and a second target determining unit, configured to determine the network response message as the target response message when the network response message includes the preset feature information.

In another apparatus example of the present disclosure, the parameter extracting module may be configured to extract the target parameter from the target message through a preset network interface.

In another apparatus example of the present disclosure, the parameter extracting module may include:

a target sending submodule, configured to send the target message to the preset Message service through a preset network interface; and a second parameter extracting submodule, configured to extract the target parameter from the target message by the preset Message service.

In another apparatus example of the present disclosure, the target sending submodule may include:

a first sending unit, configured to send the target message to the preset Message service; and a second sending unit, configured to make a copy of the target message, and send the copy of the target message to the Message service.

In another apparatus example of the present disclosure, the apparatus may further include:

a clipboard message generating module, configured to store the target message to the clipboard when a current application which displays webpages detects a preset triggering condition; and the target message acquiring module, configured to acquire the target message by a preset clipboard monitoring service;

In another apparatus example of the present disclosure, the target message acquiring module may include:

a first target acquiring submodule, configured to acquire the target message by the preset clipboard monitoring service when invoking the clipboard interface to write the target message to the clipboard; or, a second target acquiring submodule, configured to acquire the target message by the preset clipboard monitoring service after the target message is written into the clipboard.

In another apparatus example of the present disclosure, the parameter extracting module may be configured to extract the target parameter from the target message through the preset clipboard monitoring service.

In another apparatus example of the present disclosure, the target message acquiring module may include:

a triggering operation determining module, configured to determine that a triggering operation is detected, where the triggering operation is for triggering the operating system to perform a target operation;

an image outputting module, configured to output a target image generated by the network server or the user terminal according to the triggering operation, where the target image is for carrying a target parameter; and a parameter extracting module, configured to extract the target parameter from the target image.

In another apparatus example of the present disclosure, the image outputting module may include:

a network request generating submodule, configured to generate a network request according to the triggering operation, where the network request carries association information corresponding to the target operation;

a sending submodule, configured to send the network request to the network server through a network connection established in advance with the network server, so that the network server may acquire the target image according to the association information;

a receiving submodule, configured to receive the target image pushed by the network server; and a first outputting submodule, configured to output the target image generated by the network server.

In another apparatus example of the present disclosure, the image outputting module may include:

an image generating submodule, configured to determine the target pixel value according to the association information corresponding to the target operation by using a JS script associated with the triggering operation, and invoke a drawing API to generate a target image corresponding to the target pixel value; and a second outputting submodule, configured to output the target image generated by the user terminal.

In another apparatus example of the present disclosure, the association information may further include:

a URL address, or operation instructing information, where the operation instructing information may include parameter acquisition instructing information for acquiring the target parameter.

In another apparatus example of the present disclosure, the image generating submodule may include:

a first acquiring unit, configured to acquire a target pixel value corresponding to the target character included in the URL address according to a correspondence between preset characters and pixel values, if the association information includes a URL address;

a second acquiring unit, configured to acquire a target pixel difference value corresponding to the target character included in the URL address according to a preset correspondence between preset characters and the pixel difference values; and a first determining unit, configured to acquire a target pixel value, where the target pixel difference value is the difference between target pixel values corresponding to two pixels whose relative positions satisfy a preset positional requirement.

In another apparatus example of the present disclosure, the image generating submodule may include:

a third acquiring unit, configured to acquire the target parameter corresponding to the parameter acquisition instructing information according to the correspondence between parameter acquisition instructing information and operation parameters, if the association information includes the operation instructing information;

a fourth acquiring unit, configured to acquire the target pixel value corresponding to the target application parameter according to a correspondence between operation parameters and pixel values; and a fifth acquiring unit, configured to acquire the target pixel value after acquiring the target pixel difference value corresponding to the target parameter according to a correspondence between operation parameters and the pixel difference values, where a difference between target pixel values corresponding to two pixels whose relative positions satisfy a preset positional requirement is the target pixel difference value.

In another apparatus example of the present disclosure, the parameter extracting module may include:

a first acquiring submodule, configured to perform a pixel scan on the current screen image including the target image, and acquire pixel values corresponding to pixels of each row of the target image;

a second converting submodule, configured to convert pixel values corresponding to pixels of each row into values in a number sequence one by one;

a first searching submodule, configured to search for a preamble in the number sequence, where the preamble is for identifying a starting position of a target feature sequence corresponding to the target parameter;

a second searching submodule, configured to locate the target feature sequence in the number sequence according to the preamble; and a third determining submodule, configured to determine the target parameter according to the feature sequence.

In another apparatus example of the present disclosure, the second converting submodule may include any of the following units:

a second determining unit, configured to take pixel values corresponding to pixels of each row directly as values constituting the number sequence; or a third determining unit, configured to take pixel difference values between two pixels whose relative positions satisfy a preset positional requirement as values constituting the number sequence.

In another apparatus example of the present disclosure, the target message acquiring module may include:

a triggering operation determining module, configured to determine that a triggering operation is detected, where the triggering operation is for triggering the operating system to perform a target operation;

an audio outputting module, configured to output a target audio generated by the server according to the triggering operation, where the target audio is for carrying a target parameter; and a parameter extracting module, configured to extract the target parameter from the target audio.

In another apparatus example of the present disclosure, the audio outputting module may include:

a network request generating submodule, configured to generate a network request according to the triggering operation, where the network request is for requesting performing the target operation, and the network request carries association information corresponding to the target operation;

a sending submodule, configured to send the network request to the network server through a network connection established in advance with the network server;

a receiving submodule, configured to receive the target audio pushed by the network server, where the target audio is acquired by the network server according to the association information; and a first outputting submodule, configured to output the target audio through a sound outputting device.

In another apparatus example of the present disclosure, the sound outputting device includes a Bluetooth sound outputting device, a speaker or a preset virtual sound outputting device.

In another apparatus example of the present disclosure, the parameter extracting module may include:

an extracting submodule, configured to extract a plurality of audio parameter values from the target audio by using a preset processing module;

a converting submodule, configured to convert the plurality of the target audio parameter values into target numbers one by one according to a correspondence between preset audio parameter values and numbers; and a third determining submodule, configured to determine the target parameter according to the feature sequence composed of a plurality of target numbers.

In another apparatus example of the present disclosure, the third determining submodule may include:

a first searching unit, configured to search for a preamble in the number sequence composed of a plurality of target numbers, where the preamble is for identifying a starting position of a target feature sequence corresponding to the target parameter;

a second searching unit, configured to locate the target feature sequence in the number sequence according to the preamble; and a determining submodule, configured to determine the target parameter according to the feature sequence.

In another apparatus example of the present disclosure, the first searching unit may include:

a searching subunit, configured to search in the number sequence for a series of values that matches the values included in the target array; and a first determining subunit, configured to take the series of values in the number sequence that matches the values included in the target array as the preamble if there is a series of values in the number sequence that matches the values included in the target array, where the target array may be composed of preset values of a first preset number.

In another apparatus example of the present disclosure, the second searching unit may include:

a second determining subunit, configured to take a value in the number sequence immediately after the preamble as the starting value of the target feature sequence; and an acquiring subunit, configured to excerpt values of a second preset number in the number sequence starting from the starting value to acquire the target feature sequence.

In another apparatus example of the present disclosure, the second determining unit may include:

a third determining subunit, configured to determine the target parameter corresponding to the target feature sequence according to a correspondence between pre-stored feature sequences and operation parameters.

In another apparatus example of the present disclosure, the apparatus may further include:

an acquiring module, configured to excerpt values of a preset third number starting from the first value immediately after the target feature sequence, so as to acquire a verification sequence;

a verifying module, configured to verify the target feature sequence by the verification sequence, so as to acquire a verification result; and a controlling module, configured to execute the steps of the target operation according to the target application parameter if the verification result is passing the verification.

In another apparatus example of the present disclosure, the verifying module may include:

a calculating submodule, configured to calculate all values of the verification sequence and of the target feature sequence may according to a preset calculation method, so as to acquire a target value; and a fourth determining submodule, configured to determine that the verification result is passing the verification if the target number is identical with a preset value, otherwise the verification result is failing the verification.

In another apparatus example of the present disclosure, the triggering operation determining module may include:

a fifth determining submodule, configured to determine that a trigger operation is detected when an audio is played;

the audio outputting module may include:

a second outputting submodule, configured to output the target audio through a preset virtual sound outputting device according to the triggering operation.

In another apparatus example of the present disclosure, the target operation is launching a target application, and the target parameter includes at least an identifier of the target application;

the operation executing module, configured to launch the target application according to a target application parameter.

In another apparatus example of the present disclosure, the operation executing module may include:

a detecting submodule, configured to determine, according to the identifier of the target application, whether the target application has been installed locally;

an installing submodule, configured to download and install, when the target application has not been installed locally, the target application; and a jumping submodule, configured to launch the target application according to the target application parameter through a preset application platform.

Examples of the present disclosure further provide an interaction apparatus disposed in a network server, which includes:

a network connection module, configured to establish a network connection with a current application which displays web pages;

a target request acquiring module, configured to acquire a target network request sent by the current application through the network connection;

a response module, configured to generate a target response message according to the target network request, where the target response message is for instructing the operating system of the user terminal to perform the target operation; and a sending module, configured to send the target response message to the user terminal running the current application, so that the target response message is identified and analyzed when passing through the operating system, and the target operation is performed by using the target parameter obtained from analysis.

In another apparatus example of the present disclosure, the target request acquiring module may include:

a request receiving submodule, configured to receive a network request sent by the current application through the network connection;

a first target determining submodule, configured to determine, when the network request includes the preset operation instructing information, the network request as the target network request; and a second target determining submodule, configured to determine, when the network request includes the target parameter, the network request as the target network request.

In another apparatus example of the present disclosure, the response module may include:

an operation parameter determining submodule, configured to determine operation information parameter according to the target network request, where the operation information parameter include a target parameter;

similarly, if the target operation is launching the target application, the operation parameter determining submodule may be the jump parameter determining module 4-131 described above. That is, in the apparatus example, the operation parameter determining submodule includes, but is not limited to, the jump parameter determining submodule 4-131 described above.

a response message generating submodule, configured to generate a target response message according to the operation information parameter, where the target response message includes the target parameter and preset feature information.

In another apparatus example of the present disclosure, the operation parameter determining submodule may include:

a parameter determining unit, configured to determine the target parameter according to the target network request;

for example, if the target operation is launching the target application, the parameter determining unit may be the application parameter determining unit 4-4311 described above. Similarly, since the target operation is not limited to launching the target application in the apparatus example, the parameter determining unit includes, but is not limited to, the application parameter determining unit 4-4311 described above.

a remaining parameter determining unit, configured to determine a remaining operation information parameter according to the target parameter, where the remaining operation information parameter includes preset feature information for identifying a target response message to be generated, and/or, the sending method of the target response message to be generated.

Similarly, the remaining parameter determining unit may include, but is not limited to, the remaining parameter determining unit 4-4312 described above.

The sending module is configured to send the target response message to the user terminal running the current application when the remaining operation parameter includes the sending method, which includes: sending the target response message to the operating system of the user terminal according to the sending method of the target response message.

In another apparatus example of the present disclosure, the remaining parameter determining unit may include:

a security information searching subunit, configured to search a preset list according to the target parameter to acquire the target security classification information corresponding to the target parameter, where the preset list includes a correspondence between operation parameters and security classification information; and a remaining parameter determining subunit, configured to determine the remaining operation information parameter according to the target security classification information.

In another apparatus example of the present disclosure, the operation parameter determining submodule may include:

an analyzing unit, configured to analyze the target network request to obtain request data, where the request data include preset operation instructing information; and operation parameter determining unit, configured to acquire the operation information parameter according to the preset operation instructing information.

In another apparatus example of the present disclosure, the operation parameter determining unit is configured to search a preset response list according to the preset operation instructing information, and acquire the operation information parameter corresponding to the preset operation instructing information, where the preset response list includes a correspondence between preset operation instructing information and operation information parameters, and the preset operation instructing information at least includes parameter acquisition instructing information for acquiring the target parameter.

In another apparatus example of the present disclosure, the preset operation instructing information may include parameter acquisition instructing information, feature loading instructing information and sending method instructing information;

the operation parameter determining unit includes:

a first parameter determining subunit, configured to determine the target parameter according to the parameter acquisition instructing information;

a second parameter determining subunit, configured to determine the preset feature information for identifying the target response message according to the feature loading instructing information; and a third parameter determining subunit, configured to determine a method of sending the target response message according to the sending method instructing information.

The sending module is configured to send the target response message to the operating system of the user terminal according to the sending method of the target response message.

In another apparatus example of the present disclosure, the operation parameter determining submodule may include:

an analyzing unit, configured to analyze the target network request to obtain request data, where the request data include preset operation information; and a parameter searching unit, configured to acquire the target application parameter by searching a preset operation list according to the preset operation information, where the preset operation list includes a correspondence between preset operation information and target parameters.

It should be noted that if the target operation is launching the target application, the apparatus provided by this example is similar to the apparatus examples shown in FIGS. 5-22 to 5-28. Similarly, since the interaction apparatus in the examples of the present disclosure is not limited to be used for opening the target application, the interaction apparatus provided by the examples of the present disclosure may include, but is not limited to, the apparatus examples described above.

Examples of the present disclosure further provide another interaction apparatus disposed in a network server, which includes:

a receiving module, configured to receive a network request sent by a user terminal, where the network request is for requesting the operating system of the user terminal to perform a target operation, and the network request carries association information corresponding to the target operation;

an image acquiring module, configured to acquire the target image according to the association information, where the target image is for carrying a target parameter; and a pushing module, configured to push the target image to the user terminal, so that after outputting the target image, the user terminal may perform the target operation according to the target parameter extracted from the target image.

In another apparatus example of the present disclosure, the image acquiring module may include:

a second acquiring submodule, configured to acquire a target pixel value corresponding to the association information and carried in the network request according to a correspondence between association information and pixels;

an image generating submodule, configured to generate a target image in real time according to the target pixel; or an image searching submodule, configured to search for the target image including the target pixels in pre-generated images according to the target pixel values, where the target pixels are pixels whose pixel values are the target pixel values.

In another apparatus example of the present disclosure, the association information may include: a URL address of the target application, or instructing information, where the instructing information may include parameter acquisition instructing information for acquiring the target parameter.

In another apparatus example of the present disclosure, the second acquiring submodule may include:

a seventh acquiring unit, configured to acquire a target pixel value corresponding to the target character in the URL address according to a correspondence between characters and pixel values, if the association information carried in the network request includes a URL address; or an eighth acquiring unit, configured to acquire a target pixel difference value corresponding to the target character in the URL address according to a preset correspondence between characters and pixel difference values;

a ninth acquiring unit, configured to acquire a target pixel value, where the target pixel difference value is the difference between target pixel values corresponding to two pixels whose relative positions satisfy a preset positional requirement.

In another apparatus example of the present disclosure, the second acquiring submodule may include:

a tenth acquiring unit, configured to acquire the target parameter corresponding to the parameter acquisition instructing information according to a correspondence between parameter acquisition instructing information and operation parameters, if the association information carried in the network request includes the instructing information; and an eleventh acquiring unit, configured to acquire the target pixel value corresponding to the target application parameter according to a correspondence between operation parameters and pixel values.

In another apparatus example of the present disclosure, the second acquiring submodule may include:

a twelfth acquiring unit, configured to acquire the target parameter corresponding to the parameter acquisition instructing information according to a correspondence between parameter acquisition instructing information and operation parameters, if the association information carried in the network request includes the instructing information;

a thirteenth acquiring unit, configured to acquire the target pixel difference value corresponding to the target application parameter according to a correspondence between operation parameters and pixel difference values; and a fourteenth acquiring unit, configured to acquire a target pixel value according to the target pixel difference value, where the target pixel difference value is the difference between target pixel values corresponding to two pixels whose relative positions satisfy a preset positional requirement.

It should be noted that when the target operation is launching the target application, the apparatus provided by this example is similar to the apparatus examples shown in FIGS. 7-25 to 7-29. Similarly, since the interaction apparatus in the examples of the present disclosure is not limited to be used for opening the target application, the interaction apparatus provided by the examples of the present disclosure may include, but is not limited to, the apparatus examples described above.

In another aspect, the present disclosure further provides an interaction apparatus, where the apparatus is applied to a network server and includes: a receiving module, configured to receive a network request sent by a user terminal, where the network request is for requesting the operating system of the user terminal to perform a target operation, and the network request carries association information corresponding to the target operation;

an audio acquiring module, configured to acquire the target audio according to the association information, where the target audio is for carrying a target parameter; and a pushing module, configured to push the target audio to the user terminal, so that after outputting the target audio, the user terminal may perform the target operation according to the target parameter extracted from the target audio.

In another interaction apparatus of the present disclosure, the audio acquiring module may include:

a fourth acquiring submodule, configured to acquire a audio parameter value corresponding to the association information and carried in the network request according to a correspondence between association information and audio parameter values;

an audio generating submodule, configured to generate a target audio in real time according to the target audio parameter; or an audio searching submodule, configured to search for a target audio which has a parameter value identical to the target audio parameter value in pre-generated audios according to the target audio parameter value.

In another apparatus example of the present disclosure, the association information may include: a URL address, or instructing information, where the instructing information include at least parameter acquisition instructing information for acquiring the target parameter.

In another apparatus example of the present disclosure, the fourth acquiring submodule may include:

a first acquiring unit, configured to acquire a target audio parameter value corresponding to the character in the URL address according to a correspondence between characters and audio parameter values, if the association information carried in the network request includes a URL address.

In another apparatus example of the present disclosure, the fourth acquiring submodule may include:

a second acquiring unit, configured to acquire the target parameter corresponding to the parameter acquisition instructing information according to a correspondence between parameter acquisition instructing information and operation parameters, if the association information carried in the network request includes the instructing information; and a third acquiring unit, configured to acquire the target audio parameter value corresponding to the target parameter according to a correspondence between operation parameters and audio parameter values.

It should be noted that when the target operation is launching the target application, the apparatus provided by this example is similar to the apparatus examples shown in FIGS. 8-28 to 8-31. Similarly, since the interaction apparatus in the examples of the present disclosure is not limited to be used for opening the target application, the interaction apparatus provided by the examples of the present disclosure may include, but is not limited to, the apparatus examples described above.

Since the apparatus examples basically correspond to the method examples, reference may be made to the description of the method examples for related information. The apparatus examples described above are merely illustrative, wherein the units described as separate components may or may not be physically separated, and the components displayed as units may or may not be physical units, i.e., they may be located at the same location or distributed to multiple network units. Part or all of the modules may be selected according to actual needs to achieve the purposes of the present disclosure. Those of ordinary skill in the art can understand and implement the present disclosure without any creative effort.

Correspondingly, examples of the present disclosure further provide a computer readable storage medium, where the storage medium stores a computer program, and the computer program is for executing any of the application interaction methods or interaction methods applied to a user terminal.

Correspondingly, examples of the present disclosure further provide a computer readable storage medium, where the storage medium stores a computer program, and the computer program is for executing any of the application interaction methods or interaction methods applied to a server.

Correspondingly, the present disclosure provides an interaction apparatus, including a processor and a memory for storing processor-executable instructions, where the processor is configured to:

acquiring a target message passing through an operating system, where the target message is from a web page and is used to instruct the operating system to perform a target operation;

extracting a target parameter from the target message; and performing the target operation according to the target parameter.

In another aspect, the present disclosure provides an interaction apparatus, including a processor and a memory for storing processor-executable instructions, where the processor is configured to:

establishing a network connection with the current application which displays web pages;

acquiring a target network request sent by the current application through the network connection;

generating a target response message according to the target network request, where the target response message is for instructing the operating system of the user terminal to perform the target operation; and sending the target response message to the user terminal running the current application, so that the target response message is identified and analyzed when passing through the operating system, and performing the target operation by using the target parameter obtained from analysis.

In another aspect, the present disclosure provides an interaction apparatus, including a processor and a memory for storing processor-executable instructions, where the processor is configured to:

receiving a network request sent by a user terminal, where the network request is for requesting the operating system of the user terminal to perform a target operation, and the network request carries association information corresponding to the target operation;

acquiring the target image according to the association information, where the target image is for carrying a target parameter; and pushing the target image to the user terminal, so that after outputting the target image, the user terminal may perform the target operation according to the target parameter extracted from the target image.

In another aspect, the present disclosure provides an interaction apparatus, including a processor and a memory for storing processor-executable instructions, where the processor is configured to:

receiving a network request sent by a user terminal, where the network request is for requesting the operating system of the user terminal to perform a target operation, and the network request carries association information corresponding to the target operation;

acquiring the target audio according to the association information, where the target audio is for carrying a target parameter; and pushing the target audio to the user terminal, so that after outputting the target audio, the user terminal may perform the target operation according to the target parameter extracted from the target audio.

FIG. 9-1 is a structural diagram of an interaction apparatus 3200 according to an example. For example, the apparatus 3200 may be a user equipment, specifically a mobile phone, a computer, a digital broadcast terminal, a message sending and receiving device, a game console, a tablet device, a medical device, a fitness device, a personal digital assistant, a wearable device such as a smart watch, and smart glasses, a smart bracelet, smart running shoes, etc.

With reference to FIG. 9-1, the apparatus 3200 may include one or more of the following components: a processing component 3202, a memory 3204, a power component 3206, a multimedia component 3208, an audio component 3210, an input/output (I/O) interface 3212, a sensor component 3214, and a communication component 3216.

The processing component 3202 typically controls the overall operation of the apparatus 3200, such as operations associated with display, telephone calls, data communication, camera operations, and recording operations. The processing component 3202 may include one or more processors 3220 to execute instructions to perform all or part of the steps of the methods described above. Moreover, the processing component 3202 may include one or more modules to facilitate interaction between the processing component 3202 and other components. For example, the processing component 3202 may include a multimedia module to facilitate interaction between the multimedia component 3208 and the processing component 3202.

The memory 3204 is configured to store various types of data to support operation at the apparatus 3200. Examples of such data include instructions for any application or method operating on the apparatus 3200, contact data, phone book data, messages, pictures, videos, and the like. The memory 3204 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 3206 provides power to various components of the apparatus 3200. The power component 3206 may include a power management system, one or more power sources, and other components associated with generating, managing, and distributing power for the apparatus 3200.

The multimedia component 3208 includes a screen between the apparatus 3200 and the user that provides an output interface. In some examples, the screen may include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor described above may sense not only the boundary of the touch or slide action but also the duration and pressure associated with the touch or slide operation described above. In some embodiments, the multimedia component 3208 includes a front camera and/or a rear camera. When the apparatus 3200 is in an operation mode, such as a shooting mode or a video mode, the front camera and/or the rear camera can receive external multimedia data. Each front and rear camera can be a fixed optical lens system or have focal length and optical zoom capabilities.

The audio component 3210 is configured to output and/or input an audio signal. For example, the audio component 3210 includes a microphone (MIC) that is configured to receive an external audio signal when the apparatus 3200 is in an operational mode, such as a call mode, a recording mode, and a voice recognition mode. Audio signals received may be further stored in the memory 3204 or transmitted via the communication component 3216. In some embodiments, the audio component 3210 further includes a speaker for outputting audio signals.

The I/O interface 3212 provides an interface between the processing component 3202 and peripheral interface modules, which may be a keyboard, a click wheel, a button, or the like. These buttons may include, but are not limited to, a home button, a volume button, a start button, and a lock button.

The sensor component 3214 includes one or more sensors for providing a status assessment of various aspects to the apparatus 3200. For example, the sensor component 3214 may detect an on/off state of the apparatus 3200, relative positioning of components, where the components may be the display and keyboard of the apparatus 3200. The sensor component 3214 may also detect a change in position of the apparatus 3200 itself or a component thereof, presence or absence of user contact with the apparatus 3200, orientation or acceleration/deceleration of the apparatus 3200 and temperature change of the apparatus 3200. The sensor component 3214 may include a proximity sensor configured to detect the presence of nearby objects without any physical contact. The sensor component 3214 may also include a light sensor, such as a CMOS or CCD image sensor, for use in imaging applications. In some embodiments, the sensor component 3214 may also include an acceleration sensor, a gyro sensor, a magnetic sensor, a pressure sensor, or a temperature sensor.

The communication component 3216 is configured to facilitate wired or wireless communication between the apparatus 3200 and other devices. The apparatus 3200 can access a wireless network based on a communication standard, such as WiFi, 2G or 3G, or a combination thereof. In an example, the communication component 3216 receives broadcast signals or broadcast associated information from an external broadcast management system via a broadcast channel. In an example, the communication component 3216 may further include a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an example, the apparatus 3200 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component for performing any of the above-described application interaction methods or interaction methods applied to a user terminal.

FIG. 10-1 is a structural diagram of an interaction apparatus 3300 according to an example. For example, the apparatus 3300 may be provided as a web server. Referring to FIG. 10-1, the apparatus 3300 includes a processing component 3322 which further includes one or more processors, and memory resources represented by a memory 3342 for storing instructions executable by the processing component 3322, such as an application. The application stored in memory 3342 may include one or more modules each corresponding to a set of instructions. Further, the processing component 3322 is configured to execute instructions to perform the method of controlling smart home devices described above.

The apparatus 3300 can also include a power component 3326 configured to perform power management for the apparatus 3300, a wired or wireless network interface 3350 configured to connect apparatus 3300 to the network, and an input/output (I/O) interface 3358. The apparatus 3300 can be based on an operating system stored in the memory 3342, such as Android, iOS, Windows Server™, Mac OS X™, Unix™, Linux™, FreeBSD™ or the like.

When the instructions in memory 3342 are executed by the processing component 3322, the apparatus 3300 is enabled to perform any of the above-described application interaction methods or interaction methods applied to a server.

Other examples of the present disclosure will be apparent to those skilled in the art after considering the specification and implement the invention disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative only, and true scope and spirit of the present disclosure is indicated by the claims below.

It is to be understood that the disclosure is not limited to the detailed structures described above and shown in the appended drawings, and is subject to various modifications and changed within its scope. The scope of the present disclosure is to be limited only by the appended claims.

The invention claimed is:

1. An application interaction method, comprising:
acquiring a target message passing through an operating system of a user terminal, wherein the target message instructs a jump from a current application to a target application;
extracting a target application parameter from the target message, wherein the target application parameter comprises at least an identifier of the target application; and
launching the target application according to the target application parameter,
wherein acquiring the target message passing through the operating system comprises:
establishing a virtual network connection between the current application and a virtual server preset in the user terminal; and
acquiring the target message passing through the operating system via the virtual network connection; and wherein acquiring the target message passing through the operating system further comprises:

receiving a triggering operation of a user on a preset interface element in an interface of the current application, wherein the triggering operation triggers the current application to send a message passing through the operating system;

acquiring the message passing through the operating system;

determining whether the message comprises preset feature information, wherein the preset feature information comprises a keyword or a preset encoding method; and determining the message as the target message based on a determination that the message comprises the preset feature information, wherein the message passing through the operating system comprises a network request; and the message passing through the operating system is acquired by at least one of:

monitoring a network request sent by a browser; or monitoring a network request sent by a network proxy service.

2. The method according to claim 1, wherein receiving the triggering operation of the user on the preset interface element in the interface of the current application comprises:

receiving a triggering operation of the user on a preset interface element in an interface of a first type application, wherein downloading and installation of the first type application require confirmation from the user.

3. The method according to claim 1, wherein extracting a target application parameter from the target message comprises: extracting the target application parameter from the target message through a preset message service, and acquiring the target application parameter in a preset format.

4. An application interaction apparatus, comprising:
a processor; and
a memory for storing instructions executable by the processor,
wherein the processor is configured to:
acquire a target message passing through an operating system of a user terminal, wherein the target message instructs a jump from a current application to a target application;
extract a target application parameter from the target message, wherein the target application parameter comprises at least an identifier of the target application; and
launch the target application according to the target application parameter,
wherein in acquiring the target message passing through the operating system, the processor is further configured to:
establish a virtual network connection between the current application and a virtual server preset in the user terminal; and
acquire the target message passing through the operating system via the virtual network connection; and
wherein in acquiring the target message passing through the operating system, the processor is further configured to:
receive a triggering operation of a user on a preset interface element in an interface of the current application, wherein the triggering operation triggers the current application to send a message passing through the operating system;
acquire the message passing through the operating system;
determine whether the message comprises preset feature information, wherein the preset feature information comprises a keyword or a preset encoding method; and
determine the message as the target message based on a determination that the message comprises the preset feature information,
wherein the message passing through the operating system comprises a network request; and the processor is configured to acquire the message passing through the operating system by at least one of:
monitoring a network request sent by a browser; or
monitoring a network request sent by a network proxy service.

5. The apparatus according to claim 4, wherein to receive the triggering operation of the user on the preset interface element in the interface of the current application, the processor is configured to:
receive a triggering operation of the user on a preset interface element in an interface of a first type application, wherein downloading and installation of the first type application require confirmation from the user.

6. The apparatus according to claim 4, wherein to extract a target application parameter from the target message, the processor is configured to: extract the target application parameter from the target message through a preset message service, and acquire the target application parameter in a preset format.

7. The apparatus according to claim 4, wherein to extract a target application parameter from the target message, the processor is configured to:
remove the preset feature information from the target message, to acquire a filtered target message; and
extract the target application parameter from the filtered target message.

8. The apparatus according to claim 4, wherein to extract a target application parameter from the target message, the processor is configured to:
perform information verification on the target message; and
extract the target application parameter from the target message when the target message passes the information verification.

9. The apparatus according to claim 6, wherein to extract the target application parameter from the target message through a preset message service, the processor is configured to:
intercept the target message, and send the intercepted target message to the preset message service; or
make a copy of the target message, and send the copy of target message to the preset message service; and
extract the target application parameter from the target message through the preset message service.

10. The apparatus according to claim 4, wherein to launch the target application according to the target application parameter, the processor is configured to:
determine whether the target application has been installed locally according to the identifier of the target application; and
launch the target application according to the target application parameter through a preset application platform.

11. A non-transitory computer-readable storage medium having stored thereon a computer program that causes a processor to perform:

acquiring a target message passing through an operating system of a user terminal, wherein the target message instructs a jump from a current application to a target application;

extracting a target application parameter from the target message, wherein the target application parameter comprises at least an identifier of the target application; and launching the target application according to the target application parameter, wherein acquiring the target message passing through the operating system, comprises:

establishing a virtual network connection between the current application and a virtual server preset in the user terminal; and acquiring the target message passing through the operating system via the virtual network connection; and wherein acquiring the target message passing through the operating system further comprises:

receiving a triggering operation of a user on a preset interface element in an interface of the current application, wherein the triggering operation triggers the current application to send a message passing through the operating system;

acquiring the message passing through the operating system;

determining whether the message comprises preset feature information, wherein the preset feature information comprises a keyword or a preset encoding method; and determining the message as the target message based on a determination that the message comprises the preset feature information, wherein the message passing through the operating system comprises a network request; and the message passing through the operating system is acquired by at least one of:

monitoring a network request sent by a browser; or monitoring a network request sent by a network proxy service.

12. The computer readable storage medium according to claim 11, wherein receiving the triggering operation of the user on the preset interface element in the interface of the current application comprises:

receiving a triggering operation of the user on a preset interface element in an interface of a first type application, wherein downloading and installation of the first type application require confirmation from the user.

\* \* \* \* \*